US012405700B2

(12) United States Patent
Paul et al.

(10) Patent No.: US 12,405,700 B2
(45) Date of Patent: Sep. 2, 2025

(54) USER INTERFACES FOR MANAGING VISUAL CONTENT IN MEDIA

(71) Applicant: Apple Inc., Cupertino, CA (US)

(72) Inventors: Grant R. Paul, San Francisco, CA (US); Steven D. Baker, Palo Alto, CA (US); Brandon J. Corey, Palo Alto, CA (US); Neil G. Crane, San Francisco, CA (US); Matthias Dantone, Redwood City, CA (US); Nathan De Vries, Alameda, CA (US); Craig M. Federighi, Los Altos Hills, CA (US); James N. Jones, San Francisco, CA (US); Xishuo Liu, Palo Alto, CA (US); Johnnie B. Manzari, San Francisco, CA (US); Sebastien V. Marineau-Mes, San Francisco, CA (US); Pulah J. Shah, Cupertino, CA (US); Andre Souza Dos Santos, San Jose, CA (US); Srinivasan Venkatachary, Sunnyvale, CA (US); Yang Zhao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/611,216

(22) Filed: Mar. 20, 2024

(65) Prior Publication Data

US 2024/0256100 A1 Aug. 1, 2024

Related U.S. Application Data

(63) Continuation of application No. 18/125,070, filed on Mar. 22, 2023, now Pat. No. 12,001,642, which is a
(Continued)

(51) Int. Cl.
*G06F 3/048* (2013.01)
*G06F 3/0481* (2022.01)
(Continued)

(52) U.S. Cl.
CPC ........ *G06F 3/0481* (2013.01); *G06F 3/04847* (2013.01); *G06V 30/19* (2022.01); *G06F 40/58* (2020.01)

(58) Field of Classification Search
CPC .... G06F 3/0481; G06F 3/04847; G06F 40/58; G06V 30/19
See application file for complete search history.

(56) References Cited

U.S. PATENT DOCUMENTS

| | | | |
|---|---|---|---|
| 7,542,971 B2 | 6/2009 | Thione et al. | |
| 7,575,171 B2 | 8/2009 | Lev | |

(Continued)

FOREIGN PATENT DOCUMENTS

| | | |
|---|---|---|
| CN | 101609505 A | 12/2009 |
| CN | 103677618 A | 3/2014 |

(Continued)

OTHER PUBLICATIONS

Aprio Editorial Department, "[Line] Useful ways to use the OCR feature, and how to easily copy and translate text within images", Available online at: <https://appllio.com/line-how-to-use-ocr>, May 15, 2019, 14 pages (Official Copy Only). {See Communication Under Rule 37 CFR § 1.98(a) (3)}.

(Continued)

*Primary Examiner* — David Phantana-angkool
(74) *Attorney, Agent, or Firm* — DLA Piper LLP (US)

(57) ABSTRACT

The present disclosure generally relates to methods and user interfaces for managing visual content at a computer system. In some embodiments, methods and user interfaces for managing visual content in media are described. In some
(Continued)

embodiments, methods and user interfaces for managing visual indicators for visual content in media are described. In some embodiments, methods and user interfaces for inserting visual content in media are described. In some embodiments, methods and user interfaces for identifying visual content in media are described. In some embodiments, methods and user interfaces for translating visual content in media are described. In some embodiments, methods and user interfaces for translating visual content in media are described. In some embodiments, methods and user interfaces for managing user interface objects for visual content in media are described.

28 Claims, 81 Drawing Sheets

Related U.S. Application Data continuation of application No. PCT/US2022/025096, filed on Apr. 15, 2022.

(60) Provisional application No. 63/318,677, filed on Mar. 10, 2022, provisional application No. 63/197,497, filed on Jun. 6, 2021, provisional application No. 63/176,847, filed on Apr. 19, 2021.

(51) Int. Cl.

*G06F 3/04847* (2022.01)
*G06V 30/19* (2022.01)
*G06F 40/58* (2020.01)

(56) References Cited

U.S. PATENT DOCUMENTS 7,908,564 B2 3/2011 Hara et al.
8,286,102 B1 10/2012 Wilensky
8,391,697 B2 3/2013 Cho et al.
9,075,520 B2 7/2015 Park et al.
9,332,182 B2 5/2016 Nonaka et al.
9,350,924 B2 5/2016 Posa
9,541,407 B1 1/2017 Mohler
9,600,153 B2 * 3/2017 Roh ...................... G06F 3/0484
9,900,515 B2 2/2018 Kim et al.
9,953,631 B1 4/2018 Cuthbert et al.
9,996,976 B2 6/2018 Zhou et al.
10,444,975 B2 10/2019 Murphy et al.
10,488,218 B2 11/2019 Kim et al.
10,503,820 B2 12/2019 Duggan et al.
10,534,475 B2 1/2020 Yoo et al.
10,572,215 B1 2/2020 Cooper et al.
10,656,823 B2 5/2020 Mukherjee et al.
10,671,834 B2 6/2020 Adato et al.
10,748,345 B2 8/2020 Zhou
10,762,716 B1 9/2020 Paul et al.
10,882,613 B2 1/2021 Sharma et al.
10,891,800 B1 1/2021 Stoyles et al.
10,902,277 B2 1/2021 Agarwal et al.
10,929,443 B2 2/2021 Grochocki et al.
10,943,382 B2 3/2021 Shapiro et al.
11,107,219 B2 8/2021 Cohen et al.
11,112,963 B2 9/2021 Chaudhri et al.
11,223,728 B2 * 1/2022 Kim ...................... G06F 3/0488
11,227,494 B1 1/2022 Stoyles et al.
11,231,832 B2 1/2022 Yang et al.
11,670,023 B2 6/2023 Xu et al.
12,001,642 B2 6/2024 Paul et al.
2004/0201720 A1 10/2004 Robins et al.
2005/0171926 A1 8/2005 Thione et al.
2007/0074133 A1 3/2007 Hara et al.
2007/0175998 A1 8/2007 Lev
2008/0253656 A1 10/2008 Schwartzberg et al.
2009/0268076 A1 10/2009 Kawamura et al.
2009/0313584 A1 12/2009 Kerr et al.
2010/0110108 A1 5/2010 Alexandersson et al.
2010/0208999 A1 8/2010 Oh et al.
2011/0032377 A1 2/2011 Kim et al.
2011/0076003 A1 3/2011 Cho et al.
2011/0257958 A1 10/2011 Kildevaeld
2012/0310622 A1 12/2012 Zivkovic et al.
2013/0016042 A1 1/2013 Makinen et al.
2013/0093833 A1 4/2013 Al-Asaaed et al.
2013/0110494 A1 5/2013 Elgazzar et al.
2013/0117025 A1 5/2013 Park et al.
2013/0194254 A1 8/2013 Miyoshi et al.
2013/0212470 A1 8/2013 Karunamuni et al.
2013/0297287 A1 11/2013 Yin
2014/0056475 A1 2/2014 Jang et al.
2014/0062962 A1 3/2014 Jang et al.
2014/0109004 A1 4/2014 Sadhvani et al.
2014/0117076 A1 5/2014 Eberlein
2014/0156412 A1 6/2014 Tse
2014/0168056 A1 6/2014 Swaminathan et al.
2014/0192217 A1 7/2014 Kim et al.
2014/0201023 A1 7/2014 Tang
2014/0267796 A1 9/2014 Jang et al.
2015/0051898 A1 2/2015 Cuthbert et al.
2015/0268928 A1 9/2015 Park et al.
2015/0309997 A1 10/2015 Lee et al.
2016/0005189 A1 1/2016 Gray et al.
2016/0057363 A1 2/2016 Posa
2016/0063339 A1 3/2016 Kwon et al.
2016/0188181 A1 6/2016 Smith
2016/0210602 A1 7/2016 Siddique et al.
2016/0301813 A1 10/2016 Swire et al.
2016/0316147 A1 10/2016 Bernstein et al.
2016/0378277 A1 12/2016 Cho
2016/0378311 A1 12/2016 Kim et al.
2017/0039765 A1 2/2017 Zhou et al.
2017/0052939 A1 * 2/2017 Seol ...................... G06F 3/0482
2017/0090693 A1 * 3/2017 Ku ...................... G06F 3/04842
2017/0091174 A1 3/2017 Rubin et al.
2017/0134605 A1 5/2017 Ju et al.
2017/0336926 A1 11/2017 Chaudhri et al.
2017/0336960 A1 11/2017 Chaudhri et al.
2017/0365097 A1 12/2017 Lim et al.
2018/0011842 A1 1/2018 Waibel et al.
2018/0066956 A1 3/2018 Kim et al.
2018/0276203 A1 9/2018 Cuthbert et al.
2018/0284892 A1 10/2018 Kwon et al.
2018/0302568 A1 10/2018 Kim et al.
2018/0322076 A1 11/2018 Prasad et al.
2018/0349008 A1 12/2018 Manzari et al.
2018/0350144 A1 12/2018 Rathod
2019/0025999 A1 1/2019 Murphy et al.
2019/0080498 A1 3/2019 Horie et al.
2019/0084670 A1 3/2019 Sharma et al.
2019/0121522 A1 4/2019 Davis et al.
2019/0179423 A1 6/2019 Rose et al.
2019/0213212 A1 7/2019 Adato et al.
2019/0324546 A1 10/2019 Lee et al.
2019/0347144 A1 11/2019 Chen et al.
2020/0050906 A1 2/2020 Mathai
2020/0106965 A1 4/2020 Malia et al.
2020/0175975 A1 6/2020 Kong et al.
2020/0184478 A1 6/2020 Peled et al.
2020/0267267 A1 8/2020 Kim et al.
2020/0285379 A1 9/2020 George-Svahn
2020/0302135 A1 9/2020 Nirmala
2020/0341610 A1 10/2020 Quintana et al.
2021/0027471 A1 1/2021 Cohen et al.
2021/0193187 A1 6/2021 Phillips et al.
2021/0208741 A1 7/2021 Yang et al.
2021/0227145 A1 7/2021 Kasugai
2021/0263962 A1 8/2021 Chang et al.
2021/0272253 A1 9/2021 Lin et al.
2021/0279409 A1 9/2021 Karunamuni et al.
2021/0389868 A1 12/2021 Crowder
2022/0070385 A1 3/2022 Van Os et al.
2022/0078294 A1 3/2022 Kim et al.
2022/0138913 A1 5/2022 Huang et al.
2022/0150345 A1 5/2022 Woo et al.

(56) References Cited

U.S. PATENT DOCUMENTS

| | | | | |
|---|---|---|---|---|
| 2022/0179665 | A1 | 6/2022 | Rathod | |
| 2022/0240408 | A1 | 7/2022 | Faulkner et al. | |
| 2022/0269887 | A1 | 8/2022 | Chee et al. | |
| 2022/0319493 | A1 | 10/2022 | Ohishi et al. | |
| 2022/0334683 | A1 | 10/2022 | Paul et al. | |
| 2022/0334693 | A1 | 10/2022 | De Vries et al. | |
| 2022/0337741 | A1 | 10/2022 | Paul et al. | |
| 2022/0377248 | A1 | 11/2022 | Minifie et al. | |
| 2022/0391603 | A1* | 12/2022 | Pham | G06F 40/35 |
| 2023/0082876 | A1 | 3/2023 | Guzman et al. | |
| 2023/0136913 | A1 | 5/2023 | Zhao et al. | |
| 2023/0229279 | A1* | 7/2023 | Paul | G06F 3/04847 715/767 |
| 2023/0319224 | A1 | 10/2023 | Manzari et al. | |
| 2023/0379427 | A1 | 11/2023 | Manzari et al. | |
| 2023/0393865 | A1 | 12/2023 | Fleizach et al. | |
| 2024/0078375 | A1 | 3/2024 | Karunamuni et al. | |
| 2024/0220009 | A1 | 7/2024 | Dryer et al. | |
| 2024/0340371 | A1 | 10/2024 | Hua et al. | |
| 2024/0406304 | A1* | 12/2024 | Foss | G06F 1/3206 |
| 2025/0093947 | A1 | 3/2025 | Bedard et al. | |
| 2025/0113095 | A1* | 4/2025 | Alonso | H04N 23/631 |
| 2025/0238127 | A1 | 7/2025 | Alonso et al. | |
| 2025/0238128 | A1 | 7/2025 | Manzari et al. | |
| 2025/0238129 | A1 | 7/2025 | Moussette et al. | |
| 2025/0240516 | A1 | 7/2025 | Zumbrunnen et al. | |

FOREIGN PATENT DOCUMENTS

| | | | |
|---|---|---|---|
| CN | 105654532 | A | 6/2016 |
| CN | 111860479 | A | 10/2020 |
| CN | 115914824 | A | 4/2023 |
| EP | 1826724 | B1 | 3/2015 |
| EP | 3833002 | A1 | 6/2021 |
| EP | 3958101 | A1 | 2/2022 |
| EP | 4089521 | A1 | 11/2022 |
| JP | 2013-541107 | A | 11/2013 |
| JP | 2015-228009 | A | 12/2015 |
| JP | 2016-519377 | A | 6/2016 |
| JP | 2017-513143 | A | 5/2017 |
| JP | 2018-128955 | A | 8/2018 |
| JP | 2020-57204 | A | 4/2020 |
| KR | 10-2015-0135844 | A | 12/2015 |
| WO | 2013/169849 | A2 | 11/2013 |
| WO | 2014/159998 | A1 | 10/2014 |
| WO | 2015/105649 | A1 | 7/2015 |
| WO | 2019/054999 | A1 | 3/2019 |
| WO | 2023/116418 | A1 | 6/2023 |

OTHER PUBLICATIONS

Office Action received for Chinese Patent Application No. 202311577936.6, mailed on May 23, 2024, 20 pages (10 pages of English Translation and 10 pages of Official Copy).

Smahoto.jp, "An application for capturing unreadable characters in books and signboards with a camera!", Available Online at: <https://www.kitamura.jp/smahoto/photolife/app/items/205.html>, Oct. 15, 2015, 8 pages (Official Copy Only). {See Communication Under Rule 37 CFR § 1.98(a) (3)}.

Takafumi Yamazoe, "Development of character recognition technology that achieves highly accurate recognition", Technology Reports, NTT Docomo Technical Journal vol. 20 No. 1, Telecommunications Association, Apr. 1, 2012, pp. 40-43 (Official Copy Only). {See Communication Under Rule 37 CFR § 1.98(a) (3)}.

International Preliminary Report on Patentability received for PCT Patent Application No. PCT/US2023/014177, mailed on Sep. 19, 2024, 15 pages.

Non-Final Office Action received for U.S. Appl. No. 17/833,537, mailed on Sep. 9, 2024, 21 pages.

Decision to Grant received for European Patent Application No. 22720880.8, mailed on Mar. 27, 2025, 4 pages.

International Search Report and Written Opinion received for PCT Patent Application No. PCT/US2024/048985, mailed on Feb. 13, 2025, 19 pages.

Invitation to Pay Additional Fees and Partial International Search Report received for PCT Patent Application No. PCT/US2024/048985, mailed on Dec. 23, 2024, 13 pages.

Non-Final Office Action received for U.S. Appl. No. 18/441,971, mailed on Apr. 10, 2025, 39 pages.

Notice of Allowance received for Japanese Patent Application No. 2024-049961, mailed on Apr. 7, 2025, 4 pages (1 page of English Translation and 3 pages of Official Copy).

Corrected Notice of Allowance received for U.S. Appl. No. 18/125,070, mailed on Apr. 29, 2024, 2 pages.

Notice of Allowance received for U.S. Appl. No. 18/125,070, mailed on Apr. 23, 2024, 6 pages.

International Search Report and Written Opinion received for PCT Patent Application No. PCT/US2024/043090, mailed on Jan. 28, 2025, 21 pages.

Invitation to Pay Additional Fees and Partial International Search Report received for PCT Patent Application No. PCT/US2024/043090, mailed on Dec. 4, 2024, 12 pages.

Office Action received for Japanese Patent Application No. 2024-049961, mailed on Feb. 28, 2025, 8 pages (4 pages of English Translation and 4 pages of Official Copy).

Applicant-Initiated Interview Summary received for U.S. Appl. No. 17/833,537, mailed on Oct. 21, 2024, 4 pages.

Corrected Notice of Allowance received for U.S. Appl. No. 17/484,856, mailed on Nov. 6, 2024, 2 pages.

Notice of Allowance received for U.S. Appl. No. 17/484,856, mailed on Oct. 30, 2024, 9 pages.

Amazon.com, "Visual ID on Echo Show", Online Available at: <https://www.amazon.com/b?ie=UTF8&node=23615589011>, retrieved on Aug. 16, 2023, 3 pages.

International Preliminary Report on Patentability received for PCT Patent Application No. PCT/US2022/044236, mailed on Apr. 4, 2024, 12 pages.

Notice of Allowance received for Japanese Patent Application No. 2023-560220, mailed on Mar. 1, 2024, 4 pages (1 page of English Translation and 3 pages of Official Copy).

Intention to Grant received for European Patent Application No. 22720880.8, mailed on Sep. 30, 2024, 10 pages.

Final Office Action received for U.S. Appl. No. 17/833,537, mailed on Dec. 23, 2024, 26 pages.

Intention to Grant received for European Patent Application No. 22720880.8, mailed on Nov. 20, 2024, 11 pages.

Notice of Allowance received for Chinese Patent Application No. 202311577936.6, mailed on Jan. 22, 2025, 4 pages (1 page of English Translation and 3 pages of Official Copy).

Office Action received for Australian Patent Application No. 2024201515, mailed on Dec. 11, 2024, 3 pages.

Non-Final Office Action received for U.S. Appl. No. 18/167,625, mailed on Feb. 12, 2025, 15 pages.

Casey Jonathan, "Galaxy S21 Ultra Tips For Editing Photos and Videos", Online available at: https://www.youtube.com/watch?v=Cuym Tnn0ias, Feb. 12, 2021, 10 pages.

"Apple Previews Powerful Software Updates Designed for People with Disabilities", Available online at: https://www.apple.com/newsroom/2021/05/apple-previews-powerful- software-updates-designed-for-people-with-disabilities/, May 19, 2021, 10 pages.

Applicant-Initiated Interview Summary received for U.S. Appl. No. 16/140,211, mailed on Feb. 13, 2020, 3 pages.

Applicant-Initiated Interview Summary received for U.S. Appl. No. 16/140,211, mailed on Sep. 3, 2020, 4 pages.

Applicant-Initiated Interview Summary received for U.S. Appl. No. 16/140,211, mailed on Feb. 20, 2020, 5 pages.

Applicant-Initiated Interview Summary received for U.S. Appl. No. 17/484,714, mailed on Apr. 28, 2022, 2 pages.

Applicant-Initiated Interview Summary received for U.S. Appl. No. 17/484,714, mailed on Nov. 10, 2022, 2 pages.

Applicant-Initiated Interview Summary received for U.S. Appl. No. 17/484,856, mailed on Apr. 24, 2023, 4 pages.

Applicant-Initiated Interview Summary received for U.S. Appl. No. 17/484,856, mailed on Jul. 27, 2022, 7 pages.

(56) References Cited

OTHER PUBLICATIONS

Applicant-Initiated Interview Summary received for U.S. Appl. No. 17/484,856, mailed on Mar. 10, 2022, 3 pages.
Applicant-Initiated Interview Summary received for U.S. Appl. No. 17/484,856, mailed on Oct. 25, 2023, 5 pages.
Corrected Notice of Allowance recieved for U.S. Appl. No. 17/484,714, mailed on Dec. 5, 2023, 3 pages.
Corrected Notice of Allowance recieved for U.S. Appl. No. 17/547,065, mailed on May 1, 2023, 9 pages.
Decision on Appeal received for U.S. Appl. No. 16/140,211, mailed on Jul. 1, 2021, 8 pages.
Ex Parte Quayle Action received for U.S. Appl. No. 17/484,844, mailed on Sep. 8, 2022, 8 pages.
Examiner's Answer to Appeal Brief received for U.S. Appl. No. 17/484,856, mailed on Sep. 6, 2023, 4 pages.
Examiner's Answer to Appeal Brief received for U.S. Appl. No. 16/140,211, mailed on Mar. 25, 2021, 21 pages.
Final Office Action received for U.S. Appl. No. 16/140,211, mailed on May 26, 2020, 22 pages.
Final Office Action received for U.S. Appl. No. 17/484,714, mailed on May 23, 2022, 22 pages.
Final Office Action received for U.S. Appl. No. 17/484,856, mailed on Jun. 1, 2023, 31 pages.
Final Office Action received for U.S. Appl. No. 17/484,856, mailed on Mar. 30, 2022, 26 pages.
Final Office Action received for U.S. Appl. No. 17/484,856, mailed on Nov. 16, 2023, 29 pages.
Han, Sangwoo, "AR Glasses interaction prototype", Available Online at: https://sangwoohan.cargo.site/AR-Glasses-interaction-prototype, Oct. 2020, 4 pages.
International Preliminary Report on Patentability received for PCT Patent Application No. PCT/US2022/025096, mailed on Nov. 2, 2023, 14 pages.
International Search Report and Written Opinion received for PCT Patent Application No. PCT/US2022/025096, mailed on Sep. 26, 2022, 19 pages.
International Search Report and Written Opinion received for PCT Patent Application No. PCT/US2022/044236, mailed on Mar. 27, 2023, 17 pages.
International Search Report and Written Opinion received for PCT Patent Application No. PCT/US2023/014177, mailed on Sep. 1, 2023, 21 pages.
Invitation to Pay Additional Fees and Partial International Search Report received for PCT Patent Application No. PCT/US2023/014177, mailed on Jul. 11, 2023, 13 pages.
Invitation to Pay Additional Fees received for PCT Patent Application No. PCT/US2022/025096, mailed on Aug. 1, 2022, 11 pages.
Non-Final Office Action received for U.S. Appl. No. 16/140,211, mailed on Oct. 3, 2019, 15 pages.
Non-Final Office Action received for U.S. Appl. No. 16/140,286, mailed on Oct. 3, 2019, 14 pages.
Non-Final Office Action received for U.S. Appl. No. 16/897,551, mailed on Jun. 25, 2020, 12 pages.
Non-Final Office Action received for U.S. Appl. No. 17/142,134, mailed on Jul. 22, 2021, 11 pages.
Non-Final Office Action received for U.S. Appl. No. 17/484,714, mailed on Dec. 1, 2021, 19 pages.
Non-Final Office Action received for U.S. Appl. No. 17/484,714, mailed on Mar. 30, 2023, 19 pages.
Non-Final Office Action received for U.S. Appl. No. 17/484,856, mailed on Dec. 8, 2021, 24 pages.
Non-Final Office Action received for U.S. Appl. No. 17/484,856, mailed on Feb. 22, 2023, 26 pages.
Non-Final Office Action received for U.S. Appl. No. 17/484,856, mailed on Sep. 21, 2023, 32 pages.
Non-Final Office Action received for U.S. Appl. No. 18/125,070, mailed on Sep. 14, 2023, 13 pages.
Notice of Acceptance received for Australian Patent Application No. 2022261717, mailed on Dec. 20, 2023, 4 pages.
Notice of Acceptance received for Korean Patent Application No. 10-2023-7033711, mailed on Nov. 29, 2023, 9 pages.
Notice of Allowance received for U.S. Appl. No. 16/140,211, mailed on Sep. 10, 2021, 10 pages.
Notice of Allowance received for U.S. Appl. No. 16/140,286, mailed on Mar. 12, 2020, 5 pages.
Notice of Allowance received for U.S. Appl. No. 16/897,551, mailed on Oct. 16, 2020, 5 pages.
Notice of Allowance received for U.S. Appl. No. 17/142,134, mailed on Jan. 4, 2022, 5 pages.
Notice of Allowance received for U.S. Appl. No. 17/484,714, mailed on May 30, 2023, 6 pages.
Notice of Allowance received for U.S. Appl. No. 17/484,714, mailed on Oct. 31, 2023, 7 pages.
Notice of Allowance received for U.S. Appl. No. 17/484,844, mailed on Jan. 17, 2023, 10 pages.
Notice of Allowance received for U.S. Appl. No. 17/547,065, mailed on Feb. 16, 2023, 16 pages.
Notice of Allowance received for U.S. Appl. No. 18/125,070, mailed on Feb. 6, 2024, 7 pages.
Office Action received for Australian Patent Application No. 2022261717, mailed on Nov. 6, 2023, 3 pages.
Stone, Zeda, "Could AR Be the Unlikely Savior of Print?", Online available at: https://adage.com/article/digitalnext/ar-savior-print/308923, May 11, 2017, 4 pages.
Supplemental Notice of Allowance received for U.S. Appl. No. 17/142,134, mailed on Jan. 12, 2022, 2 pages.
"Text of 2nd CD Mixed and Augmented Reality (MAR) Reference Model", International Organisation for Standardisation Organisation Internationale De Normalisation, ISO/IEC JTC 1/SC 29/WG 11, Coding of Moving Pictures and Audio, Feb. 2016, 67 pages.
Office Action received for Australian Patent Application No. 2024201515, mailed on May 28, 2025, 3 pages.
Applicant-Initiated Interview Summary received for U.S. Appl. No. 18/167,625, mailed on May 2, 2025, 3 pages.
Examiner's Answer to Appeal Brief received for U.S. Appl. No. 17/833,537, mailed on May 16, 2025, 13 pages.
Final Office Action received for U.S. Appl. No. 18/167,625, mailed on Jun. 13, 2025, 16 pages.
Applicant-Initiated Interview Summary received for U.S. Appl. No. 18/441,971, mailed on Jul. 15, 2025, 4 pages.
Extended European Search Report received for European Patent Application No. 25164608.9, mailed on Jul. 4, 2025, 9 pages.
Timekettle, "Timekettle for ESL Students", Online available at: https://www.timekettle.co/, Retrieved on Feb. 2025, 11 pages.
Translate with Google Pixel Buds, Online available at: https://support.google.com/googlepixelbuds/answer/7573100?hl=en, Retrieved on Feb. 2025, 2 pages.
International Search Report and Written Opinion received for PCT Patent Application No. PCT/US2025/010440, mailed on Jul. 4, 2025, 20 pages.
Invitation to Pay Additional Fees and Partial International Search Report received for PCT Patent Application No. PCT/US2025/010440, mailed on May 13, 2025, 15 pages.
Non-Final Office Action received for U.S. Appl. No. 18/892,251, mailed on Jul. 11, 2025, 28 pages.

* cited by examiner

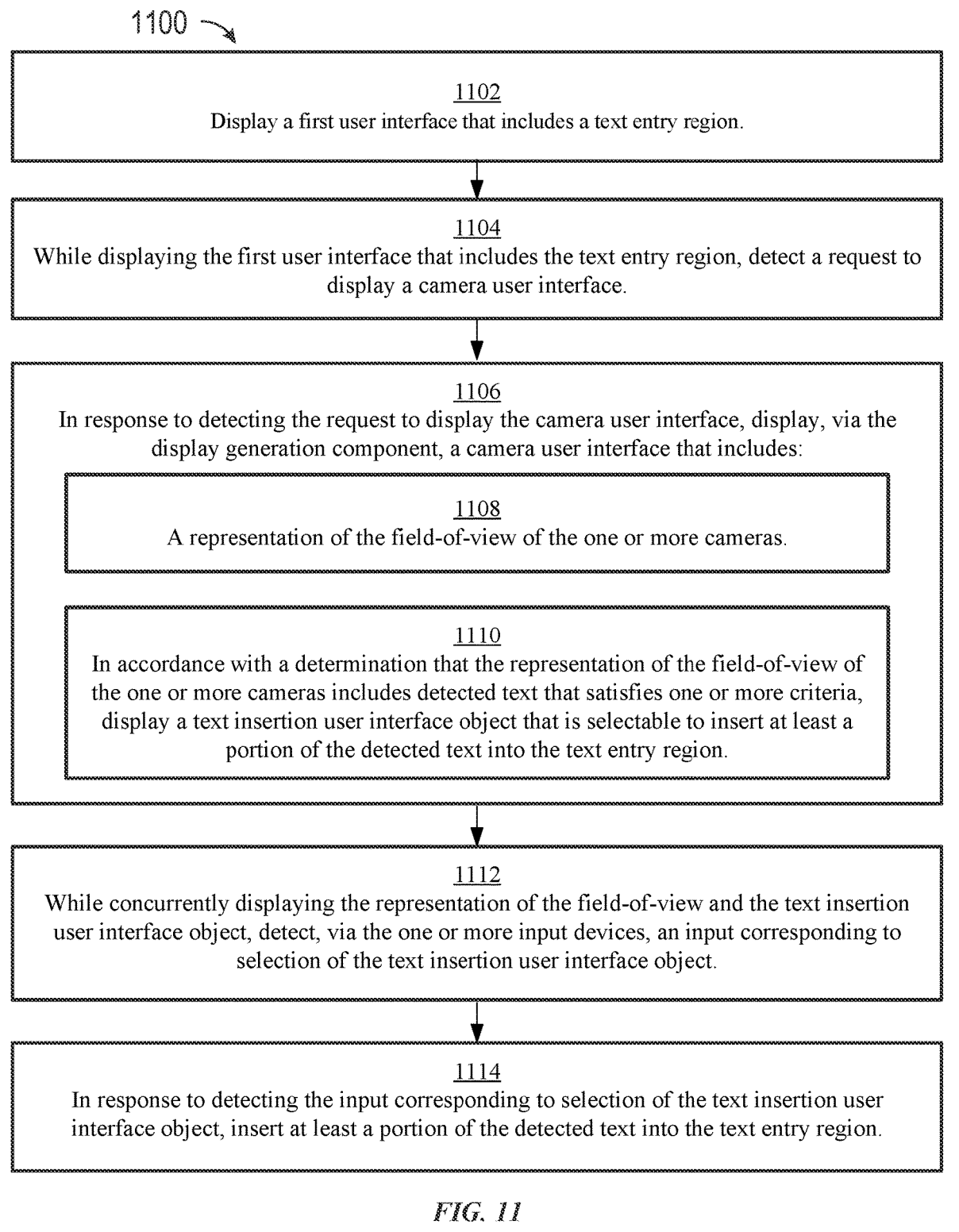

1100

1102
Display a first user interface that includes a text entry region.

1104
While displaying the first user interface that includes the text entry region, detect a request to display a camera user interface.

1106
In response to detecting the request to display the camera user interface, display, via the display generation component, a camera user interface that includes:

1108
A representation of the field-of-view of the one or more cameras.

1110
In accordance with a determination that the representation of the field-of-view of the one or more cameras includes detected text that satisfies one or more criteria, display a text insertion user interface object that is selectable to insert at least a portion of the detected text into the text entry region.

1112
While concurrently displaying the representation of the field-of-view and the text insertion user interface object, detect, via the one or more input devices, an input corresponding to selection of the text insertion user interface object.

1114
In response to detecting the input corresponding to selection of the text insertion user interface object, insert at least a portion of the detected text into the text entry region.

*FIG. 11*

USER INTERFACES FOR MANAGING VISUAL CONTENT IN MEDIA

CROSS-REFERENCE TO RELATED APPLICATIONS

This application is a continuation of U.S. patent application Ser. No. 18/125,070, entitled "USER INTERFACES FOR MANAGING VISUAL CONTENT IN MEDIA," filed Mar. 22, 2023, which is a continuation of PCT Patent Application Serial No. PCT/US2022/025096, entitled "USER INTERFACES FOR MANAGING VISUAL CONTENT IN MEDIA," filed Apr. 15, 2022, which claims priority to U.S. Patent Application Ser. No. 63/176,847, entitled "USER INTERFACES FOR MANAGING VISUAL CONTENT IN MEDIA," filed on Apr. 19, 2021; U.S. Patent Application Ser. No. 63/197,497, entitled "USER INTERFACES FOR MANAGING VISUAL CONTENT IN MEDIA," filed on Jun. 6, 2021; U.S. patent application Ser. No. 17/484,844, entitled "USER INTERFACES FOR MANAGING VISUAL CONTENT IN MEDIA," filed on Sep. 24, 2021; U.S. patent application Ser. No. 17/484,714, entitled "USER INTERFACES FOR MANAGING VISUAL CONTENT IN MEDIA," filed on Sep. 24, 2021; U.S. patent application Ser. No. 17/484,856, entitled "USER INTERFACES FOR MANAGING VISUAL CONTENT IN MEDIA," filed on Sep. 24, 2021; and U.S. Patent Application Ser. No. 63/318,677, entitled "USER INTERFACES FOR MANAGING VISUAL CONTENT IN MEDIA," filed on Mar. 10, 2022, which are each hereby incorporated by reference in their entirety.

FIELD

The present disclosure generally relates to computer user interfaces, and more specifically, to techniques for managing visual content in media.

BACKGROUND

Smartphones and other personal electronic devices allow users to capture and view content in media. Users can capture a variety of types of media, including video and image data. Users can store the captured media on smartphones or other personal electronic devices.

BRIEF SUMMARY

Some techniques for managing visual content in media using computer systems, however, are generally cumbersome and inefficient. For example, some existing techniques use a complex and time-consuming user interface, which can include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing visual content in media. Such methods and interfaces optionally complement or replace other methods for managing visual content in media. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component. The method comprises: displaying, via the display generation component, a camera user interface that includes concurrently displaying a representation of media and a media capture affordance; and while concurrently displaying the representation of media and the media capture affordance: in accordance with a determination that a respective set of criteria is satisfied, wherein the respective set of criteria includes a criterion that is satisfied when respective text is detected in the representation of media, displaying, via the display generation component, a first user interface object corresponding to one or more text management operations; and in accordance with a determination that a respective set of criteria is not satisfied, forgoing displaying the first user interface object; while displaying the representation of media, detecting a first input directed to the camera user interface; and in response to detecting the first input directed to the camera user interface: in accordance with a determination that the first input corresponds to selection of the media capture affordance, initiating capture of media to be added to a media library associated with the computer system; and in accordance with a determination that the first input corresponds to selection of the first user interface object, displaying, via the display generation component, a plurality of options to manage the respective text.

In accordance with some embodiments, a non-transitory computer-readable storage is described. The non-transitory computer-readable storage medium stores one or more programs configured to be executed by one or more processors of a computer system, wherein the computer system is in communication with a display generation component, the one or more programs including instructions for: displaying, via the display generation component, a camera user interface that includes concurrently displaying a representation of media and a media capture affordance; and while concurrently displaying the representation of media and the media capture affordance: in accordance with a determination that a respective set of criteria is satisfied, wherein the respective set of criteria includes a criterion that is satisfied when respective text is detected in the representation of media, displaying, via the display generation component, a first user interface object corresponding to one or more text management operations; and in accordance with a determination that a respective set of criteria is not satisfied, forgoing displaying the first user interface object; while displaying the representation of media, detecting a first input directed to the camera user interface; and in response to detecting the first input directed to the camera user interface: in accordance with a determination that the first input corresponds to selection of the media capture affordance, initiating capture of media to be added to a media library associated with the computer system; and in accordance with a determination that the first input corresponds to selection of the first user interface object, displaying, via the display generation component, a plurality of options to manage the respective text.

In accordance with some embodiments, a transitory computer-readable storage is described. The transitory computer-readable storage medium stores one or more programs configured to be executed by one or more processors of a computer system, wherein the computer system is in communication with a display generation component, the one or more programs including instructions for: displaying, via the display generation component, a camera user interface that includes concurrently displaying a representation of media and a media capture affordance; and while concurrently displaying the representation of media and the media capture affordance: in accordance with a determination that a respective set of criteria is satisfied, wherein the respective set of criteria includes a criterion that is satisfied when respective text is detected in the representation of media, displaying, via the display generation component, a first user interface object corresponding to one or more text management operations; and in accordance with a determination that a respective set of criteria is not satisfied, forgoing displaying the first user interface object; while displaying the representation of media, detecting a first input directed to the camera user interface; and in response to detecting the first input directed to the camera user interface: in accordance with a determination that the first input corresponds to selection of the media capture affordance, initiating capture of media to be added to a media library associated with the computer system; and in accordance with a determination that the first input corresponds to selection of the first user interface object, displaying, via the display generation component, a plurality of options to manage the respective text.

In accordance with some embodiments, a computer system that is configured to communicate with a display generation component is described. The computer system comprises one or more processors; and memory storing one or more programs configured to be executed by the one or more processors, the one or more programs including instructions for: displaying, via the display generation component, a camera user interface that includes concurrently displaying a representation of media and a media capture affordance; and while concurrently displaying the representation of media and the media capture affordance: in accordance with a determination that a respective set of criteria is satisfied, wherein the respective set of criteria includes a criterion that is satisfied when respective text is detected in the representation of media, displaying, via the display generation component, a first user interface object corresponding to one or more text management operations; and in accordance with a determination that a respective set of criteria is not satisfied, forgoing displaying the first user interface object; while displaying the representation of media, detecting a first input directed to the camera user interface; and in response to detecting the first input directed to the camera user interface: in accordance with a determination that the first input corresponds to selection of the media capture affordance, initiating capture of media to be added to a media library associated with the computer system; and in accordance with a determination that the first input corresponds to selection of the first user interface object, displaying, via the display generation component, a plurality of options to manage the respective text.

In accordance with some embodiments, a computer system that is configured to communicate with a display generation component is described. The computer system, comprises: one or more processors; memory storing one or more programs configured to be executed by the one or more processors; means for displaying, via the display generation component, a camera user interface that includes concurrently displaying a representation of media and a media capture affordance; and means, while concurrently displaying the representation of media and the media capture affordance, for: in accordance with a determination that a respective set of criteria is satisfied, wherein the respective set of criteria includes a criterion that is satisfied when respective text is detected in the representation of media, displaying, via the display generation component, a first user interface object corresponding to one or more text management operations; and in accordance with a determination that a respective set of criteria is not satisfied, forgoing displaying the first user interface object; means, while displaying the representation of media, for detecting a first input directed to the camera user interface; and means, responsive to detecting the first input directed to the camera user interface, for: in accordance with a determination that the first input corresponds to selection of the media capture affordance, initiating capture of media to be added to a media library associated with the computer system; and in accordance with a determination that the first input corresponds to selection of the first user interface object, displaying, via the display generation component, a plurality of options to manage the respective text.

In accordance with some embodiments, a computer program product is described. The computer program product comprises one or more programs configured to be executed by one or more processors of a computer system that is in communication with a display generation component. The one or more programs include instructions for: displaying, via the display generation component, a camera user interface that includes concurrently displaying a representation of media and a media capture affordance; and while concurrently displaying the representation of media and the media capture affordance: in accordance with a determination that a respective set of criteria is satisfied, wherein the respective set of criteria includes a criterion that is satisfied when respective text is detected in the representation of media, displaying, via the display generation component, a first user interface object corresponding to one or more text management operations; and in accordance with a determination that a respective set of criteria is not satisfied, forgoing displaying the first user interface object; while displaying the representation of media, detecting a first input directed to the camera user interface; and in response to detecting the first input directed to the camera user interface: in accordance with a determination that the first input corresponds to selection of the media capture affordance, initiating capture of media to be added to a media library associated with the computer system; and in accordance with a determination that the first input corresponds to selection of the first user interface object, displaying, via the display generation component, a plurality of options to manage the respective text.

In accordance with some embodiments, a method is described. The method is performed at a computer system that is in communication with a display generation component and one or more input devices. The method comprises: displaying, via the display generation component, a first representation of a previously captured media item while displaying the first representation of the previously captured media item, detecting, via the one or more input devices, an input that corresponds to a request to display a second representation of the previously captured media item; in response to detecting the input that corresponds to a request to display a second representation of the previously captured media item, displaying, via the display generation component, the second representation of the previously captured media item; and while displaying the second representation of the previously captured media item: in accordance with a determination that a portion of text included in the second representation of the previously captured media item satisfies a respective set of criteria, displaying, via the display generation component, a visual indication corresponding to the portion of text included in the second representation that was not displayed when the first representation of the previously captured media item was displayed.

In accordance with some embodiments, a non-transitory computer-readable storage is described. The non-transitory computer-readable storage medium stores one or more programs configured to be executed by one or more processors of a computer system, wherein the computer system is in communication with a display generation component and one or more input devices, the one or more programs including instructions for: displaying, via the display generation component, a first representation of a previously captured media item while displaying the first representation of the previously captured media item, detecting, via the one or more input devices, an input that corresponds to a request to display a second representation of the previously captured media item; in response to detecting the input that corresponds to a request to display a second representation of the previously captured media item, displaying, via the display generation component, the second representation of the previously captured media item; and while displaying the second representation of the previously captured media item: in accordance with a determination that a portion of text included in the second representation of the previously captured media item satisfies a respective set of criteria, displaying, via the display generation component, a visual indication corresponding to the portion of text included in the second representation that was not displayed when the first representation of the previously captured media item was displayed.

In accordance with some embodiments, a transitory computer-readable storage is described. The transitory computer-readable storage medium stores one or more programs configured to be executed by one or more processors of a computer system, wherein the computer system is in communication with a display generation component and one or more input devices, the one or more programs including instructions for: displaying, via the display generation component, a first representation of a previously captured media item while displaying the first representation of the previously captured media item, detecting, via the one or more input devices, an input that corresponds to a request to display a second representation of the previously captured media item; in response to detecting the input that corresponds to a request to display a second representation of the previously captured media item, displaying, via the display generation component, the second representation of the previously captured media item; and while displaying the second representation of the previously captured media item: in accordance with a determination that a portion of text included in the second representation of the previously captured media item satisfies a respective set of criteria, displaying, via the display generation component, a visual indication corresponding to the portion of text included in the second representation that was not displayed when the first representation of the previously captured media item was displayed.

In accordance with some embodiments, a computer system that is configured to communicate with a display generation component and one or more input devices is described. The computer system comprises one or more processors; and memory storing one or more programs configured to be executed by the one or more processors, the one or more programs including instructions for: displaying, via the display generation component, a first representation of a previously captured media item while displaying the first representation of the previously captured media item, detecting, via the one or more input devices, an input that corresponds to a request to display a second representation of the previously captured media item; in response to detecting the input that corresponds to a request to display a second representation of the previously captured media item, displaying, via the display generation component, the second representation of the previously captured media item; and while displaying the second representation of the previously captured media item: in accordance with a determination that a portion of text included in the second representation of the previously captured media item satisfies a respective set of criteria, displaying, via the display generation component, a visual indication corresponding to the portion of text included in the second representation that was not displayed when the first representation of the previously captured media item was displayed.

In accordance with some embodiments, a computer system that is configured to communicate with a display generation component and one or more input devices is described. The computer system, comprises: one or more processors; memory storing one or more programs configured to be executed by the one or more processors; means for displaying, via the display generation component, a first representation of a previously captured media item; means, while displaying the first representation of the previously captured media item, for detecting, via the one or more input devices, an input that corresponds to a request to display a second representation of the previously captured media item; means, responsive to detecting the input that corresponds to a request to display a second representation of the previously captured media item, displaying, via the display generation component, the second representation of the previously captured media item; and means for, while displaying the second representation of the previously captured media item: in accordance with a determination that a portion of text included in the second representation of the previously captured media item satisfies a respective set of criteria, displaying, via the display generation component, a visual indication corresponding to the portion of text included in the second representation that was not displayed when the first representation of the previously captured media item was displayed.

In accordance with some embodiments, a computer program product is described. The computer program product comprises one or more programs configured to be executed by one or more processors of a computer system that is in communication with a display generation component and one or more input devices. The one or more programs include instructions for: displaying, via the display generation component, a first representation of a previously captured media item; while displaying the first representation of the previously captured media item, detecting, via the one or more input devices, an input that corresponds to a request to display a second representation of the previously captured media item; in response to detecting the input that corresponds to a request to display a second representation of the previously captured media item, displaying, via the display generation component, the second representation of the previously captured media item; and while displaying the second representation of the previously captured media item: in accordance with a determination that a portion of text included in the second representation of the previously captured media item satisfies a respective set of criteria, displaying, via the display generation component, a visual indication corresponding to the portion of text included in the second representation that was not displayed when the first representation of the previously captured media item was displayed.

In accordance with some embodiments, a method is described. The method is performed at a computer system that is in communication with one or more cameras, one or more input devices, and a display generation component.

The method comprises: displaying a first user interface that includes a text entry region; while displaying the first user interface that includes the text entry region, detecting a request to display a camera user interface; in response to detecting the request to display the camera user interface, displaying, via the display generation component, a camera user interface that includes: a representation of the field-of-view of the one or more cameras; and in accordance with a determination that the representation of the field-of-view of the one or more cameras includes detected text that satisfies one or more criteria, displaying a text insertion user interface object that is selectable to insert at least a portion of the detected text into the text entry region; while concurrently displaying the representation of the field-of-view and the text insertion user interface object, detecting, via the one or more input devices, an input corresponding to selection of the text insertion user interface object; and in response to detecting the input corresponding to selection of the text insertion user interface object, inserting at least a portion of the detected text into the text entry region.

In accordance with some embodiments, a non-transitory computer-readable storage is described. The non-transitory computer-readable storage medium stores one or more programs configured to be executed by one or more processors of a computer system, wherein the computer system is in communication with one or more cameras, one or more input devices, and a display generation component, the one or more programs including instructions for: displaying a first user interface that includes a text entry region; while displaying the first user interface that includes the text entry region, detecting a request to display a camera user interface; in response to detecting the request to display the camera user interface, displaying, via the display generation component, a camera user interface that includes: a representation of the field-of-view of the one or more cameras; and in accordance with a determination that the representation of the field-of-view of the one or more cameras includes detected text that satisfies one or more criteria, displaying a text insertion user interface object that is selectable to insert at least a portion of the detected text into the text entry region; while concurrently displaying the representation of the field-of-view and the text insertion user interface object, detecting, via the one or more input devices, an input corresponding to selection of the text insertion user interface object; and in response to detecting the input corresponding to selection of the text insertion user interface object, inserting at least a portion of the detected text into the text entry region.

In accordance with some embodiments, a transitory computer-readable storage is described. The transitory computer-readable storage medium stores one or more programs configured to be executed by one or more processors of a computer system, wherein the computer system is in communication with one or more cameras, one or more input devices, and a display generation component, the one or more programs including instructions for: displaying a first user interface that includes a text entry region; while displaying the first user interface that includes the text entry region, detecting a request to display a camera user interface; in response to detecting the request to display the camera user interface, displaying, via the display generation component, a camera user interface that includes: a representation of the field-of-view of the one or more cameras; and in accordance with a determination that the representation of the field-of-view of the one or more cameras includes detected text that satisfies one or more criteria, displaying a text insertion user interface object that is selectable to insert at least a portion of the detected text into the text entry region; while concurrently displaying the representation of the field-of-view and the text insertion user interface object, detecting, via the one or more input devices, an input corresponding to selection of the text insertion user interface object; and in response to detecting the input corresponding to selection of the text insertion user interface object, inserting at least a portion of the detected text into the text entry region.

In accordance with some embodiments, a computer system that is configured to communicate with one or more cameras, one or more input devices, and a display generation component is described. The computer system comprises one or more processors; and memory storing one or more programs configured to be executed by the one or more processors, the one or more programs including instructions for: displaying a first user interface that includes a text entry region; while displaying the first user interface that includes the text entry region, detecting a request to display a camera user interface; in response to detecting the request to display the camera user interface, displaying, via the display generation component, a camera user interface that includes: a representation of the field-of-view of the one or more cameras; and in accordance with a determination that the representation of the field-of-view of the one or more cameras includes detected text that satisfies one or more criteria, displaying a text insertion user interface object that is selectable to insert at least a portion of the detected text into the text entry region; while concurrently displaying the representation of the field-of-view and the text insertion user interface object, detecting, via the one or more input devices, an input corresponding to selection of the text insertion user interface object; and in response to detecting the input corresponding to selection of the text insertion user interface object, inserting at least a portion of the detected text into the text entry region.

In accordance with some embodiments, a computer system that is configured to communicate with one or more cameras, one or more input devices, and a display generation component is described. The computer system, comprises: memory storing one or more programs configured to be executed by the one or more processors; means for, displaying a first user interface that includes a text entry region; means for, while displaying the first user interface that includes the text entry region, detecting a request to display a camera user interface; means, responsive to detecting the request to display the camera user interface, for displaying, via the display generation component, a camera user interface that includes: a representation of the field-of-view of the one or more cameras; and in accordance with a determination that the representation of the field-of-view of the one or more cameras includes detected text that satisfies one or more criteria, displaying a text insertion user interface object that is selectable to insert at least a portion of the detected text into the text entry region; means for, while concurrently displaying the representation of the field-of-view and the text insertion user interface object, detecting, via the one or more input devices, an input corresponding to selection of the text insertion user interface object; and means, responsive to detecting the input corresponding to selection of the text insertion user interface object, for inserting at least a portion of the detected text into the text entry region.

In accordance with some embodiments, a computer program product is described. The computer program product comprises one or more programs configured to be executed by one or more processors of a computer system that is in communication with one or more cameras, one or more input devices, and a display generation component. The one or more programs include instructions for: displaying a first user interface that includes a text entry region; while displaying the first user interface that includes the text entry region, detecting a request to display a camera user interface; in response to detecting the request to display the camera user interface, displaying, via the display generation component, a camera user interface that includes: a representation of the field-of-view of the one or more cameras; and in accordance with a determination that the representation of the field-of-view of the one or more cameras includes detected text that satisfies one or more criteria, displaying a text insertion user interface object that is selectable to insert at least a portion of the detected text into the text entry region; while concurrently displaying the representation of the field-of-view and the text insertion user interface object, detecting, via the one or more input devices, an input corresponding to selection of the text insertion user interface object; and in response to detecting the input corresponding to selection of the text insertion user interface object, inserting at least a portion of the detected text into the text entry region.

In accordance with some embodiments, a method is described. The method is performed at a computer system that is in communication with a display generation component. The method comprises: displaying, via the display generation component, a media user interface that includes a representation of media; while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including: in accordance with a determination that the first detected feature is a first type of feature, the first indication has a first appearance; and in accordance with a determination that the first detected feature is a second type of feature that is different from the first type of feature, the first indication has a second appearance that is different from the first appearance.

In accordance with some embodiments, a non-transitory computer-readable storage is described. The non-transitory computer-readable storage medium stores one or more programs configured to be executed by one or more processors of a computer system, wherein the computer system is in communication with a display generation component, the one or more programs including instructions for: displaying, via the display generation component, a media user interface that includes a representation of media; while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including: in accordance with a determination that the first detected feature is a first type of feature, the first indication has a first appearance; and in accordance with a determination that the first detected feature is a second type of feature that is different from the first type of feature, the first indication has a second appearance that is different from the first appearance.

In accordance with some embodiments, a transitory computer-readable storage is described. The transitory computer-readable storage medium stores one or more programs configured to be executed by one or more processors of a computer system, wherein the computer system is in communication with a display generation component, the one or more programs including instructions for: displaying, via the display generation component, a media user interface that includes a representation of media; while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including: in accordance with a determination that the first detected feature is a first type of feature, the first indication has a first appearance; and in accordance with a determination that the first detected feature is a second type of feature that is different from the first type of feature, the first indication has a second appearance that is different from the first appearance.

In accordance with some embodiments, a computer system that is configured to communicate with a display generation component is described. The computer system comprises one or more processors; and memory storing one or more programs configured to be executed by the one or more processors, the one or more programs including instructions for: displaying, via the display generation component, a media user interface that includes a representation of media; while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including: in accordance with a determination that the first detected feature is a first type of feature, the first indication has a first appearance; and in accordance with a determination that the first detected feature is a second type of feature that is different from the first type of feature, the first indication has a second appearance that is different from the first appearance.

In accordance with some embodiments, a computer system that is configured to communicate with display generation component is described. The computer system, comprises: one or more processors; memory storing one or more programs configured to be executed by the one or more processors; means for, displaying, via the display generation component, a media user interface that includes a representation of media; means for, while displaying the media user interface that includes the representation of the media, receiving a request to display additional information about a plurality of detected features in the representation of the media; and means, responsive to receiving the request to display additional information about the plurality of detected features and while displaying the media user interface that includes the representation of the media, for displaying one or more indications of detected features in the media, including a first indication of a first detected feature that is displayed at a first location in the representation of the media that corresponds to a location of the first detected feature in the representation of the media, including: in accordance with a determination that the first detected feature is a first type of feature, the first indication has a first appearance; and in accordance with a determination that the first detected feature is a second type of feature that is different from the first type of feature, the first indication has a second appearance that is different from the first appearance.

In accordance with some embodiments, a computer program product is described. The computer program product comprises one or more programs configured to be executed by one or more processors of a computer system that is in communication with a display generation component. The one or more programs include instructions for: displaying, via the display generation component, a media user interface that includes a representation of media; while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including: in accordance with a determination that the first detected feature is a first type of feature, the first indication has a first appearance; and in accordance with a determination that the first detected feature is a second type of feature that is different from the first type of feature, the first indication has a second appearance that is different from the first appearance.

In accordance with some embodiments, a method is described. The method is performed at a computer system that is in communication with one or more cameras, a display generation component, and one or more input devices. The method comprises: receiving a request to display a representation of the field-of-view of the one or more cameras; in response to receiving the request to display the representation of the field-of-view of the one or more cameras: displaying, via the display generation component, the representation of the field-of-view of the one or more cameras, wherein the representation includes text that is in the field-of-view of the one or more cameras; and automatically displaying, via the display generation component, a plurality of indications of translated text that includes a first indication of a translation of a first portion of the text and a second indication of a translation of a second portion of the text; while displaying, via the display generation component, the first indication and the second indication, receiving, via the one or more inputs devices, a request to select a respective indication of the plurality of translated portions; and in response to receiving the request to select the respective indication, in accordance with a determination that the request is a request to select the first indication, displaying, via the display generation component, a first translation user interface object that includes the first portion of the text and the translation of the first portion of the text without including the translation of the second portion of the text.

In accordance with some embodiments, a non-transitory computer-readable storage is described. The non-transitory computer-readable storage medium stores one or more programs configured to be executed by one or more processors of a computer system, wherein the computer system is in communication with one or more cameras, a display generation component, and one or more input devices, the one or more programs including instructions for: receiving a request to display a representation of the field-of-view of the one or more cameras; in response to receiving the request to display the representation of the field-of-view of the one or more cameras: displaying, via the display generation component, the representation of the field-of-view of the one or more cameras, wherein the representation includes text that is in the field-of-view of the one or more cameras; and automatically displaying, via the display generation component, a plurality of indications of translated text that includes a first indication of a translation of a first portion of the text and a second indication of a translation of a second portion of the text; while displaying, via the display generation component, the first indication and the second indication, receiving, via the one or more inputs devices, a request to select a respective indication of the plurality of translated portions; and in response to receiving the request to select the respective indication, in accordance with a determination that the request is a request to select the first indication, displaying, via the display generation component, a first translation user interface object that includes the first portion of the text and the translation of the first portion of the text without including the translation of the second portion of the text.

In accordance with some embodiments, a transitory computer-readable storage is described. The transitory computer-readable storage medium stores one or more programs configured to be executed by one or more processors of a computer system, wherein the computer system is in communication with one or more cameras, a display generation component, and one or more input devices, the one or more programs including instructions for: receiving a request to display a representation of the field-of-view of the one or more cameras; in response to receiving the request to display the representation of the field-of-view of the one or more cameras: displaying, via the display generation component, the representation of the field-of-view of the one or more cameras, wherein the representation includes text that is in the field-of-view of the one or more cameras; and automatically displaying, via the display generation component, a plurality of indications of translated text that includes a first indication of a translation of a first portion of the text and a second indication of a translation of a second portion of the text; while displaying, via the display generation component, the first indication and the second indication, receiving, via the one or more inputs devices, a request to select a respective indication of the plurality of translated portions; and in response to receiving the request to select the respective indication, in accordance with a determination that the request is a request to select the first indication, displaying, via the display generation component, a first translation user interface object that includes the first portion of the text and the translation of the first portion of the text without including the translation of the second portion of the text.

In accordance with some embodiments, a computer system that is configured to communicate with one or more cameras, a display generation component, and one or more input devices is described. The computer system comprises one or more processors; and memory storing one or more programs configured to be executed by the one or more processors, the one or more programs including instructions for: receiving a request to display a representation of the field-of-view of the one or more cameras; in response to receiving the request to display the representation of the field-of-view of the one or more cameras: displaying, via the display generation component, the representation of the field-of-view of the one or more cameras, wherein the representation includes text that is in the field-of-view of the one or more cameras; and automatically displaying, via the display generation component, a plurality of indications of translated text that includes a first indication of a translation of a first portion of the text and a second indication of a translation of a second portion of the text; while displaying, via the display generation component, the first indication and the second indication, receiving, via the one or more inputs devices, a request to select a respective indication of the plurality of translated portions; and in response to receiving the request to select the respective indication, in accordance with a determination that the request is a request to select the first indication, displaying, via the display generation component, a first translation user interface object that includes the first portion of the text and the translation of the first portion of the text without including the translation of the second portion of the text.

In accordance with some embodiments, a computer system that is configured to communicate with one or more cameras, a display generation component, and one or more input devices is described. The computer system comprises one or more processors; and memory storing one or more programs configured to be executed by the one or more processors, the one or more programs including instructions for: means for, receiving a request to display a representation of the field-of-view of the one or more cameras; means, responsive to receiving the request to display the representation of the field-of-view of the one or more cameras, for: displaying, via the display generation component, the representation of the field-of-view of the one or more cameras, wherein the representation includes text that is in the field-of-view of the one or more cameras; and automatically displaying, via the display generation component, a plurality of indications of translated text that includes a first indication of a translation of a first portion of the text and a second indication of a translation of a second portion of the text; means for, while displaying, via the display generation component, the first indication and the second indication, receiving, via the one or more inputs devices, a request to select a respective indication of the plurality of translated portions; and means, responsive to receiving the request to select the respective indication, in accordance with a determination that the request is a request to select the first indication, for displaying, via the display generation component, a first translation user interface object that includes the first portion of the text and the translation of the first portion of the text without including the translation of the second portion of the text.

In accordance with some embodiments, a computer program product is described. The computer program product comprises one or more programs configured to be executed by one or more processors of a computer system that is in communication with one or more cameras, a display generation component, and one or more input devices. The one or more programs include instructions for: receiving a request to display a representation of the field-of-view of the one or more cameras; in response to receiving the request to display the representation of the field-of-view of the one or more cameras: displaying, via the display generation component, the representation of the field-of-view of the one or more cameras, wherein the representation includes text that is in the field-of-view of the one or more cameras; and automatically displaying, via the display generation component, a plurality of indications of translated text that includes a first indication of a translation of a first portion of the text and a second indication of a translation of a second portion of the text; while displaying, via the display generation component, the first indication and the second indication, receiving, via the one or more inputs devices, a request to select a respective indication of the plurality of translated portions; and in response to receiving the request to select the respective indication, in accordance with a determination that the request is a request to select the first indication, displaying, via the display generation component, a first translation user interface object that includes the first portion of the text and the translation of the first portion of the text without including the translation of the second portion of the text.

In accordance with some embodiments, a method performed at a computer system that is in communication with a display generation component is described. The method comprises: while displaying a user interface that includes a representation of media, detecting a request to display additional information that corresponds to the representation of the media; and in response to detecting the request to display additional information that corresponds to the representation of the media: in accordance with a determination that detected text in the representation of media has a first set of properties, displaying, via the display generation component, a first user interface object that, when selected, causes the computer system to perform a first operation based on the detected text; and in accordance with a determination that detected text in the representation of media has a second set of properties that is different from the first set of properties, displaying, via the display generation component, a second user interface object that, when selected, causes the computer system to perform a second operation, different from the first operation, based on the detected text.

In accordance with some embodiments, a non-transitory computer-readable storage medium is described. The non-transitory computer storage medium stores one or more programs configured to be executed by one or more processors of a computer system that is in communication with a display generation component, the one or more programs including instructions for: while displaying a user interface that includes a representation of media, detecting a request to display additional information that corresponds to the representation of the media; and in response to detecting the request to display additional information that corresponds to the representation of the media: in accordance with a determination that detected text in the representation of media has a first set of properties, displaying, via the display generation component, a first user interface object that, when selected, causes the computer system to perform a first operation based on the detected text; and in accordance with a determination that detected text in the representation of media has a second set of properties that is different from the first set of properties, displaying, via the display generation component, a second user interface object that, when selected, causes the computer system to perform a second operation, different from the first operation, based on the detected text.

In accordance with some embodiments, a transitory computer-readable storage medium is described. The transitory computer storage medium stores one or more programs configured to be executed by one or more processors of a computer system that is in communication with a display generation component, the one or more programs including instructions for: while displaying a user interface that includes a representation of media, detecting a request to display additional information that corresponds to the representation of the media; and in response to detecting the request to display additional information that corresponds to the representation of the media: in accordance with a determination that detected text in the representation of media has a first set of properties, displaying, via the display generation component, a first user interface object that, when selected, causes the computer system to perform a first operation based on the detected text; and in accordance with a determination that detected text in the representation of media has a second set of properties that is different from the first set of properties, displaying, via the display generation component, a second user interface object that, when selected, causes the computer system to perform a second operation, different from the first operation, based on the detected text.

In accordance with some embodiments, a computer system is described. The computer system is configured to communicate with a display generation component, the computer system comprises: one or more processors; and memory storing one or more programs configured to be executed by the one or more processors, the one or more programs including instructions for: while displaying a user interface that includes a representation of media, detecting a request to display additional information that corresponds to the representation of the media; and in response to detecting the request to display additional information that corresponds to the representation of the media: in accordance with a determination that detected text in the representation of media has a first set of properties, displaying, via the display generation component, a first user interface object that, when selected, causes the computer system to perform a first operation based on the detected text; and in accordance with a determination that detected text in the representation of media has a second set of properties that is different from the first set of properties, displaying, via the display generation component, a second user interface object that, when selected, causes the computer system to perform a second operation, different from the first operation, based on the detected text.

In accordance with some embodiments, a computer system is described. The computer system is configured to communicate with a display generation component, the computer system comprises: means for, while displaying a user interface that includes a representation of media, detecting a request to display additional information that corresponds to the representation of the media; and means for, in response to detecting the request to display additional information that corresponds to the representation of the media: in accordance with a determination that detected text in the representation of media has a first set of properties, displaying, via the display generation component, a first user interface object that, when selected, causes the computer system to perform a first operation based on the detected text; and in accordance with a determination that detected text in the representation of media has a second set of properties that is different from the first set of properties, displaying, via the display generation component, a second user interface object that, when selected, causes the computer system to perform a second operation, different from the first operation, based on the detected text.

In accordance with some embodiments, a computer program product is described. The computer program product comprises one or more programs configured to be executed by one or more processors of a computer system that is in communication with a generation component, the one or more programs including instructions for: while displaying a user interface that includes a representation of media, detecting a request to display additional information that corresponds to the representation of the media; and in response to detecting the request to display additional information that corresponds to the representation of the media: in accordance with a determination that detected text in the representation of media has a first set of properties, displaying, via the display generation component, a first user interface object that, when selected, causes the computer system to perform a first operation based on the detected text; and in accordance with a determination that detected text in the representation of media has a second set of properties that is different from the first set of properties, displaying, via the display generation component, a second user interface object that, when selected, causes the computer system to perform a second operation, different from the first operation, based on the detected text.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing visual content in media, thereby increasing the effectiveness, efficiency, and user satisfaction with such devices. Such methods and interfaces may complement or replace other methods for managing visual content in media.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 11 is a flow diagram illustrating user interfaces for inserting visual content in media in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing visual content. For example, there is a need for electronic devices and/or computer systems to allow a user to manage visual content that is included in objects that are captured by one or more cameras of the computer system, such as signs or restaurant menus. Such techniques can reduce the cognitive burden on a user who manages visual content, thereby, enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing visual content.

Figure 6B:
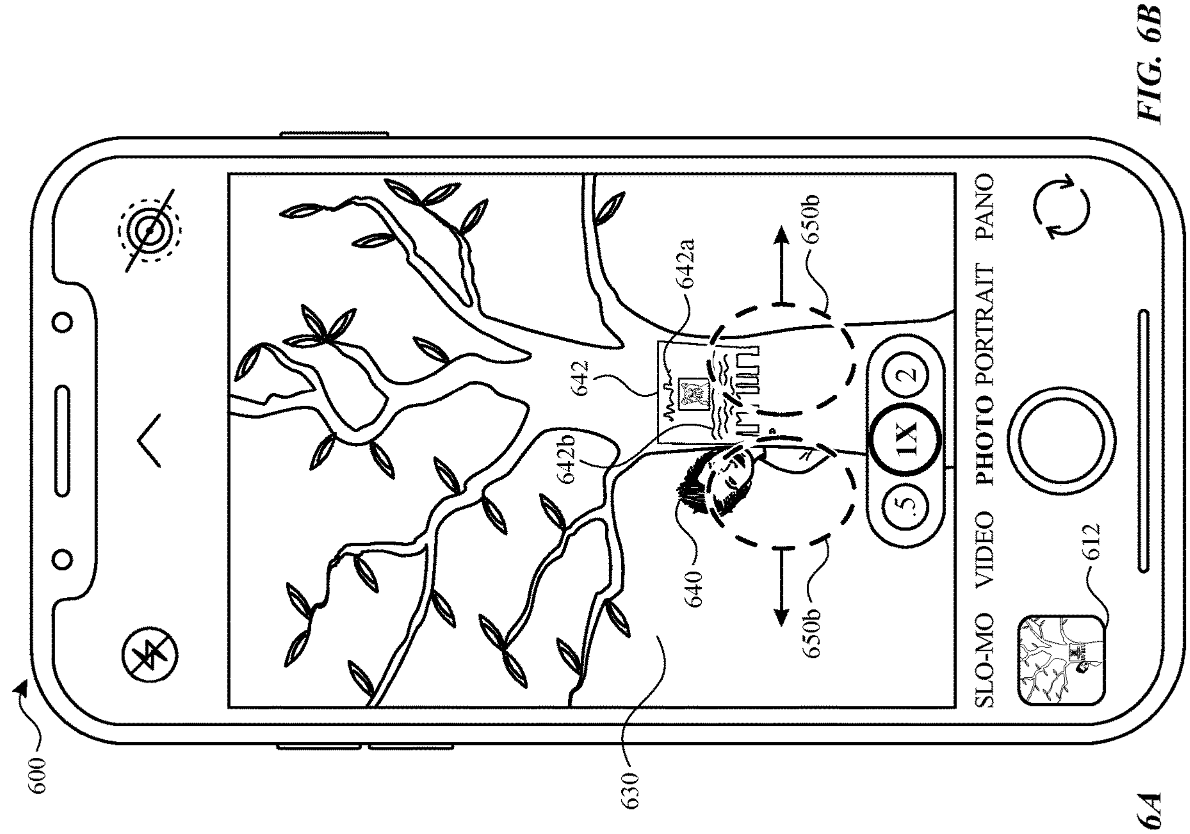
FIGS. 6A-6Z illustrate exemplary user interfaces for managing visual content in media in accordance with some embodiments.
Figure 6A:
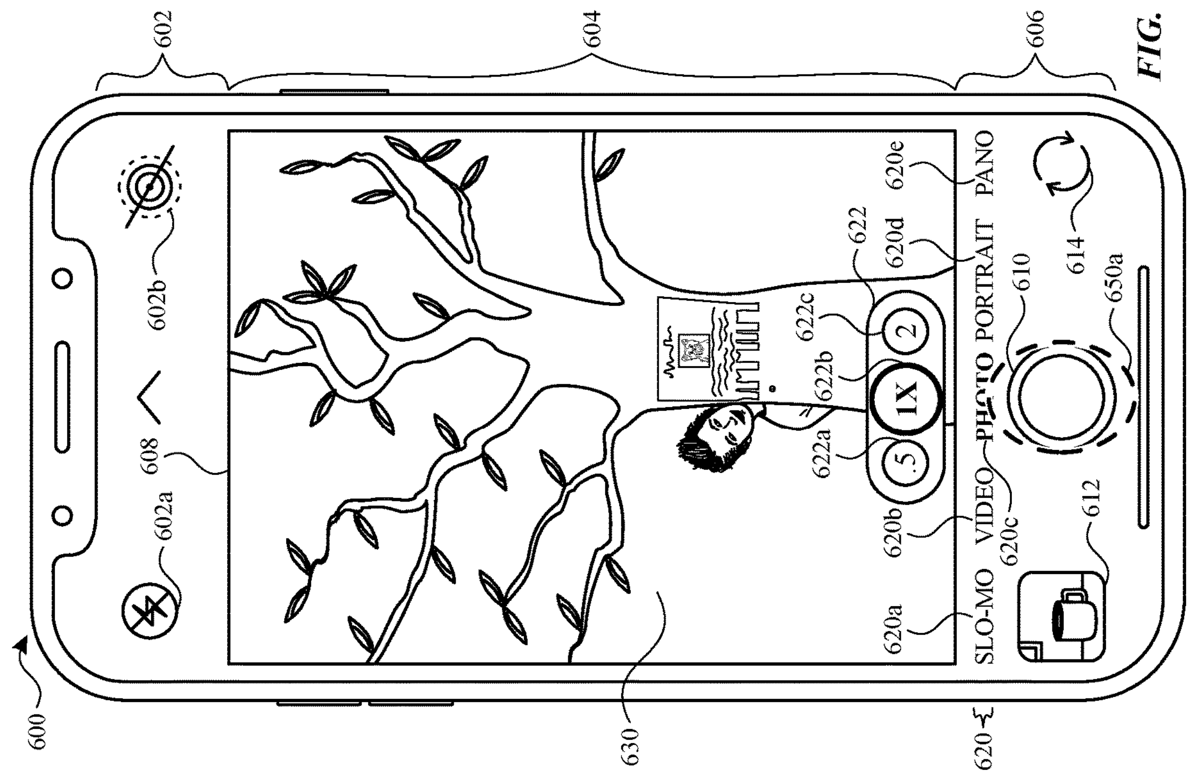
Figure 6C:
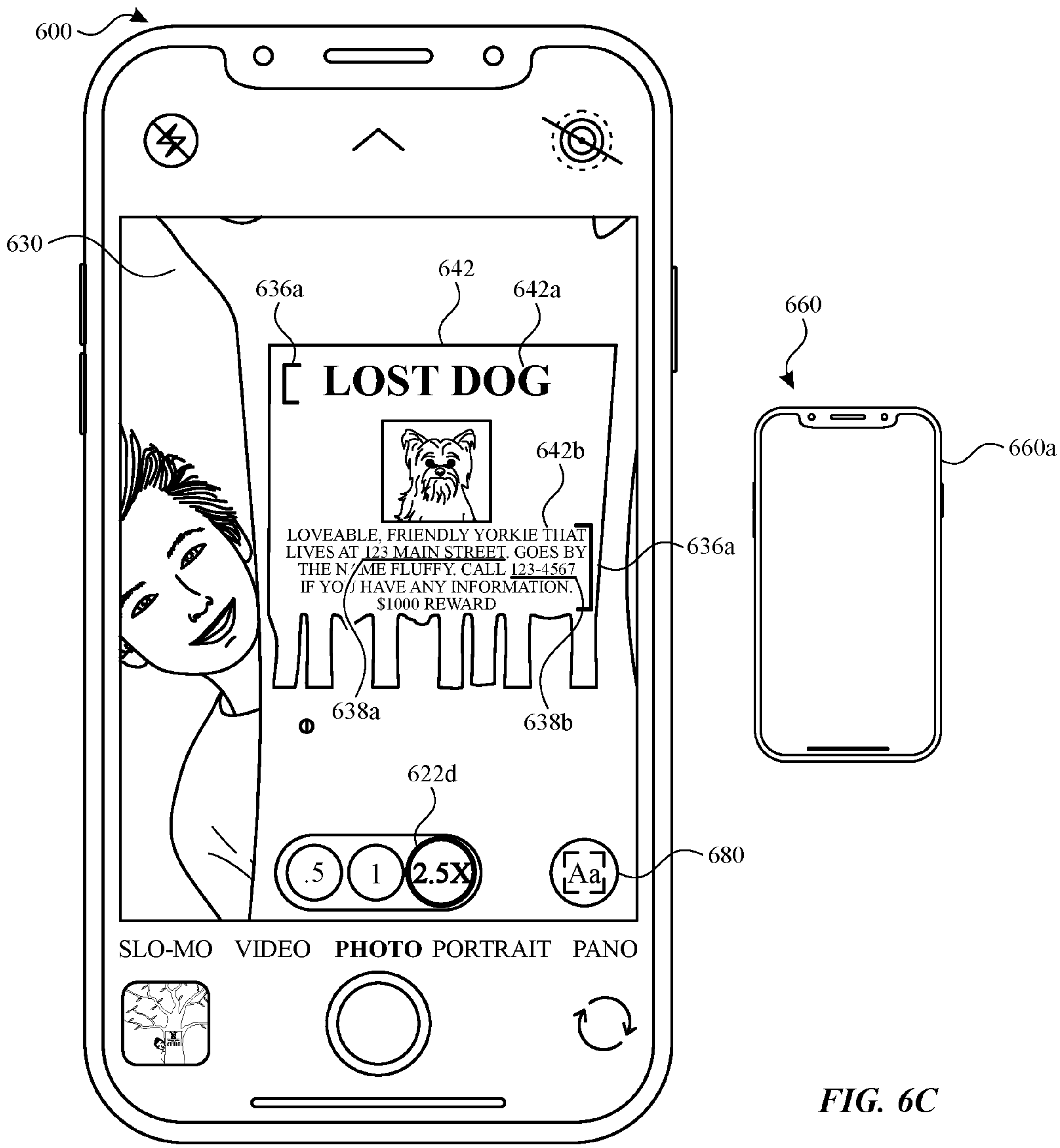
Figure 6D:
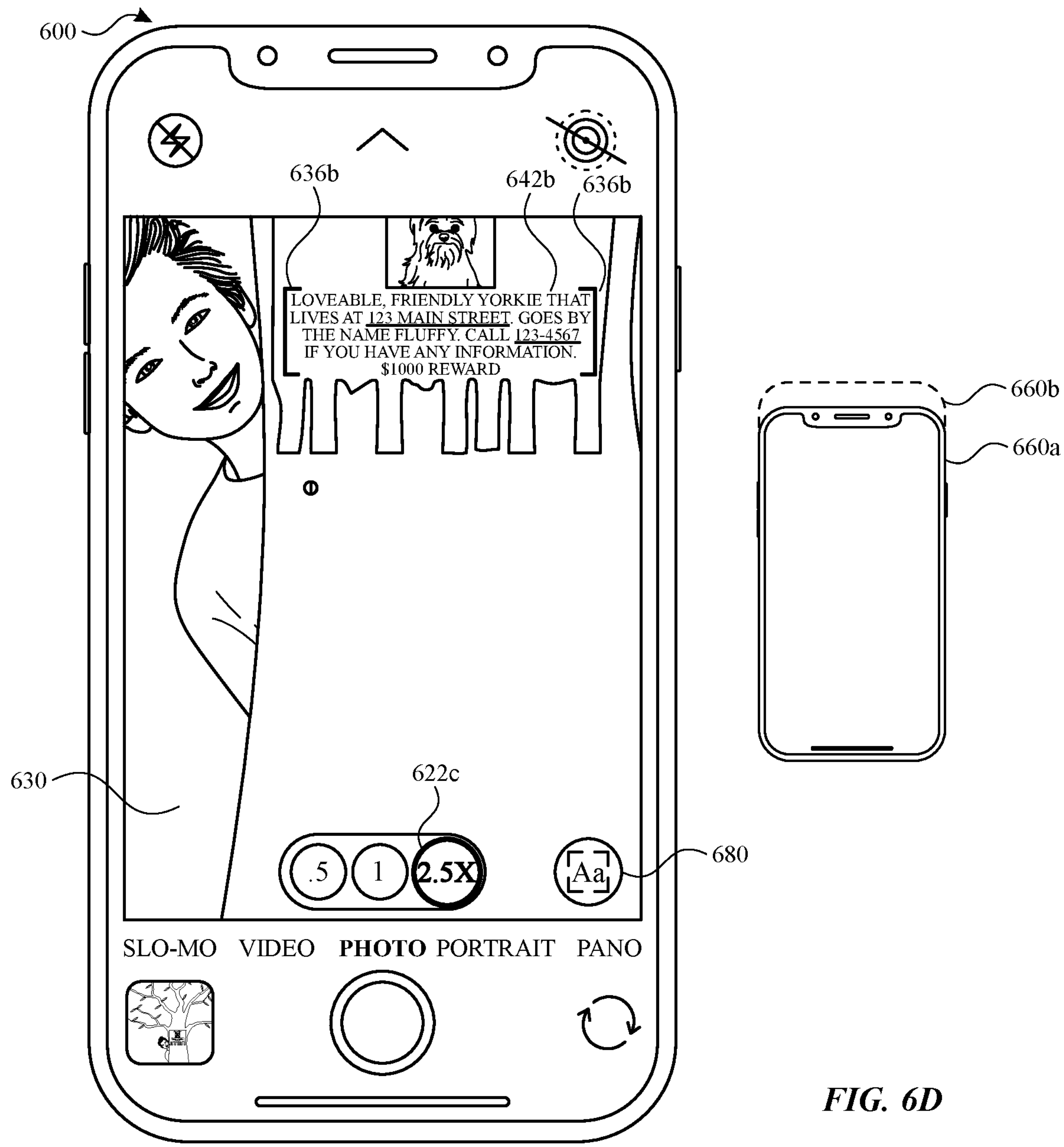
Figure 6F:
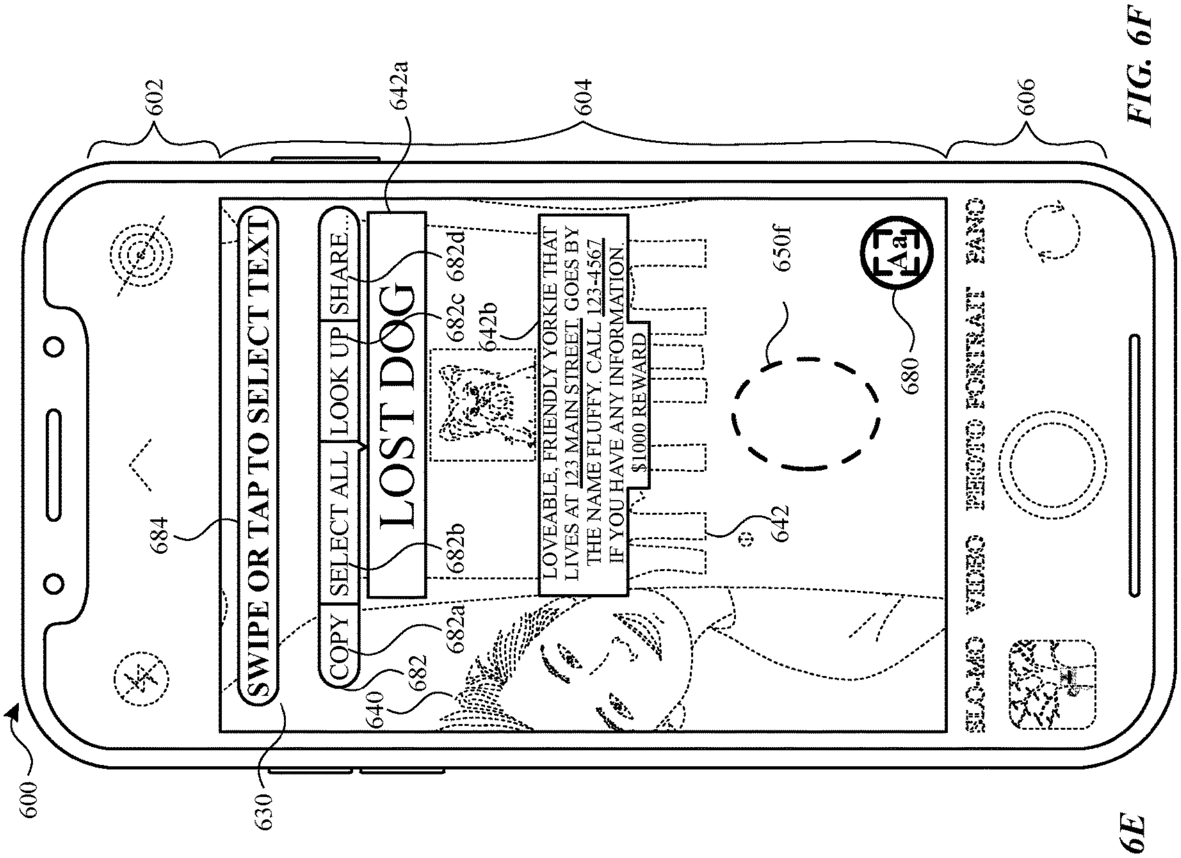
Figure 6E:
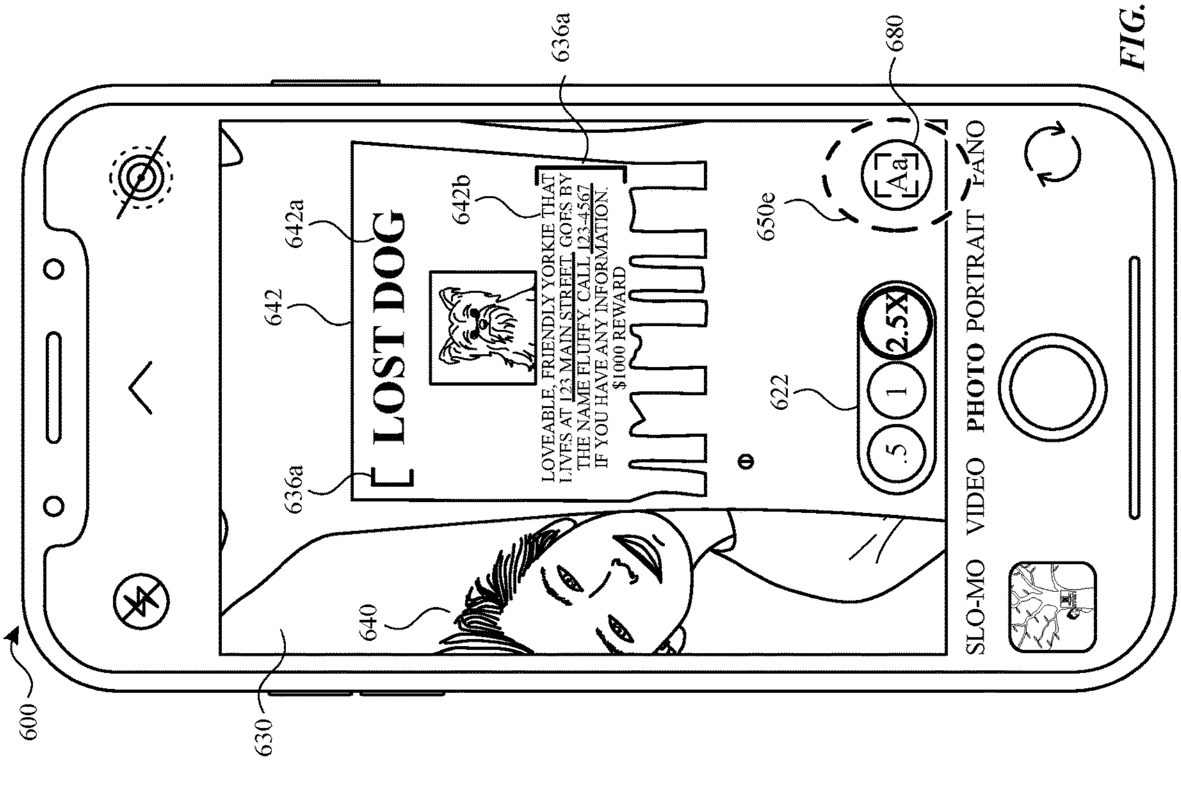
Figure 6H:
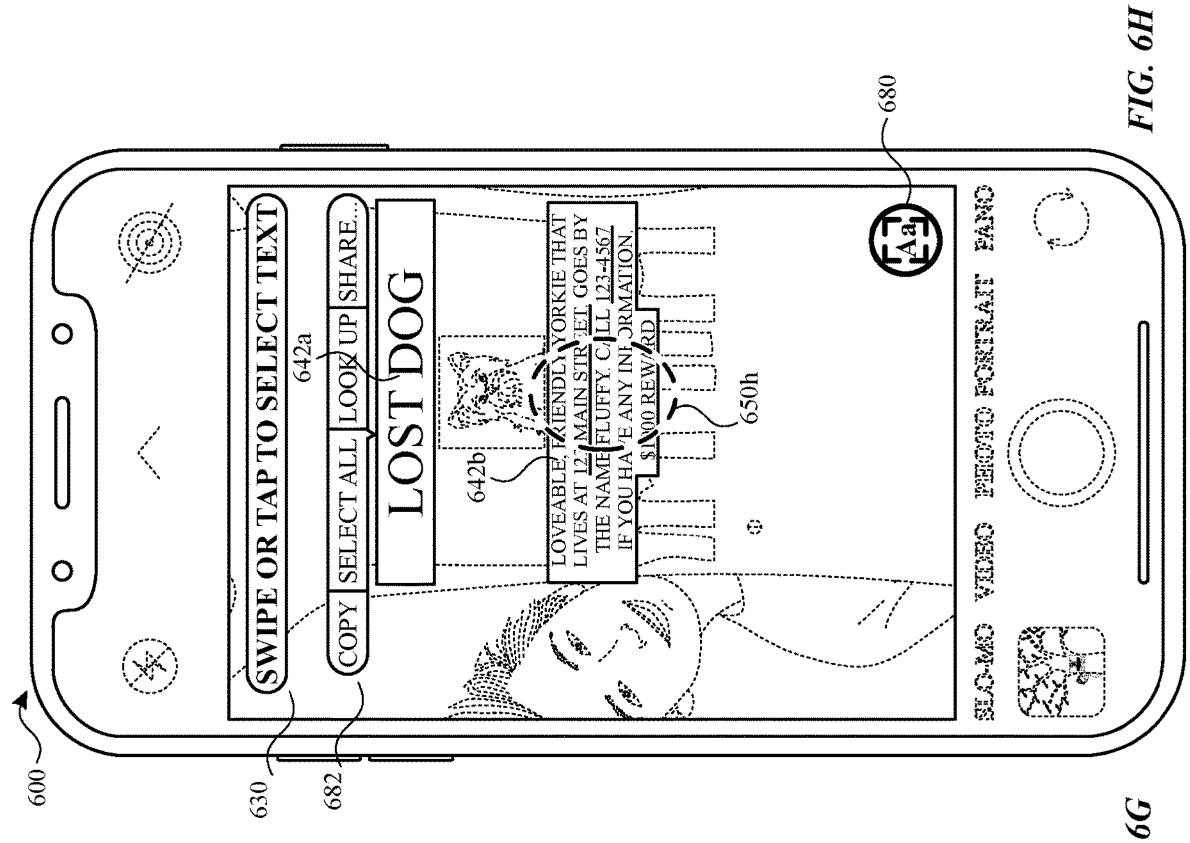
Figure 6G:
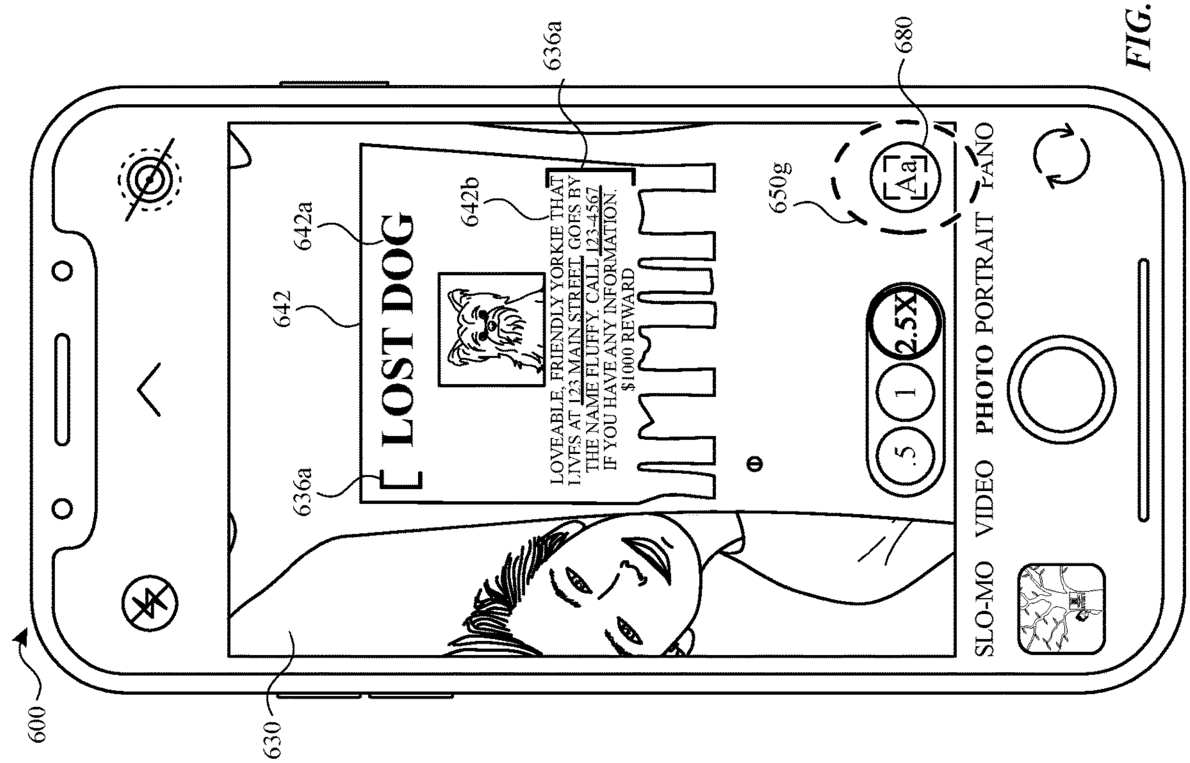
Figure 6J:
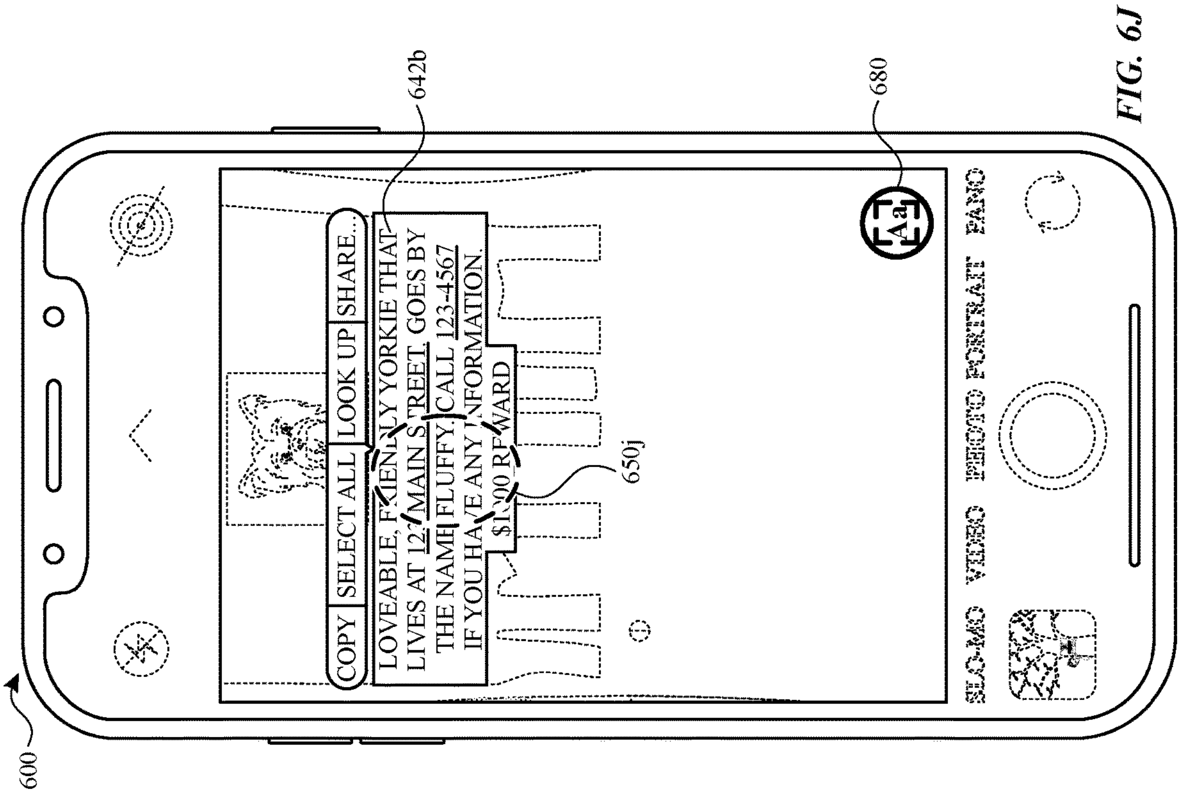
Figure 6I:
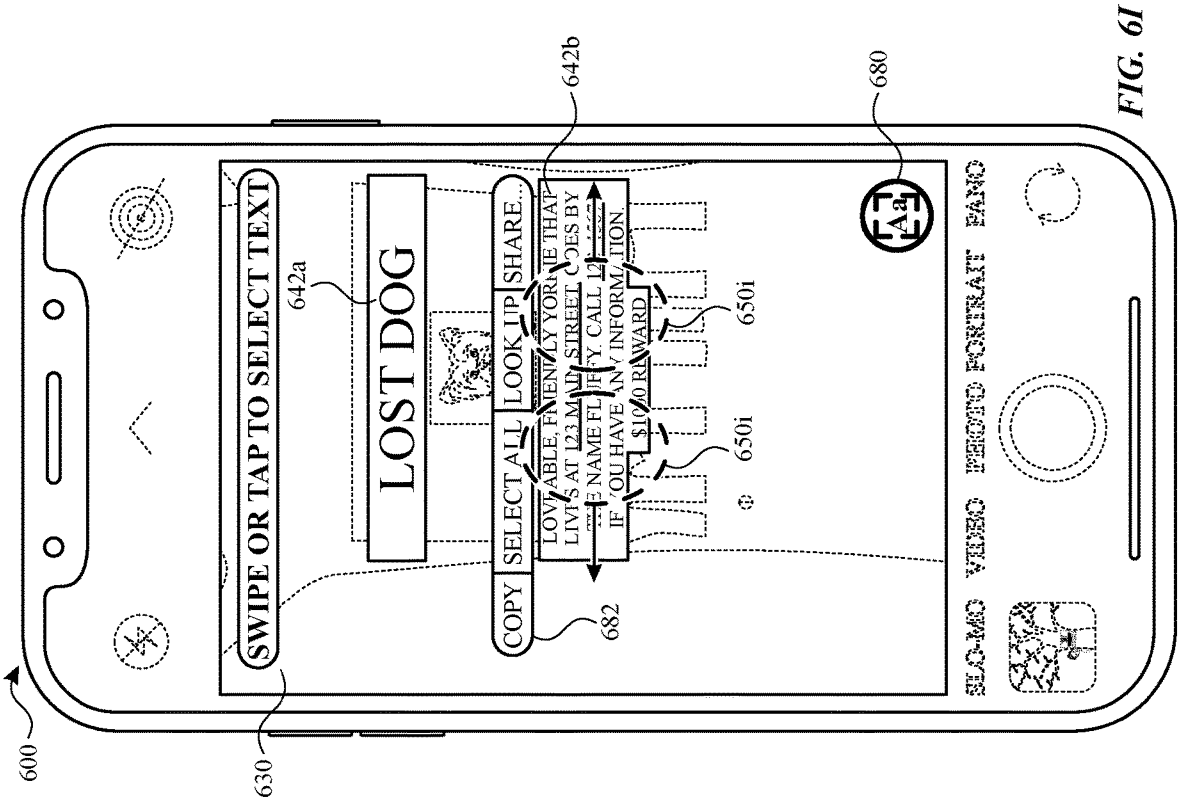
Figure 6K:
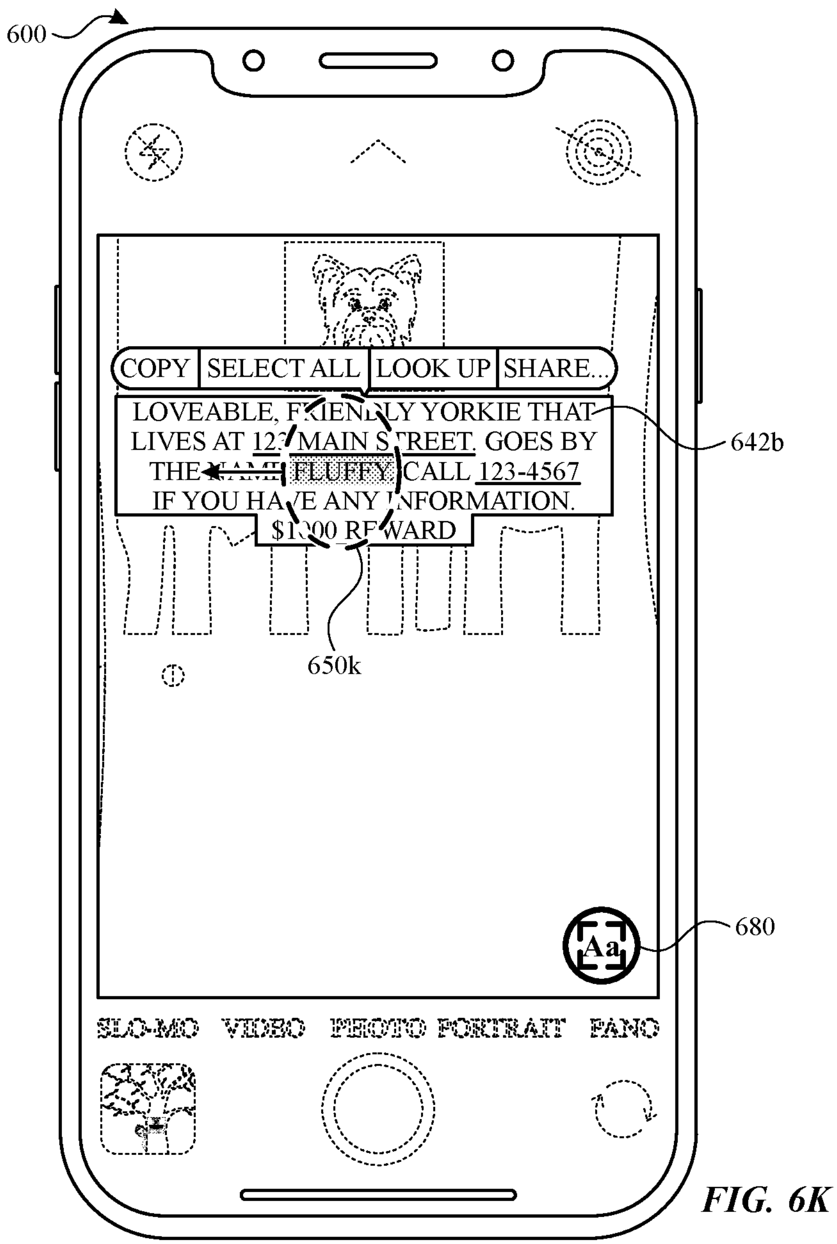
Figure 6L:
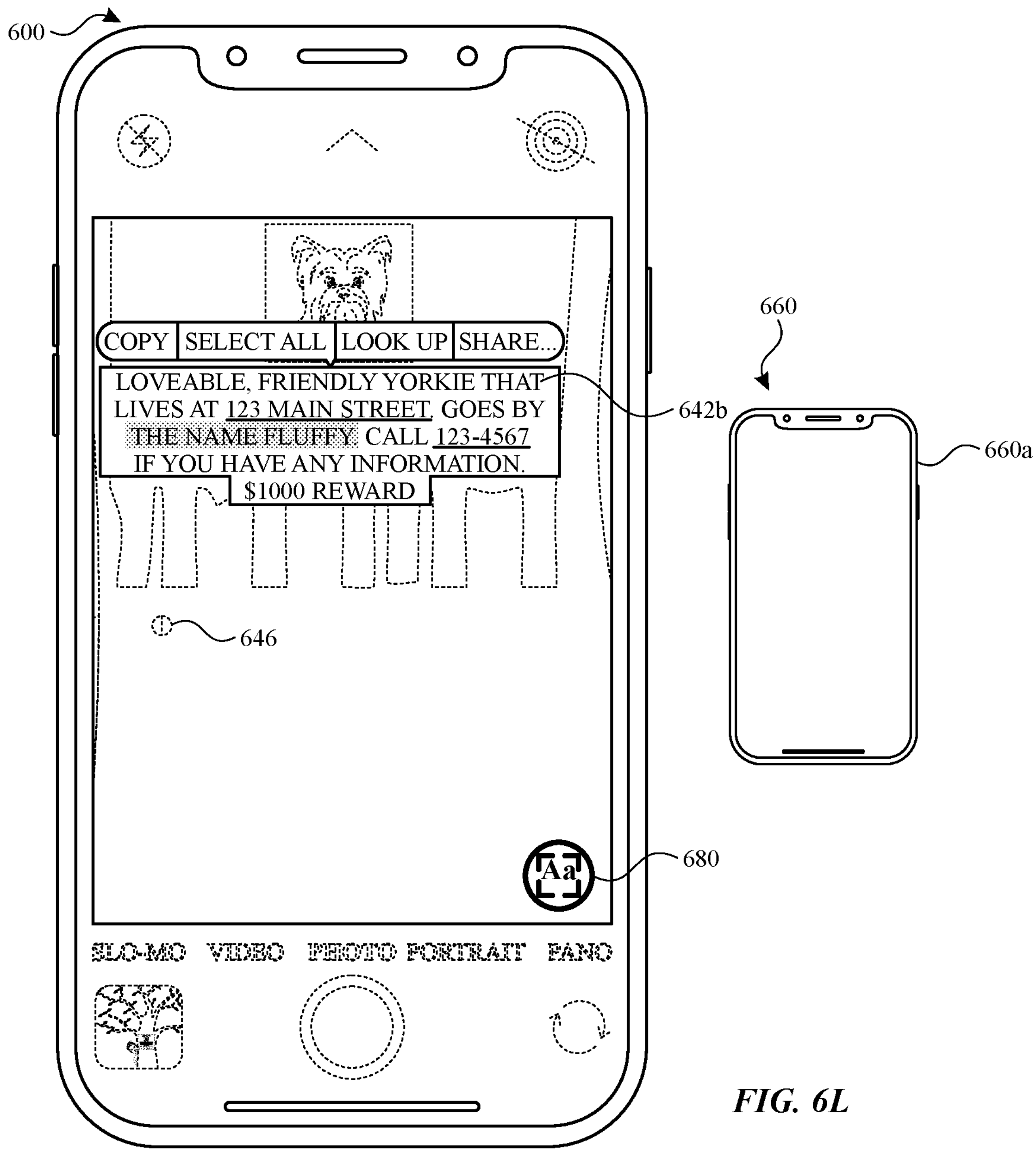
Figure 6M:
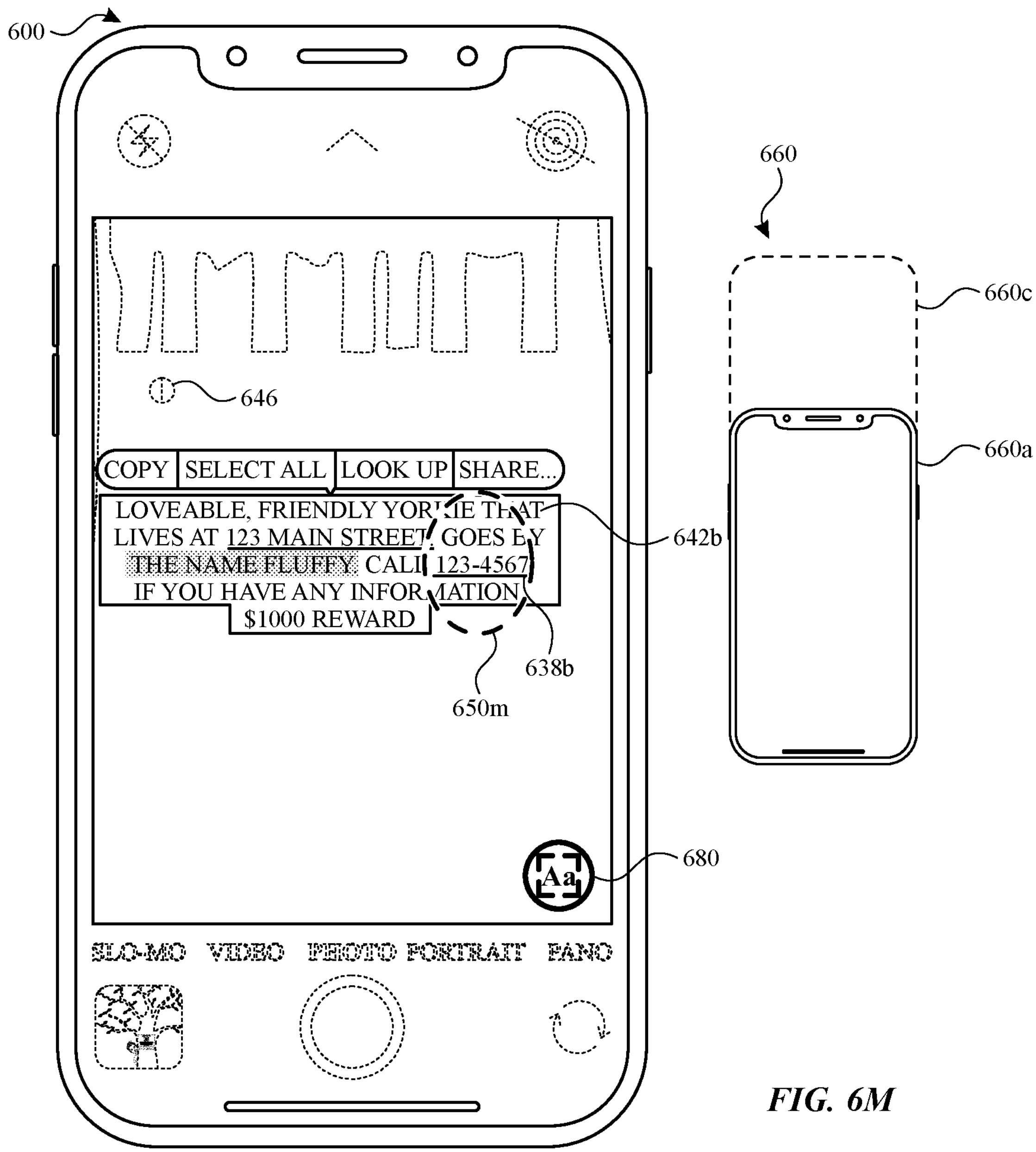
Figure 6O:
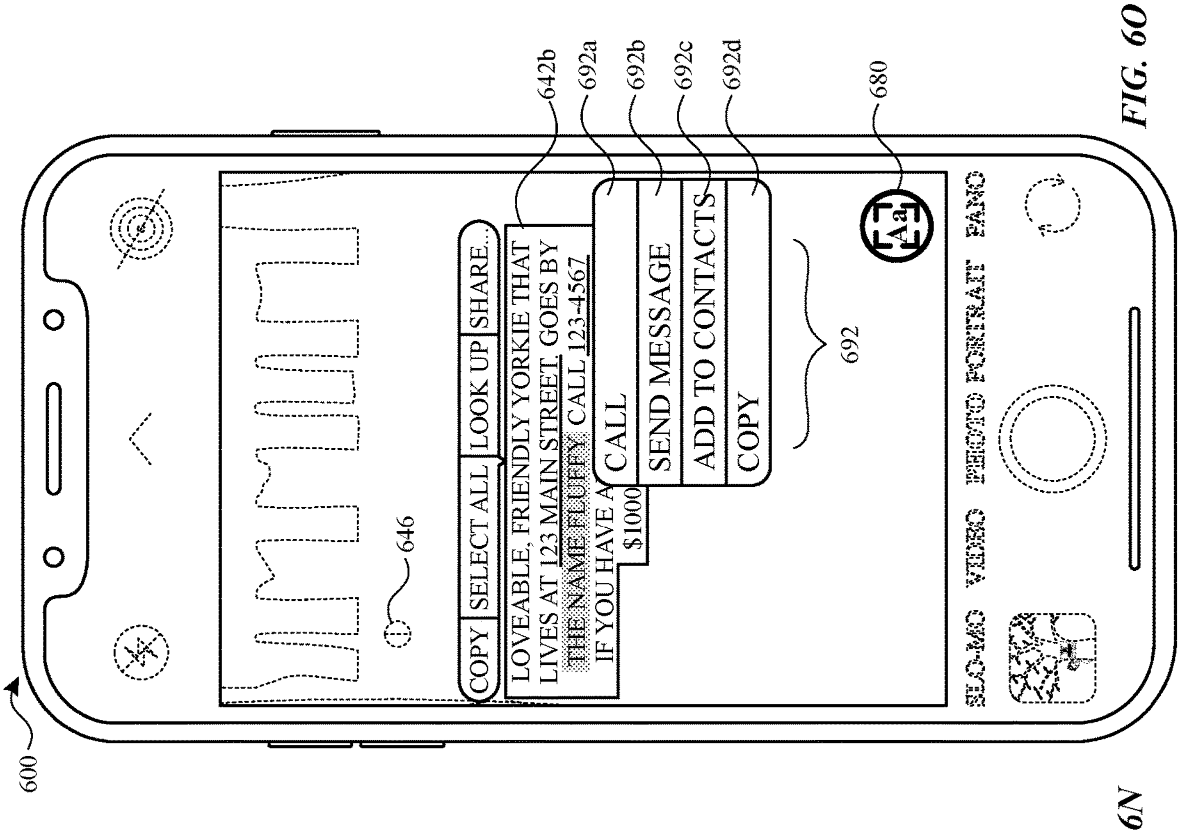
Figure 6N:
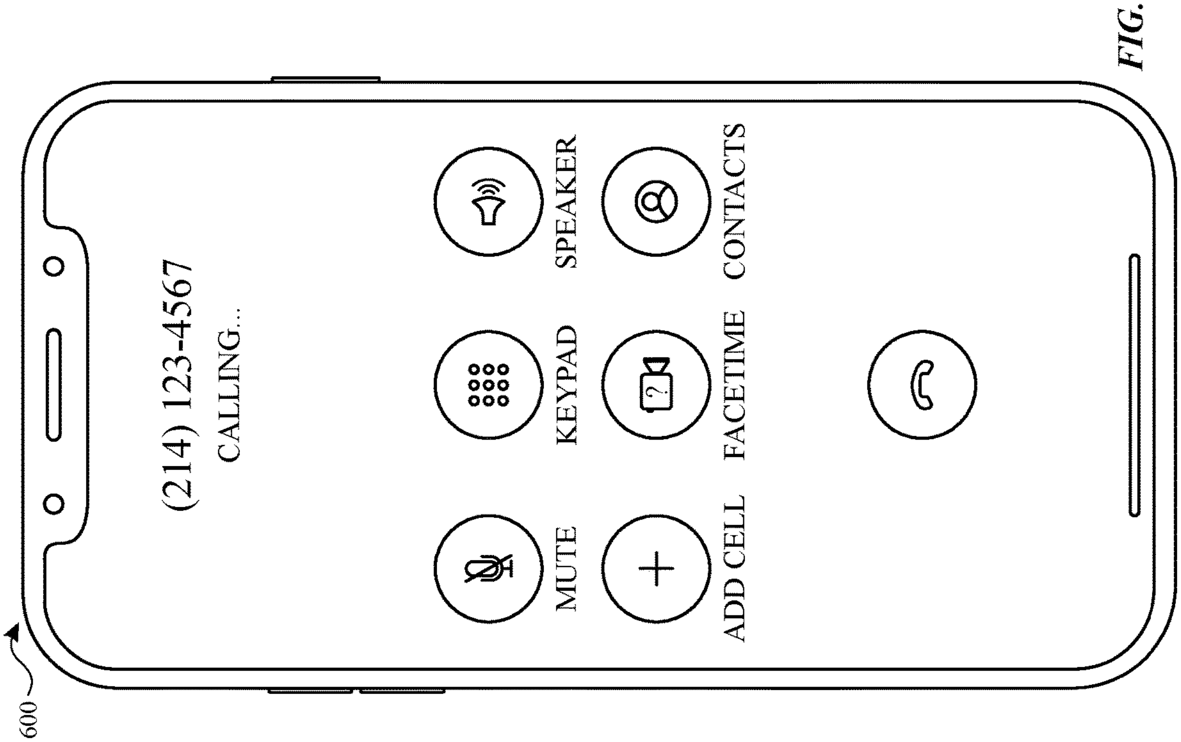
Figure 6Q:
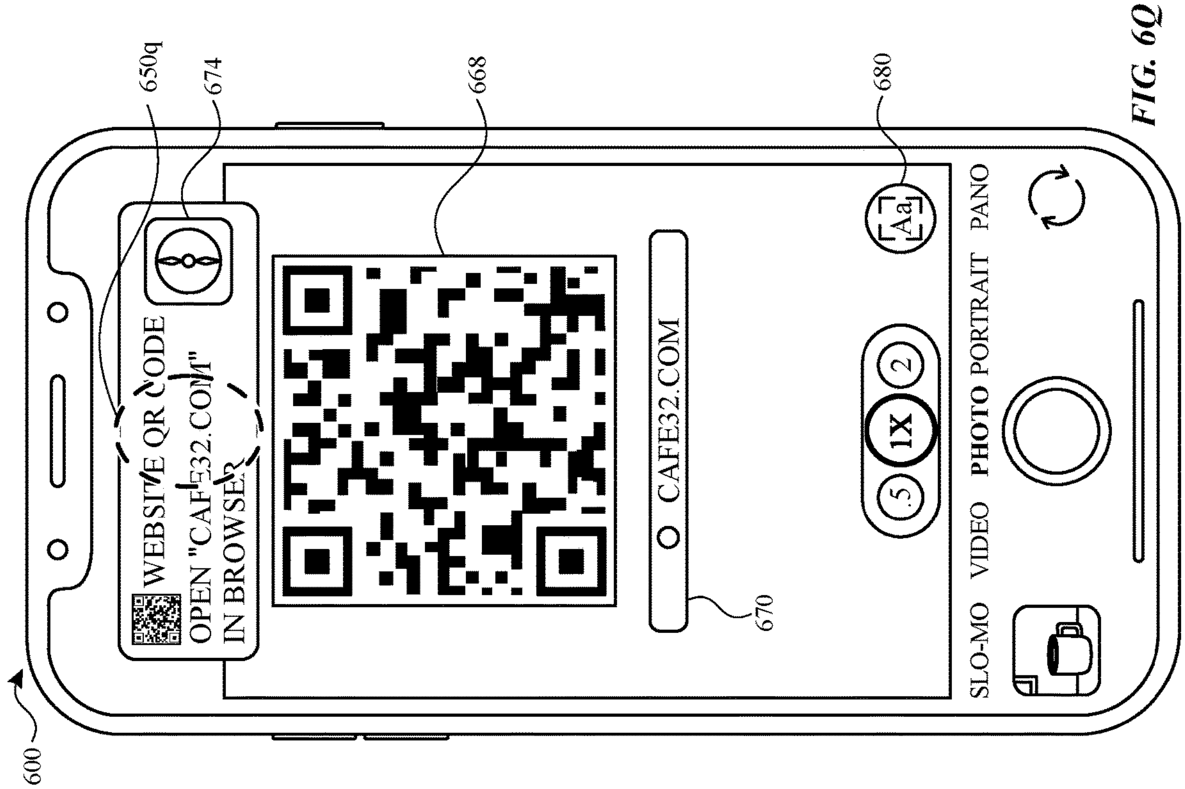
Figure 6P:
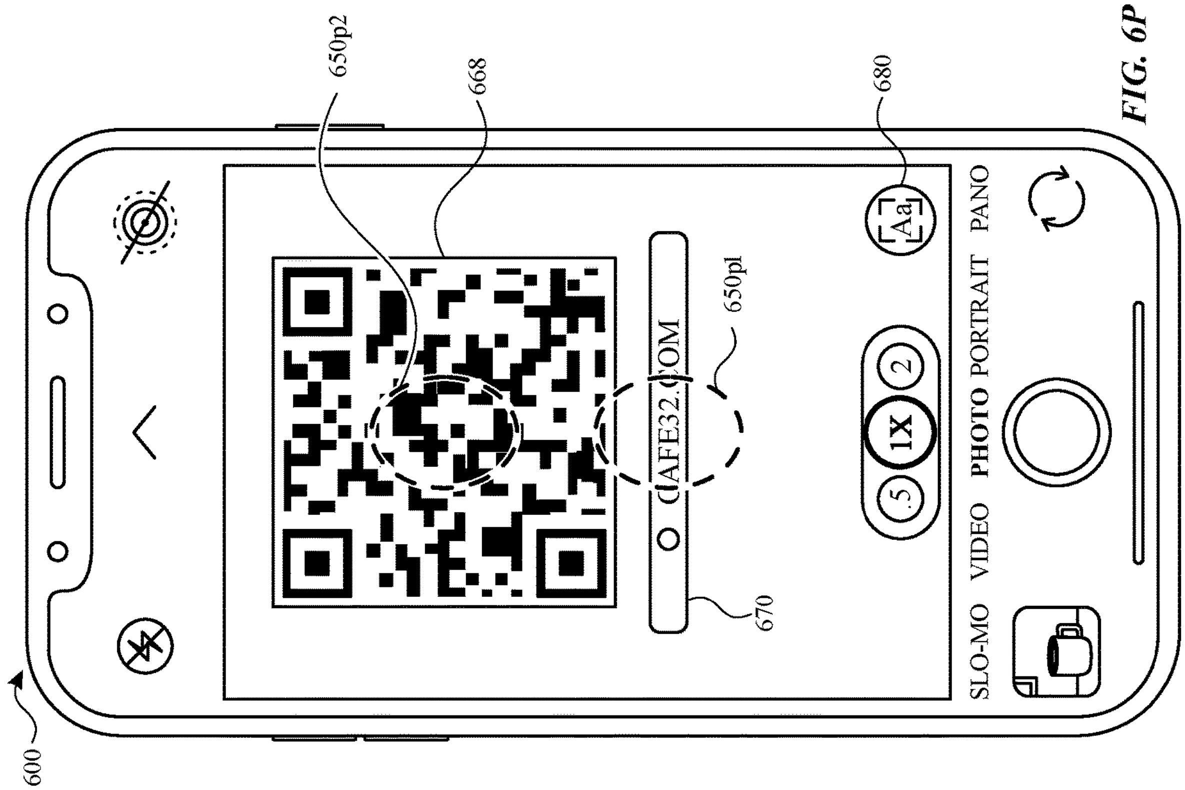
Figure 6R:
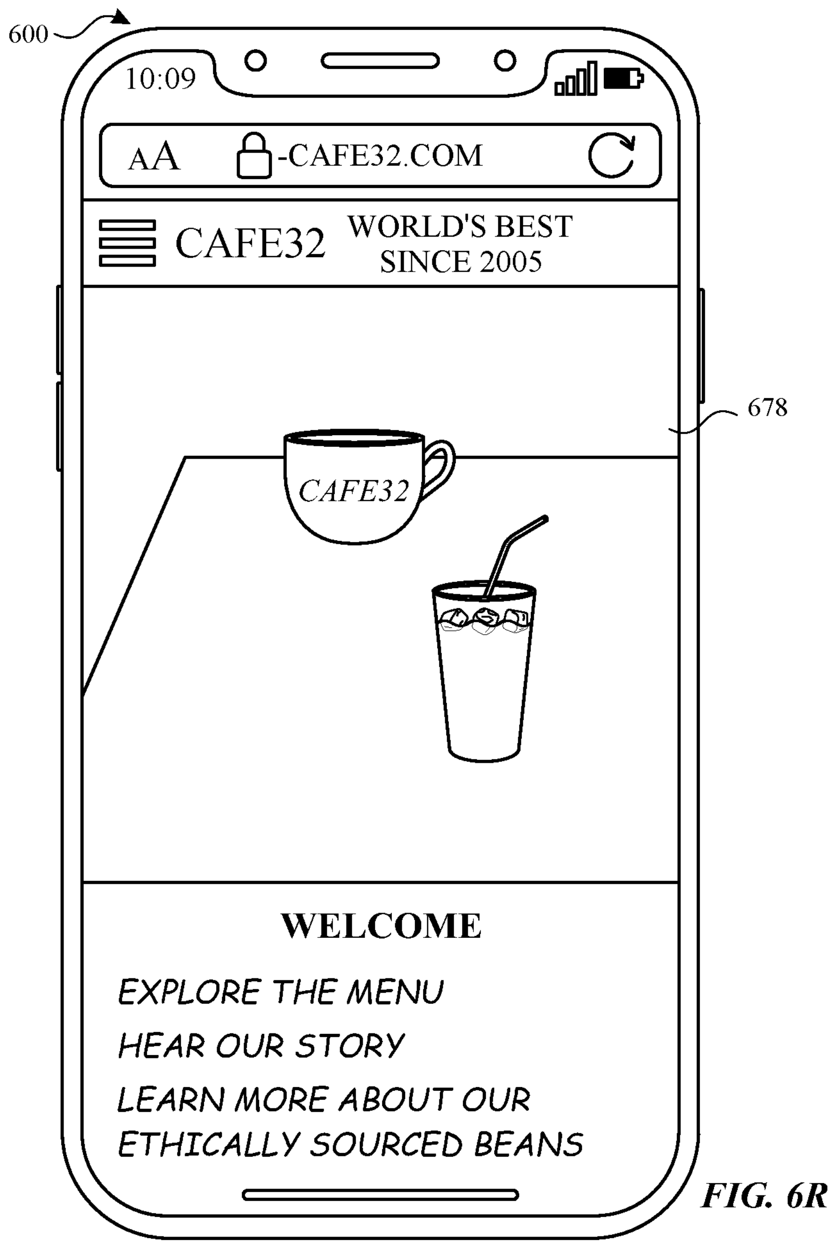
Figure 6T:
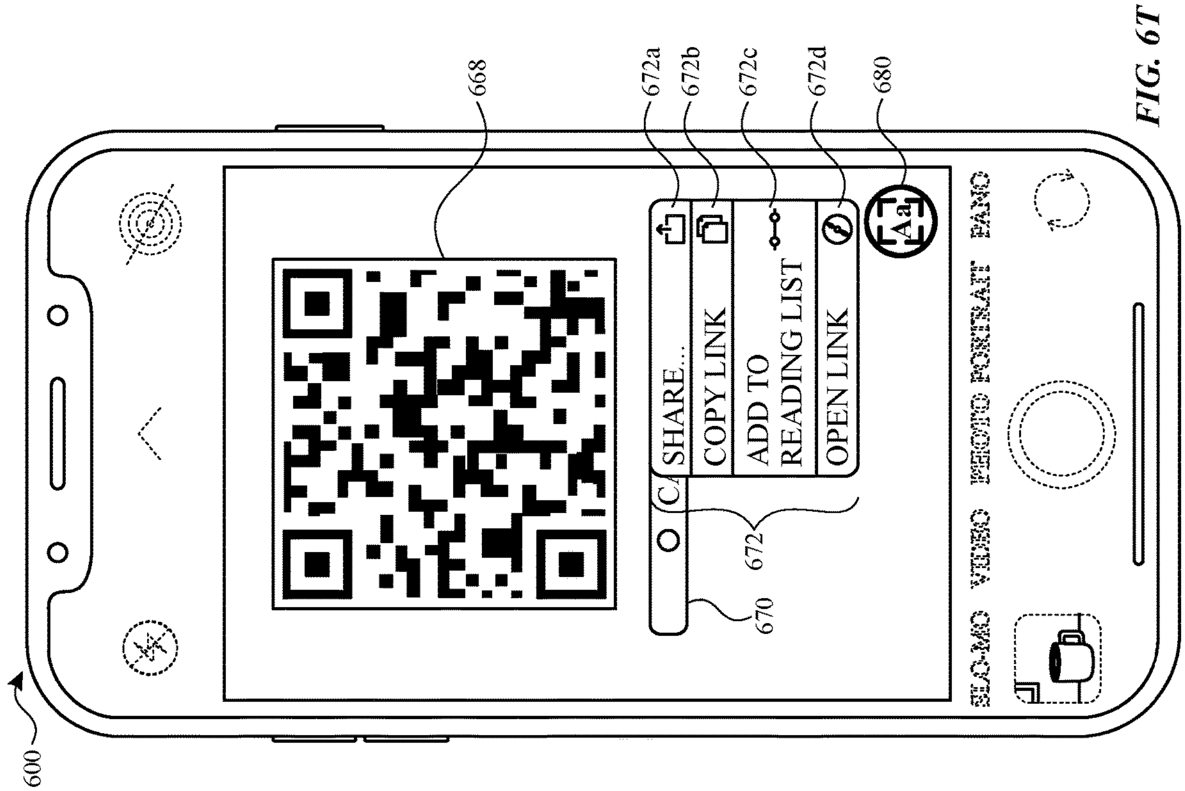
Figure 6S:
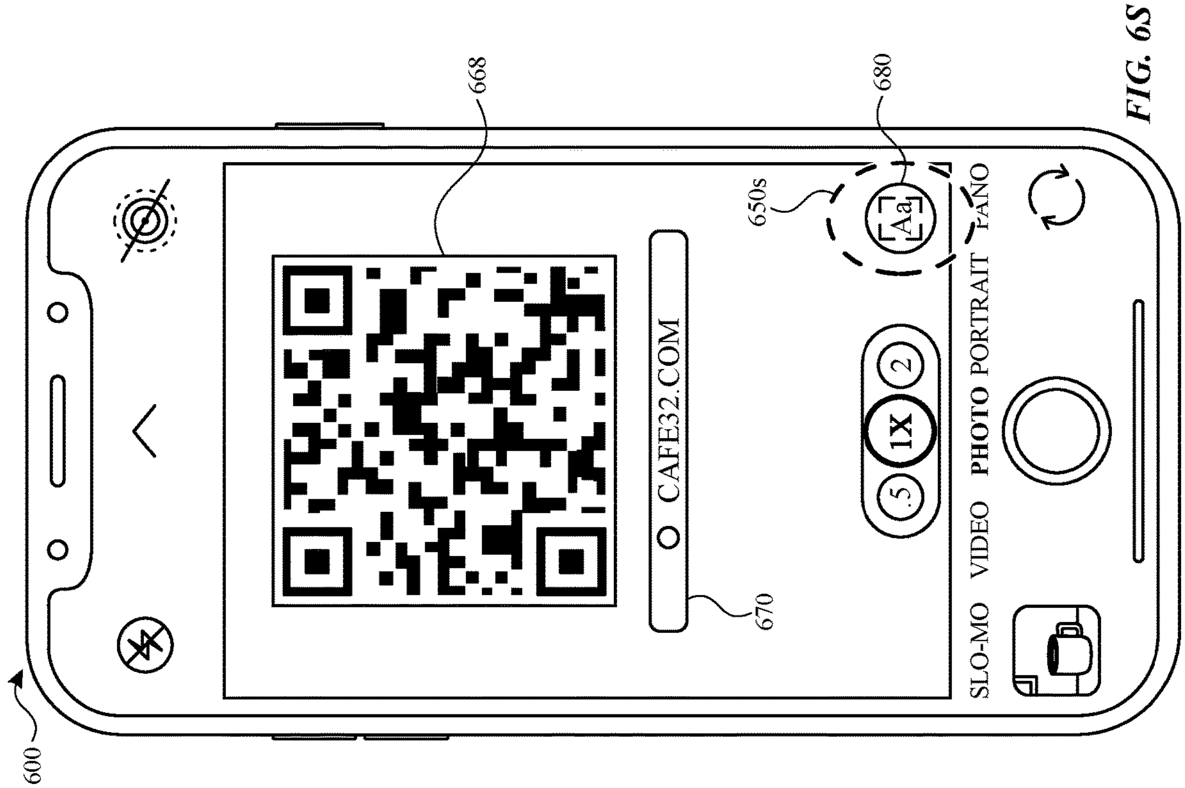
Figure 6U:
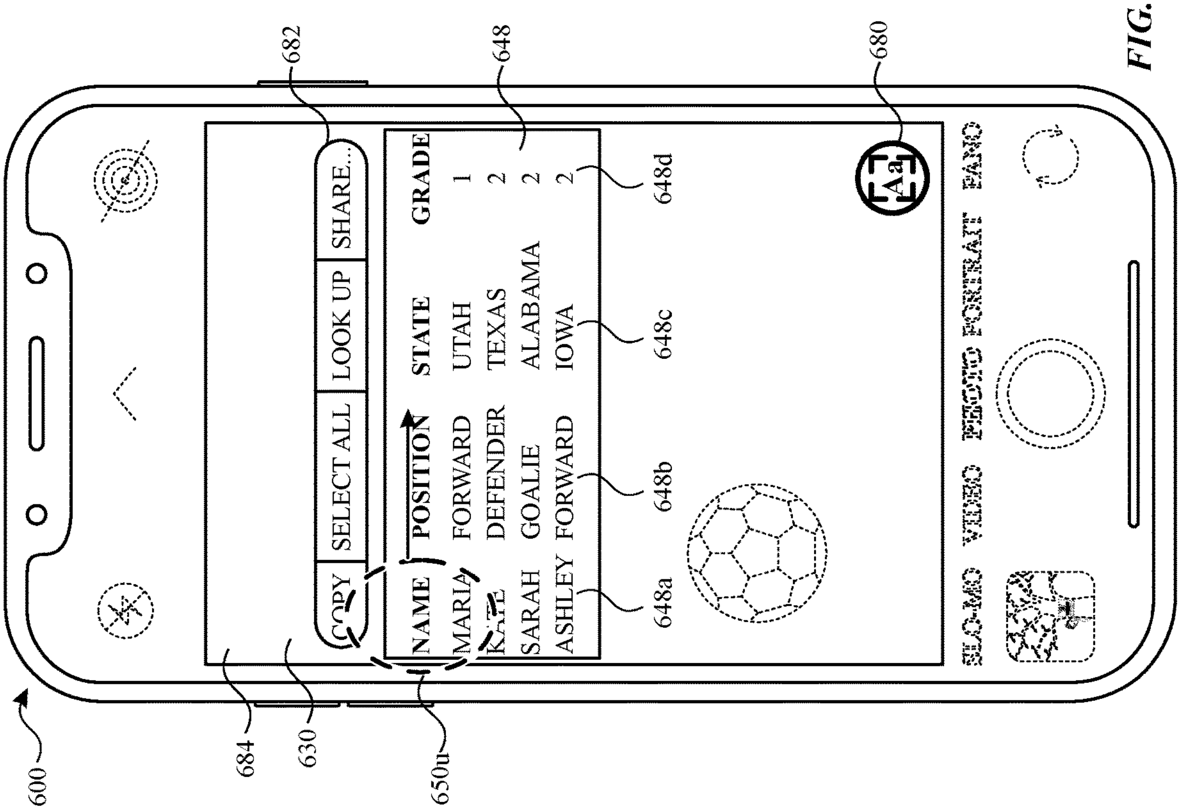
Figure 6V:
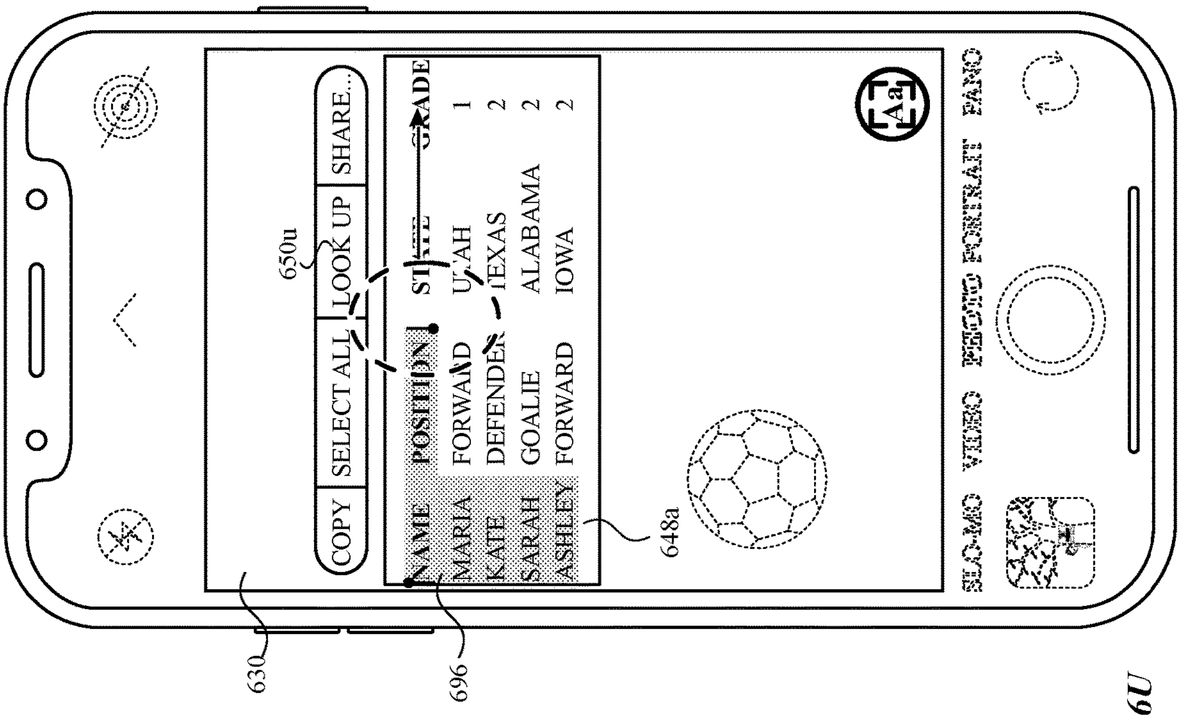
Figure 6X:
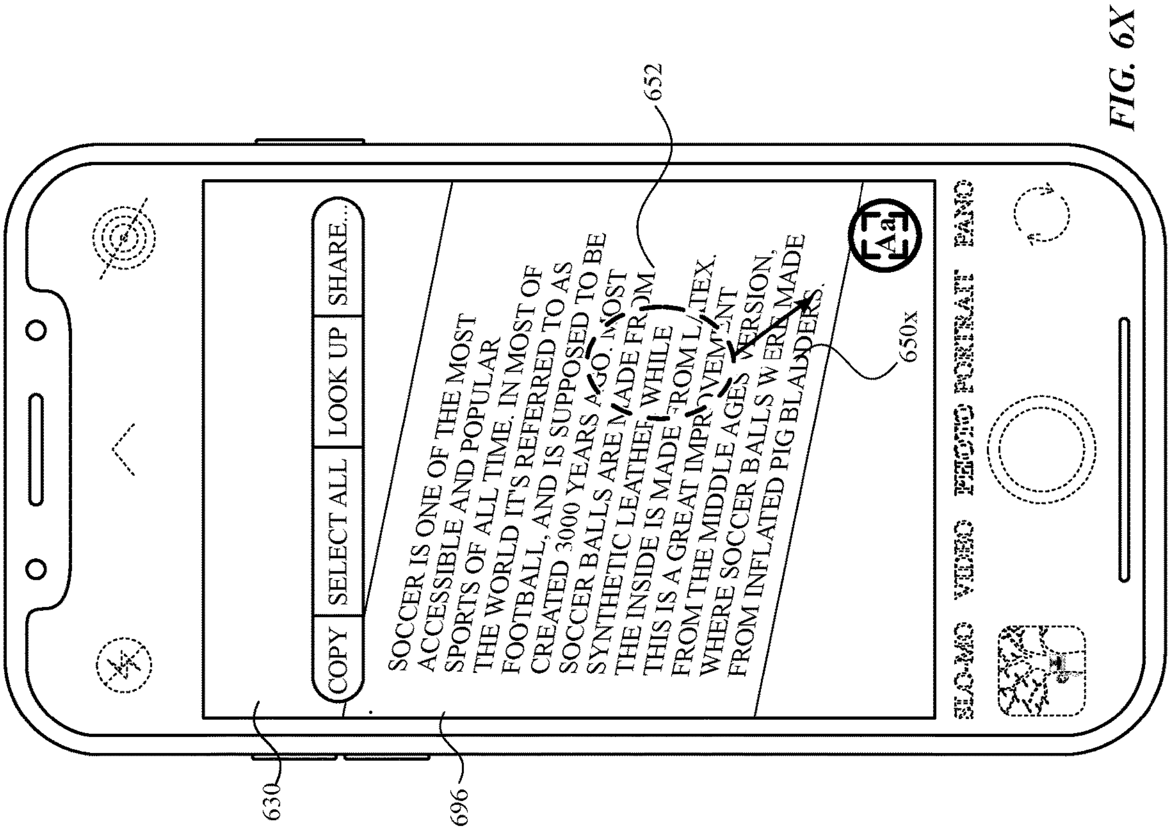
Figure 6W:
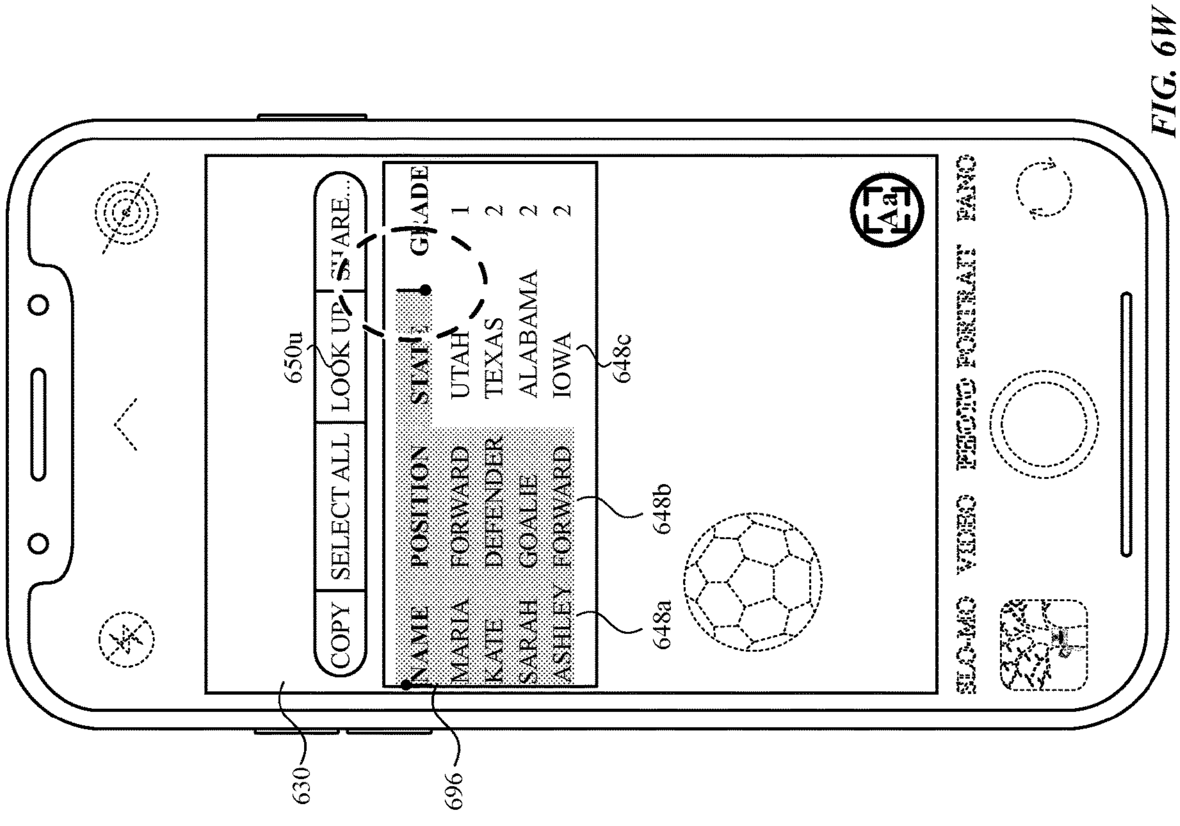
Figure 6Y:
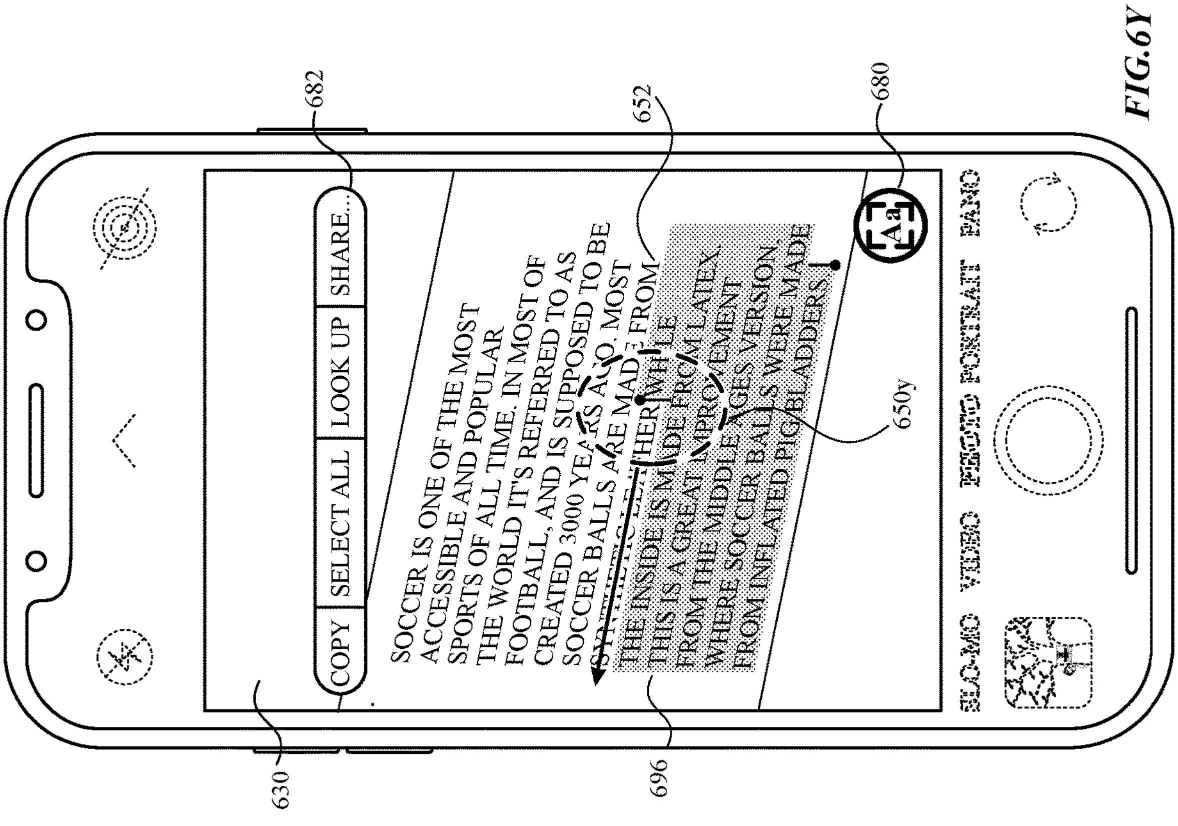
Figure 6Z:
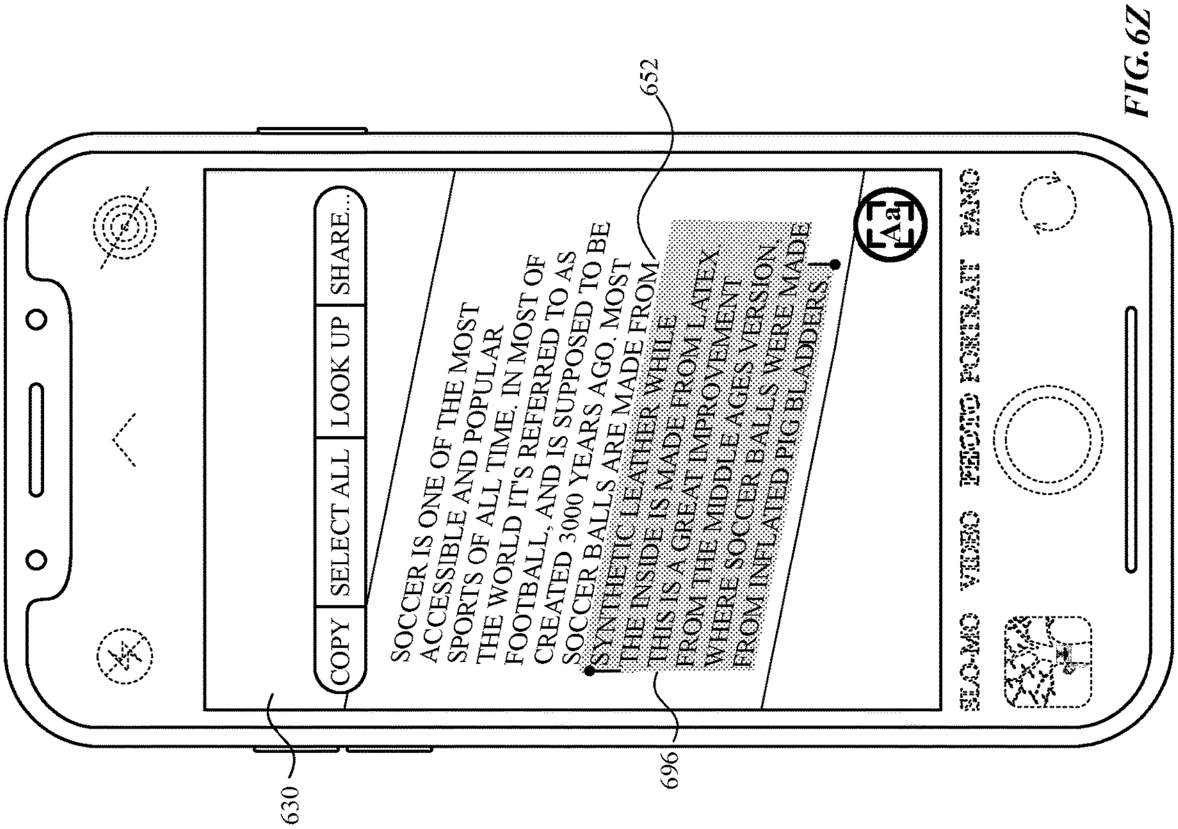
Figure 8:
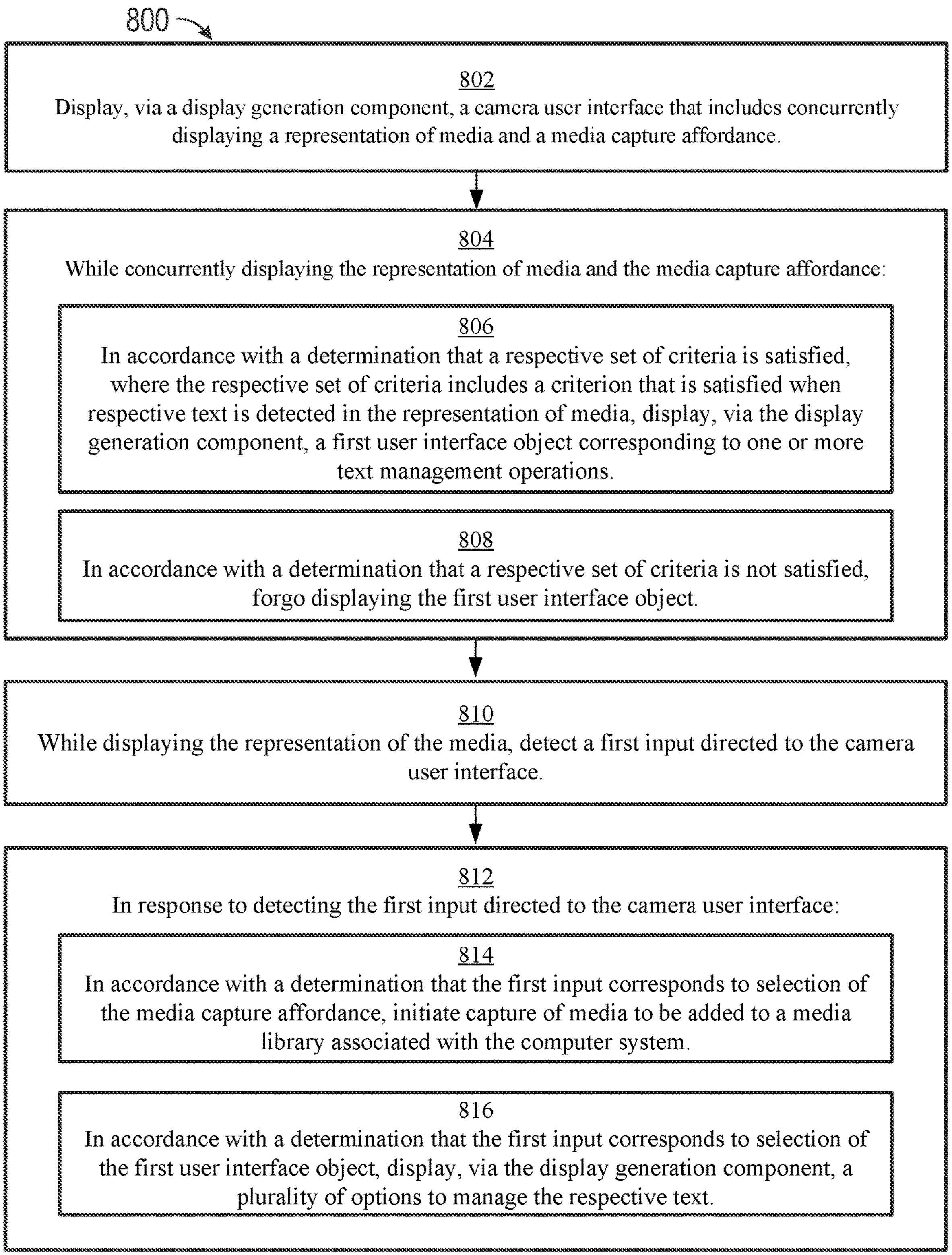
FIG. 8 is a flow diagram illustrating a method for managing visual content in media in accordance with some embodiments.

FIGS. 6A-6Z illustrate exemplary user interfaces for managing visual content in media. FIG. 8 is a flow diagram illustrating methods of managing visual content in accordance with some embodiments. The user interfaces in FIGS. 6A-6Z are used to illustrate the processes described below, including the processes in FIG. 8.

Figure 9:
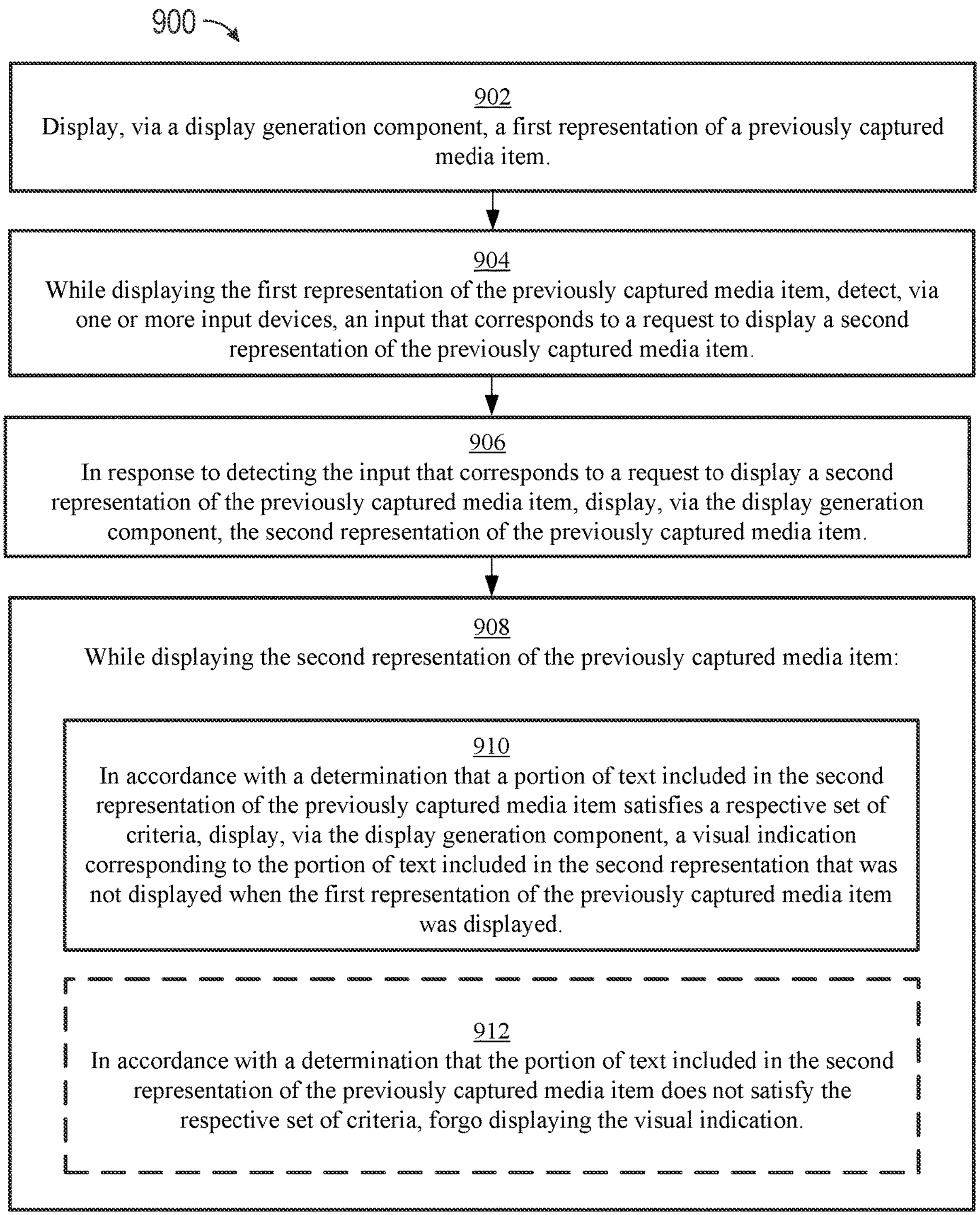
FIG. 9 is a flow diagram illustrating for managing visual indicators for visual content in media in accordance with some embodiments.

FIGS. 7A-7L illustrate exemplary user interfaces for managing visual indicators for visual content in media. FIG. 9 is a flow diagram illustrating methods of managing visual indicators for visual content in media in accordance with some embodiments. The user interfaces in FIGS. 7A-7L are used to illustrate the processes described below, including the processes in FIG. 9.

Figures 10A, 10B:
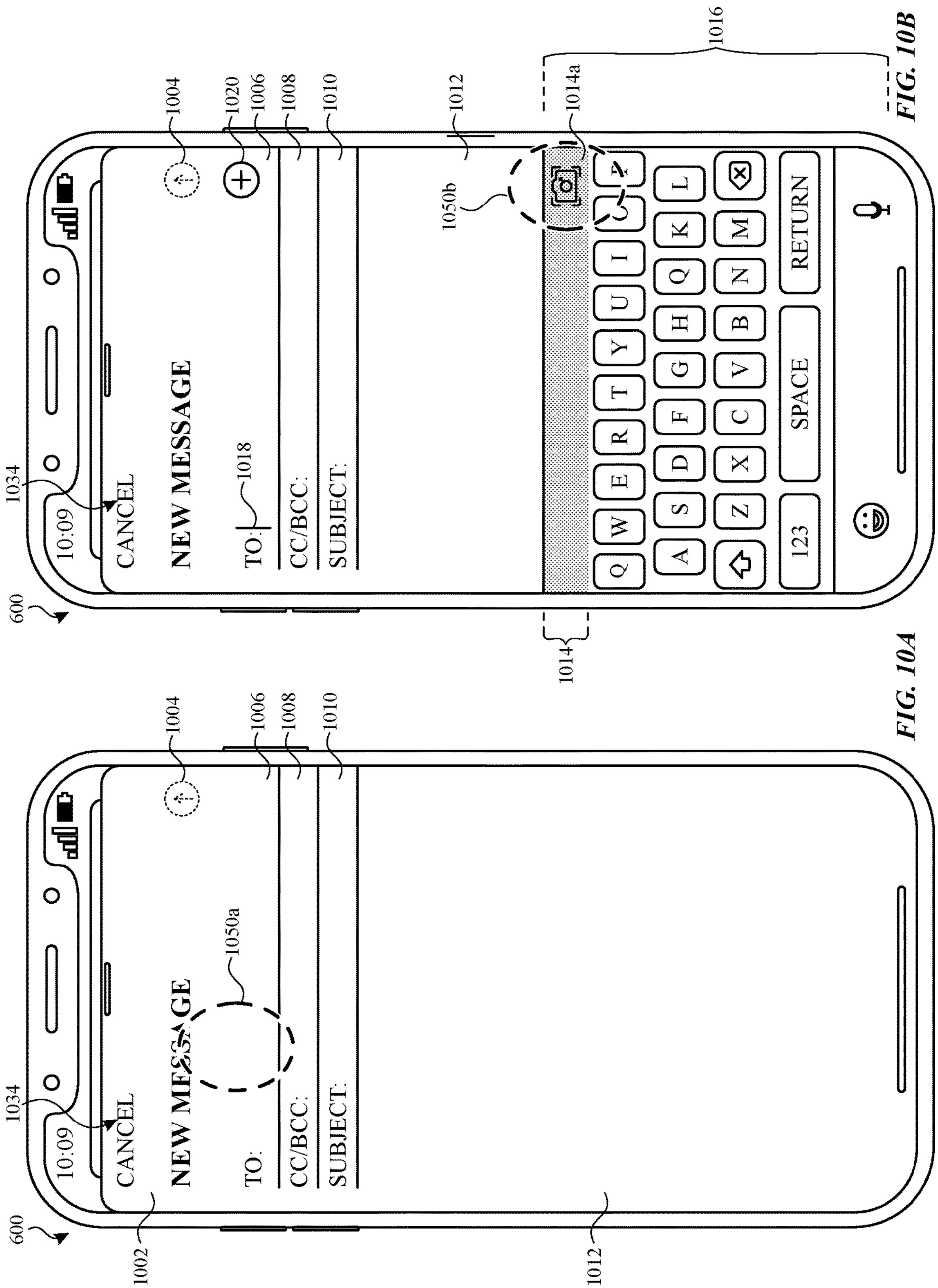
FIGS. 10A-10AD illustrate exemplary user interfaces for inserting visual content in media in accordance with some embodiments.

FIGS. 10A-10AD illustrate exemplary user interfaces for inserting visual content in media. FIG. 11 is a flow diagram illustrating methods of inserting visual content in media. The user interfaces in FIGS. 10A-10AD are used to illustrate the processes described below, including the process in FIG. 11.

Figure 12B:
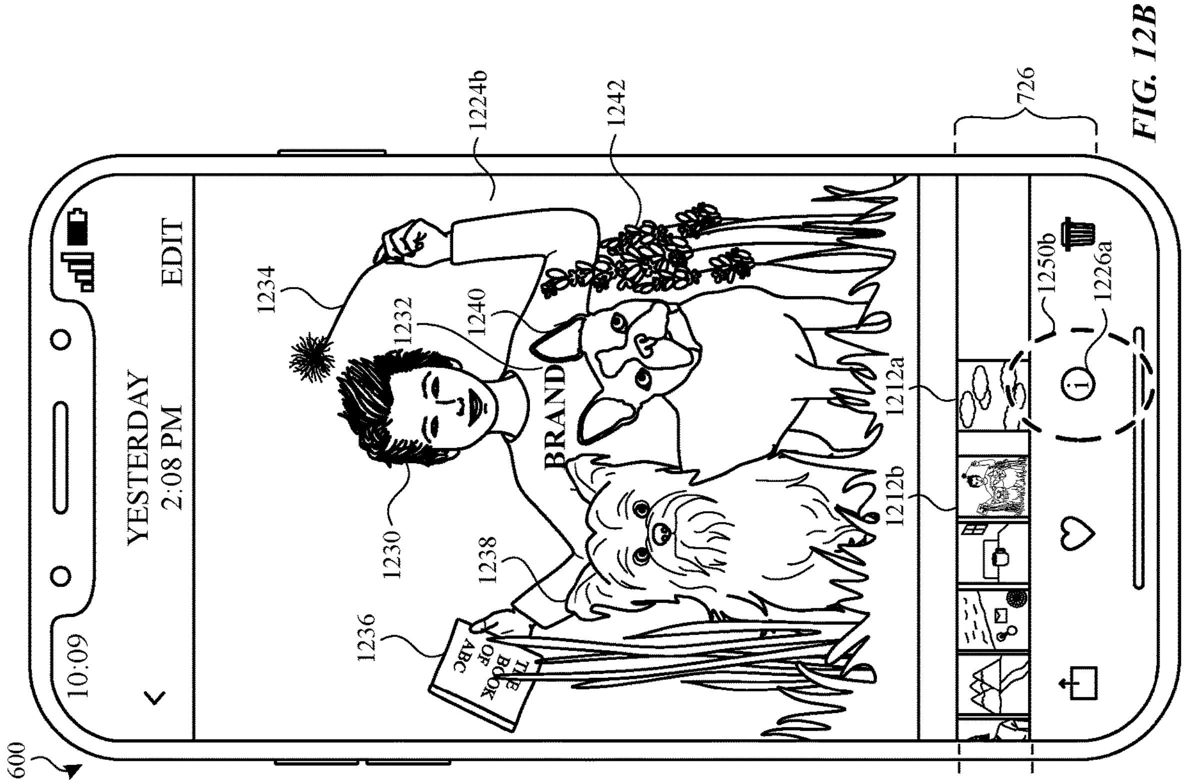
FIGS. 12A-12L illustrate exemplary user interfaces for identifying visual content in media in accordance with some embodiments.

FIGS. 12A-12L illustrate exemplary user interfaces for identifying visual content in media. FIG. 13 is a flow diagram illustrating methods of identifying visual content in media. The user interfaces in FIG. 12A-12L are used to illustrate the process described below, including the processes in FIG. 13.

Figure 14A:
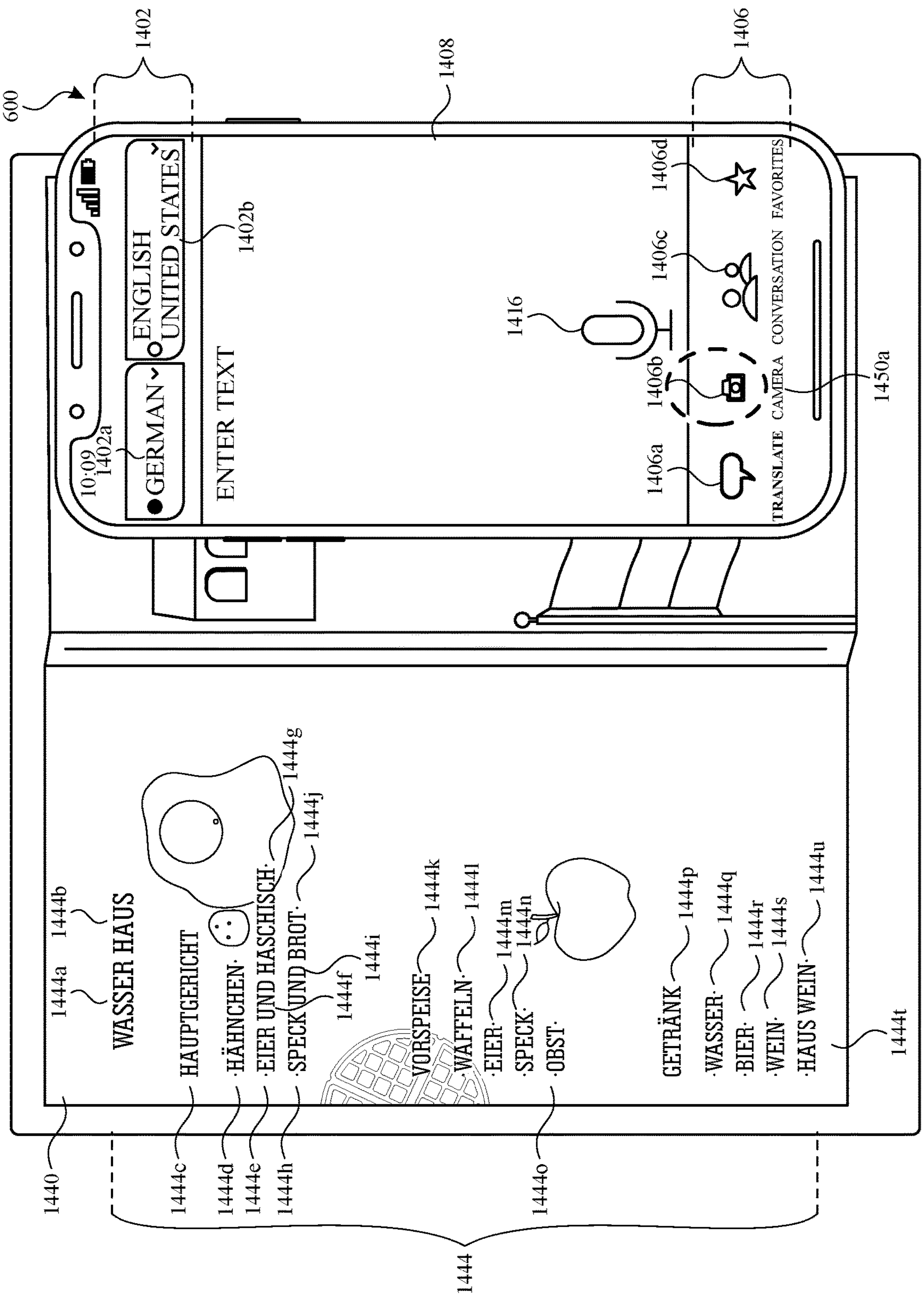
FIGS. 14A-14N illustrate exemplary user interfaces for translating visual content in media in accordance with some embodiments.
Figure 14B:
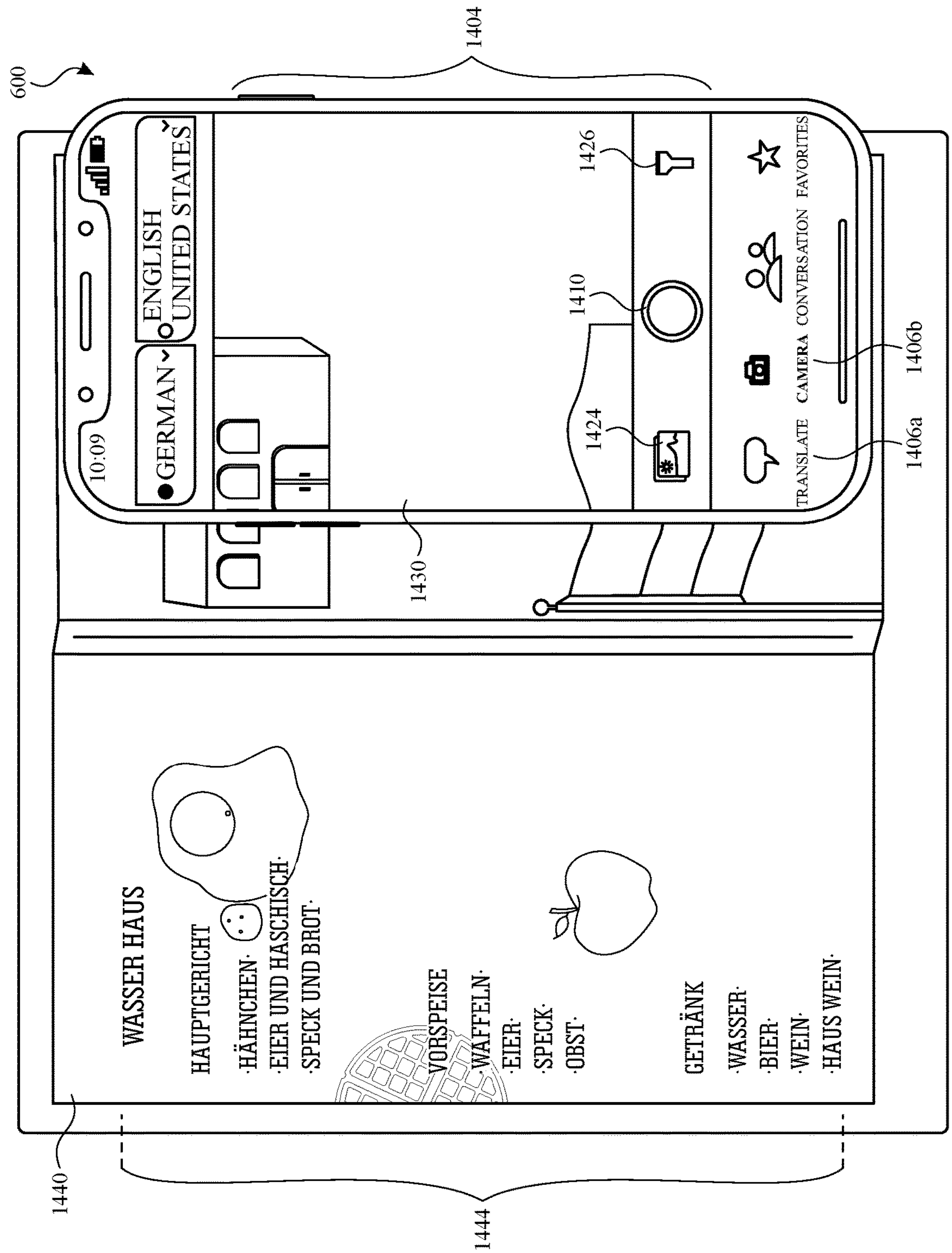
Figure 14C:
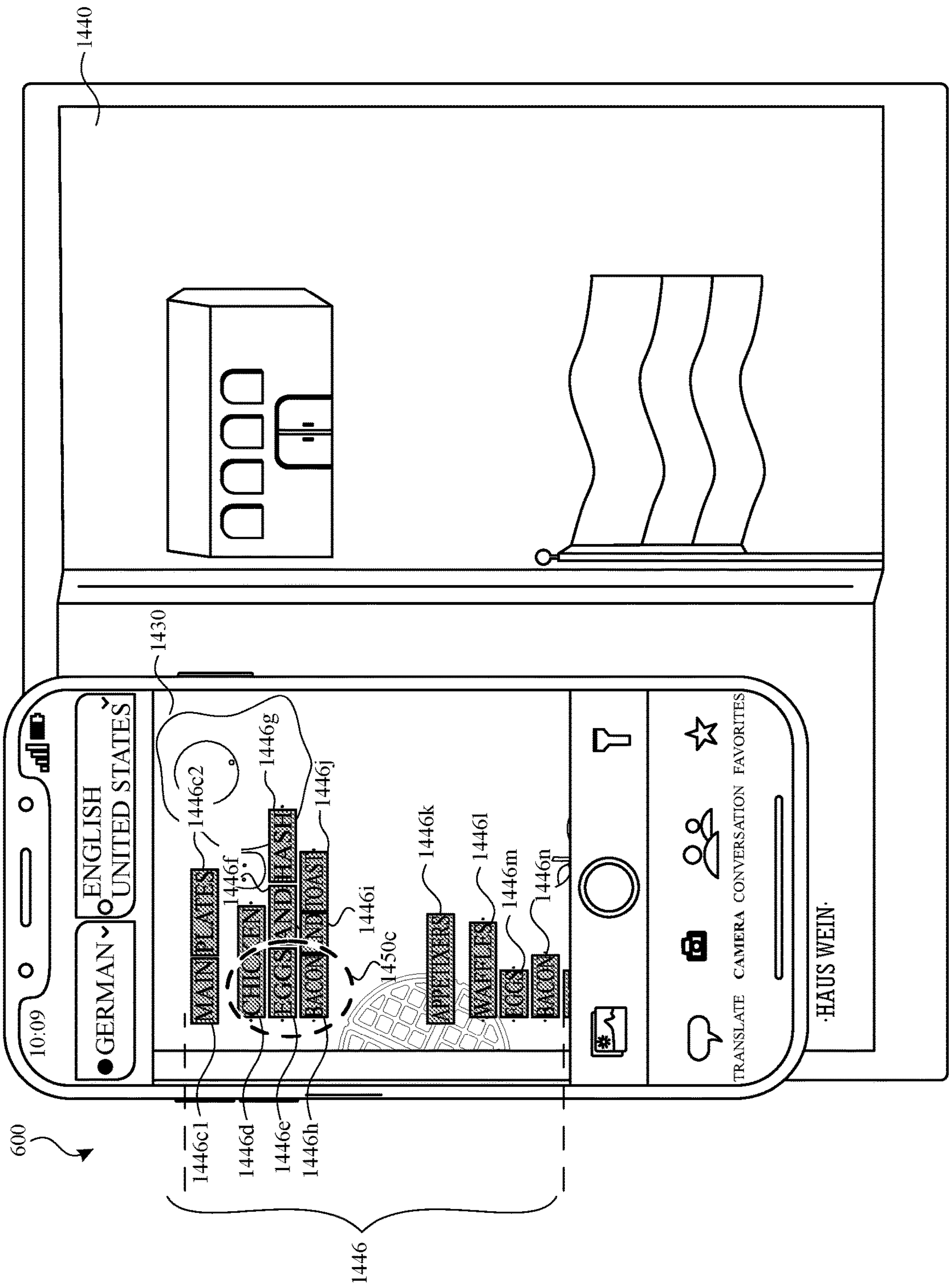
Figure 14D:
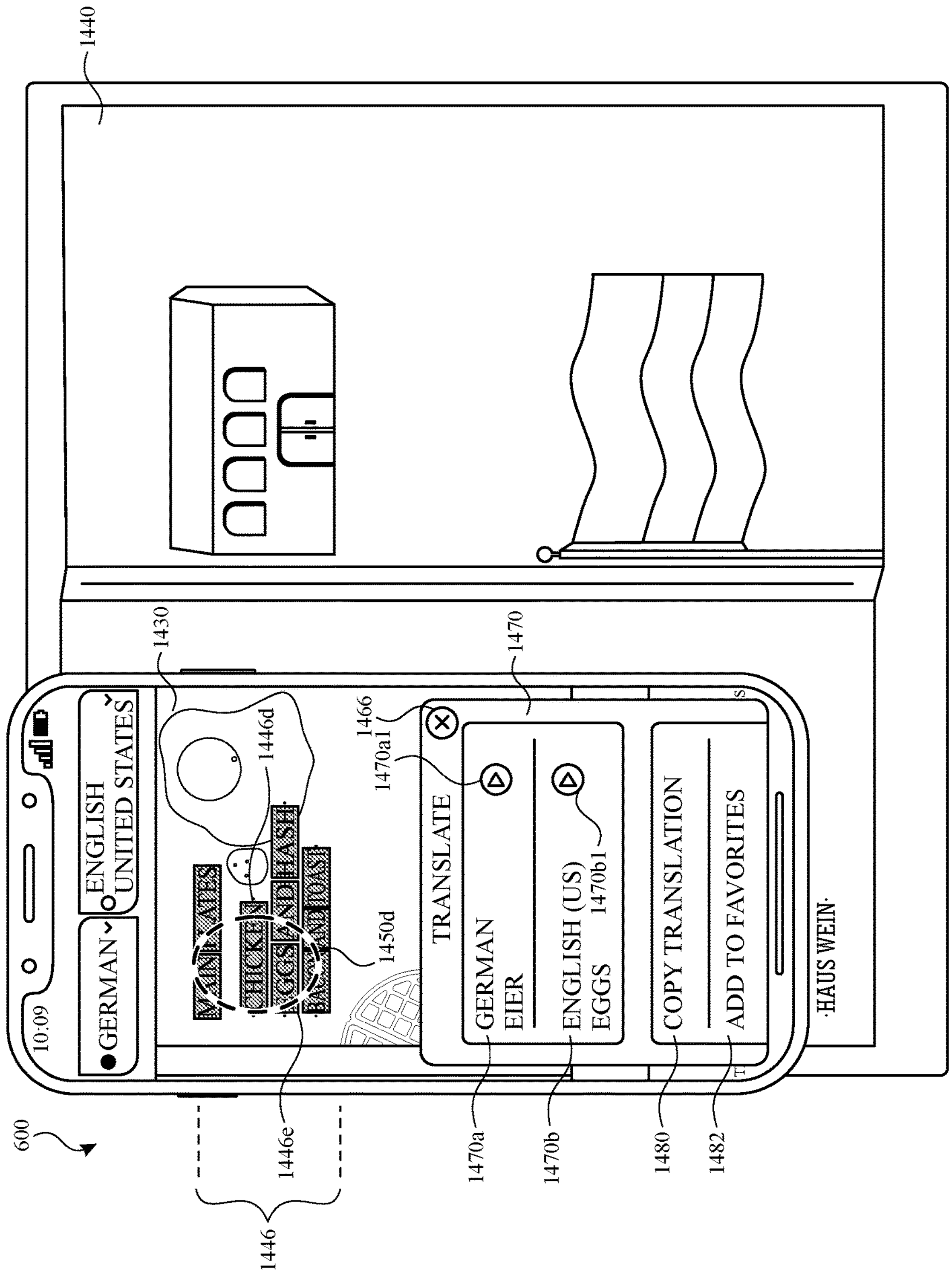
Figure 14E:
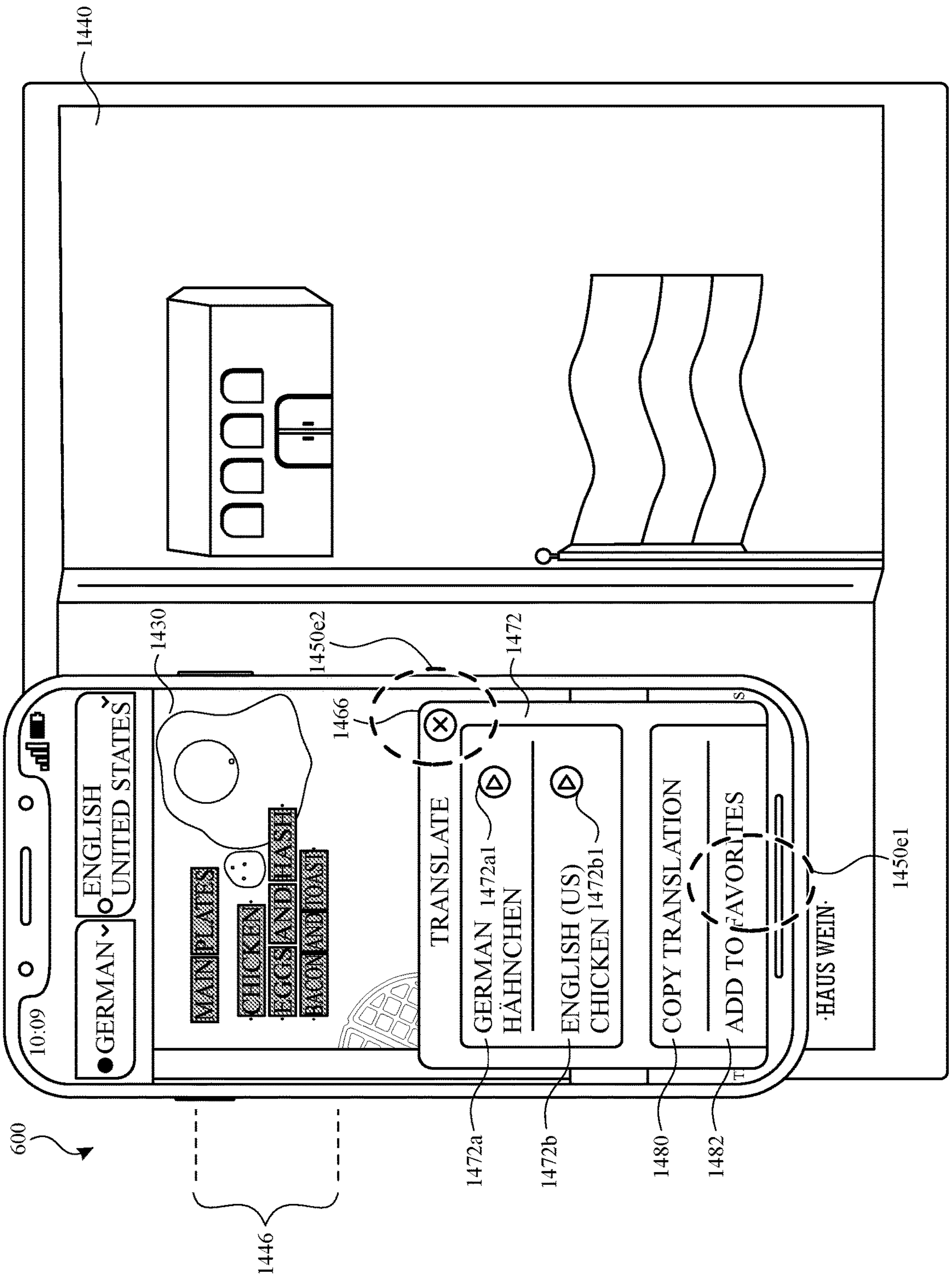
Figure 14F:
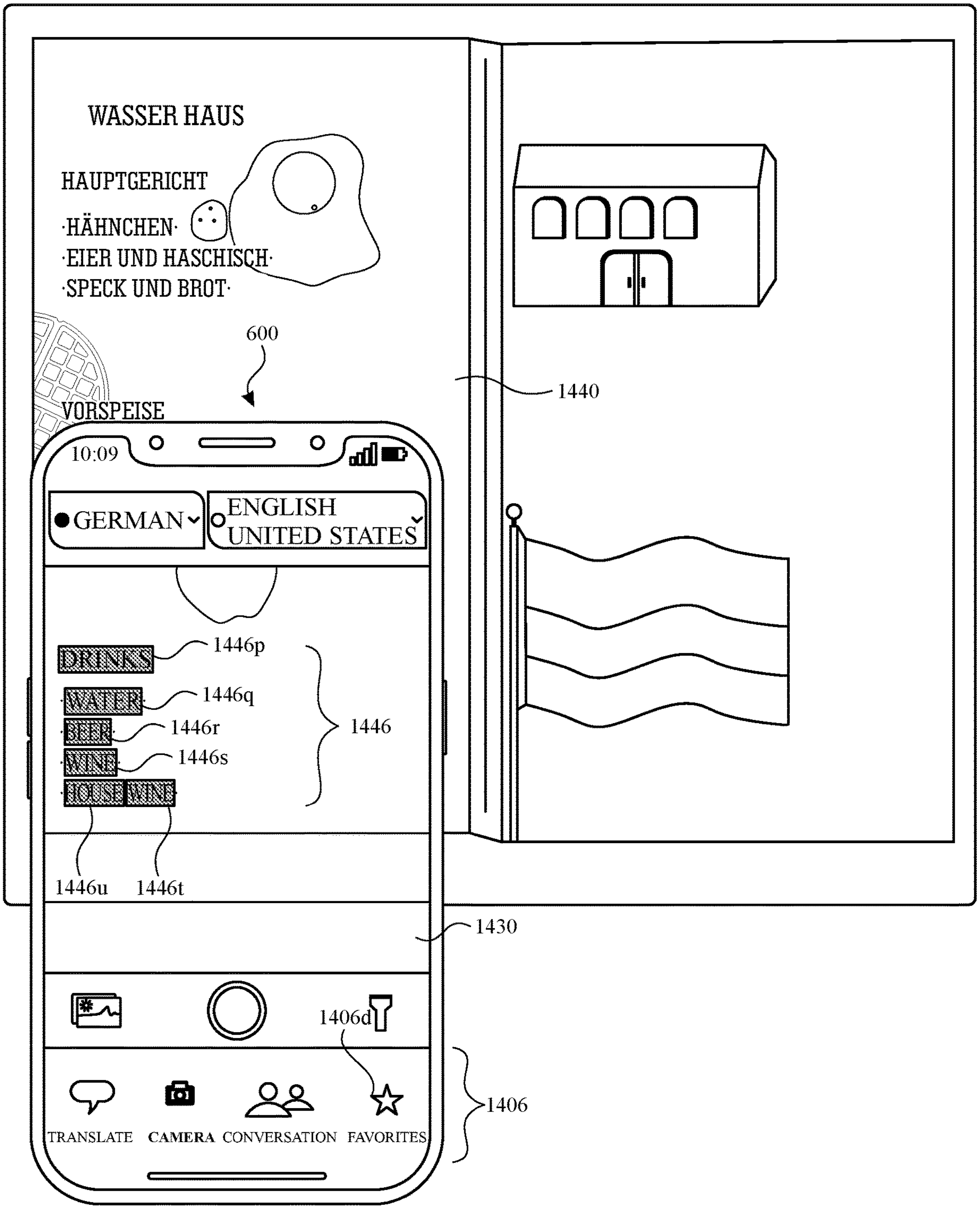
Figure 14G:
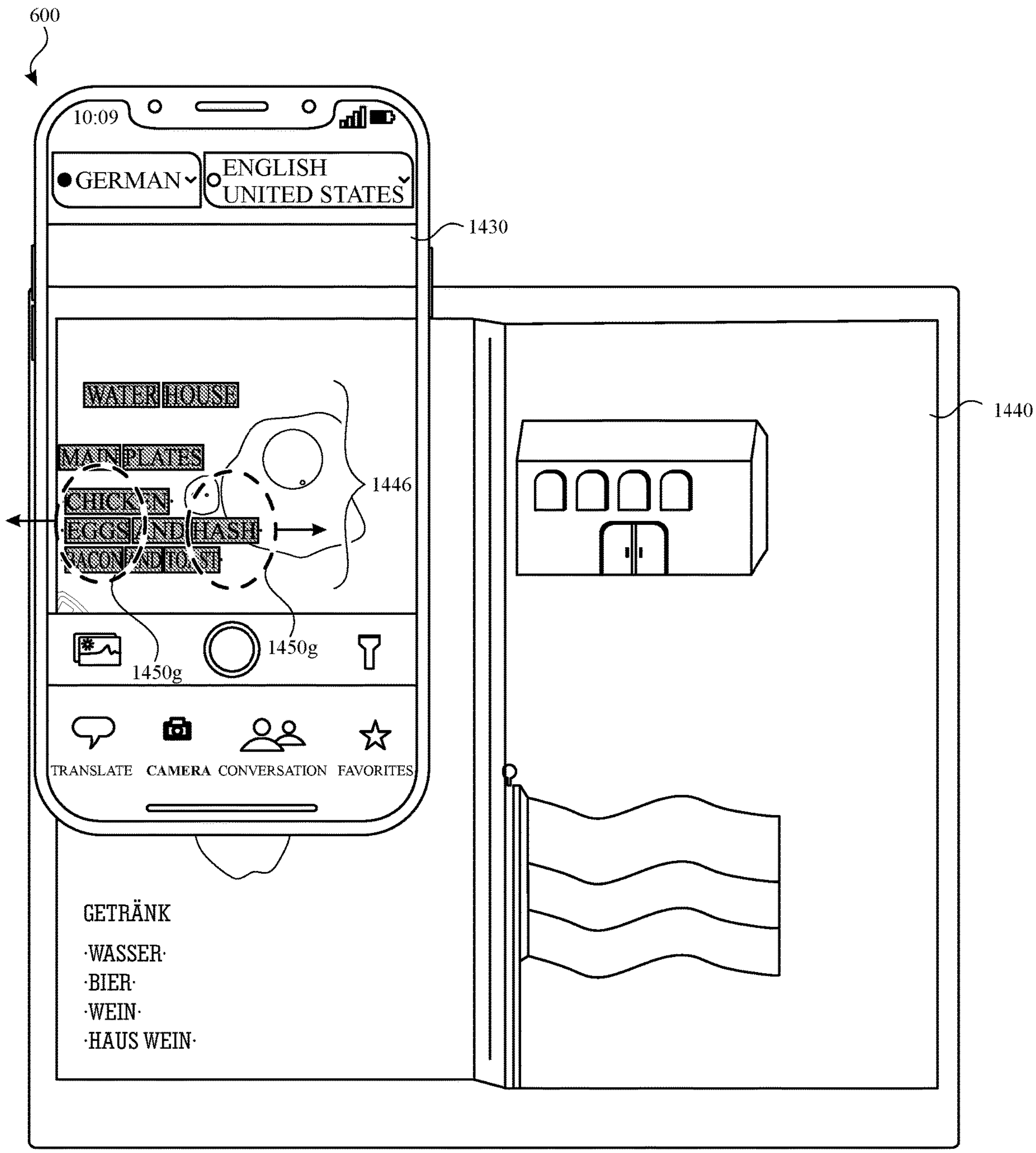
Figure 14H:
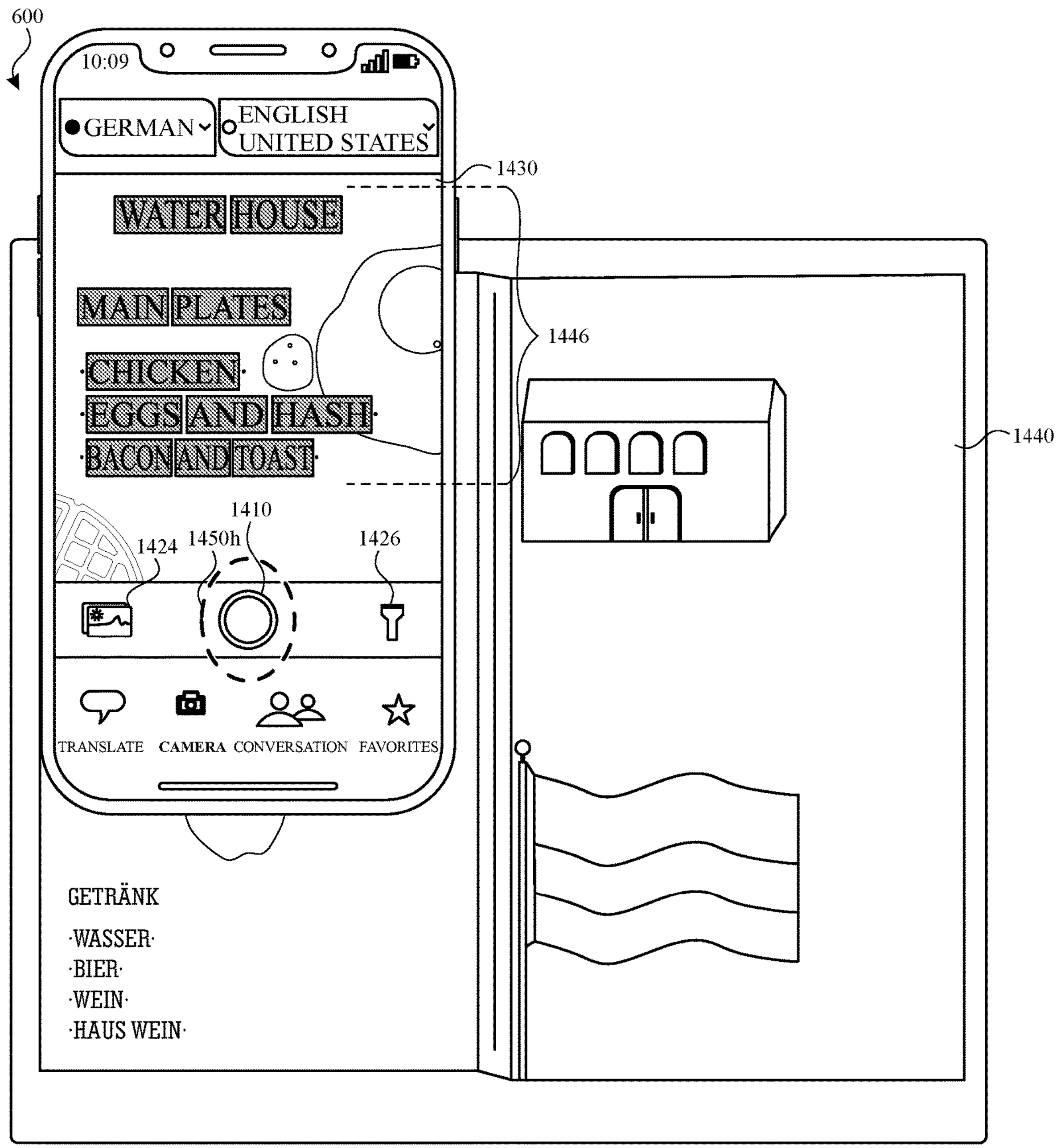
Figure 14I:
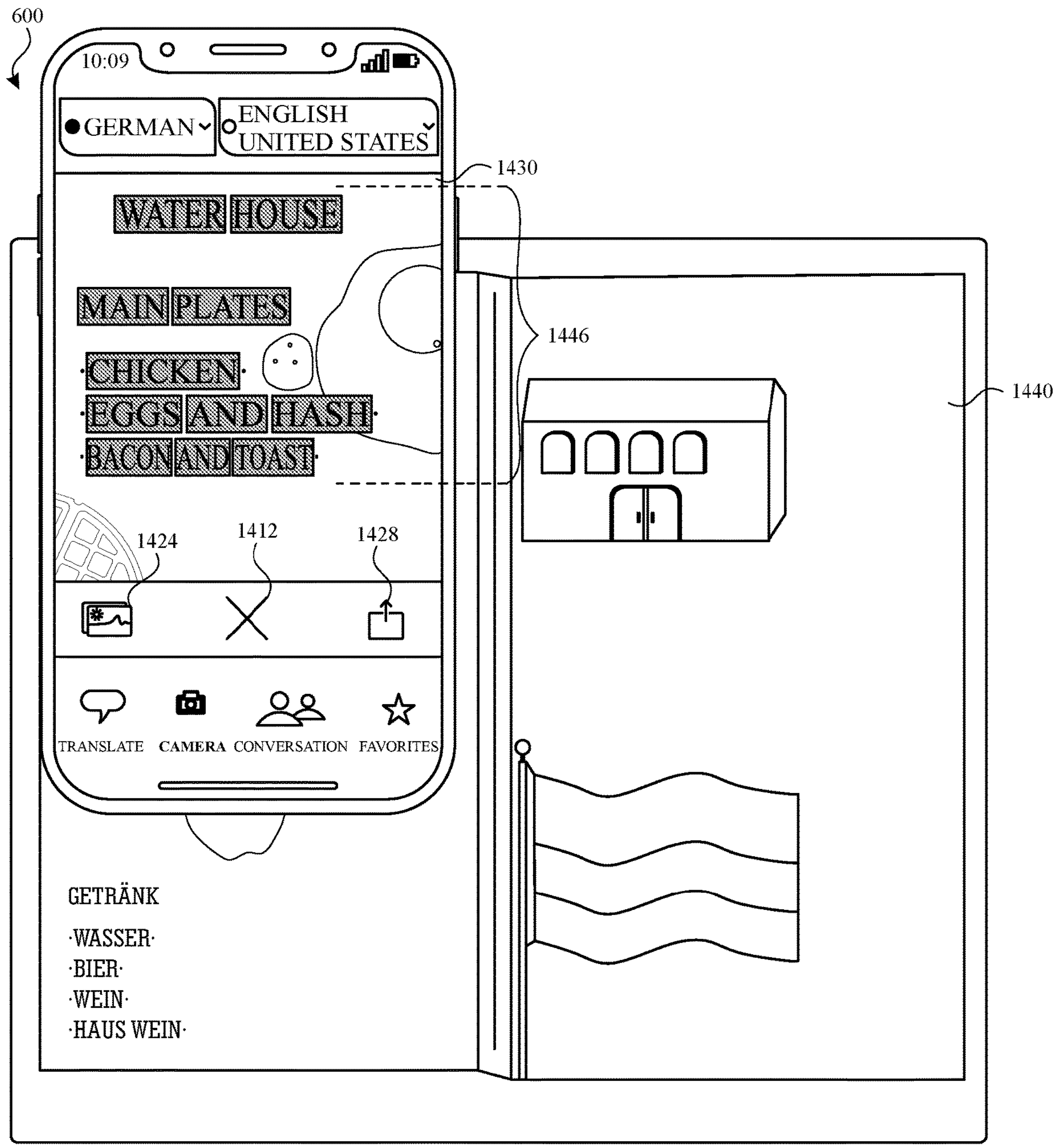
Figure 14J:
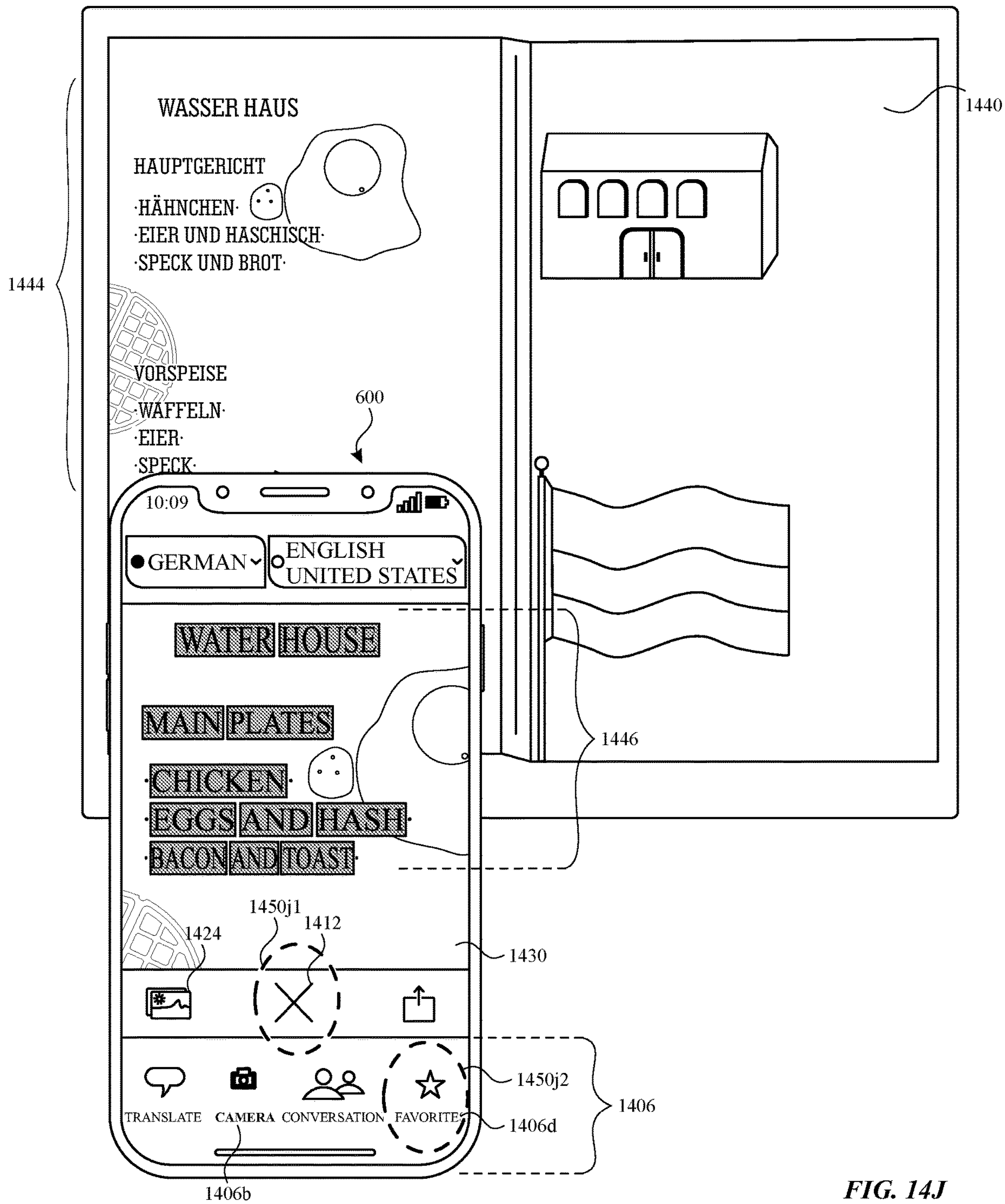
Figure 14K:
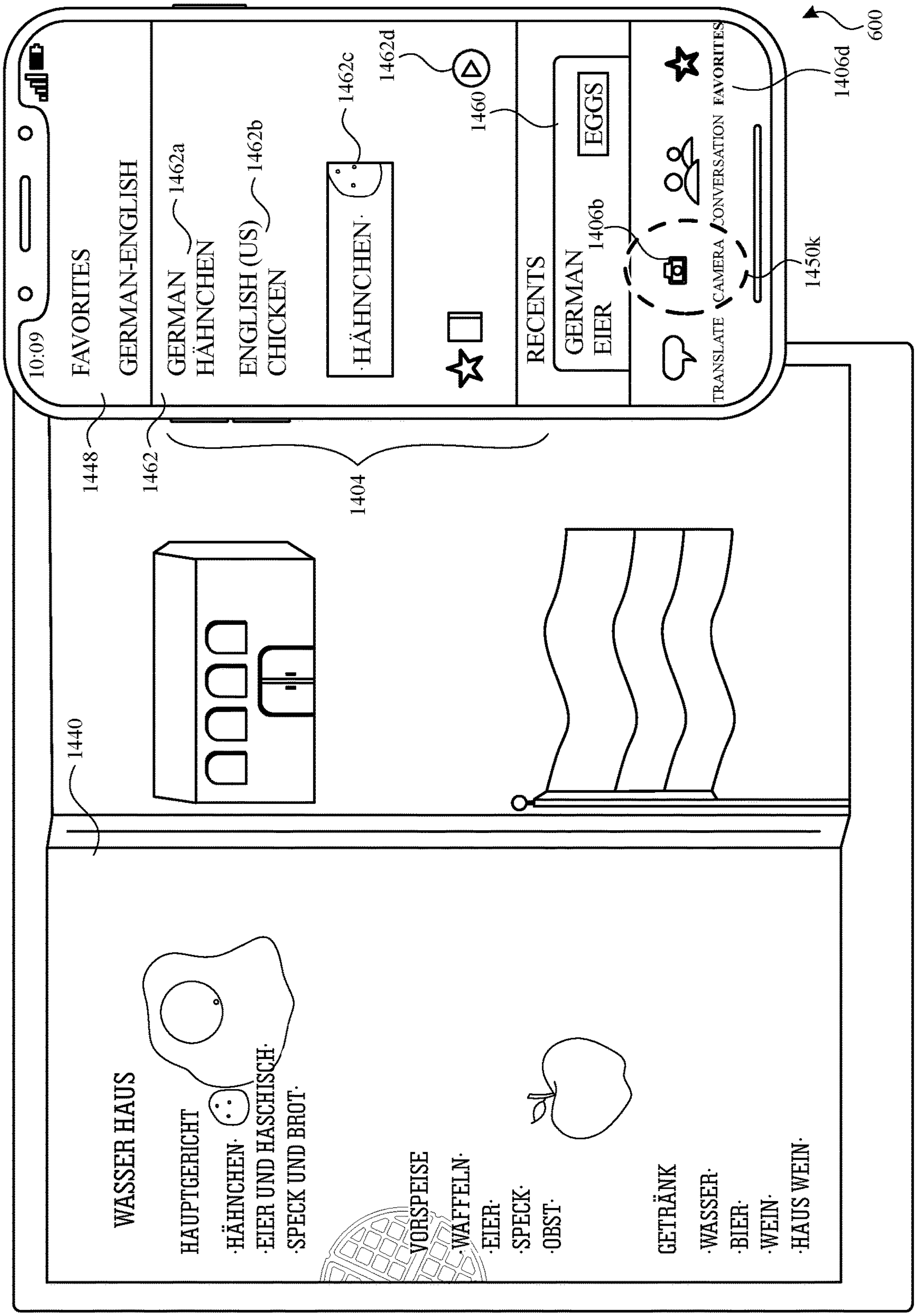
Figure 14L:
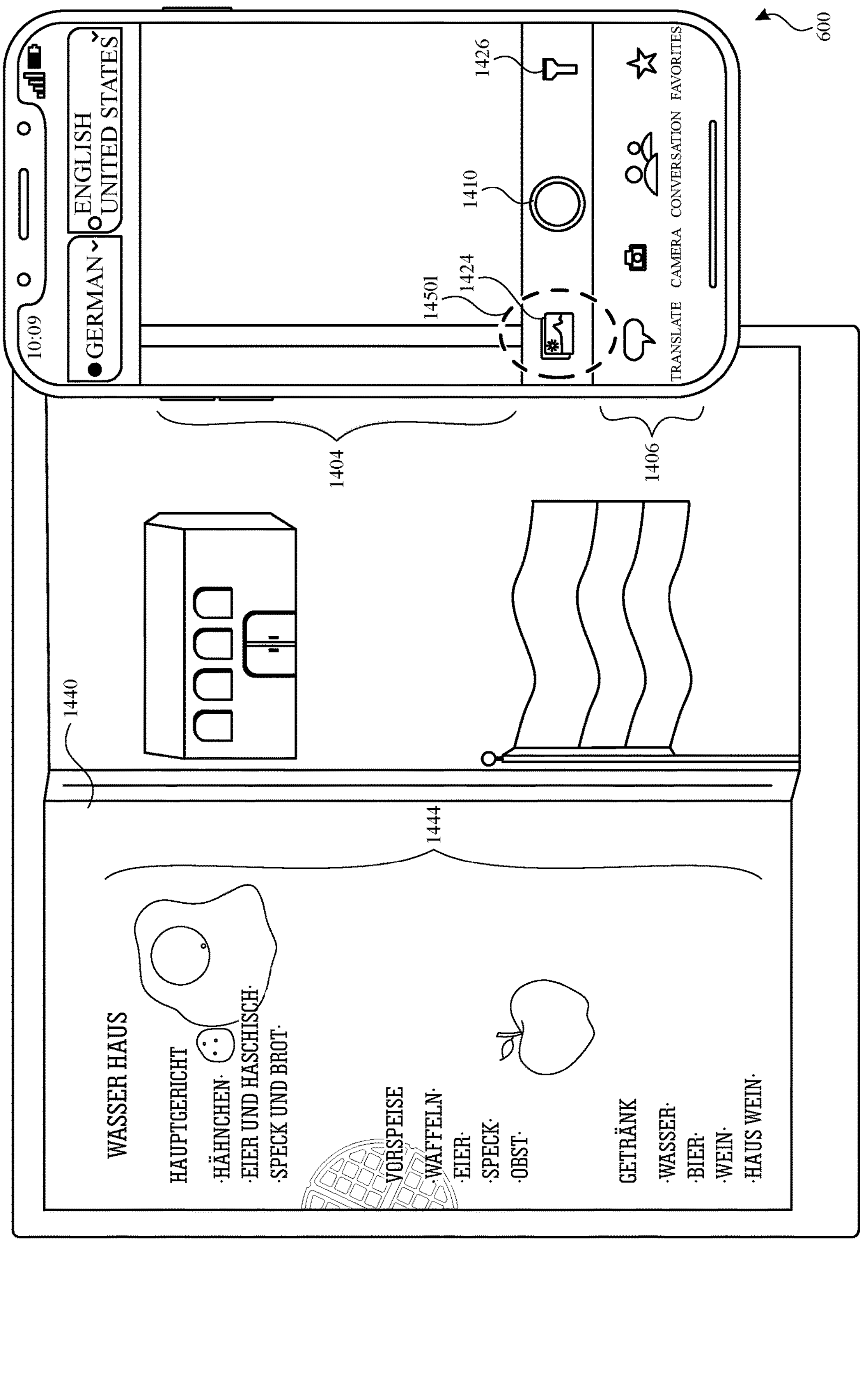
Figure 14M:
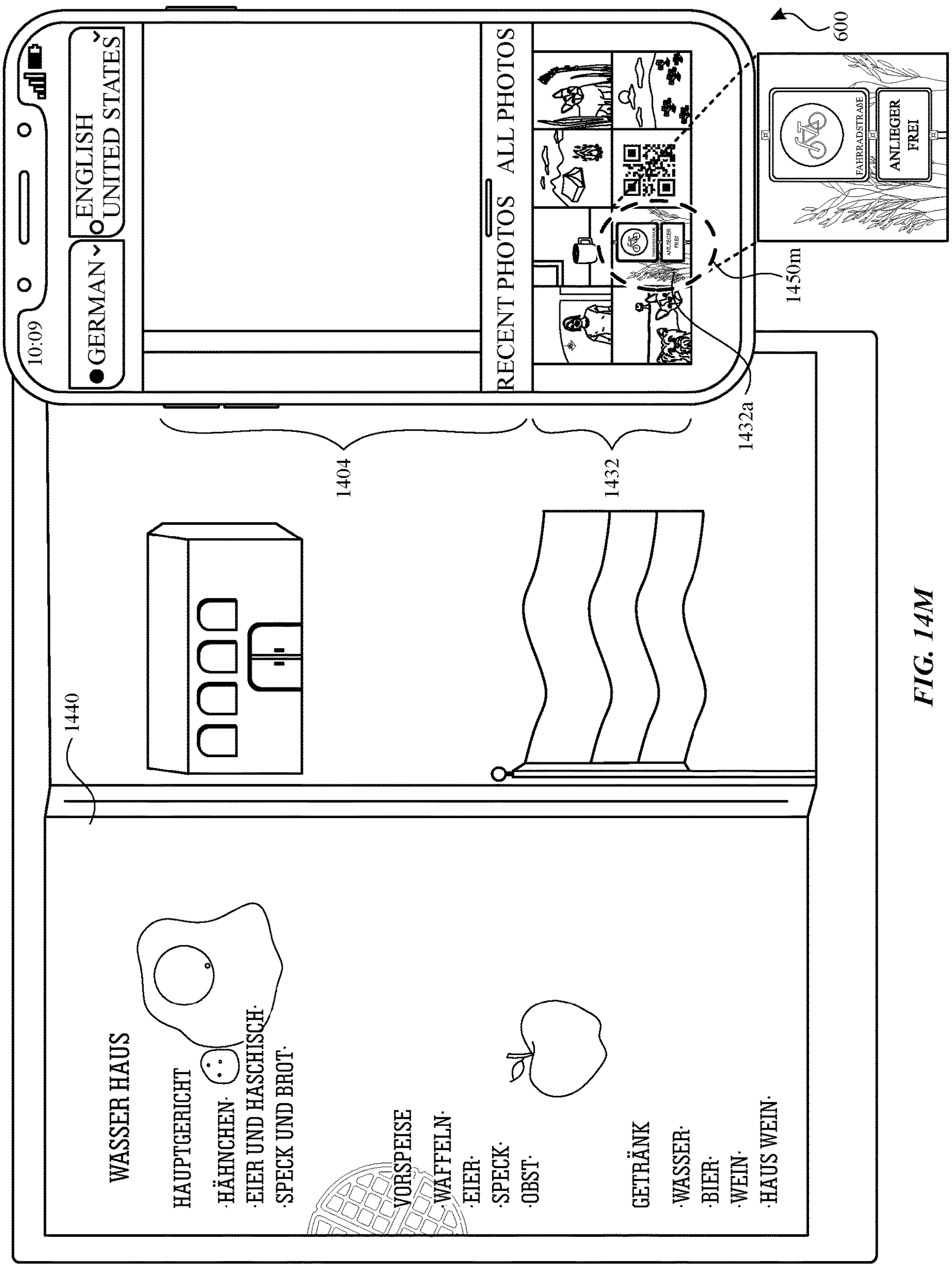
Figure 14N:
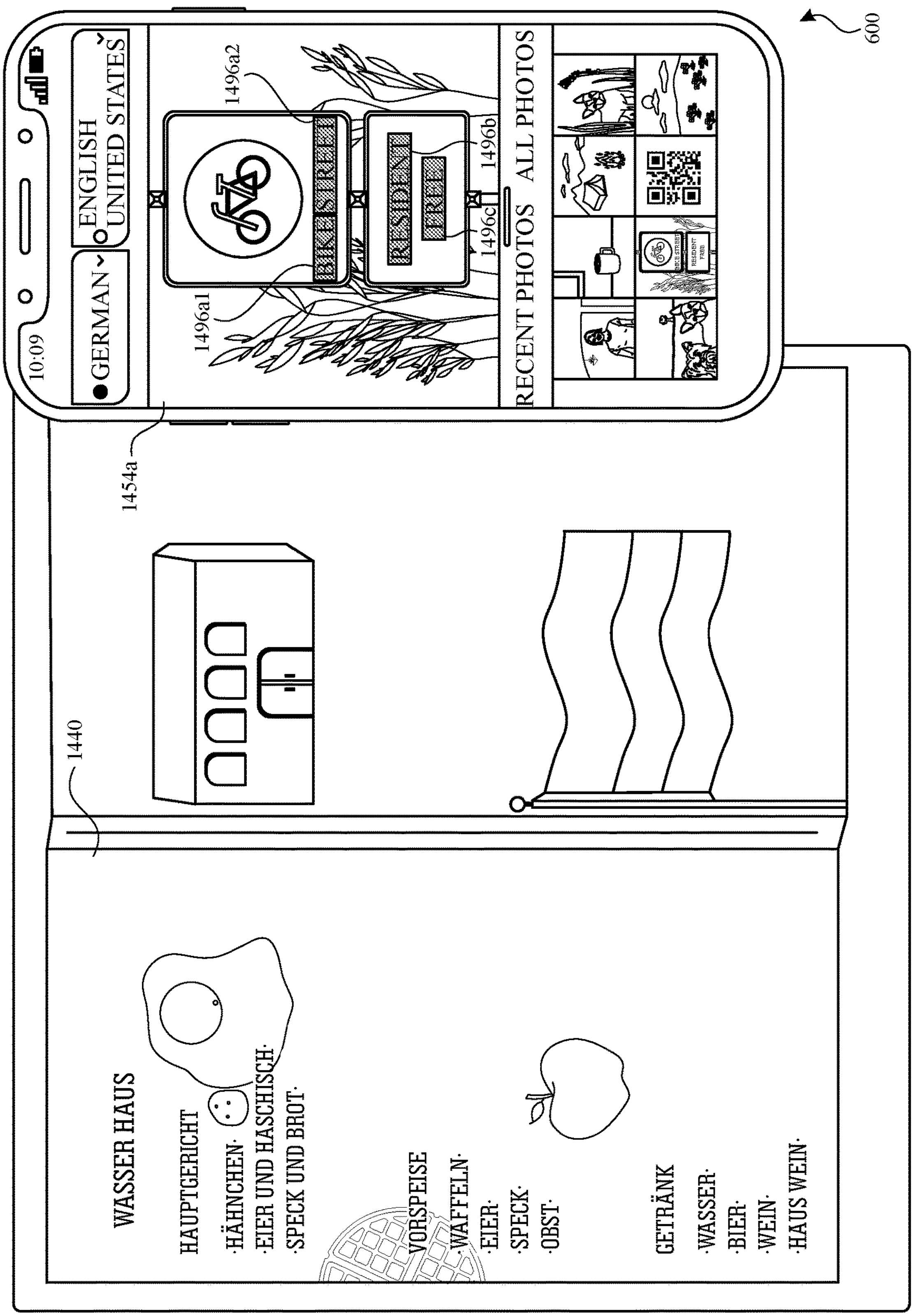
Figure 15:
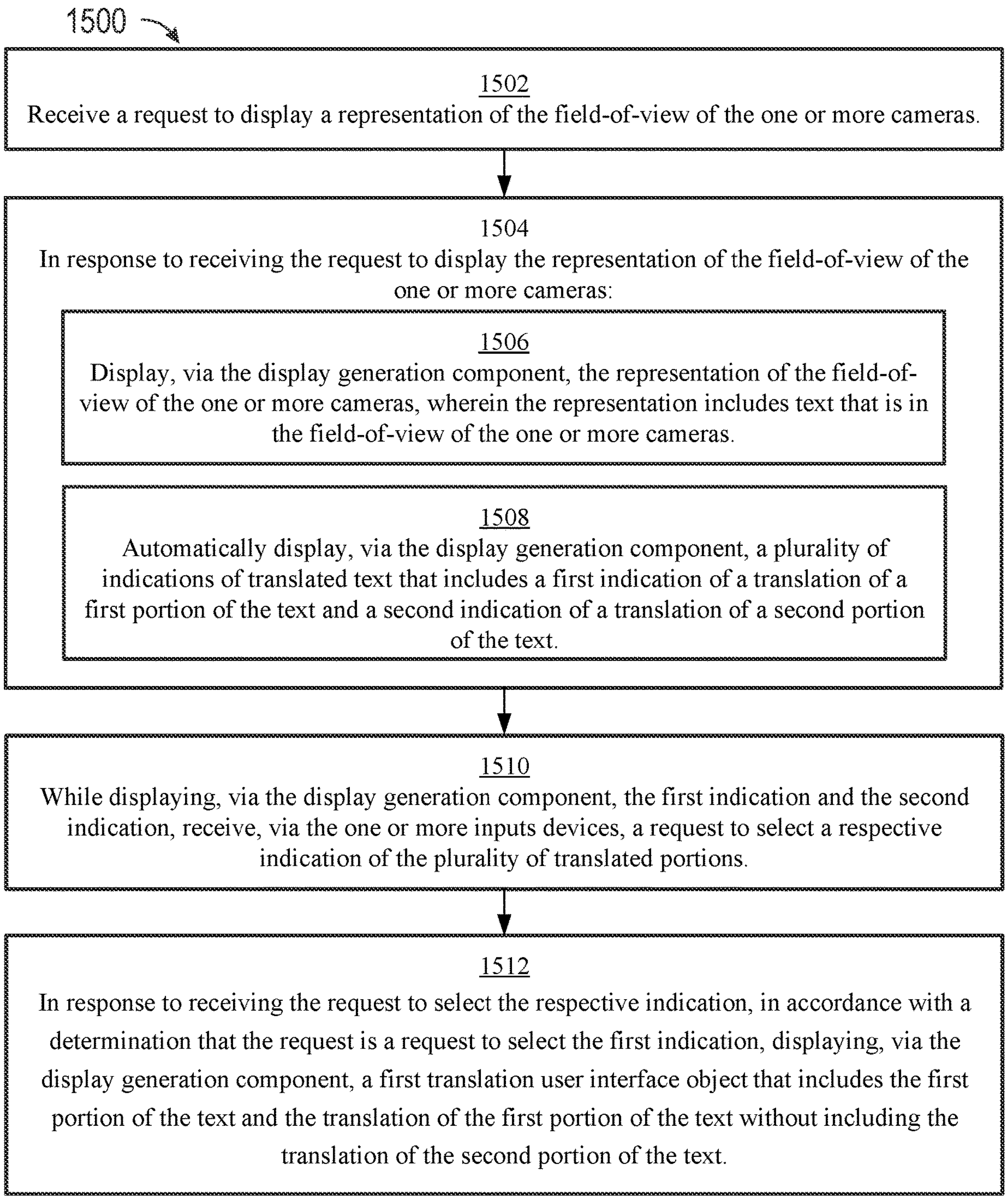
FIG. 15 is a flow diagram illustrating a method for translating visual content in media in accordance with some embodiments.

FIGS. 14A-14N illustrate exemplary user interfaces for translating visual content in media. FIG. 15 is a flow diagram illustrating methods of translating visual content in media in accordance with some embodiments. The user interfaces for FIGS. 14A-14N are used to illustrate the process described below, including the processes in FIG. 15.

Figure 16B:
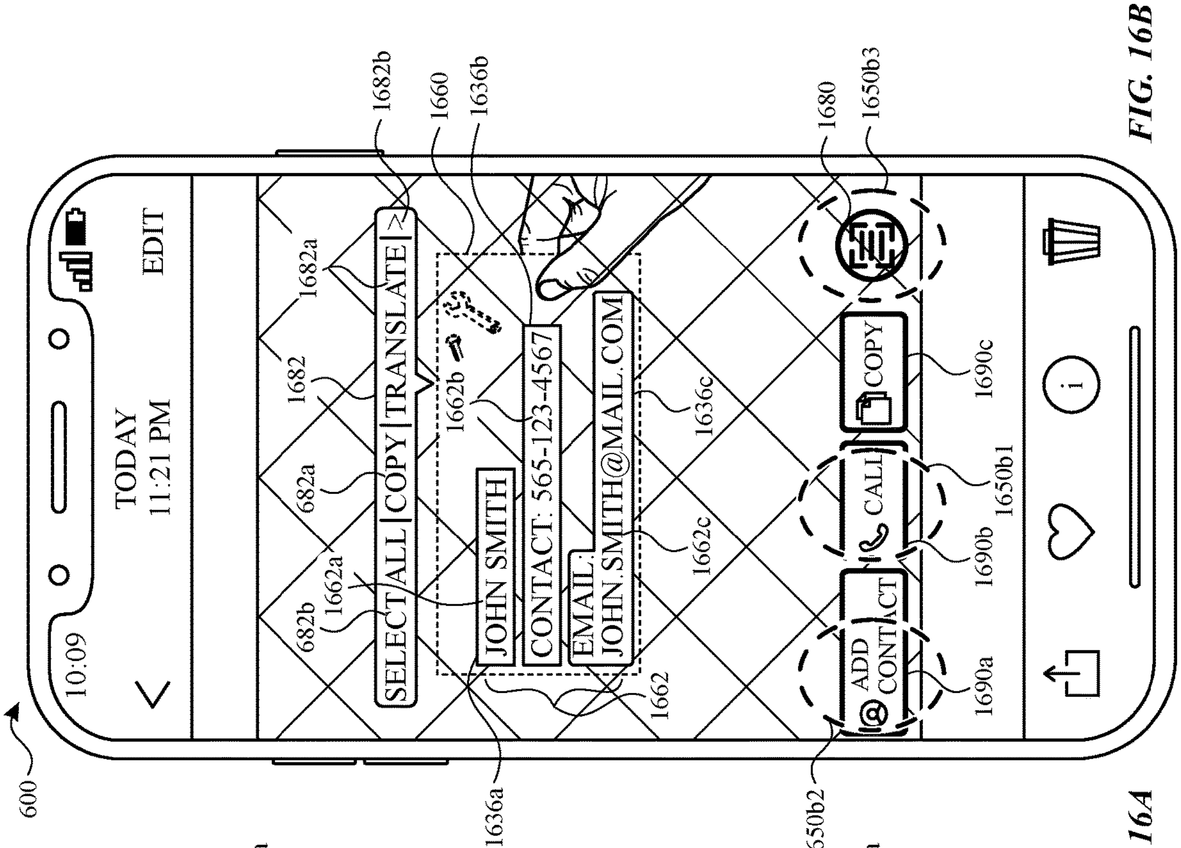
FIGS. 16A-16O illustrate exemplary user interfaces for managing user interface objects for visual content in media in accordance with some embodiments.
Figure 16A:
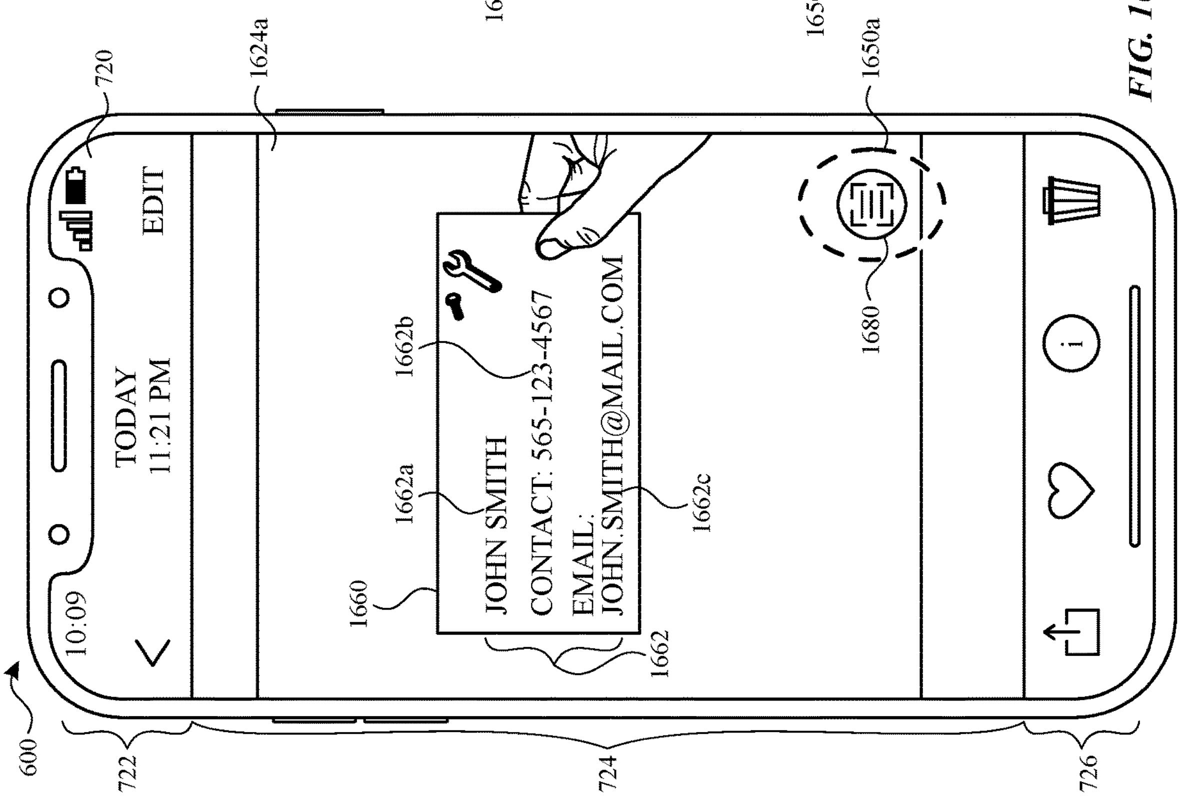
Figure 16D:
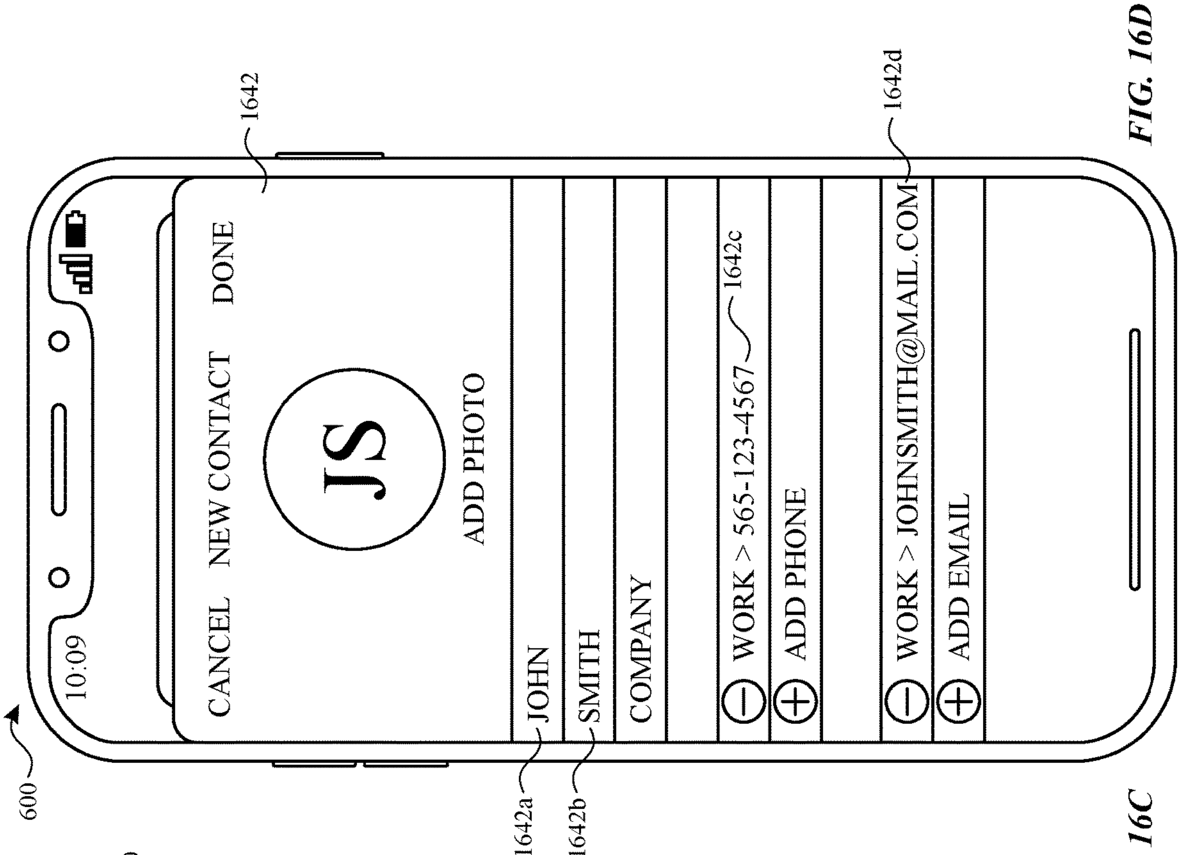
Figure 16C:
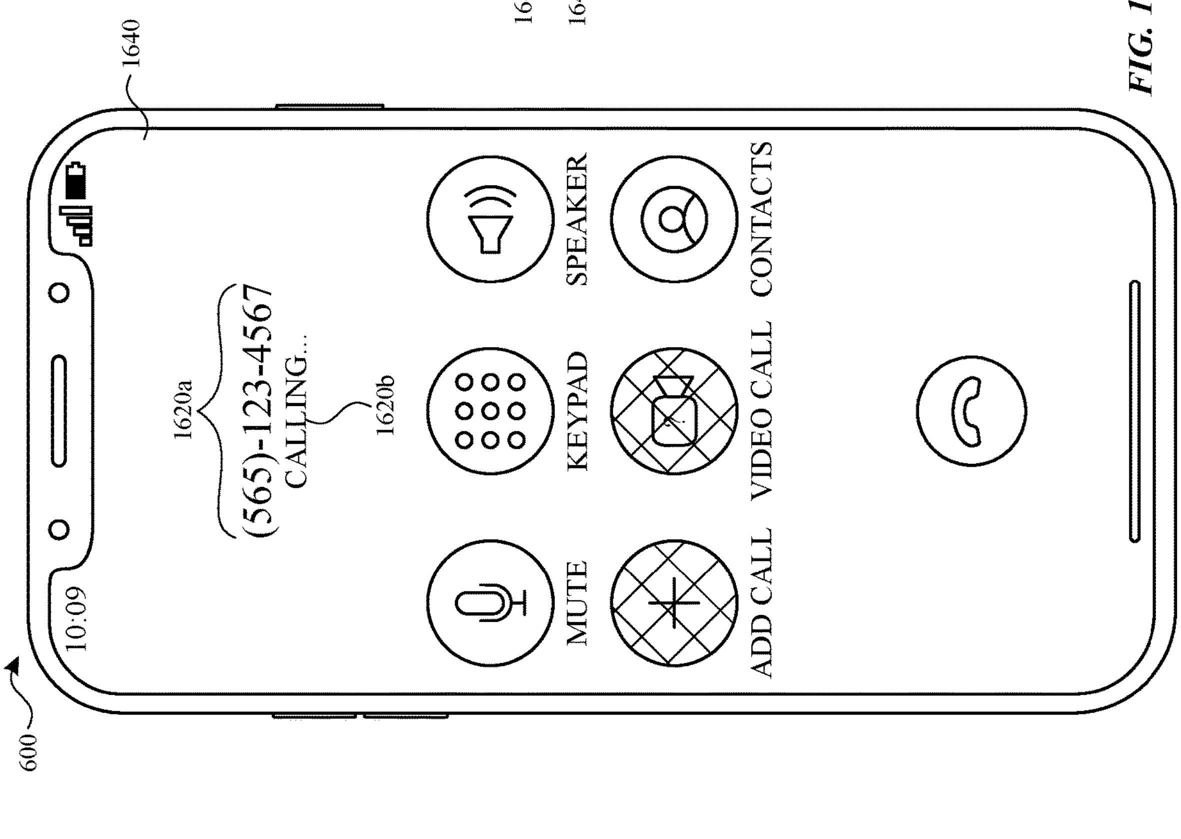
Figure 16F:
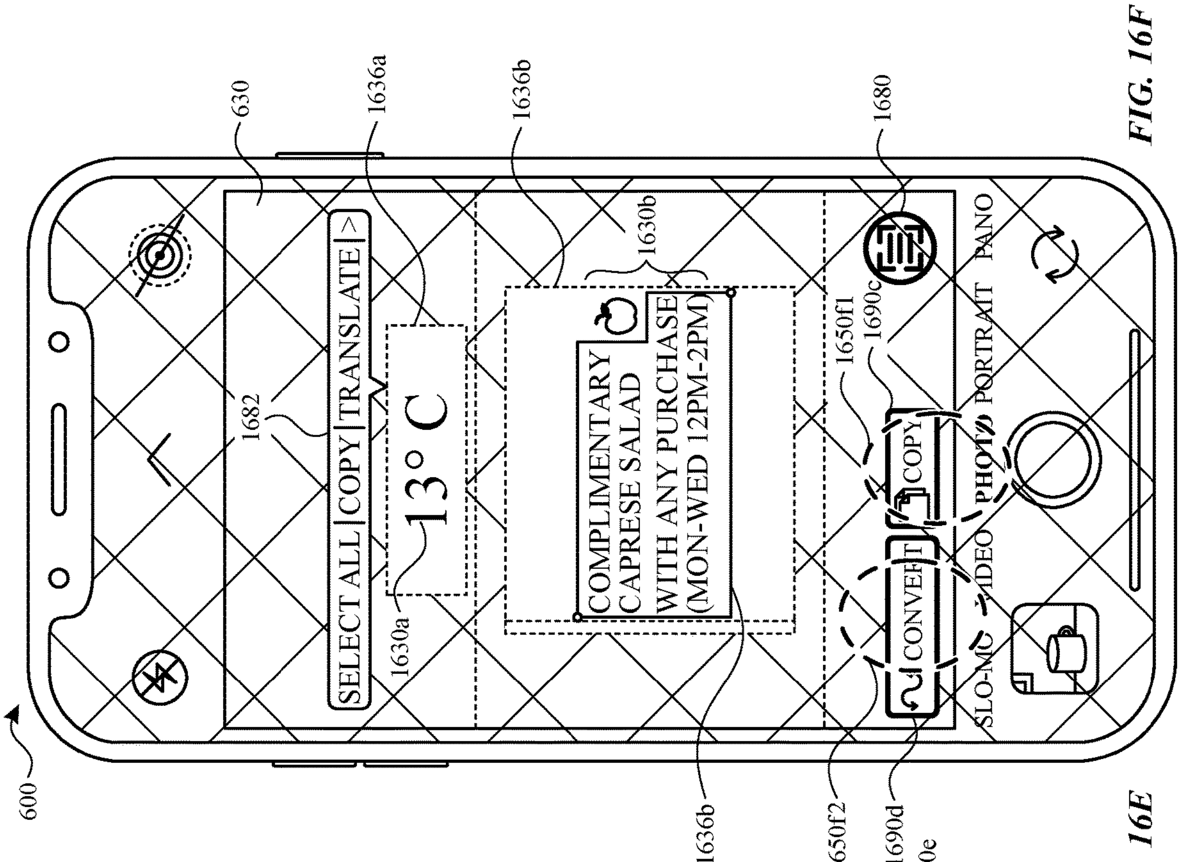
Figure 16E:
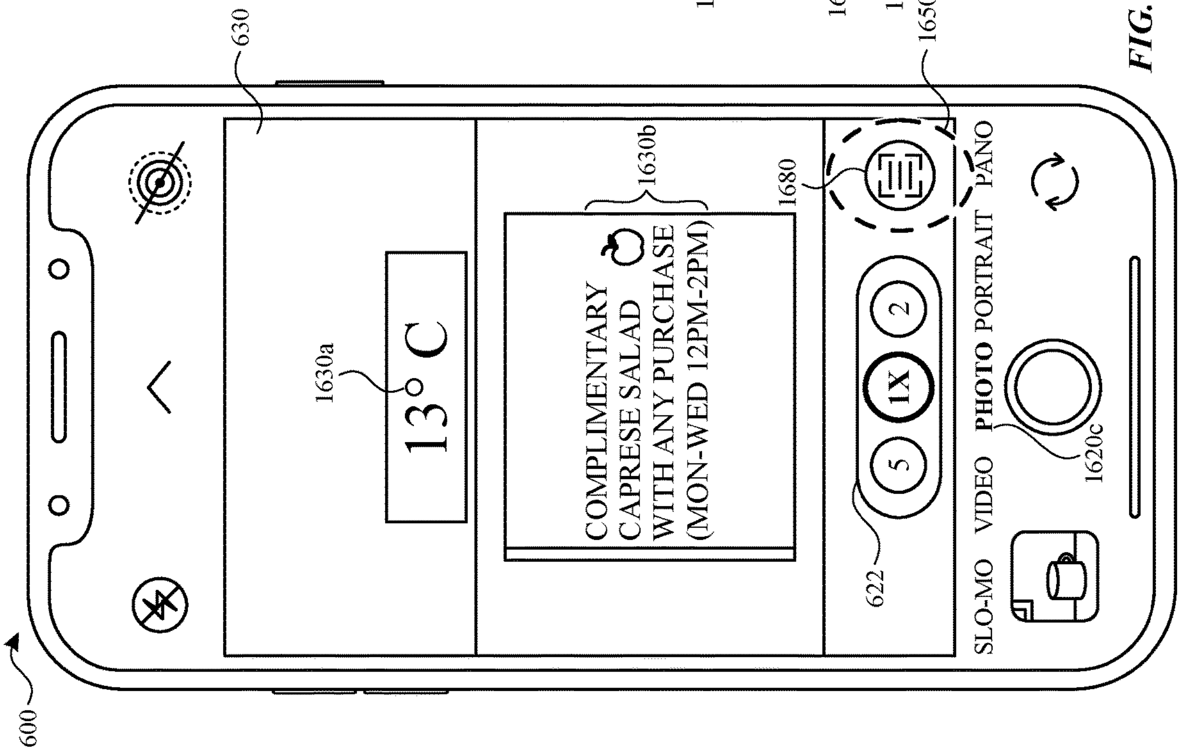
Figure 16H:
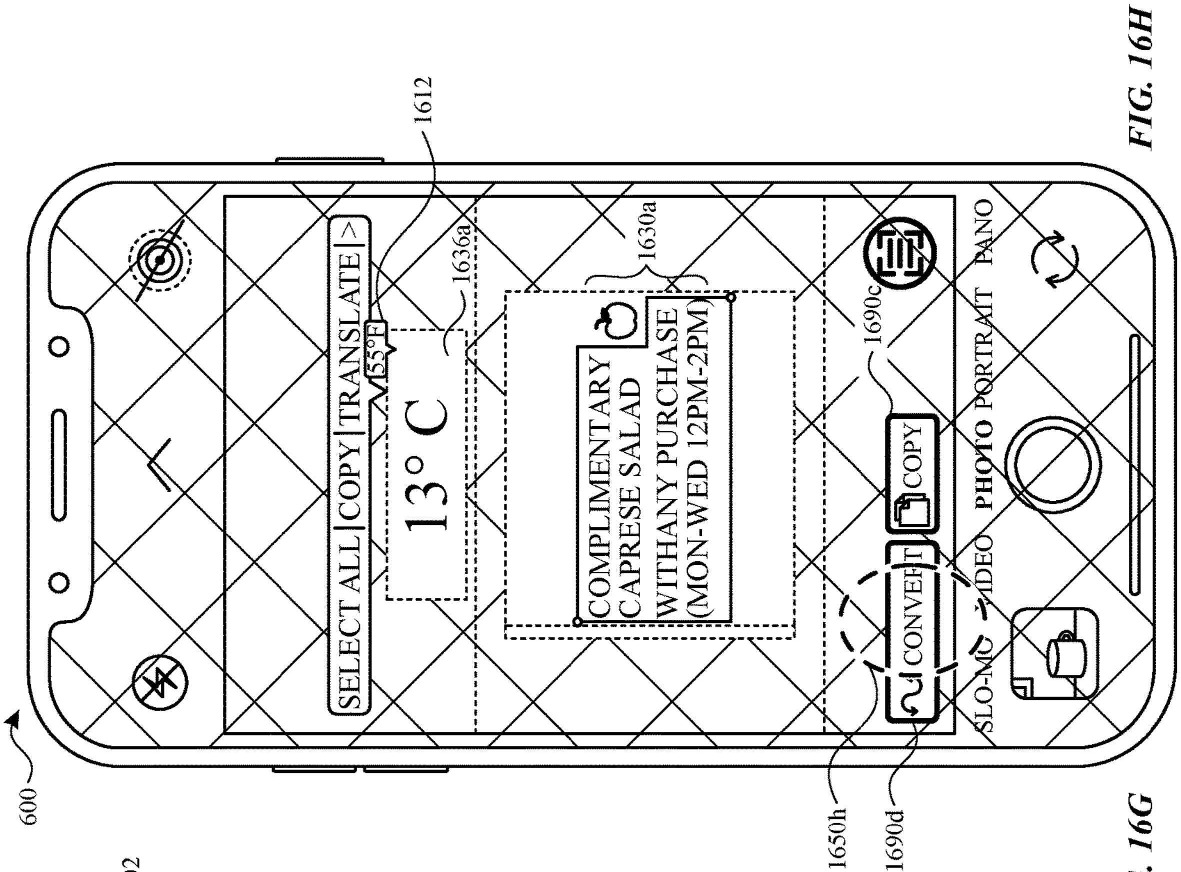
Figure 16G:
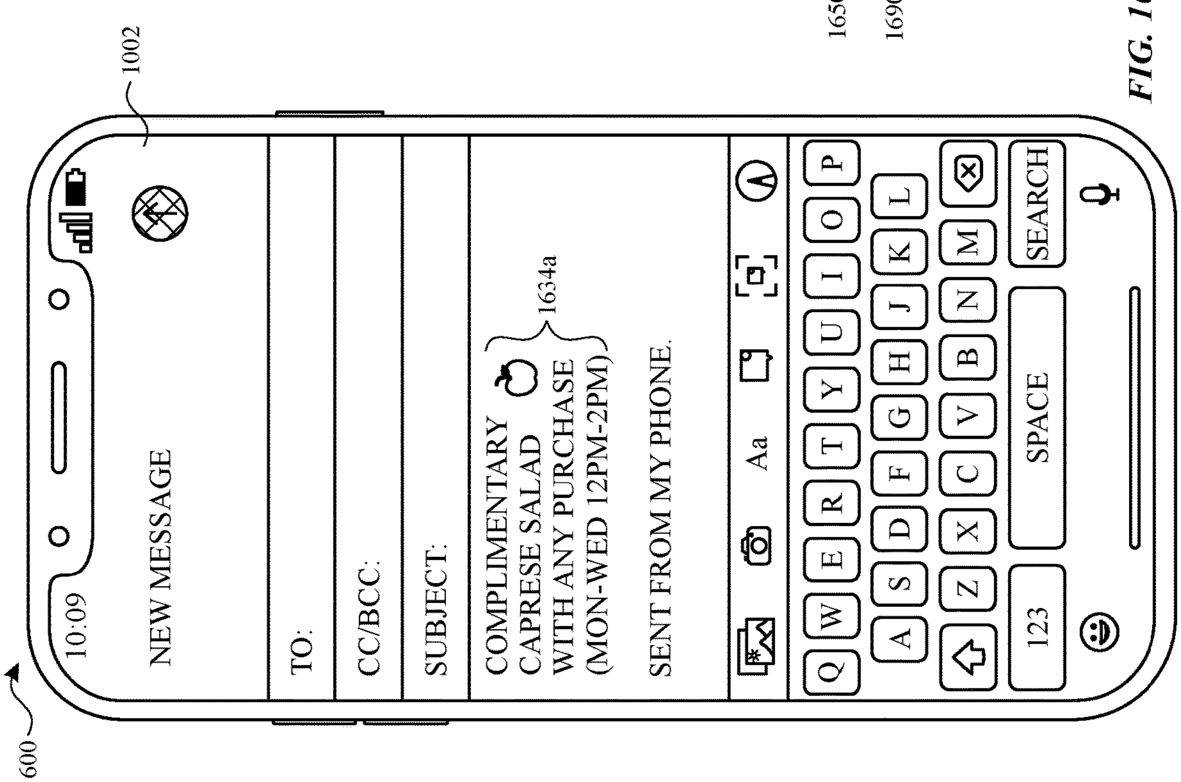
Figure 16J:
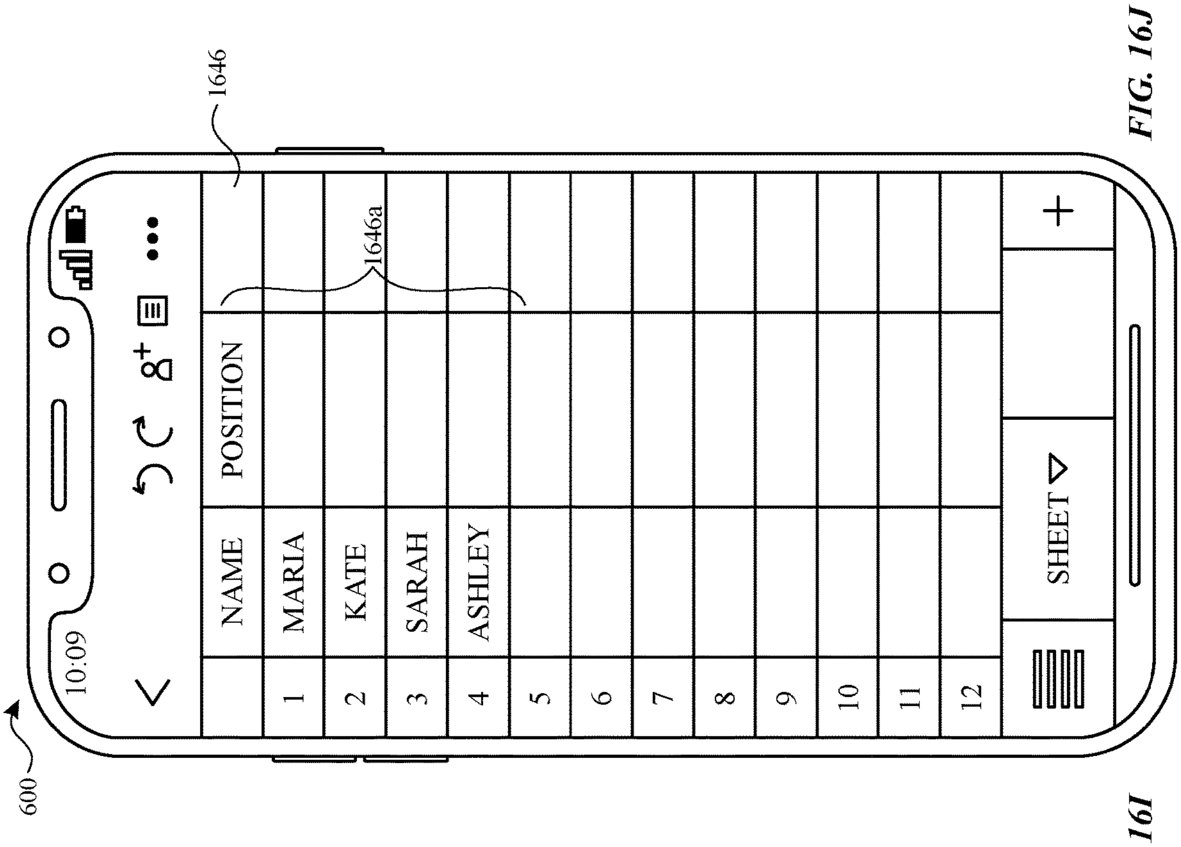
Figure 16I:
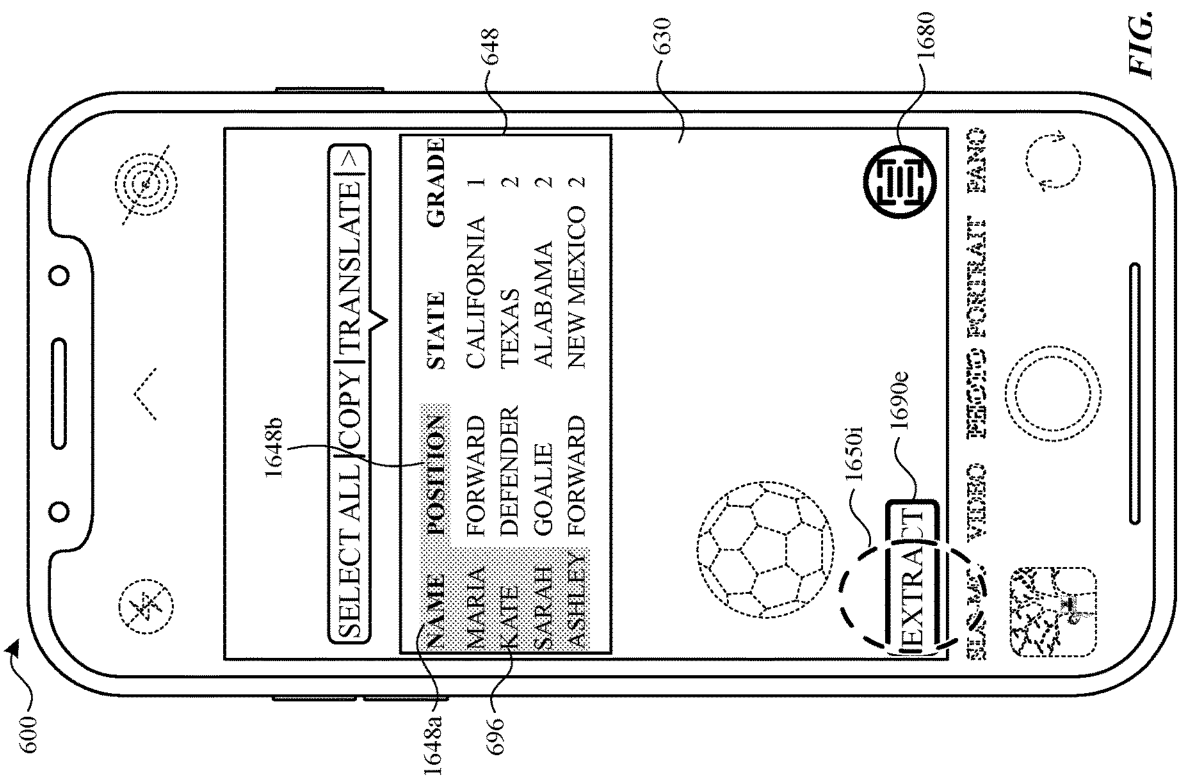
Figure 16L:
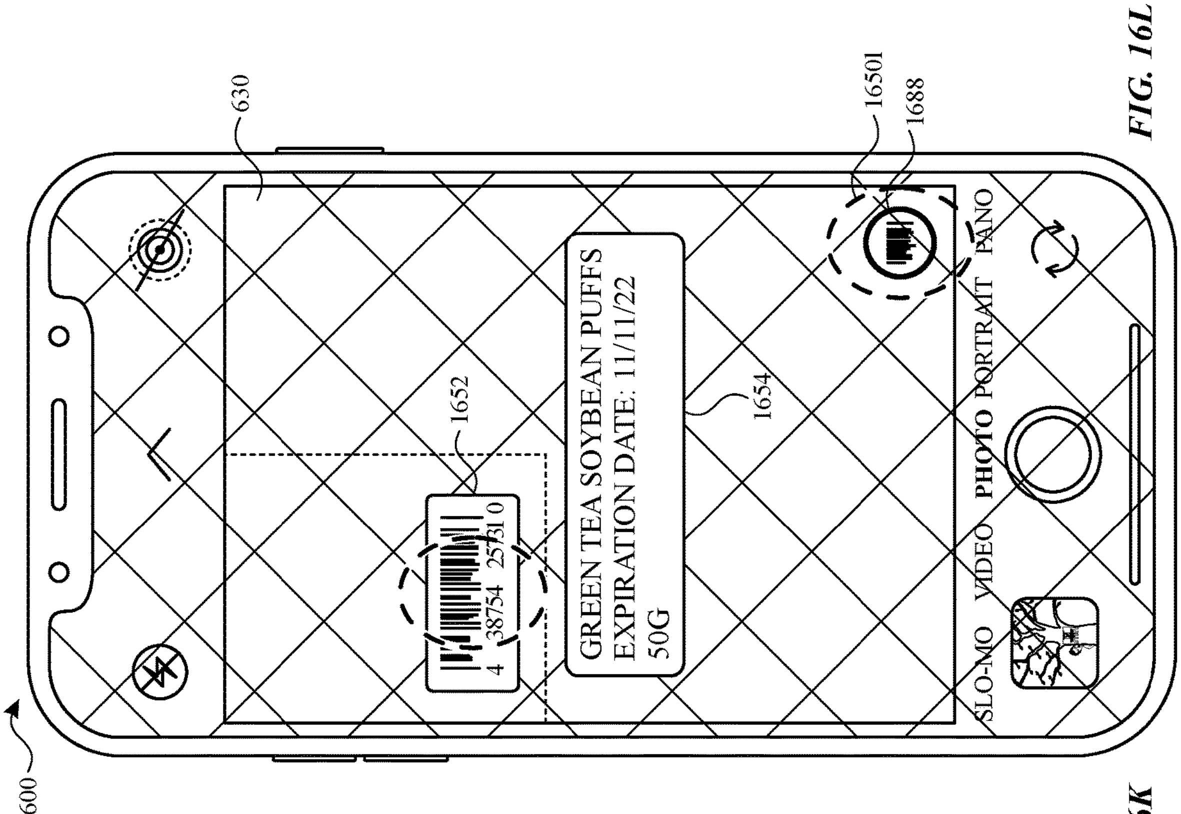
Figure 16K:
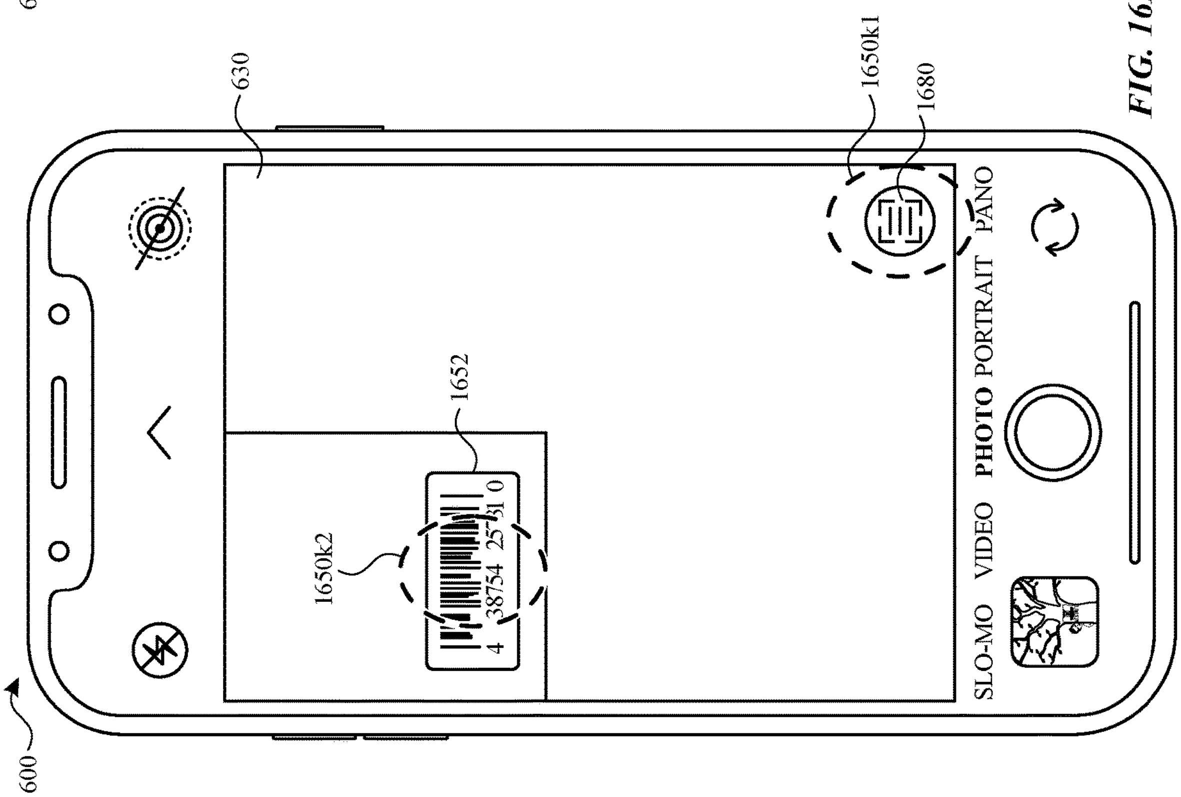
Figure 16N:
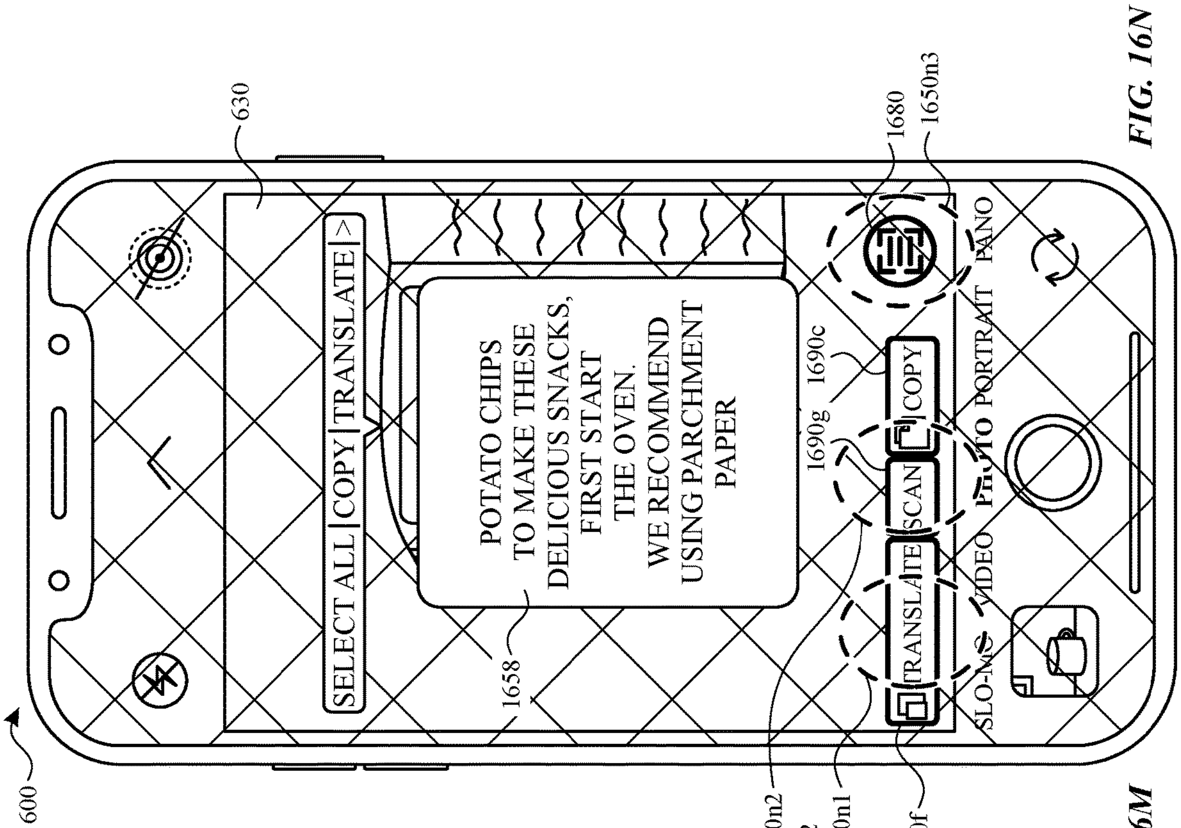
Figure 16M:
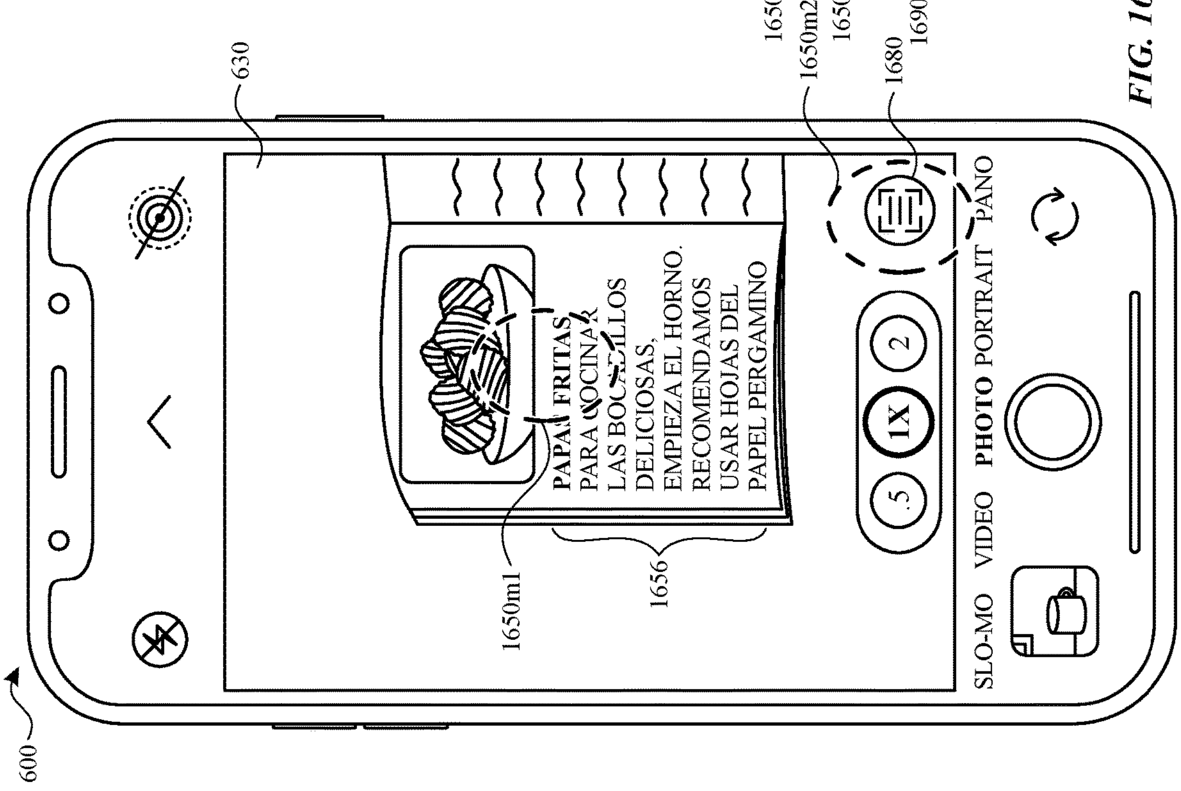
Figure 16O:
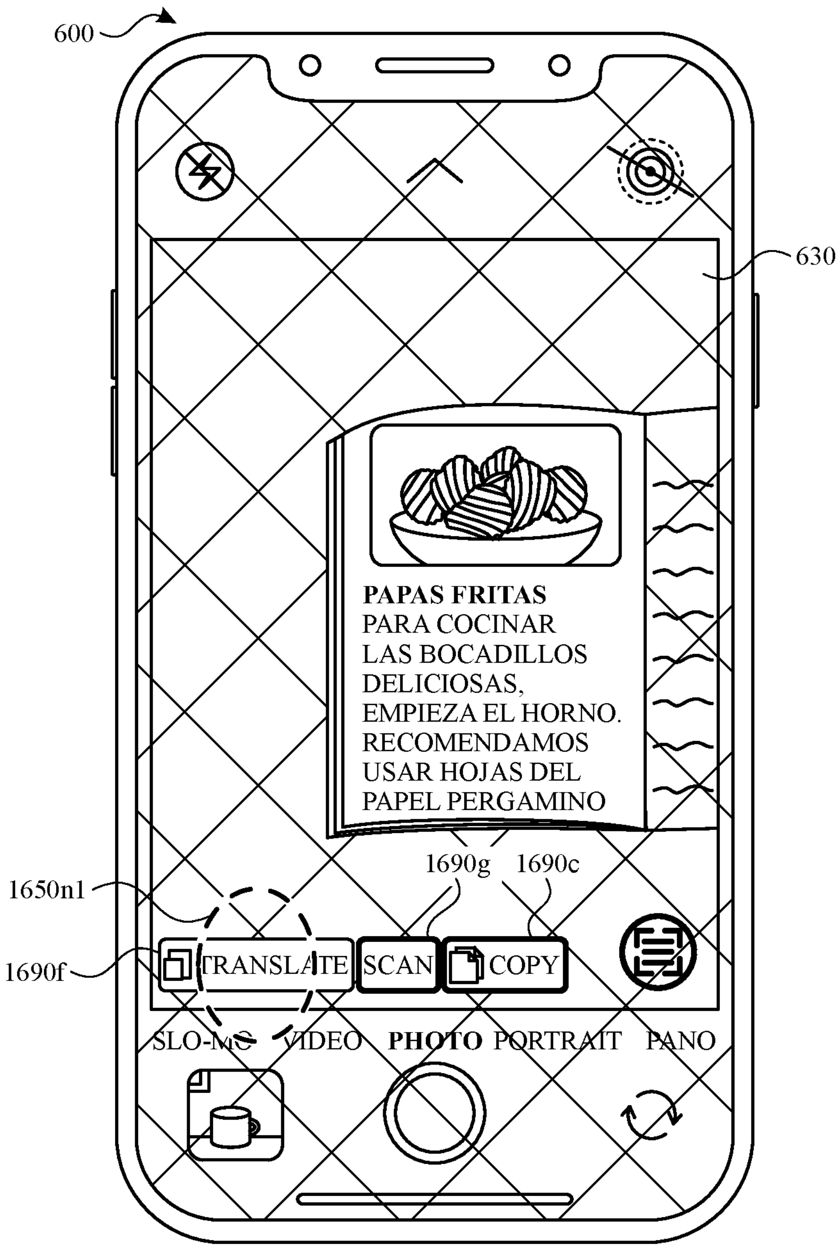
Figure 17:
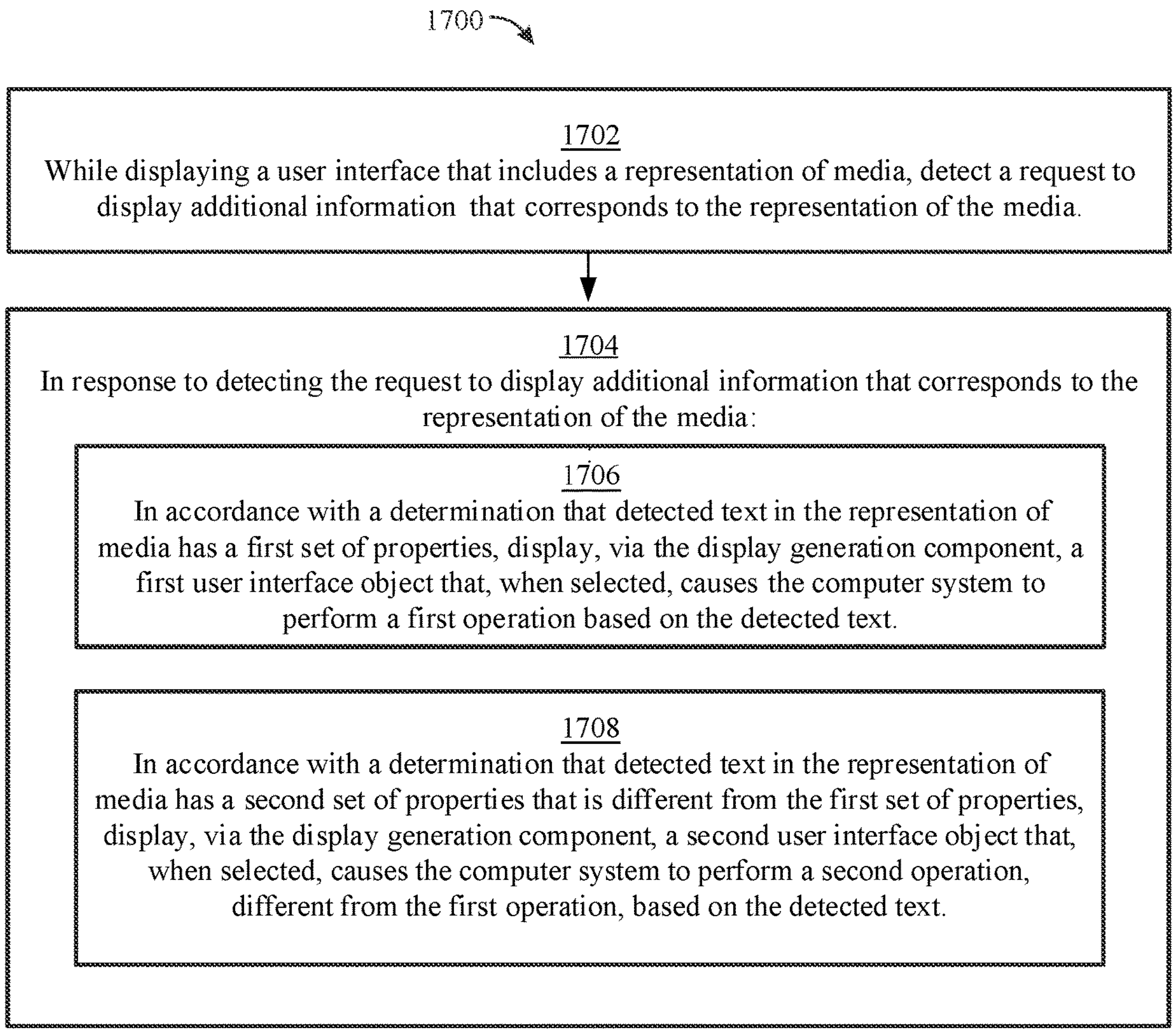
FIG. 17 is a flow diagram illustrating a method for managing user interface objects for visual content in media in accordance with some embodiments.

FIGS. 16A-16O illustrate exemplary user interfaces for managing user interface objects for visual content in media in accordance with some embodiments. FIG. 17 is a flow diagram illustrating a method for managing user interface objects for visual content in media in accordance with some embodiments. The user interfaces for FIGS. 16A-16O are used to illustrate the process described below, including the processes in FIG. 17.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
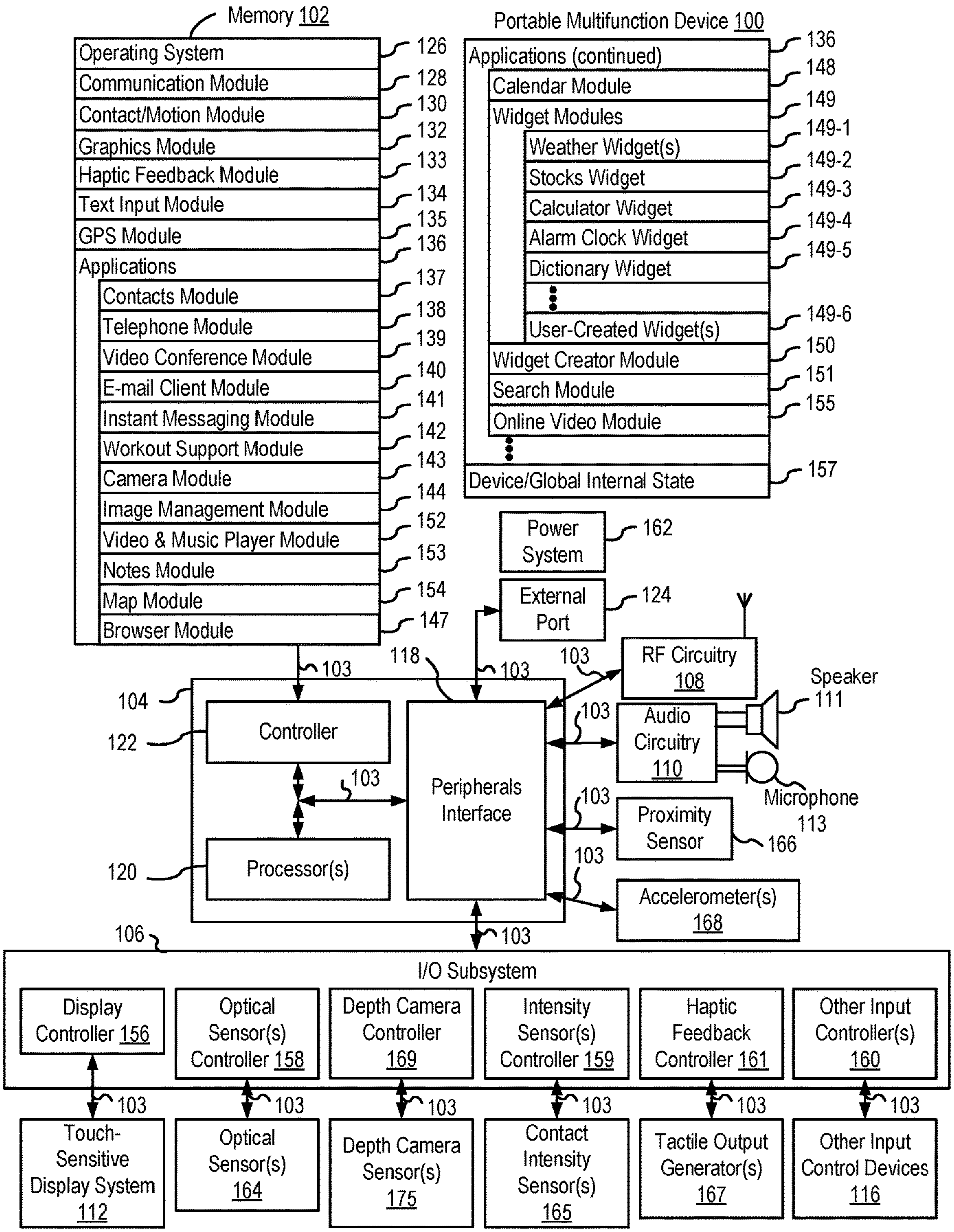
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
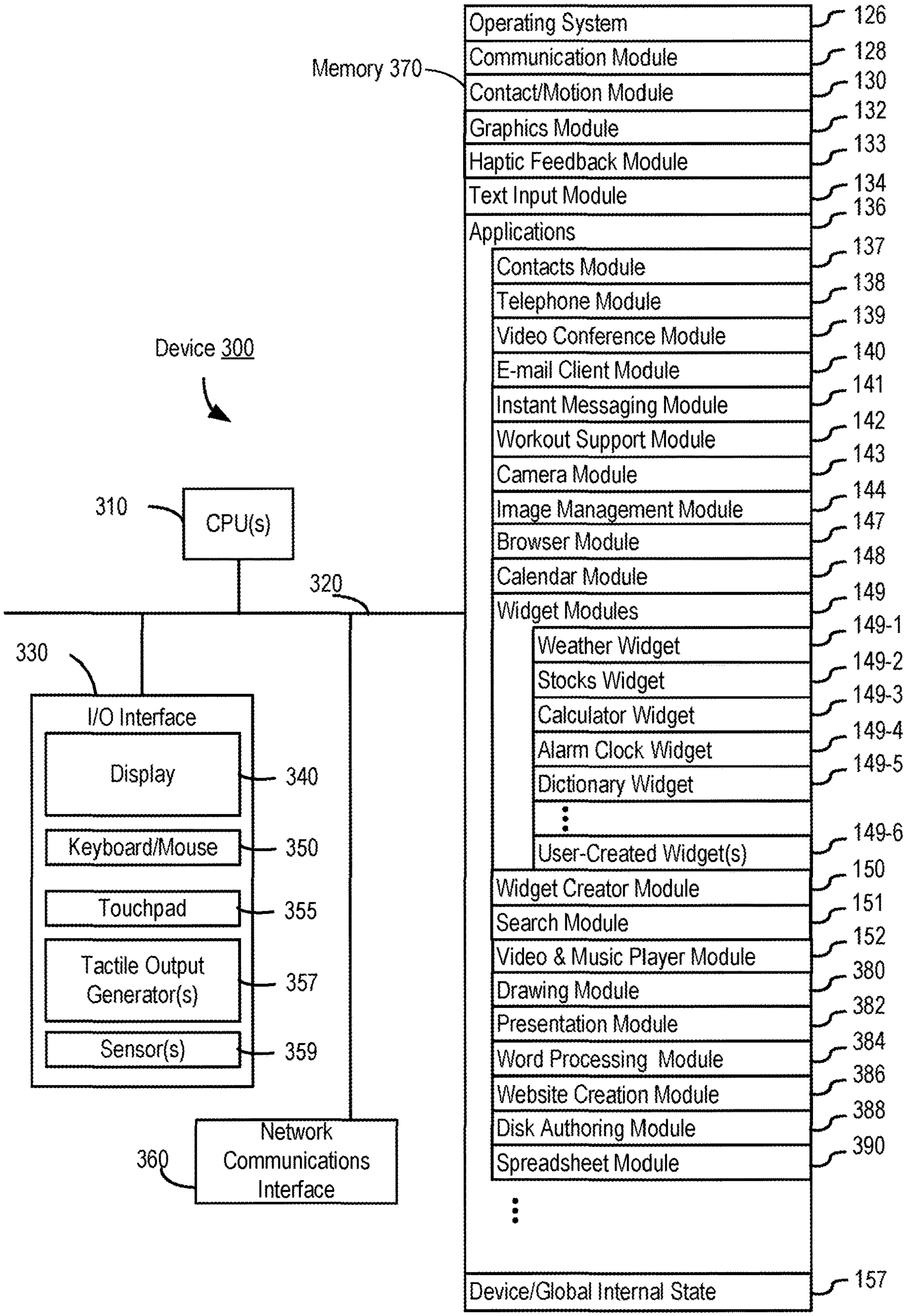
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
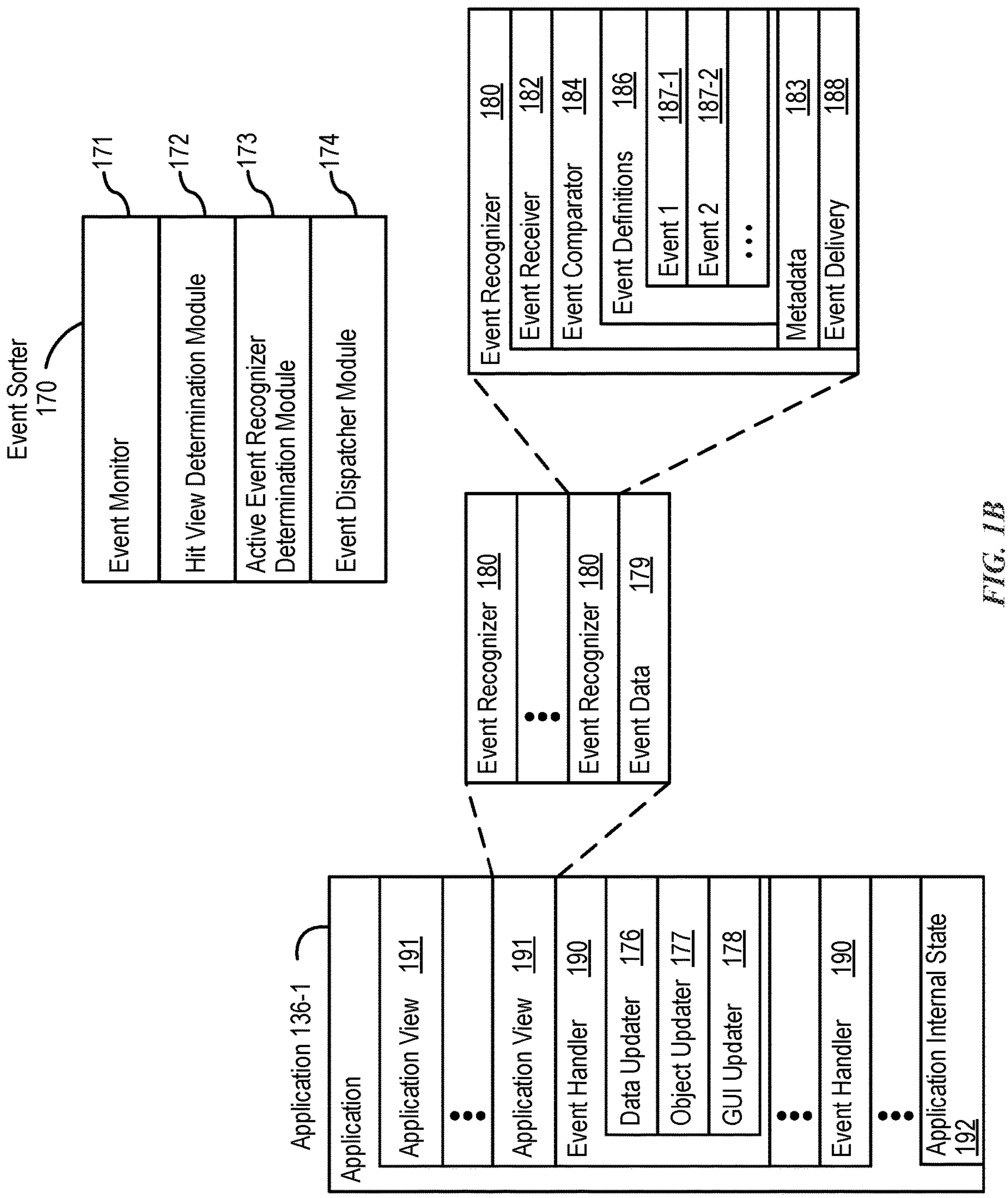
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
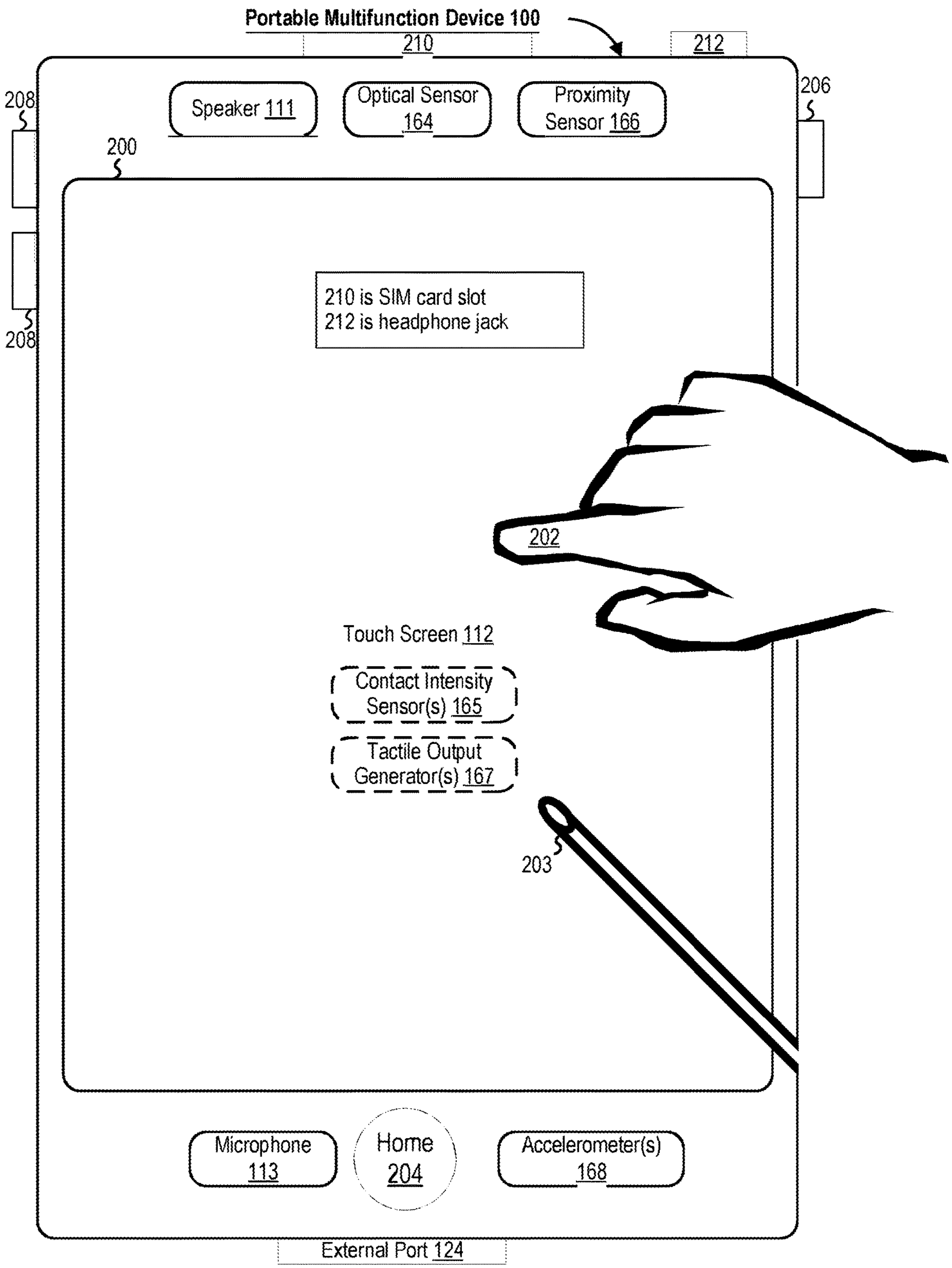
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
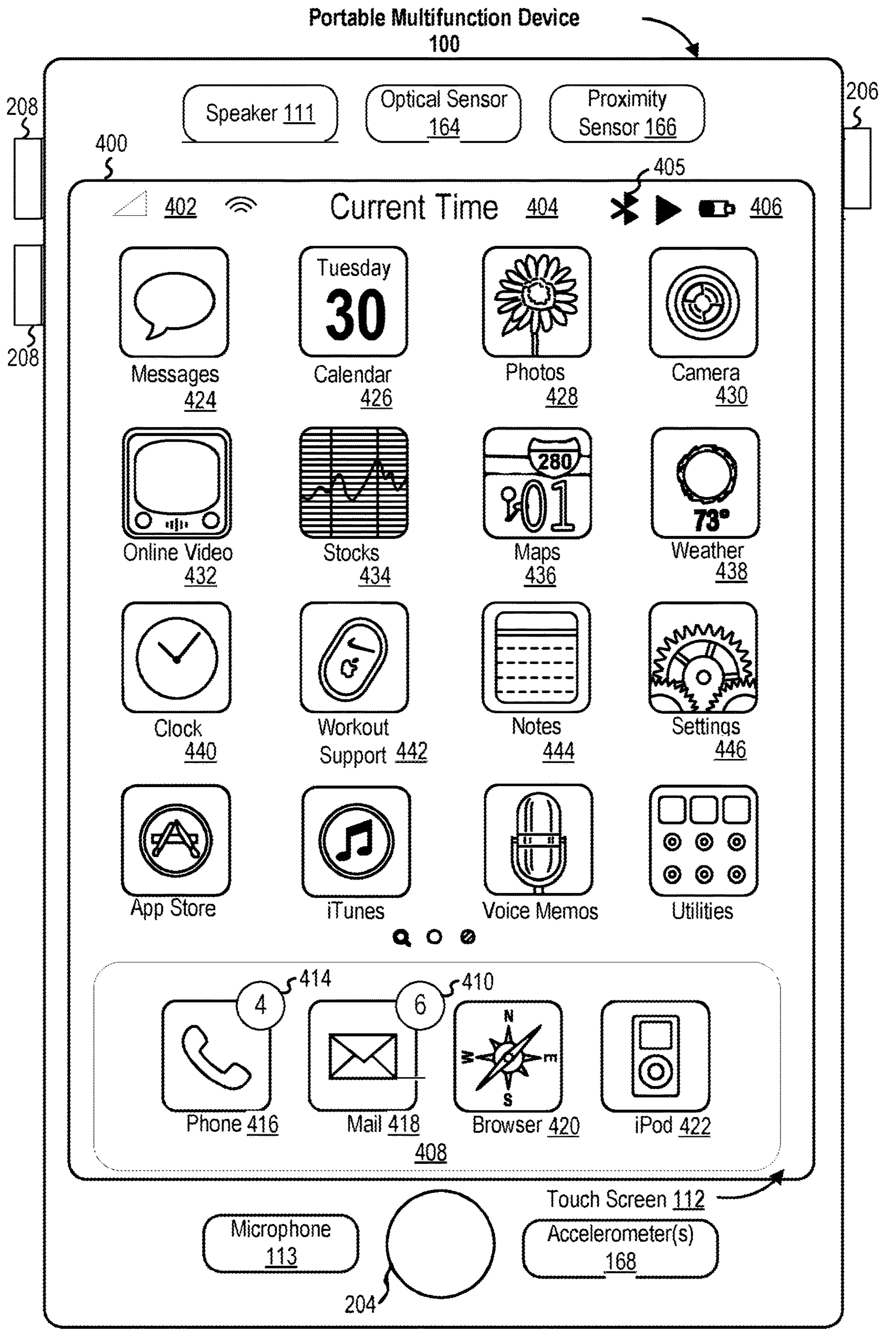
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
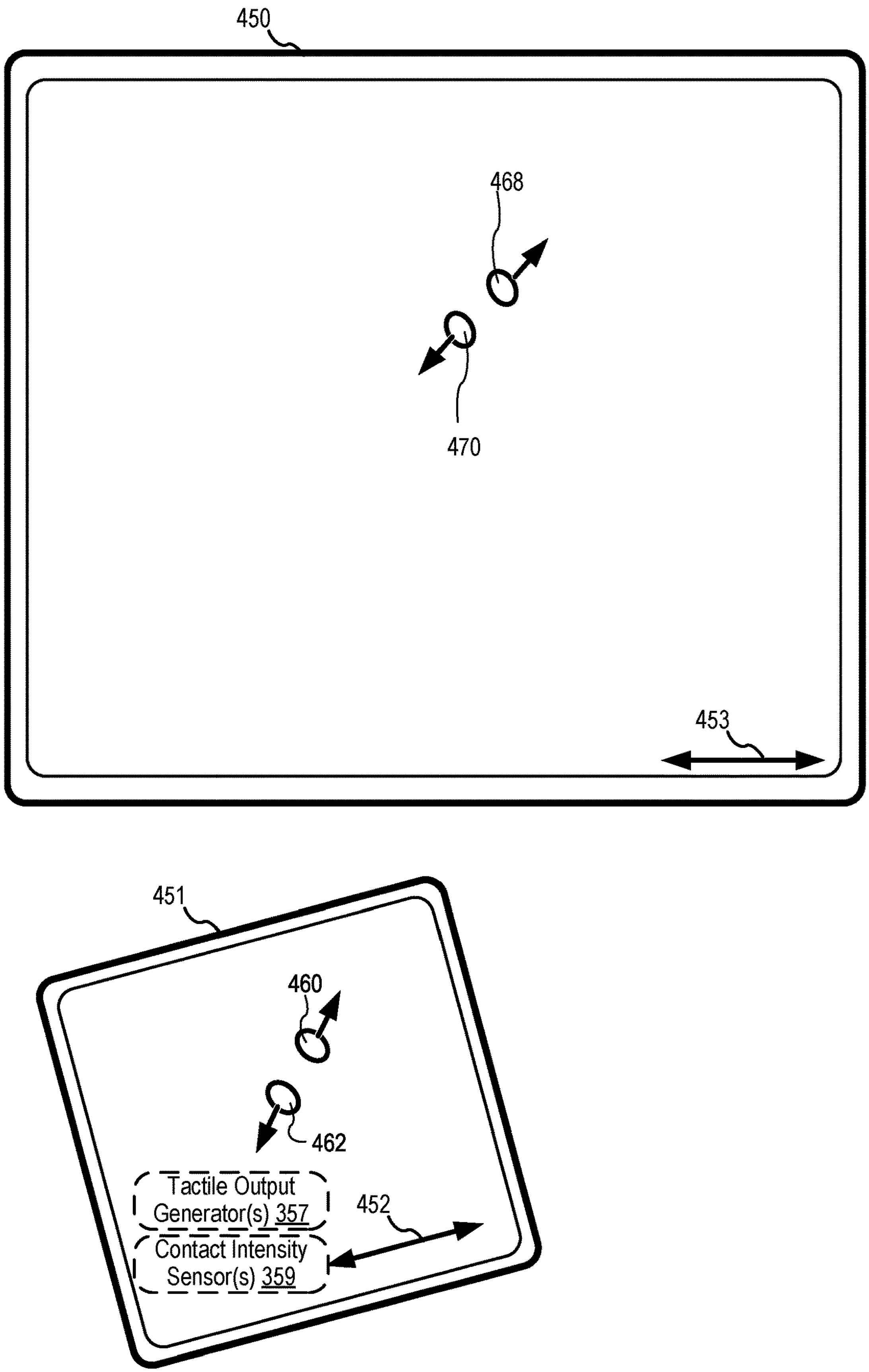
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
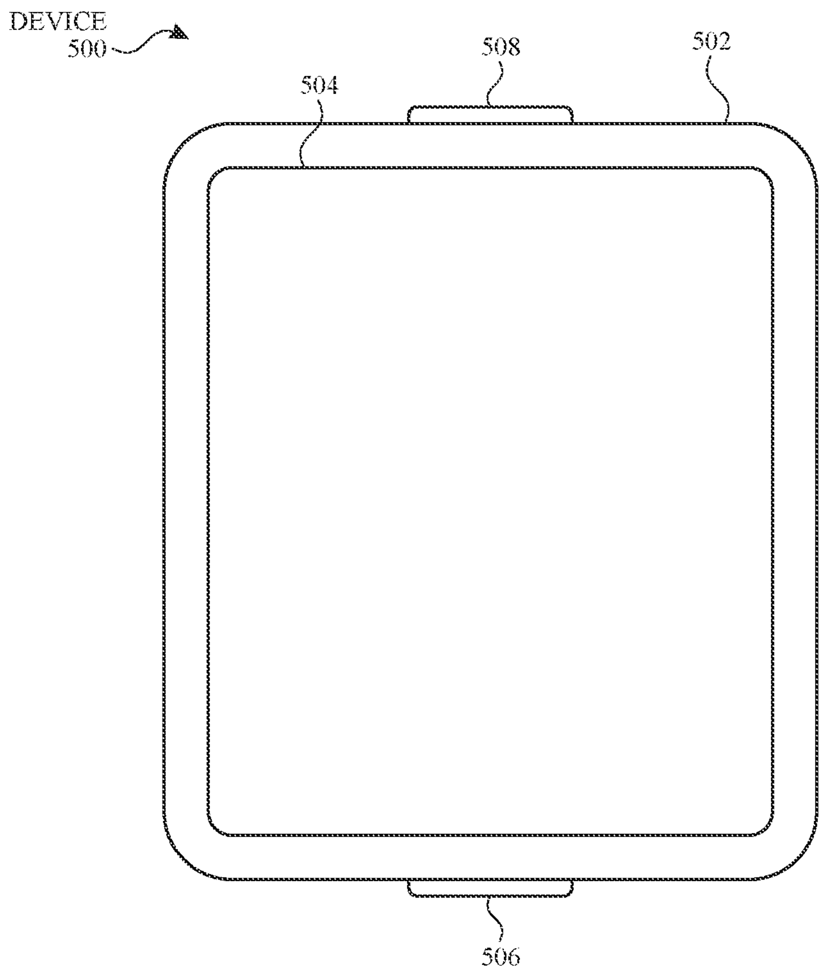
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
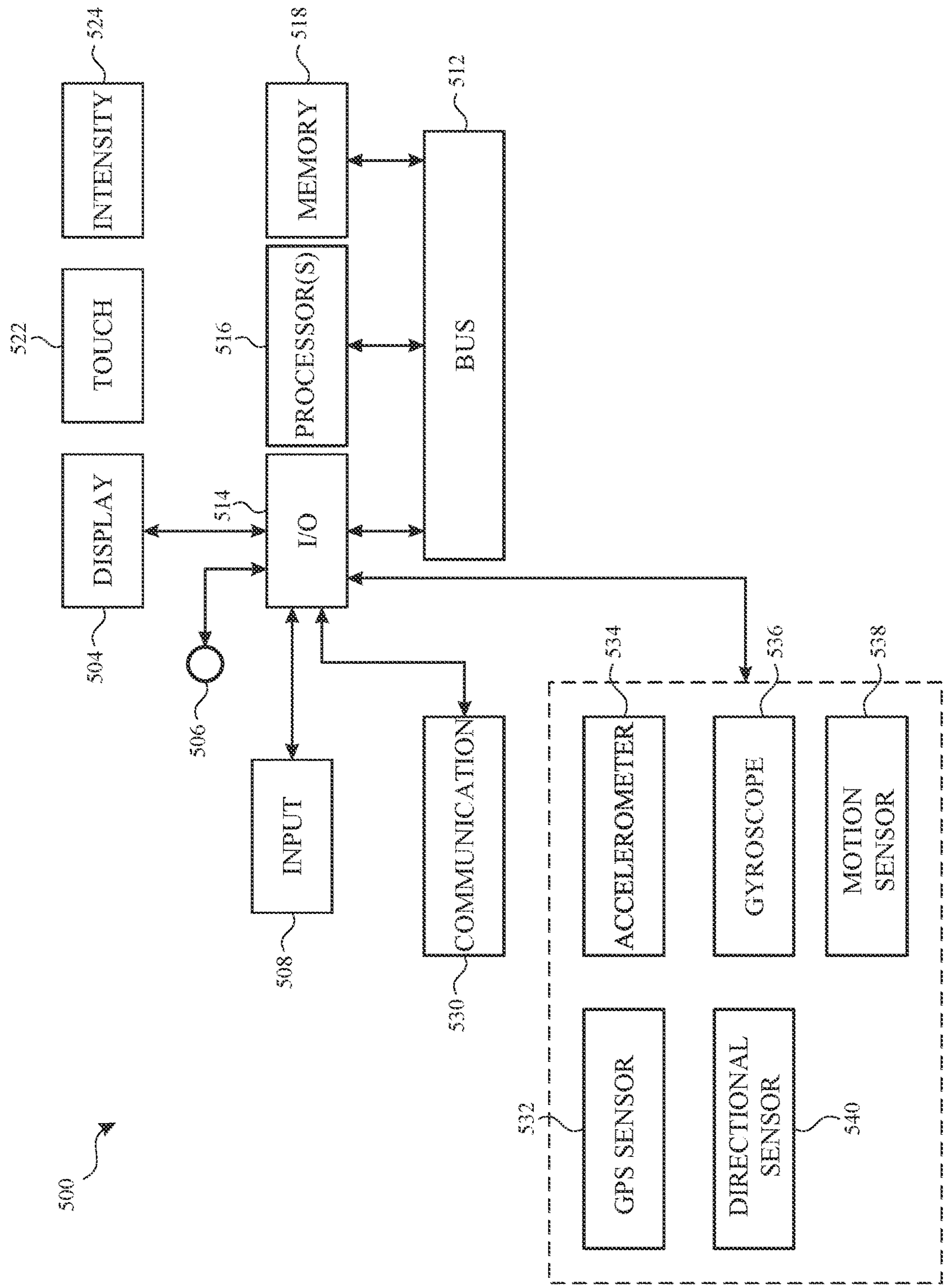
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 900, 1100, 1300, 1500, and 1700. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6Z illustrate exemplary user interfaces for managing visual content in media in accordance with some embodiments. The user interfaces in these figures are used to illustrate the processes described below, including the processes in FIG. 8.

FIG. 6A illustrates computer system 600 (e.g., an electronic device) displaying a camera user interface, which includes live preview 630 that optionally extends from the top of the display of computer system 600 to the bottom of the display of computer system 600. In some embodiments, computer system 600 optionally includes one or more features of device 100, device 300, or device 500. In some embodiments, computer system 600 is a tablet, phone, laptop, desktop, etc.

Live preview 630 is a representation of a field-of-view of one or more cameras of computer system 600 ("FOV"). In some embodiments, live preview 630 is a representation of a partial FOV. In some embodiments, live preview 630 is based on images detected by one or more camera sensors. In some embodiments, computer system 600 captures images using a plurality of camera sensors and combines them to display live preview 630. In some embodiments, computer system 600 captures images using a single camera sensor to display live preview 630.

The camera user interface of FIG. 6A includes indicator region 602 and control region 606, which are positioned with respect to live preview 630 such that indicators and controls can be displayed concurrently with live preview 630. Camera display region 604 is substantially not overlaid with indicators and/or controls. As illustrated in FIG. 6A, the camera user interface includes visual boundary 608 that indicates the boundary between indicator region 602 and camera display region 604 and the boundary between camera display region 604 and control region 606.

As illustrated in FIG. 6A, indicator region 602 includes indicators, such as flash indicator 602*a* and animated image indicator 602*b*. Flash indicator 602*a* indicates whether a flash mode is on (e.g., active), off (e.g., inactive), or in another mode (e.g., automatic mode). In FIG. 6A, flash indicator 602*a* indicates to the user that the flash mode is off and a flash operation will not be used when computer system 600 is capturing media. Moreover, animated image indicator 602*b* indicates whether the camera is configured to capture a single image or a plurality of images (e.g., in response to detecting a request to capture media). In some embodiments, indicator region 602 is overlaid onto live preview 630 and, optionally, includes a colored (e.g., gray; translucent) overlay.

As illustrated in FIG. 6A, camera display region 604 includes live preview 630 and zoom controls (e.g., affordance) 622. Zoom controls 622 include 0.5× zoom control 622*a*, lx zoom control 622*b*, and 2× zoom control 622*c*. As illustrated in FIG. 6A, lx zoom control 622*b* is bolded and enlarged compared to the other zoom controls, which indications that 1× zoom control 622*b* is selected and that computer system 600 is displaying live preview 630 at a "lx" zoom level.

As illustrated in FIG. 6A, control region 606 includes camera mode controls (e.g., controls) 620, shutter control 610, camera switcher control 614, and a representation of media collection 612. In FIG. 6A, camera modes controls 620*a*-620*e* are displayed, and 'Photo' camera mode 620*c* is bolded, which indicates that the computer system 600 is configured to capture photo media when shutter control 610 is active. As such, shutter control 610, when activated, causes computer system 600 to capture media (e.g., a photo when shutter control 610 is activated in FIG. 6A), using the one or more camera sensors, based on the current state of live preview 630 and the current state of the camera application (e.g., which camera mode is selected). The captured media is stored locally at computer system 600 and/or transmitted to a remote server for storage. Camera switcher control 614, when activated, causes computer system 600 to switch to showing the field-of-view of a different camera in live preview 630, such as by switching between a rear-facing camera sensor and a front-facing camera sensor. The representation of media collection 612 illustrated in FIG. 6A is a representation of media (e.g., an image, a video) that was most recently captured by computer system 600. In some embodiments, in response to detecting a gesture directed to media collection 612, computer system 600 displays a similar user interface to the user interface illustrated in FIG. 7B (discussed below). In some embodiments, indicator region 602 is overlaid onto live preview 630 and, optionally, includes a colored (e.g., gray; translucent) overlay. At FIG. 6A, computer system detects tap input 650*a* on (and/or directed to) shutter control 610.

As illustrated in FIG. 6B, in response to detecting tap input 650*a*, computer system 600 initiates capture of media to capture live preview 630 of FIG. 6A and displays a new representation in media collection 612. In FIG. 6B, the new representation is a representation of live preview 630 of FIG. 6A (e.g., that was captured in response to detecting tap input 650*a* on shutter control 610). Additionally, the new representation is displayed on top of media collection 612 in FIG. 6B because the new representation corresponds to a representation of the most recently captured media.

As illustrated in FIG. 6B, live preview 630 includes a representation that shows person 640 standing behind a tree, where the head of person 640 and a portion of the body of person 640 is not obscured by the tree. Positioned on the tree is a sign 642 that includes text portion 642*a* (e.g., "LOST DOG") and text portion 642*b* (e.g., paragraph of text that starts with "LOVEABLE"). In FIG. 6B, the text in text portions 642*a*-642*b* is not visually prominent, and in the embodiment shown in FIG. 6B, the text in text portions 642*a* and 642*b* is small and cannot be easily read by a user looking at computer system 600. At FIG. 6B, computer system 600 detects de-pinching input 650*b* on live preview 630.

As illustrated in FIG. 6C, in response to detecting de-pinching input 650*b*, computer system 600 replaces the display of 2× zoom control 622*c* of FIG. 6B with the display of 2.5× zoom control. Additionally, computer system 600 updates live preview 630 to reflect a change in zoom level, such that objects in the field-of-view of the one or more cameras are displayed at a "2.5×" zoom level (e.g., as indicated by newly displayed and selected (e.g., enlarged and bolded) 2.5× zoom control 622*d*) instead of the "1×" zoom level of FIG. 6B.

When compared to FIG. 6B, text portions 642*a*-642*b* of FIG. 6C are more visually prominent (e.g., bigger, more readable) than text portions 642*a*-642*b* of FIG. 6B. At FIG. 6C, a determination is made that text portions 642*a*-642*b* (and/or text included in text portions 642*a*-642*b*) individually satisfy a set of prominence criteria. Text portions 642*a*-642*b* of FIG. 6C satisfy the set of prominence criteria because each text portion occupies more than a threshold portion of live preview 630 (e.g., 10%) and/or each text portion includes text that is greater than a threshold size (e.g., greater than 6 pt font). In some embodiments, one or more text portions satisfy the set of prominence criteria based on other criteria, such as whether a respective text portion includes one or more types of text (e.g., an e-mail, phone number, a quick response ("QR") code, etc.), whether a respective text portion is displayed at or close to a particular location (e.g., central location) of live preview 630, whether a respective text portion is relevant based on the context of the media displayed as live preview 630, etc. (as discussed in more detail in relation to FIGS. 7A-7L, FIG. 8, and FIG. 9).

As illustrated in FIG. 6C, computer system 600 displays bracket 636*a* around text portions 642*a*-642*b* and text management control 680 to the right of zoom control 622*d* in camera display region 604 because of the determination that text portions 642*a*-642*b* satisfy the set of prominence criteria (and/or because at least one portion of text satisfies the set of prominence criteria).

Looking back at FIG. 6B, bracket 636*a* and text management control 680 were not displayed in FIG. 6B because a determination was made that text portions 642*a*-642*b* did not satisfy the set of prominence criteria (and/or because no portion of text satisfied the set of prominence criteria). At FIG. 6B, the determination was made that text portions 642*a*-642*b* did not satisfy the set of prominence criteria because text portions 642*a*-642*b* did not occupy more than a threshold portion of live preview 630 and did not include text that was greater than the threshold size. In some embodiments (as shown in FIGS. 6B-6C), the determination of whether a respective text portion satisfies the set of prominence criteria is made based on how/when the text portion is currently being displayed in the live preview 630 and not solely based on whether live preview 630 includes text (and/or a text portion).

Returning back to FIG. 6C, bracket 636*a* is positioned around the image of the dog on sign 642 because the image of the dog is positioned between text portions 642*a*-642*b*. In some embodiments, multiple brackets are displayed, such that one bracket is displayed around text portion 642*a* and another bracket is displayed around text portion 642*b*. In some embodiments, multiple brackets are displayed because a determination is made that multiple text portions (e.g., "portions of text") satisfy the set of prominence criteria and an object is positioned between the text portions. In some embodiments, only one bracket is displayed around multiple portions of text when an object is not positioned between the multiple portions of text. In some embodiments, where text portion 642*a* satisfies the set of prominence criteria but text portion 642*b* does not satisfy the set of prominence criteria, a bracket is displayed around text portion 642*a* while a bracket is not displayed around text portion 642*b* (and vice-versa). In some embodiments, computer system 600 indicates that a respective text portion (e.g., portion of text) satisfies the set of prominence criteria by emphasizing the respective portion in other ways, such as by highlighting, bolding, resizing, displaying a box around the respective portion of text in addition to and/or in lieu of displaying the bracket around the respective portion of text.

As illustrated in FIG. 6C, computer system 600 displays text-type indications 638*a*-638*b* (e.g., underlining) to show that a particular type of text (e.g., e-mail, address, phone number, QR code, etc.) has been detected (e.g., data detector) in text portion 642*b*. In FIG. 6C, text-type indication 638*a* is displayed under "123 Main Street" to show that an address has been detected, and text-type indication 638*b* is displayed under "123-4567" to show that a phone number has been detected. In some embodiments, when a text-type indicator is displayed under a portion of text, a user can select the portion of text and/or the text-type indicator to perform an operation (e.g., as discussed further in relation to FIGS. 6M-6N below).

FIGS. 6C-6D illustrate an exemplary embodiment where computer system 600 is moved in the physical environment. FIGS. 6C-6D include graphical representation 660 that shows the original position 660*a* of computer system 600 (e.g., in FIGS. 6C-6D) relative to a changed position 660*b* (e.g., in FIG. 6D) of computer system 600 in the physical environment. As illustrated in FIG. 6C, computer system 600 is at original position 660*a*. At FIG. 6C, the position of computer system 600 is changed.

As illustrated in FIG. 6D, in response to the position of computer system 600 changing (e.g., from original position 660*a* to changed position 660*b*), computer system 600 translates live preview in the upward direction. In FIG. 6D, live preview 630 is translated in an upward direction, such that a top portion of live preview 630 of FIG. 6C ceases to be displayed (e.g., portion that included text portion 642*a*), and a new bottom portion of live preview 630 (as shown in FIG. 6D) is newly displayed. At FIG. 6D, a determination is made that text portion 642*a* does not satisfy the set of prominence criteria and text portion 642*b* does (or continues to) satisfy the set of prominence criteria. Here, the determination is made that text portion 642*a* does not satisfy the set of prominence criteria because text portion 642*a* is no longer displayed as a part of live preview 630 (e.g., in the camera display region) in FIG. 6D. As illustrated, because text portion 642*a* does not satisfy the set of prominence criteria and text portion 642*b* satisfies the set of prominence criteria, computer system 600 displays bracket 636*b* around text portion 642*b* (and not text portion 642*a*) and ceases to display bracket 636*a*. In other words, computer system 600 dynamically changes bracket 636*a* into bracket 636*b* in accordance with a change with respect to a determination of whether one or more text portions (e.g., text portions that are currently displayed as being a part of live preview 630) satisfy and/or do not satisfy the set of prominence criteria. Therefore, one or more determination(s) of whether one or more text portions satisfies the set of prominence criteria is dynamic and can change when live preview 630 changes in response to a request to zoom in (e.g., de-pinch input)/zoom out (e.g., pinch input), pan (e.g., right, left, up, down swipe input) and/or changes in response to movement of computer system 600 (e.g., forward, back, up, down) and/or one or more cameras of computer system 600. In some embodiments, the display of one or more brackets (e.g., brackets 636*a*-636*b*) and/or the display of text management control 680 changes when the one or more determination(s) of whether one or more text portions satisfies the set of prominence criteria change (as further described below in relation to FIGS. 7A-7L, 8, 9). In some embodiments, while computer system 600 displays bracket 636*a* around text portion 642*b* (and/or in response to detecting text in live preview 630), computer system 600 dims and/or reduces the saturation (e.g., colorfulness, tint, and/or hue) of portions of live preview 630 that do not have text (e.g., the photo of the dog) while the saturation and/or brightness of text portion 642*b* (and/or other portions of text) is maintained. In some embodiments, as a part of dimming portions of live preview 630 that do not have text and maintaining the brightness of text portion 642*b*, computer system 600 displays text portion 642*b* with a greater amount of brightness than the portions of live preview 630 that do not have text.

As illustrated in FIG. 6D, because the determination is made that text portion 642*b* does (or continues to) satisfy the set of prominence criteria, computer system 600 continues to display text management control 680. At FIG. 6D, text management control 680 is displayed because at least one determination is made that a currently displayed text portion (e.g., of live preview 630) satisfies the set of prominence criteria, irrespective of whether another text portion (e.g., text portion 642*a*) fails to continue to (or does not) satisfy the set of prominence criteria. At FIG. 6D, computer system 600 is moved back to original position 660*a*.

As illustrated in FIG. 6E, in response to computer system 600 being at original position 660*a*, computer system 600 re-displays live preview 630, using one or more techniques as described above in relation to FIG. 6C. At FIG. 6E, computer system 600 detects tap input 650*e* on text management control 680.

As illustrated in FIG. 6F, in response to detecting tap input 650*e*, computer system 600 changes the display of text management control 680. In particular, computer system 600 displays text management control 680 of FIG. 6F in an active and/or selected state (e.g., as indicated by text management control 680 being bold in FIG. 6F) and ceases to display text management control 680 in an inactive state and/or deselected state (e.g., as indicated by text management control 680 not being bold in FIG. 6E).

As illustrated in FIG. 6F, in response to detecting tap input 650*e*, computer system 600 emphasizes text portions 642*a*-642*b* and dims out other portions of live preview 630 (and/or other objects in the field-of-view of the one or more cameras), such as person 640, the image of the dog on sign 642, and the tree displayed in live preview 630. Along with dimming out other portions of live preview 630, computer system 600 ceases display of one or more controls (e.g., zoom controls 622 of FIG. 6E) in camera display region 604. In addition, computer system 600 also dims (or ceases to display) portions of the camera user interface, such as the indicator in the indicators in indicator region 602 and the controls and controls in camera control region 606. In some embodiments, some of the indicators and/or controls that are dimmed in the camera user interface of FIG. 6F are not selectable (e.g., does not cause computer system 600 to perform an action when selected). In some embodiments, some of the indicators and/or controls remain selectable and/or are not dimmed in response to detecting tap input 650*e*. In some embodiments, computer system 600 maintains display of some controls in camera display region 604 in response to detecting tap input 650*e*. In some embodiments, computer system 600 emphasizes portions 642*a*-642*b* by increasing the size of the text in text portions 642*a*-642*b*, highlighting the text in text portions 642*a*-642*b*, displaying a box around text portions 642*a*-642*b*, etc. In some embodiments, dimming portions of live preview 630 includes reducing the saturation of portions of the live preview 630 that do not have text (e.g., the photo of the dog) while maintaining the saturation of text portions 642*a* and 642*b* (e.g., using similar techniques as described above in relation to FIG. 6D).

Notably, at FIG. 6F, the portions of text that are emphasized in response to detecting input 650*e* are the portions of text that a bracket (e.g., bracket 636*a*) surrounded when input 650*e* was received in FIG. 6E. In some embodiments, a bracket around a portion of text indicates to the user, which text will be emphasized and/or managed by the user when selection of text management control 680 occurs. In some embodiments, one or more text portions that are displayed via live preview 630 but do not have a bracket surrounding it when an input is received on text management control 680 are not emphasized in response to selection of the text management control 680 (e.g., in FIG. 7F below, "BRAND" is not emphasized when text management control 680 is selected in FIG. 7F). In some embodiments, one or more text portions that are displayed via live preview 630 but do not have a bracket surrounding it when an input is received on text management control 680 are emphasized in response to selection of the text management control 680 (e.g., if it is determined that the one or more portion of text meet a set of prominence criteria).

As illustrated in FIG. 6F, in response to detecting tap input 650*e*, computer system 600 also displays text management options 682 and instruction 684 that indicates one or more inputs/gestures that can be used to select a subset of text among text portions 642*a*-642*b* (e.g., "SWIPE OR TAP TO SELECT TEXT"). In FIG. 6F, text management options 682 are options to manage text portions 642*a*-642*b*. In particular, text management options 682 include copy option 682*a*, select-all option 682*b*, look-up option 682*c*, and share option 682*d*. In some embodiments, in response to receiving an input directed to copy option 682*a*, computer system 600 copies selected text (e.g., text in text portions 642*a*-642*b* in FIG. 6F) and/or saves the selected text in a copy/paste buffer, which allows the selected text to be pasted in response to receiving a request to paste the selected text. In some embodiments, in response to receiving an input directed to select-all option 682*b*, computer system 600 selects all of the text that is emphasized on computer system 600. In some embodiments, when computer system 600 selects all of the text in the selected text, computer system 600 highlights the selected text. In some embodiments, in response to receiving an input directed to look-up option 682*c*, computer system 600 looks up, via a search application (e.g., a web application, a dictionary application, a personal assistant application), the selected text (e.g., the emphasized text portions in FIG. 6F) and/or displays one or more definitions and resources for the emphasized and/or selected text. In some embodiments, in response to receiving an input directed to share option 682*d*, computer system 600 initiates a process to share the selected text via one or more application (e.g., an e-mail, text messaging, word processing, social media application) (e.g., one or more predetermined application). In some embodiments, as a part of initiating the process to share the selected text, computer system 600 displays a scrollable list of applications, where selection of an application from the scrollable list of applications causes computer system 600 to share the selected text using the selected application. In some embodiments, the scrollable list of applications is displayed concurrently with a portion of live preview 630 (e.g., that includes one or more of text portions 642*a*-642*b*). At FIG. 6F, computer system 600 detects tap input 650*f* on a portion of live preview 630 (e.g., a portion in a dimmed region of live preview 630 and/or a portion of live preview 630 that does not include text portions 642*a*-642*b* and/or text management control 680).

As illustrated in FIG. 6G, in response to detecting tap input 650*f*, computer system 600 displays text management control 680 in an inactive state, deemphasizes text portions 642*a*-642*b*, brightens the other portions of live preview 630 and the camera user interface, and ceases to display text management options 682 and instruction 684. Additionally, in response to detecting tap input 650*f*, computer system 600 re-displays bracket 636*a* because a determination is made that text portions 642*a*-642*b* satisfy (or continue to satisfy) the set of prominence criteria. Effectively, in response to detecting tap input 650*f*, the camera user interface is returned to the state that the camera user interface was in before tap input 650*e* was detected on text management control 680. At FIG. 6G, computer system 600 detects tap input 650*g* on text management control 680.

As illustrated in FIG. 6H, in response to detecting tap input 650*g*, computer system 600 displays the camera user interface of FIG. 6H, using one or more techniques as described above in relation to FIG. 6F. Notably, at FIG. 6H (and in FIG. 6F), computer system 600 emphasizes text portions 642*a*-642*b* because text portions 642*a*-642*b* satisfy the set of prominence criteria. In some embodiments, computer system 600 dims one or more portions of text that do not satisfy the set of prominence criteria in response to detecting tap input 650*g*. At FIG. 6H, computer system 600 detects tap input 650*h* on text portion 642*b*.

As illustrated in FIG. 6I, in response to detecting tap input 650*h*, computer system 600 selects text portion 642*b* and re-positions text management options 682, such that text management options 682 is displayed above text portion 642*b* in FIG. 6I instead of being displayed above text portion 642*a* (e.g., as shown in FIG. 6H). Text management options 682 is re-positioned to indicate that the text management options can be used to manage the text in text portion 642*b* and cannot be used to manage the text in text portion 642*a*. Thus, in other words, computer system 600 changes the text that is selected to be managed using text management options 682 in response to detecting an input (e.g., swipe or tap) to select a particular portion of text.

Notably, live preview 630 of FIG. 6I does not include person 640, which was included in live preview 630 of FIG. 6H. This is because person 640 has moved behind the tree in live preview 630 of FIG. 6I and, thus, is not in the field of view of the one or more cameras of computer system 600. As illustrated in FIG. 6I, live preview 630 continues to update to reflect changes in the field-of-view of one or more cameras of the computer system 600 while text management control 680 is displayed in the active state and/or while text management options 682 are displayed. In some embodiments, live preview 630 does not continue to update while text management control 680 is displayed in the active state and/or while text management options 682 are displayed. Thus, in the embodiments where live preview 630 is not updated, computer system 600 would maintain display of a portion of person 640 sticking out from behind the tree in live preview 630 of FIG. 6I. At FIG. 6I, computer system 600 detects de-pinch input 650*i*.

As illustrated in FIG. 6J, in response to detecting de-pinch input 650*i*, computer system 600 displays live preview 630 at an increased zoom level and maintains display of text portion 642*b* and text management options 682. In some embodiments, computer system 600 continues to display at least a subset of text portion 642*b* in response to a request to zoom in (e.g., de-pinch input) (and/or zoom out, pan and/or move of computer system 600 and/or one or more camera of computer system 600) because text portion 642*b* is selected. In some embodiments, display of a selected text portion (e.g., text portion 642*b*) is static. Thus, in some embodiments where the selected text portion is static, computer system 600 continues to display the selected text portion, irrespective of whether the selected text portion remains in the field-of-view of the one or more cameras (e.g., as further described below in relation to FIGS. 6L-6M) (e.g., when computer system 600 is moved, panned, and/or zoomed, etc.) (e.g., while the camera user interface remains displayed). At FIG. 6J, computer system 600 detects tap input 650*j* on the word "Fluffy," which is a word that is included in text portion 642*b*.

As illustrated in FIG. 6K, in response to detecting tap input 650*j*, computer system 600 selects and highlights the word "Fluffy." At FIG. 6K, only the selected word "Fluffy" can be managed using text management options 682 that are displayed in FIG. 6K. At FIG. 6K, computer system 600 detects leftward swipe input 650*k* start from the word "Fluffy."

As illustrated in FIG. 6L, in response to detecting leftward swipe input 650*k*, computer system 600 selects and highlights multiple words included in text portion 642*b* based on the direction of swipe input 650*k*. As illustrated in FIG. 6L, the words "THE NAME FLUFFY" are highlighted to show that "THE NAME FLUFFY" has been selected based on swipe input 650*k*. At FIG. 6L, only the selected words "THE NAME FLUFFY" can be managed using text management options 682 that are displayed in FIG. 6L.

FIGS. 6L-6M illustrate an exemplary embodiment where computer system 600 is moved in the physical environment while computer system 600 continues to display the selected text portion (or text portion where a subset of the text portion is selected), irrespective of whether the selected text portion remains in the field-of-view of the one or more cameras (e.g., as further described below in relation to FIGS. 6L-6M). FIGS. 6L-6M include graphical representation 660 that shows the original position 660*a* of computer system 600 (e.g., in FIGS. 6L-6M) relative to changed position 660*c* (e.g., in FIG. 6M) of computer system 600.

As illustrated in FIG. 6L, tree mark 646 is representative of a static portion of the tree displayed in live preview 630 of FIGS. 6L-6M. In FIG. 6L, tree mark 646 is displayed below text portion 642*b*. At FIG. 6L, the position of computer system 600 is changed.

As illustrated in FIG. 6M, in response to positioning of computer system 600 changing (e.g., as shown by changed position 660*c* relative to original position 660*a*), computer system 600 updates live preview, such that the tree mark 646 is displayed above text portion 642*b*. Notably, at FIG. 6M, computer system 600 text portion 642*b* is no longer in the field-of-view of the one or more cameras, such that text portion 642*b* would be located at the position in which text portion 642*b* is displayed live preview 630 of FIG. 6M (e.g., which evident by tree mark 646 moving to a higher position in live preview 630). However, computer system 600 continues to display text portion 642*b* in live preview 630 of FIG. 6M because a subset (e.g., "THE NAME FLUFFY") of text portion 642*b* is selected. In some embodiments, computer system 600 only displays the subset of text portion 642*b* that is selected without displaying other portions of text portion 642*b* that are not selected. In some embodiments, computer system 600 does not update live preview 630 when text is selected and the camera is moved in the physical environment (and/or zoomed/panned). In some embodiments, computer system 600 selects a different portion of text (e.g., if text was displayed towards the bottom of the tree in live preview 630) in response to computer system 600 and/or a camera of computer system 600 being moved (e.g., and/or zoomed/panned) (e.g., as further described below in relation to FIGS. 7A-7L, 8, and 9). At FIG. 6M, computer system 600 detects input 650*m* on "123-4567" under which text-type indication 638*b* is displayed.

As illustrated in FIG. 6N, in response to detecting input 650*m* and because determinations are made that input 650*m* is a tap input and "123-4567" corresponds to a phone number, computer system 600 displays a phone dialer user interface and automatically (e.g., without user input on a keypad and/or a contact information card) initiates a phone call to "123-4567". In some embodiments, a confirmation screen is displayed before computer system 600 initiates the phone call.

As illustrated in FIG. 6O, in response to detecting input 650*m* and because determinations are made that input 650*m* is a press-and-hold input and "123-4567" corresponds to a phone number, computer system 600 displays phone number management options 692, which includes call option 692*a*, send message option 692*b*, add-to-contacts option 692*c*, and copy option 692*d*. As illustrated in FIG. 6O, computer system 600 displays different options for management of some particular types of text (e.g., e-mails, phone numbers, QR codes) than management of other types of text (as shown by text management options 682 being displayed in FIG. 6L when "THE NAME FLUFFY" was selected as opposed to phone number management options 692 being displayed when "123-4567" is selected in FIG. 6O). In some embodiments, in response to detecting an input directed to call option 692*a*, computer system 600 initiates a phone call to "123-4567" (e.g., using similar techniques as described above in relation to FIG. 6N). In some embodiments, in response to detecting an input directed to send message option 692*b*, computer system 600 initiates a process for sending a message (e.g., displays a text management application) to "123-4567". In some embodiments, in response to detecting an input directed to add-to-contacts option 692*c*, computer system 600 initiates a process for adding a contact to a contact list that has "123-4567" as a phone number in the information for the contact. In some embodiments, in response to detecting an input directed to copy option 692*d*, computer system 600 copies "123-4567" using one or more techniques as described above in relation to copy option 682*a* in FIG. 6F.

FIGS. 6P-6T illustrate an exemplary embodiment where a QR code is displayed in live preview 630. In some embodiments, the QR code can be replaced with other types of matrices and/or barcodes.

As illustrated in FIG. 6P, computer system 600 displays QR code 668 concurrently with QR code identifier 670 (e.g., "CAFE32.COM") in live preview 630. In some embodiments, a QR code identifier identifies one or more of a website, a contact, a cellular plan, an e-mail address, a calendar invite/event, a location (e.g., a GPS location), text, a video, a phone number, a WiFi-Network, an application and/or an instance of an application, etc. QR code identifier 670 includes an indication of the information identified by the QR code. At FIG. 6P, QR code 668 is in the field-of-view of one or more cameras of computer system 600, and QR code identifier 670 is not. Computer system 600 displays QR code identifier 670 because a determination is made that QR code 668 corresponds to (e.g., or identifies) a website destination that belongs to "CAFE32.COM". At FIG. 6P, computer system 600 detects input 650*p*1 and/or input 650*p*2 in camera display region 604.

As illustrated in FIG. 6Q, in response to detecting input 650*p*1 and/or input 650*p*2 (and based on a determination that at least one of the inputs is a tap input and/or a press-and-hold input), computer system 600 displays notification 674, which includes a preview of the website (e.g., "CAFE32.COM" address). In some embodiments, the preview of the web address includes the full web address (e.g., "http:\\cafe32.com\menu") and/or an image from the web address. In some embodiments, computer system 600 displays notification 674 in lieu of navigating to the web address corresponding to QR code 668 in response to detecting one or more inputs to minimize the chances of a user unintentionally navigating to the website site that corresponds to QR code 668. In some embodiments, in response to detecting input 650*p*1 on QR code 668, computer system 600 displays notification 674 (e.g., without automatically navigating to the website. In some embodiments, in response to detecting input 650*p*2 on QR code identifier, computer system 600 automatically navigates to the website that corresponds to QR code 668 (e.g., without displaying notification 674) (e.g., using one or more similar techniques as described below in relation to computer system 600's response to tap input 650*q*). At FIG. 6Q, computer system 600 detects tap input 650*q* on notification 674.

As illustrated in FIG. 6R, in response to detecting tap input 650*q*, computer system 600 automatically navigates to the web address that corresponds to the QR code (and/or opens) via web application 678.

As illustrated in FIG. 6S, computer system 600 displays QR code 668 concurrently with QR code identifier 670, using one or more techniques as described above in relation to FIG. 6P. At FIG. 6S, computer system 600 detects tap input 650*s* on text management control 680.

As illustrated in FIG. 6T, in response to detecting tap input 650*s*, computer system 600 displays QR code management options 672, which includes share option 672*a*, copy link option 672*b*, add-to-reading list option 672*c*, and open link option 672*d*. As described in relation to FIG. 6O above, computer system 600 displays different options for management of some particular types of text than management of other types of text. In some embodiments, in response to detecting an input directed to share option 672*a*, computer system 600 initiates a process for sharing the web address and/or link that corresponds to the QR code (e.g., using one or more similar techniques as described in relation to an input directed to share option 682*d* in FIG. 6F). In some embodiments, in response to detecting an input directed to copy link option 672*b*, computer system 600 copies the web address and/or link that corresponds to the QR code (e.g., using one or more techniques as described above in relation to copy option 682*a* in FIG. 6F). In some embodiments, in response to detecting an input directed to add-to-reading list option 672*c*, computer system 600 initiates a process for adding the web address and/or link that corresponds to the QR code to a list of items (e.g., one or more articles, books, websites, etc.). In some embodiments, in response to detecting an input directed to open link option 672*d*, computer system 600 navigates to the web address that corresponds to the QR code (and/or opens) via web application 678 (e.g., using similar techniques as described above in relation to FIG. 6R).

In some embodiments, QR code management options 672 include one or more options that are dynamically chosen based on the type of resource that the QR code represents (e.g., the QR code displayed when text management control 680 is selected). For example, the type of resource represented by a QR code can include one or more of a link to a website, a contact, a cellular plan, an e-mail address, a calendar invite/event, a location (e.g., a GPS location), text, a video, a phone number, a WiFi-Network, an application and/or an instance of an application, etc. In some embodiments, QR code management options 672 include a first set of controls when the QR code represents a resource of a first type and a second set of controls when the QR code represents a resource of a second type that is different from the first type. In some embodiments, the first set of controls has a different number of controls than the second set of controls. In some embodiments, a preview of the resource represented by the QR code is included in QR code management options 672 (e.g., when the QR code represents a string of text).

In some embodiments, QR code management options 672 include a different set of controls based on whether computer system 600 is in a locked or unlocked state. In some embodiments, when computer system 600 is in a locked state and the QR represents a link to an application, a control option to install and/or open the application is displayed. In some embodiments, when computer system 600 is in an unlocked state, a link to open the application is not displayed (e.g., is suppressed) even if the application is installed so as to avoid conveying information to an unauthorized user of the device about which applications are installed on the device. Optionally, instead of displaying a link to open the application, the device displays an option to use a portion of the application that is available without downloading the full application. In some embodiments, computer system 600 displays a different set of controls (e.g., based on whether computer system 600 is in a locked or unlocked state) to limit information given to unauthorized users (e.g., information that can be used to determine whether the application represented by the QR code is installed and/or not installed on computer system 600).

FIGS. 6U-6W illustrate an exemplary scenario where computer system 600 displays a selection indicator around selected text that is separated into columns. In FIGS. 6U-6W, computer system 600 is oriented, such that the text in the environment is aligned with field-of-view of one or more cameras of computer system 600. FIG. 6U illustrates computer system 600 displaying live preview 630 that includes a representation of text portion 648 (e.g., a roster of soccer players). In some embodiments, computer system 600 displays a representation of previously captured media that includes the representation of text portion 648 and one or more techniques described below in relation to FIGS. 6U-6W are used to select words in text portion 648.

As illustrated in FIG. 6U, text portion 648 includes name column 648*a*, position column 648*b*, state column 648*c*, and grade column 648*d*. Each respective column includes text that has been detected by computer system 600 (e.g., using one or more techniques as discussed above in relation to FIGS. 6A-6F). As illustrated in FIG. 6U, computer system 600 is emphasizing text portion 648 while reducing the visual prominence of the portions of live preview 630 that do not include text (e.g., the soccer ball) (e.g., using one or more techniques as discussed above in relation to FIGS. 6A-6F). In addition, because computer system 600 has detected text portion 648, computer system 600 places a box around text 648 to emphasize text 648. As illustrated in FIG. 6U, computer system 600 displays text management control 680 as active (e.g., as indicated by text management control 680 being bolded) and text management options 682 (e.g., as described above in relation to FIG. 6F). At FIG. 6U, computer system 600 detects a first portion of swipe input 650*u* on name column 648*a*, which travels from the "name" header of name column 648*a* to the "position" header of position column 648*b*.

As illustrated in FIG. 6V, in response to detecting the first portion of swipe input 650*u*, computer system 600 displays selection indicator 696 (e.g., "gray highlighting") around all of the words ("Name", "Maria", "Kate", "Sarah", and "Ashley") in name column 648*a* and the "position" header of position column 648*b*. Selection indicator 696 is positioned based on the location of swipe input 650*u*. Because the first portion of swipe input 650*u* computer system 600 end at the location of the "position" header of position column 648*b*, computer system 600 displays selection indicator 696 around all of the words up to (e.g., including the words of name column 648*a*) and including the "position" header. In some embodiments, computer system 600 does not include the "position" header of position column 648*b* because the first portion of swipe input 650*u* computer system 600 ends at the location of the "position" header of position column 648*b*. In some embodiments, where the end of the input ends at the location of the word "DEFENDER" in position column 648*b* (e.g., in the row 3 of position column 648*b*), computer system 600 highlights all the words up to the word "DEFENDER", including all the words of name column 648*a*, the "position" header of position column 648*b* (e.g., on row 1 of position column 648*b*), and the word "Forward" in row 2 of position column 648*b*.

The shape of selection indicator 696 is dependent upon whether the selected text (e.g., text that selection indicator 696 surrounds) is aligned with computer system 600. At FIG. 6V, computer system 600 displays selection indicator 696 as a polygon with angles that are right angles (e.g., a shape with all right angles referred to herein as a rectangle-based selection indicator). Selection indicator 696 is a rectangle-based selection indicator because a determination is made that the selected text (e.g., text that selection indicator 696) is aligned with computer system 600 (e.g., and/or aligned with the field-of-view of one or more cameras of computer system 600) (e.g., which is explained with additional details in relation to FIGS. 6X-6Z below). At FIG. 6V, computer system 600 detects a second portion of swipe input 650*u*, which is a rightward swipe input that travels from the "position" header of position column 648*b* to the "state" header of state column 648*c*.

As illustrated in FIG. 6W, in response to detecting the second portion of swipe input 650*u*, computer system 600 expands selection indicator 696 to the right, such that selection indicator 696 is displayed around the words (e.g., all of the words) in name column 648*a* and position column 648*b* and is also displayed around the "state" header of state column 648*c* (e.g., using one or more techniques as described above in relation to FIGS. 6U-6W) because the computer system recognized the words in name column 648*a* as being in a same column. As illustrated in FIG. 6W, selection indicator 696 continues to be a rectangle-based selection indicator because the text portion continues to be aligned with the field-of-view of the one or more cameras. At FIG. 6W, computer system 600 is no longer detecting input swipe input 650*u*. However, computer system 600 continues to display selection indicator 696 around a portion of the text.

FIGS. 6X-6Z illustrate an exemplary scenario where computer system 600 displays a selection indicator around selected text when computer system 600 is oriented (e.g., oriented with respect to a respective text portion differently than how computer system 600 of FIG. 6U-6V was oriented with to a respective text portion), such that the text in the environment is not aligned with the field-of-view of one or more cameras of computer system 600. FIG. 6X illustrates computer system 600 displaying live preview 630 that includes a representation of text portion 652 (e.g., a paragraph of text about soccer). Text portion 652 is on a piece of paper in the environment that is being captured by the field-of-view of one or more cameras of computer system 600. In some embodiments, computer system 600 displays a representation of previously captured media that includes the representation of text portion 648 and one or more techniques described below in relation to FIGS. 6U-6W are used to select words in text portion 648.

At FIG. 6X, text portion 652 is not aligned with the field-of-view of the one or more cameras. At FIG. 6X, computer system 600 is oriented in a position, such that computer system 600 is not parallel with text portion 652 and/or is rotated/tilted along an axis (z-axis) in the environment (e.g., a user is holding phone at an angle and/or titled, such that the field-of-view of the one or more cameras are not aligned with text portion 652). At FIG. 6X, computer system 600 detects swipe input 650*x* in a diagonal direction that travels from the word "while" in text portion 652 to the last period (".") in text portion 652.

As illustrated in FIG. 6Y, in response to detecting swipe input 650*x*, computer system 600 displays selection indicator 696 around a subset of text portion 652 from the word "while" in text portion 652 to the last period in text portion 652. As illustrated in FIG. 6Y, selection indicator 696 is a polygon with some angles that are not right angles (e.g., a shape with some acute and some obtuse angles referred to herein as a not-rectangle-based selection indicator). The not-rectangle-based selection indicator is drawn by the computer system to match or appear to match (or substantially match or appear to substantially match) an orientation of text portion 652 in live preview 630 (e.g., as though selection indicator 696 were a rectangle-based selection indicator on a surface that contains text portion 642 but viewed from the same perspective as the surface that contains text portion 642 is viewed in FIGS. 6X-6Z). As discussed above, selection indicator 696 of FIG. 6Y is not-rectangle-based because a determination is made that text portion 652 is not aligned with computer system 600 (e.g., as opposed to selection indicator 696 of FIGS. 6V-6U being a rectangle-based selection indicator (e.g., with respect to the orientation of the display of computer system 600). At FIG. 6Y, computer system 600 detects swipe input 650*y* that travels from the word "while" to the word "synthetic" in text portion 652. Notably, swipe input 650*y* is moving in a diagonal direction with respect to computer system 600 but is traveling along a row of words in text portion 652. In some embodiments, even though the edges of selection indicator 696 are displayed at a diagonal relative to edges of a display region of the computer system, some or all of the edges of selection indicator 696 are placed by the computer system at locations determined to be parallel or perpendicular to lines of text in text portion 652. In some embodiments, the angle of the edges of selection indicator 696 shift in the display region as an angle of the camera relative to the surface that contains text portion 642 changes so as to maintain the edges at locations determined to be parallel or perpendicular to lines of text in text portion 652.

As illustrated in FIG. 6Z, in response to detecting swipe input 650*y*, computer system 600 expands selection indicator 696 in the direction of swipe input 650*y*, such that selection indicator 696 surrounds a subset of text portion 652 from the word "synthetic" to the last period in text portion 652 (e.g., where while is included in the portion of text). Selection indicator 696 remains displayed as a non-rectangle-based selection indicator even though selection indicator 696 has been expanded. In addition, selection indicator 696 continues to be displayed around the portion of text after computer system 600 no longer detects swipe input 650*y*.

FIGS. 7A-7L illustrate exemplary user interfaces for managing visual indicators for visual content in media using a computer system in accordance with some embodiments. The user interfaces in these figures are used to illustrate the processes described below, including the processes in FIG. 9.

Figure 7B:
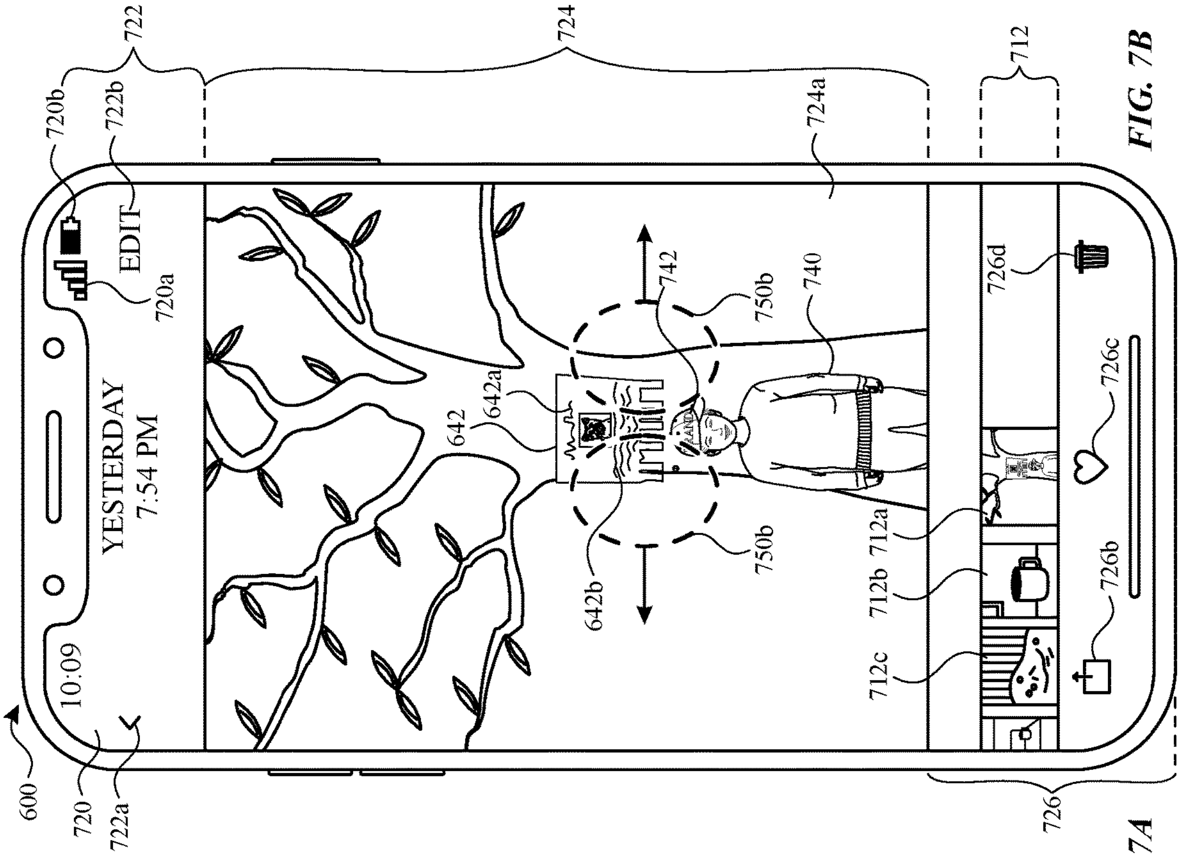
FIGS. 7A-7L illustrate exemplary user interfaces for managing visual indicators for visual content in media in accordance with some embodiments.
Figure 7A:
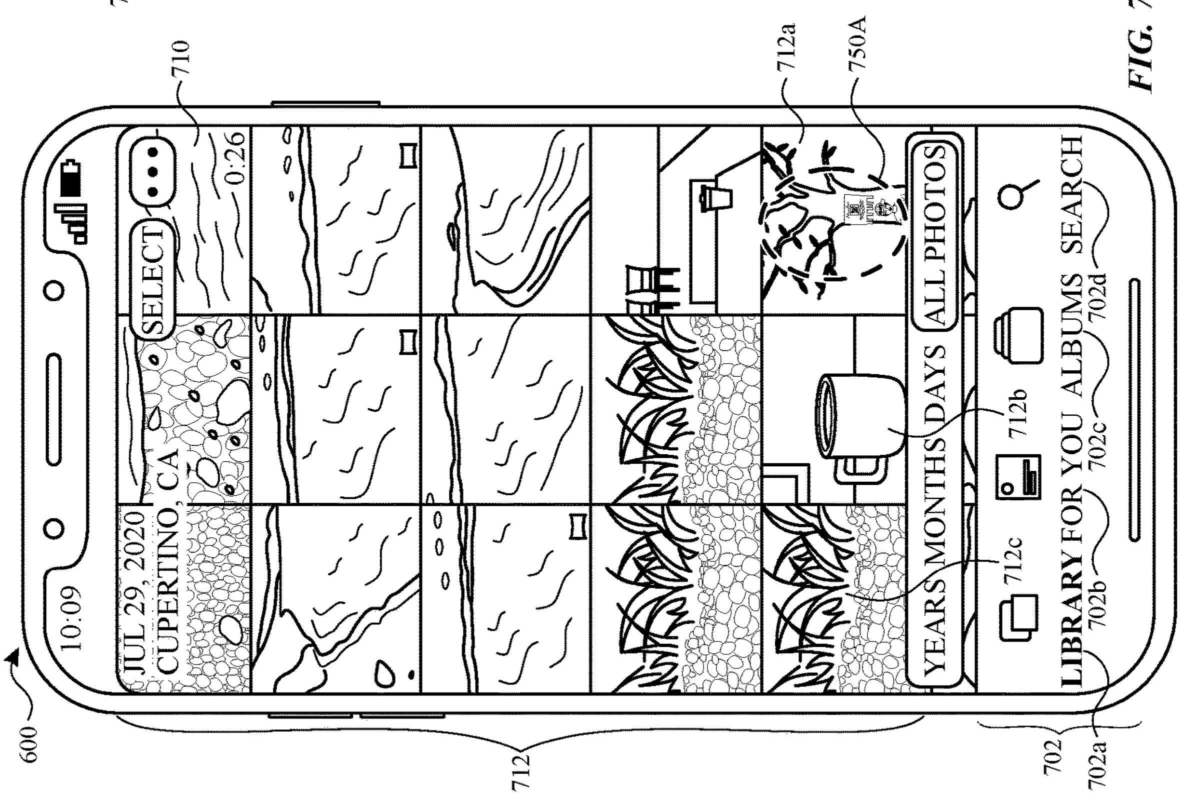

FIG. 7A illustrates computer system 600 concurrently displaying media gallery user interface 710 that includes thumbnail media representations 712 and gallery region 702. Thumbnail media representations 712 include thumbnail media representations 712*a*-712*c*, where each of thumbnail media representations 712*a*-712*c* is representative of a different media item (e.g., a media item that was captured at a different instance in time). Gallery region 702 includes a library control 702*a* (e.g., that, when selected, causes computer system 600 to display thumbnail media representations 712), a "for you" control 702*b* (e.g., that, when selected, causes computer system 600 to display dynamically generated thumbnail representations of media items based on user preferences, albums control 702*c* (e.g., that, when selected, causes computer system 600 to display thumbnail album representations that each represent a collection of media items), and search control 702*d* (e.g., that, when selected, causes computer system 600 to display a search user interface that includes one or more controls to search for a media item). In FIG. 7A, library control 702*a* has been selected (e.g., as indicated by the library control 702*a* being bolded). At FIG. 7A, computer system 600 detects tap input 750*a* on thumbnail media representation 712*a*.

As illustrated in FIG. 7B, in response to detecting tap input 750*a*, computer system 600 displays media viewer user interface 720 and ceases to display media gallery user interface 710. Media viewer user interface 720 includes media viewer region 724 positioned between application control region 722 and application control region 726. Media viewer region 724 includes enlarged representation 724*a*, which is representative of the same media item as thumbnail media representation 712*a*. Media viewer user interface 720 is not substantially overlaid with controls, while application control region 722 and application control region 726 are substantially overlaid with controls.

Enlarged representation 724*a* includes sign 642 that includes text portion 642*a* (e.g., "LOST DOG") and text portion 642*b* (e.g., paragraph of text that starts with "LOVEABLE"), as described above in relation to FIG. 6B. The text of text portions 642*a*-642*b* are not visually prominent, and the text of text portions 642*a*-642*b* are small and cannot be easily read by a user looking at computer system 600. Further, enlarged representation 724*a* includes person 740 standing in front of a tree. Person 740 is wearing a hat that contains the word "BRAND" (e.g., text portion 742).

Application control region 722 optionally includes an indicator of a time (e.g., "7:54" in FIG. 7B) that the currently displayed enlarged representation of media was taken (e.g., enlarged representation 724*a*), a cellular signal status indicator 720*a* that shows the state of a cellular signal, and battery level status indicator 720*b* that shows the state of the remaining battery life of computer system 600. Application control region 722 also includes a back control 722*a* (e.g., that, when selected, causes computer system 600 to redisplay media gallery user interface 710) and an edit control 722*b* (e.g., that, when selected, causes computer system 600 to display a media editing user interface that includes one or more controls for editing a representation of the media item represented by the currently displayed enlarged representation 724*a*).

Application control region 726 includes some of thumbnail media representations 712 (e.g., 712*a*-712*c*) that are displayed in a single row. Because enlarged representation 724*a* is displayed in media viewer region 724, thumbnail media representation 712*a* is displayed as being selected. In particular, thumbnail media representation 712*a* is displayed as being selected in FIG. 7B by being displayed as having space from the other thumbnails (e.g., 712*b* and 712*c*). In addition, application control region 726 includes send control 726*b* (e.g., that, when selected, causes computer system 600 to initiate a process for transmitting a media item represented by the enlarged media representation), favorites control 726*c* (e.g., that, when selected, causes computer system 600 to mark/unmark the media item represented by enlarged representation 724*a* as a favorite media), and trash control 726*d* (e.g., that, when selected, causes computer system 600 to delete (or initiate a process for deleting) the media item represented by enlarged representation 724*a*). At FIG. 7B, computer system 600 detects de-pinch input 750*b* on (e.g., at and/or directed to a location on the display of computer system 600 that corresponds to) media viewer region 724.

Figure 7D:
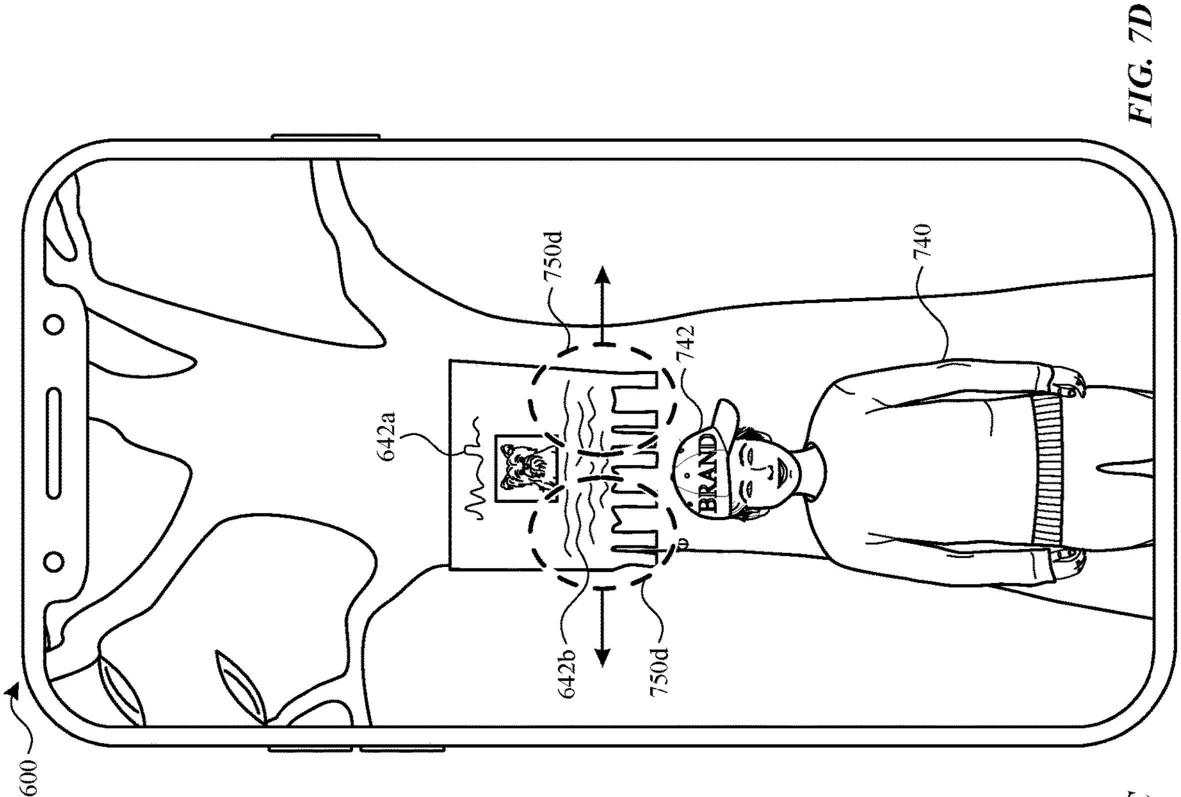
Figure 7C:
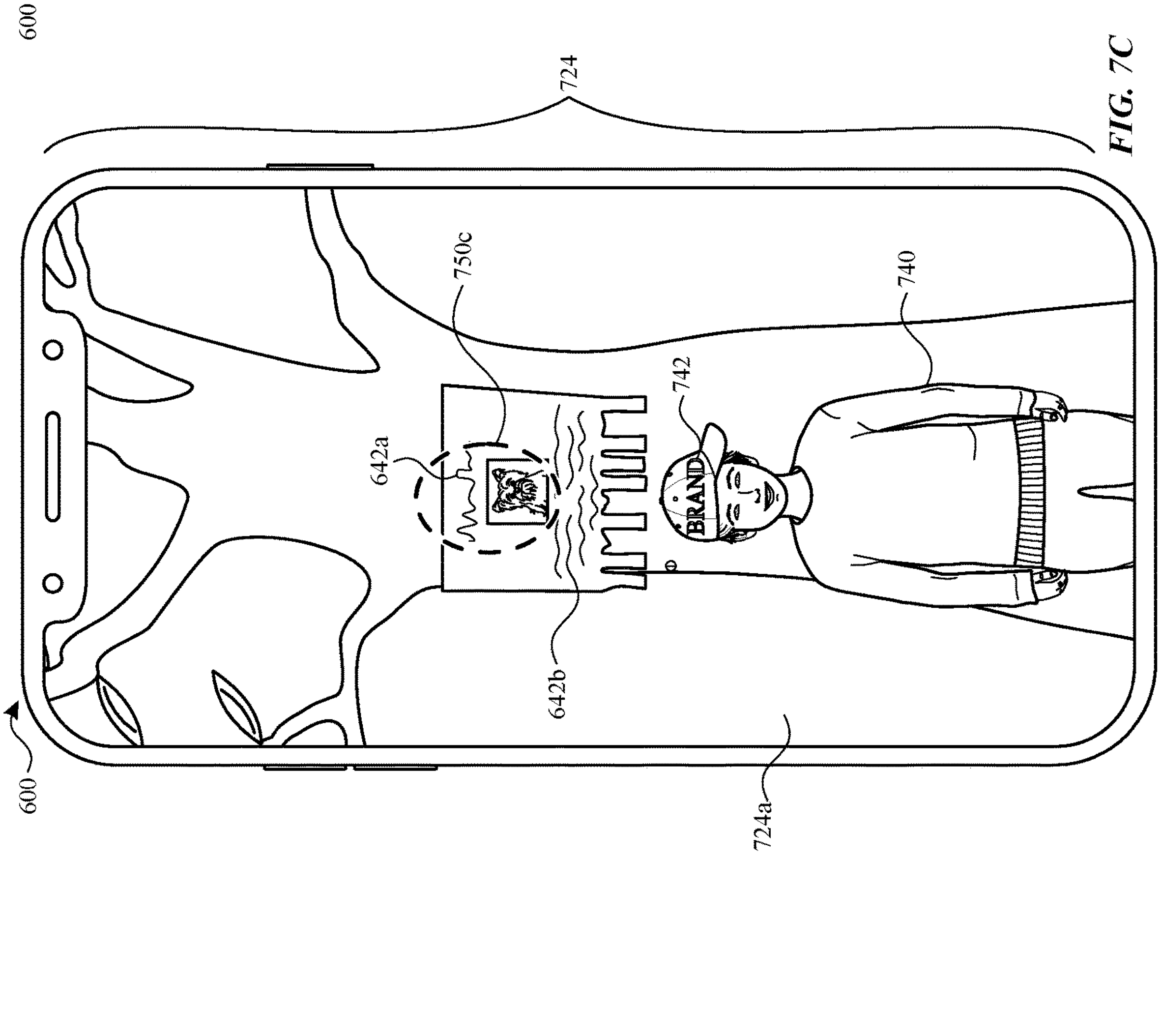

As illustrated in FIG. 7C, in response to detecting de-pinch input 750*b*, computer system 600 updates enlarged representation 724*a* to reflect a change in zoom level, such that the display of enlarged representation 724*a* of FIG. 7C is displayed at a greater zoom level than the display of enlarged representation 724*a* of FIG. 7B. At the increased zoom level, text portions 642*a*-642*b* of FIG. 7C are bigger and more visually prominent (e.g., bigger, more readable) than text portions 642*a*-642*b* of FIG. 7B. In addition to updating enlarged representation 724*a*, computer system 600 also expands media viewer region 724 of FIG. 7B, such that enlarged representation 724*a* of FIG. 7B occupies the portion of the display that application control regions 722 and 726 previously occupied in FIG. 7A.

At FIG. 7C, a determination is made that the text of text portion 642*a* and the text of text portion 642*b* in FIG. 7C do not individually satisfy the set of prominence criteria (e.g., using one or more similar techniques as described above in relation to FIGS. 6A-6C). Accordingly, the computer system 600 does not display a bracket that corresponds to (e.g., surrounds) text portions 642*a*-642*b* in FIG. 7B. Further, because the text of text portions 642*a*-642*b* do not satisfy the set of prominence criteria, computer system 600 does not display text management control 680 (e.g., as described above in relation to FIG. 6B).

In some embodiments, the set of prominence criteria include a criterion that is satisfied when a determination is made that one or more of text portions 642*a*-642*b* include text that occupy a predetermined amount of space (e.g., 10%-100%) of the enlarged representation 724*a*. In some embodiments, the set of prominence criteria include a criterion that is satisfied when a determination is made that one or more of portions 642*a*-642*b* include text that is positioned in or close to a predetermined location (e.g., central location) of the enlarged representation 724*a*. In some embodiments, the set of prominence criteria include a criterion that is satisfied when a determination is made that one or more of text portions 642*a*-642*b* include text of a certain type of text (e.g., an e-mail, phone number, address, QR code, etc.) (e.g., as described above in relation to FIGS. 6M-6T). In some embodiments, the set of prominence criteria include a criterion that is satisfied when a determination is made that one or more of text portions 642*a*-642*b* include text that is relevant to the context of the enlarged representation 724*a* (e.g., the text satisfies a relevancy threshold (e.g., computer system 600 determines that the text is 90%, 95%, 99% relevant)).

At FIG. 7C, a determination is made that the principal subject matter of enlarged representation 724*a* is sign 642. That is, the context of enlarged representation 724*a* is the content that is displayed within sign 642. At FIG. 7C, a further determination is made that text portion 742 (e.g., "BRAND") is not relevant because it appears on the hat of person 740 and, thus, is not relevant to the context of what is displayed in enlarged representation 724*a*. In some embodiments, computer system 600 determines that text portion 742 is not relevant to the context of what is displayed in enlarged representation 724*a* because text portion 742 is displayed on a person or something on a person in enlarged representation 724*a*.

Because the determination was made that text portion 742 is not relevant, a determination is made that text portion 742 does not satisfy the set of prominence criteria. Notably, the determination is made that text portion 742 does not satisfy the set of prominence criteria even though text portion 742 has larger text than text portion 642*a*-642*b*. As illustrated in FIG. 7C, computer system 600 does not display one or more brackets around text portion 742 ("BRAND) because text portion 742 does not satisfy the set of prominence criteria (e.g., due to the determination being made that text portion 742 is not relevant to the context of enlarged representation 724*a*). At FIG. 7C, computer system 600 detects tap input 750*c* on text portion 742.

As illustrated in FIG. 7D, in response to detecting tap input 750*c*, computer system 600 maintains the display of enlarged representation 724*a* as depicted in FIG. 7C. At FIG. 7D, computer system 600 does not update the display of enlarged representation 724*a* to indicate that text portion 742 is selected because a determination was made that text portion 742 does not satisfy the set of prominence criteria (e.g., as discussed above in relation to FIG. 7C). In addition, computer system 600 does not update the display of enlarged representation 724*a* to indicate that text portion 742 is selected because a text management control is not displayed and selected (e.g., as opposed to computer system 600 updating the representation of media in FIGS. 6J-6L as described above). In addition, because computer system 600 does not update the display of enlarged representation 724*a* at FIG. 7D, text portions 642*a*-642*b* continue to not satisfy the set of prominence criteria. Accordingly, as illustrated in FIG. 7D, computer system 600 does not display brackets that correspond to either text portion 642*a* or 642*b*. At FIG. 7D, computer system 600 detects de-pinch 750*d* input in media viewer region 724. In some embodiments, in lieu of de-pinch input 750*d*, computer system 600 detects a directional swipe that corresponds to a request to pan (e.g., translate) enlarged representation 724*a* shown in FIG. 7D.

Figure 7F:
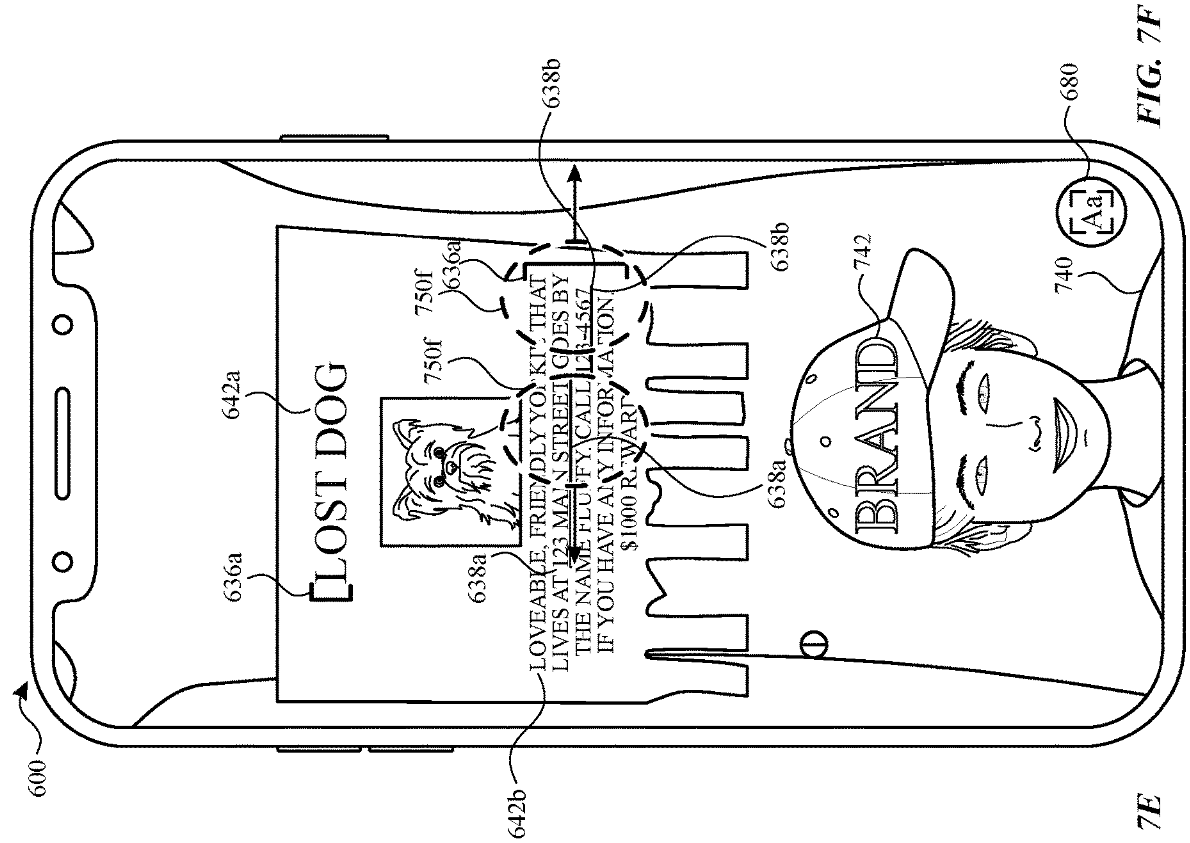
Figure 7E:
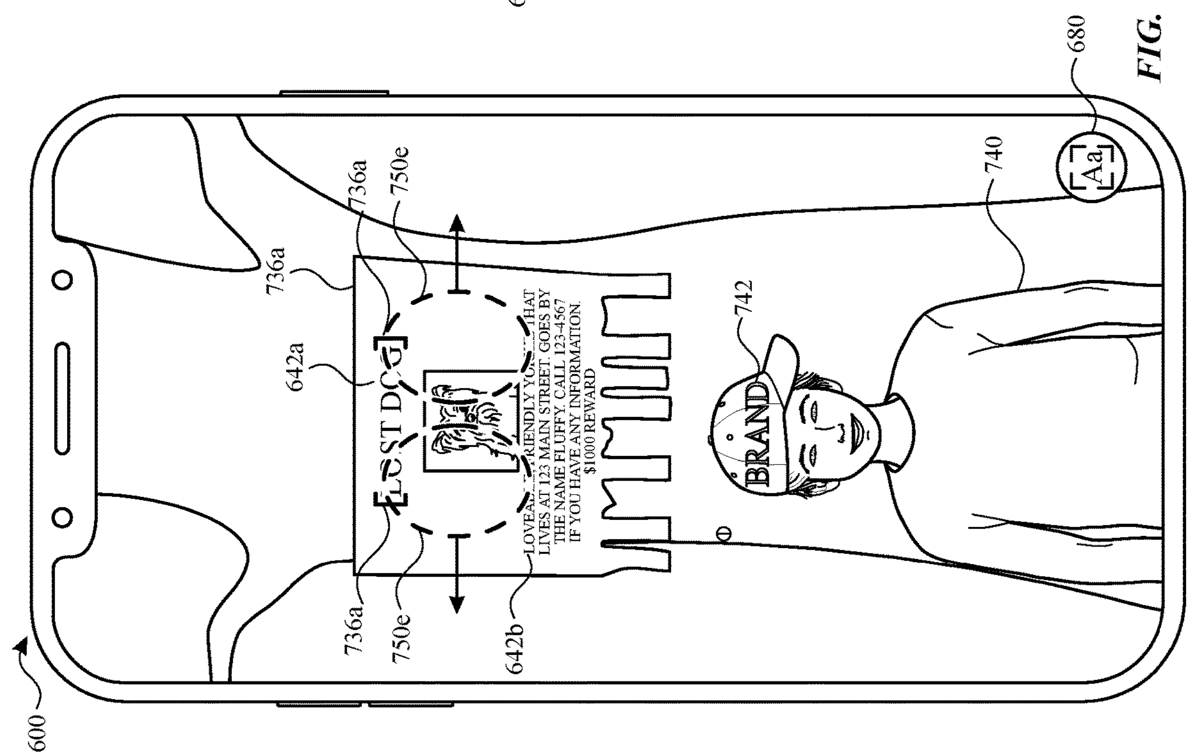

As illustrated in FIG. 7E, in response to detecting de-pinch input 750*d*, computer system 600 updates enlarged representation 724*a* to reflect a change in zoom level, such that the display of enlarged representation 724*a* of FIG. 7E is displayed at a greater zoom level than the display of enlarged representation 724*a* of FIG. 7D. At FIG. 7E, a determination is made that text of text portion 642*a* satisfies the set of prominence criteria but text of text portion 642*b* does not satisfy the set of prominence criteria. As a result, computer system 600 displays bracket 736*a* at a location (e.g., surrounding text portion 642*a*) that corresponds to the location of text portion 642*a*. However, computer system 600 does not display bracket 736*a*, or any other bracket, at a location that corresponds to the location of text portion 642*b* (e.g., because text of text portion 642*b* does not satisfy the set of prominence criteria). Notably, the determination is made that text portion 742 (e.g., "BRAND") continues to not satisfy the set of prominence criteria (e.g., due to text portion 742 not being relevant), even though text portion 742 has larger text than text portions 642*a*-642*b*. In some embodiments, when computer system 600 detects a directional swipe in lieu of de-pinch input 750*d*, computer system 600 pans enlarged representation 724*a*, such that a different portion of enlarged representation 724*a* is displayed in response to receiving de-pinch input 750*d*.

As illustrated in FIG. 7E, because a determination was made that text of text portion 642*a* satisfies the set of prominence criteria, computer system 600 displays text management control 680. Text management control 680 is displayed in an inactive state (e.g., as indicated by text management control 680 not being bolded) because text management control 680 has not been selected (e.g., an input directed to text management control has not been detected). At FIG. 7E, computer system 600 detects de-pinch input 750*e* in media viewer region 724.

As illustrated in FIG. 7F, in response to detecting de-pinch input 750*e*, computer system 600 updates display of enlarged representation 724*a* to reflect a change in zoom level, such that the display of enlarged representation 724*a* of FIG. 7F is displayed at a greater zoom level than the display of enlarged representation 724*a* of FIG. 7E. At FIG. 7F, a determination was made that text of text portion 642*a* satisfies the set of prominence criteria and text of text portion 642*b* satisfies the set of prominence criteria. Accordingly, bracket 636*a*, as described above in relation to FIG. 6C, is displayed around the entirety of both text portions 642*a*-642*b*. Notably, at FIG. 7F, the determination is made that text portion 742 (e.g., "BRAND") continues to not satisfy the set of prominence criteria (e.g., due to text portion 742 not being relevant), even though text portion 742 has larger text than text portions 642*a*-642*b*. As illustrated in FIG. 7F, computer system 600 displays text-type indication 638*a* is displayed underneath "123 MAIN STREET" to show that an address has been detected and displays text-type indication 638*b* underneath "123-4567" to show that a phone number has been detected (e.g., using one or more techniques as described above in relation to FIG. 6C). In some embodiments, computer system 600 displays multiple brackets, one bracket around text portion 642*a* and another bracket around text portion 642*b*, and/or other combination of brackets (e.g., using one or more techniques as described above in relation to FIGS. 6A-6M). In some embodiments (e.g., looking back at FIG. 7E), computer system 600 displays text-type indicators underneath a text portion, irrespective of whether the text portion in which the text-type indicators belong to satisfies the set of prominence criteria. At FIG. 7F, computer system 600 detects de-pinch input 750*f* in media viewer region 724.

Figure 7H:
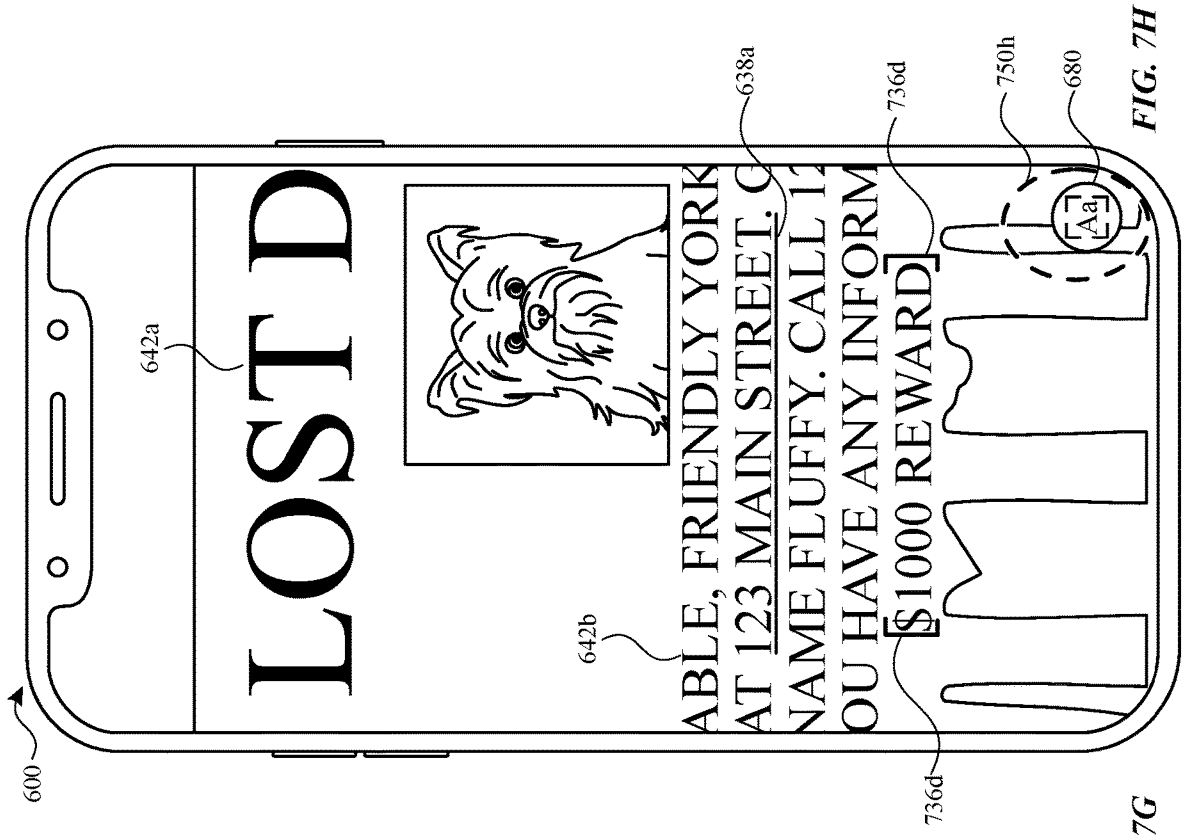
Figure 7G:
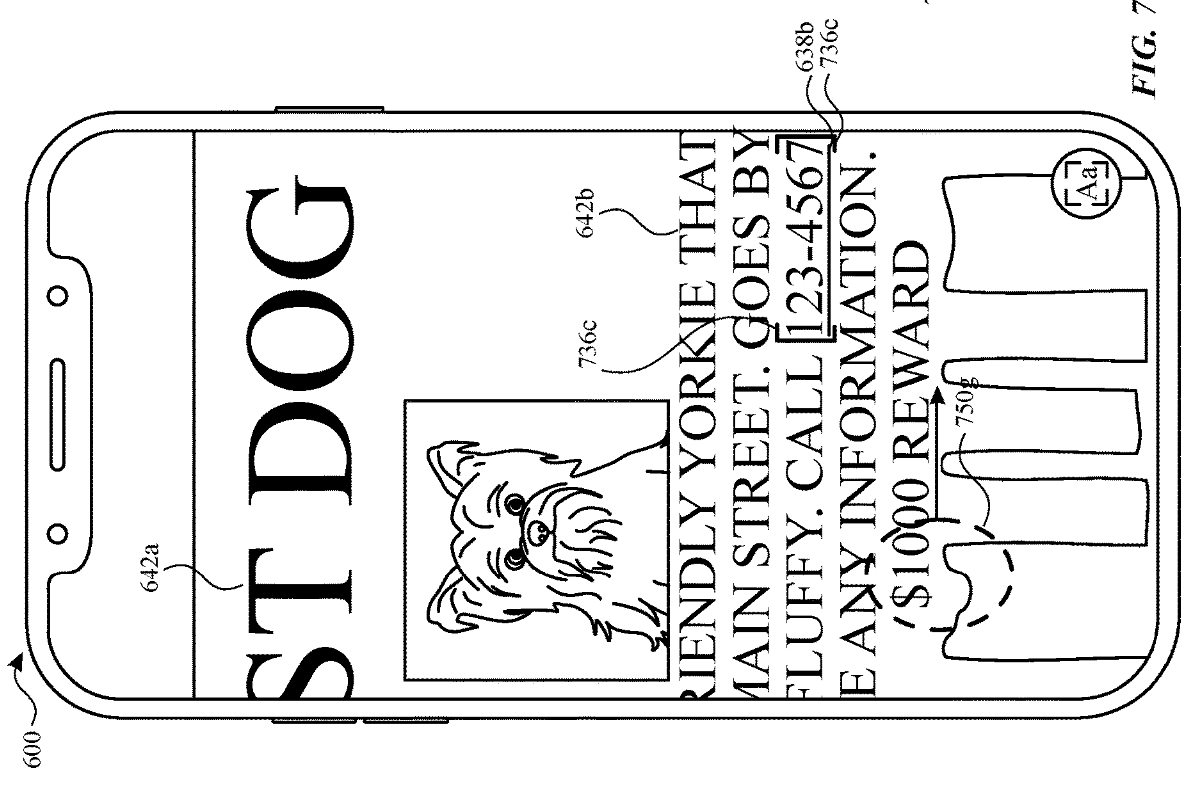

As illustrated in FIG. 7G, in response to detecting de-pinch input 750*f*, computer system 600 updates enlarged representation 724*a* to reflect a change in zoom level, such that the display of enlarged representation 724*a* of FIG. 7G is displayed at a greater zoom level than the display of enlarged representation 724*a* of FIG. 7F. In some embodiments, the input to display enlarged representation 724*a*, a shown in FIG. 7G, corresponds to a directional swipe input.

As illustrated in FIG. 7G, enlarged representation 724*a* includes a subset of text portion 642*a* and a subset of text portion 642*b*. As a result of a determination that the entirety of text portions 642*a*-642*b* no longer satisfies the set of prominence criteria (e.g., and/or enlarged representation 724*a* only including a subset of text portion 642*a* and text portion 642*b*), computer system 600 ceases displaying bracket 636*a* around the entirety of text portion 642*a* and text portion 642*b*. In FIG. 7G, a determination is made that a subset of the text (e.g., the phone number "123-4567") of text portion 642*b* satisfies the set of prominence criteria (e.g., while another subset of the text of text portion 642*b* does not satisfy the criteria). In some embodiments, the determination is made that the subset of text portion 642*b* satisfies the set of prominence criteria because a determination is made that a user intends to interact with or view the phone number based on the inputs previously detected by computer system 600 (e.g., computer system 600 has continued to zoom in near the phone number when looking at FIGS. 7A-7G).

In some embodiments, a determination is made that FIG. 7G includes a subset of text portion 642*a* (e.g., "DOG") satisfies the set of prominence criteria. In response to the determination, computer system 600 displays a set of brackets around the subset of text portion 642*a* concurrently with bracket 736*c*.

As illustrated in FIG. 7G, computer system 600 only displays a portion of the address "123 MAIN STREET". Consequentially, computer system 600 ceases the display of text-type indication 638*a*. In some embodiments, computer system 600 maintains display of text-type indication 638*a* underneath the portion of the address "123 MAIN STREET" that is displayed at FIG. 7G. In some embodiments, computer system 600 determines that the portion of the address does not meet the set of prominence criteria because the other portion of the address is not displayed. At FIG. 7G, computer system 600 detects rightward swipe 750*g* in media viewer region 724.

As illustrated in FIG. 7H, in response to detecting rightward swipe 750*g*, computer system 600 pans enlarged representation 724*a* in a rightward direction. Enlarged representation 724*a* is panned, such that the rightmost portion of text portions 642*a*-642*b* illustrated in FIG. 7G cease to be displayed by computer system 600 and a leftmost portion of text portions 642*a*-642*b* are re-displayed by computer system 600 in FIG. 7H. As illustrated in FIG. 7H, computer system 600 does not display the entirety of the telephone number (e.g., 123-4567) and ceases display of bracket 736*c* and text-type indication 638*b*. In some embodiments, a portion of text-type indication 638*b* remains displayed underneath the portion of the telephone number (e.g., "12") that continues to be displayed in FIG. 7H. At FIG. 7H, computer system 600 displays more of the address (e.g., 123 MAIN STREET) in FIG. 7H and re-displays text-type indication 638*a* underneath "123 MAIN STREET" to indicate to a user that an address is detected.

At FIG. 7H, a determination is made that another subset of text portion 642*b* (e.g., "$1000 REWARD") satisfies the set of prominence criteria (e.g., without any other subset of text portion 642*b* satisfying the set of prominence criteria). Because a determination is made that the other subset of text portion 642*b* satisfies the set of prominence criteria, computer system 600 displays bracket 736*d* around the other subset of text portion 642*b* "$1000 REWARD." In some embodiments, the determination is made that the other subset of text portion 642*b* (e.g., "1000 REWARD") is the most relevant text displayed based on the context of the displayed content of enlarged representation 724*a*. In some embodiments, a determination is made that FIG. 7H includes a subset of text portion 642*a* (e.g., "LOST") satisfies the set of prominence criteria. In some embodiments, in response to this determination, computer system 600 displays a respective set of brackets around the subset of text portion 642*a* concurrently with bracket 736*e*. At FIG. 7H, computer system 600 detects tap input 750*h* on text management control 680.

Figure 7J:
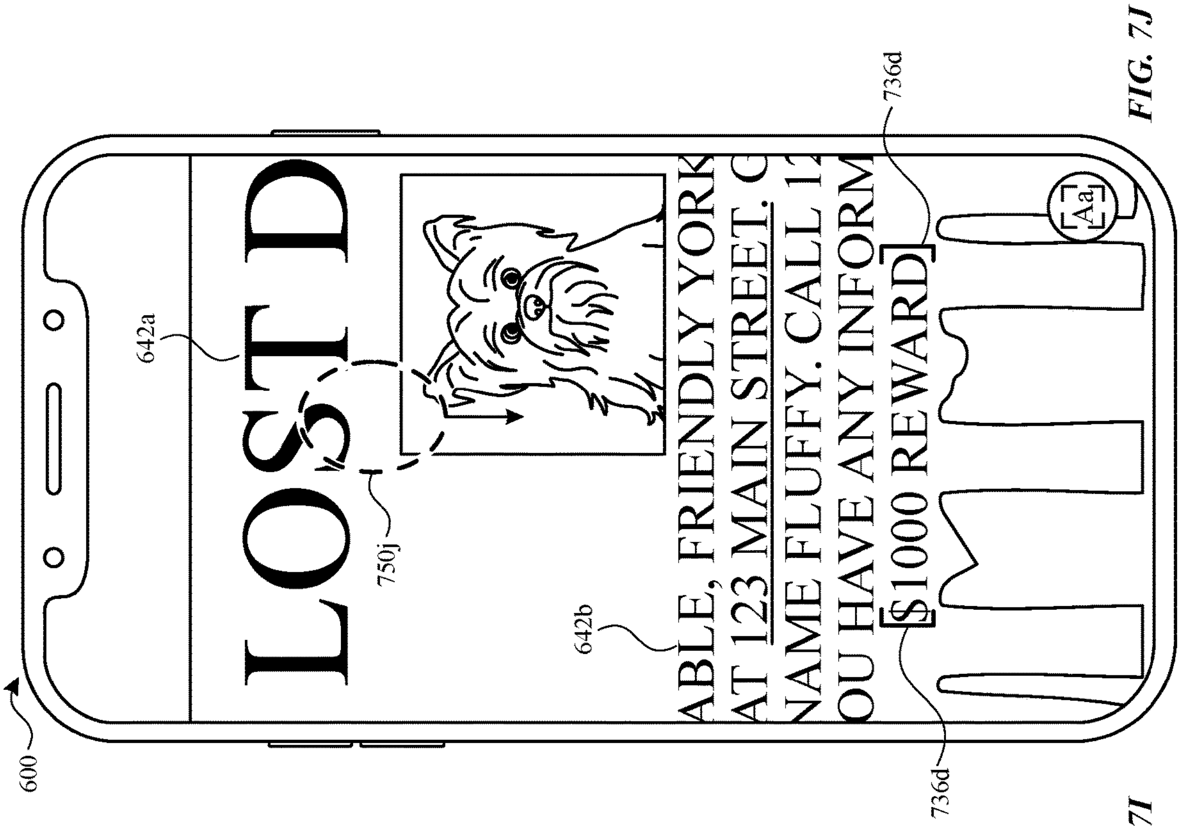
Figure 7I:
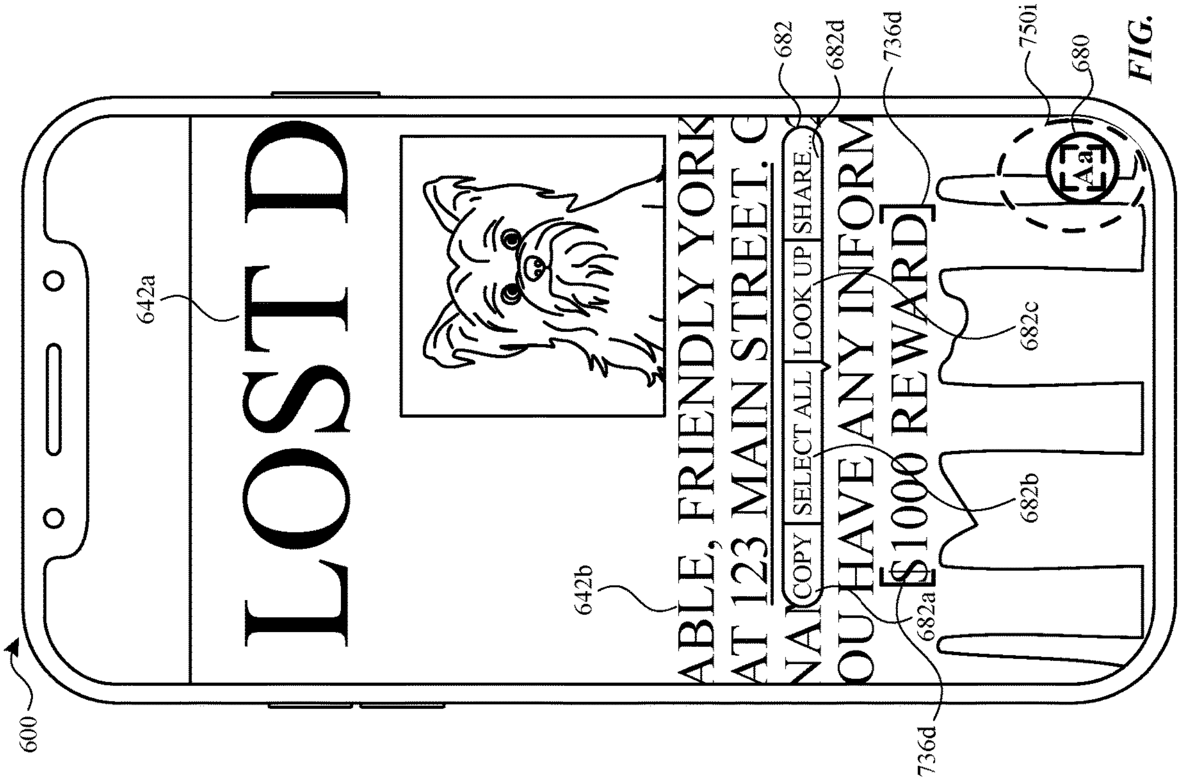

As illustrated in FIG. 7I, in response to detecting tap input 750*h*, computer system 600 displays text management options 682, which includes copy option 682*a* (e.g., that, when selected, computer system 600 copies text surrounded by bracket 736*d*), select-all option 682*b* (e.g., that, when selected, computer system 600 selects all the text surrounded by bracket 736*d*), look-up option 682*c* (e.g., that, when selected, computer system looks up, via a search (e.g., a web search, a dictionary search) the text surrounded by bracket 736*d*), and share option 682*d* (e.g., that, when selected, computer system 600 initiates a process to share the text surrounded by bracket 736*d*). In some embodiments, the various components of text management options 682 function as described above in relation to FIGS. 6A-6M. In some embodiments, computer system 600 displays multiple text management options, where each respective text management option corresponds to a respective portion of text that is surrounded by a respective pair of brackets. In some embodiments, selection of a respective text management option allows the user to manage the portion of text that corresponds to the respective text management option.

As illustrated in FIG. 7I, computer system 600 displays text management control 680 as activated (e.g., as indicated by text management control 680 being bolded). At FIG. 7I, computer system 600 detects tap input 750*i* on text management control 680.

As illustrated in FIG. 7J, in response to detecting tap input 750*i*, computer system 600 re-displays enlarged representation 724*a*, using one or more techniques as described above in relation to FIG. 7H. At FIG. 7J, computer system 600 detects downward swipe input 750*j* in media viewer region 724.

Figure 7L:
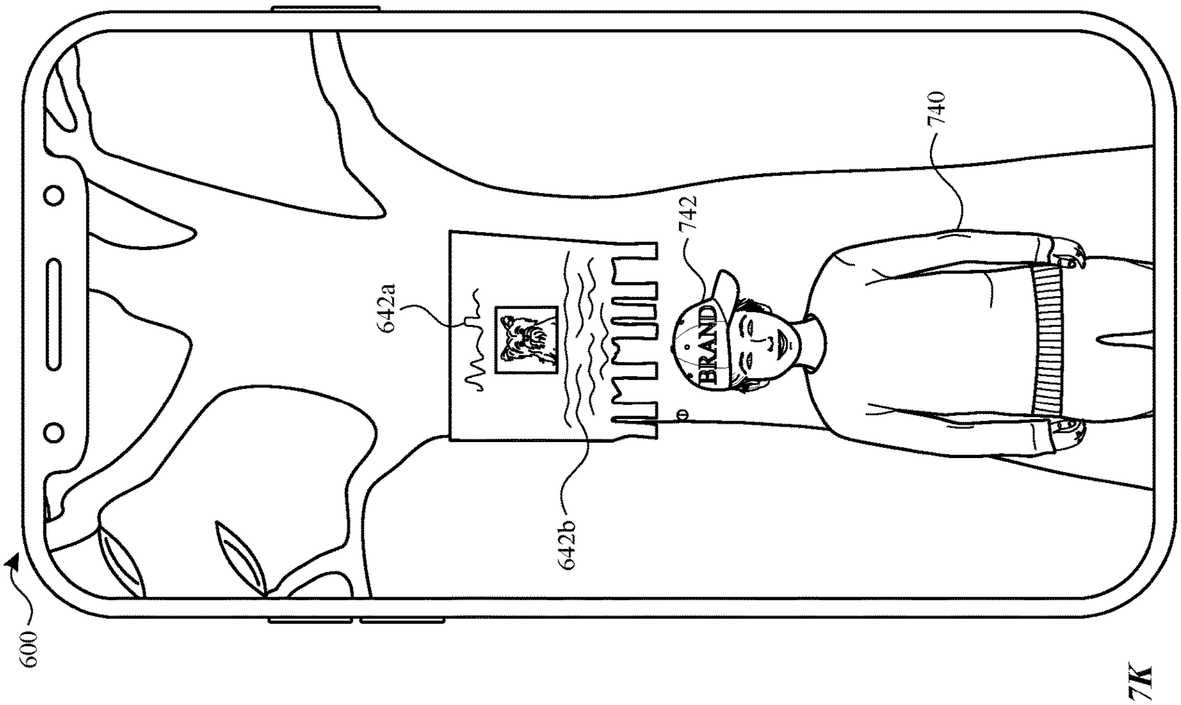
Figure 7K:
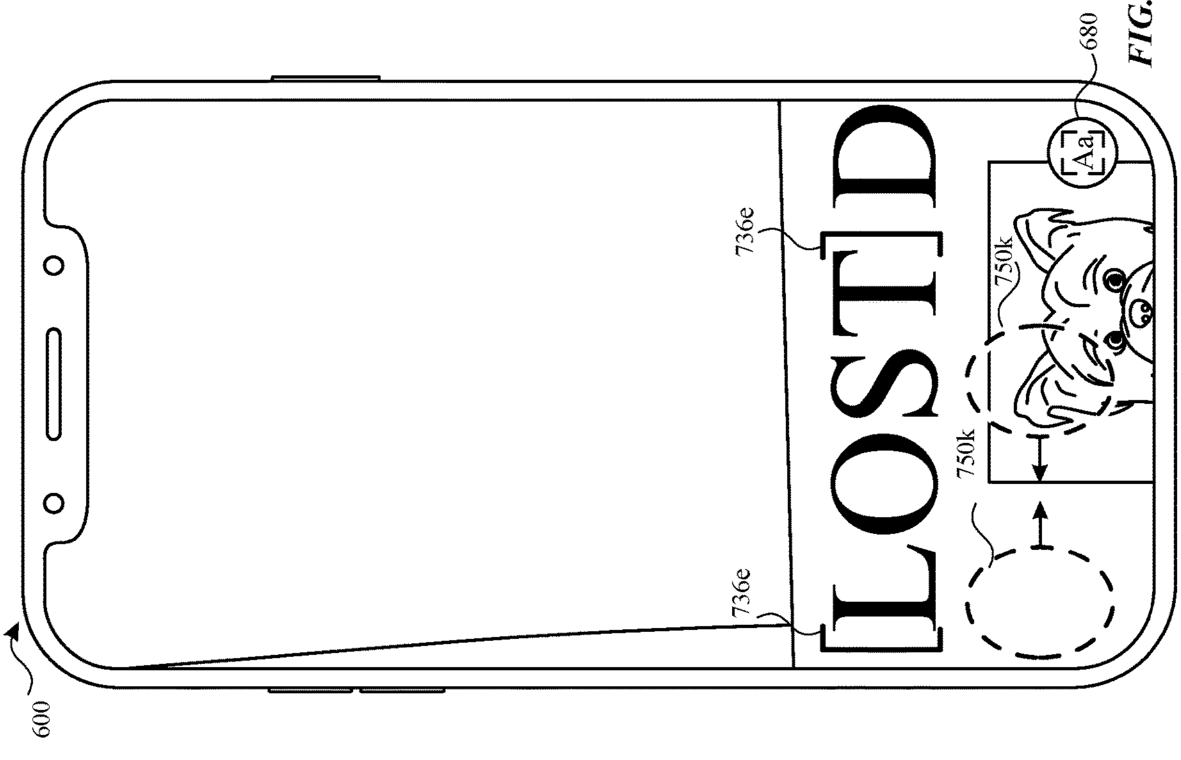

As illustrated in FIG. 7K, in response to detecting downward swipe input 750*j*, computer system 600 pans media viewer region 724 downward (e.g., based on the swipe input) such that text portion 642*b* ceases to be displayed and computer system only displays a subset of text portion 642*a*. At FIG. 7K, a determination is made that a subset of text portion 642*a* (e.g., "LOST") satisfies the set of prominence criteria. Because the subset of text portion 642*a* does satisfy the set of prominence criteria, computer system 600 displays bracket 736*e* surrounding the subset of text portion 642*a*.

At FIG. 7K, computer system 600 does not display bracket 736*d* because text portion 642*b* is not displayed as part of enlarged representation 724*a* at FIG. 7K. At FIG. 7K, computer system 600 detects pinch input 750*k* in media viewer region 724.

As illustrated in FIG. 7L, in response to detecting pinch input 750*k*, computer system 600 updates enlarged representation 724*a* to reflect a change in zoom level (e.g., a decrease in the zoom level), such that the display of enlarged representation 724*a* of FIG. 7L is displayed at a decreased zoom level in comparison to the zoom level of the display of enlarged representation 724*a* of FIG. 7K. At FIG. 7L, a determination is made that text portion 642*a* and text portion 642*b* do not satisfy the set of prominence criteria. Accordingly (e.g., because determination is made that text portion 642*a* and text portion 642*b* do not satisfy the set of prominence criteria), computer system 600 does not display (and/or ceases to display) text management control 680 and/or any brackets surrounding text portions 642*a*-642*b*.

While the techniques discussed above in relation to FIGS. 7A-7L were discussed in the context of computer system 600 displaying a representation of previously captured media and a media viewer user interface, one or more techniques as discussed above in relation to FIGS. 6A-6Z can also be applied while computer system 600 is displaying previously captured media and a media viewer user interface. In addition, the techniques discussed above in relation to FIGS. 7A-7L can also be applied in the context of computer system 600 displaying a live preview (e.g., a representation of the field-of-view of one or more cameras, before media has been captured), such as live preview 630 of FIGS. 6A-6M, and a camera user interface.

While the techniques discussed above in relation to FIGS. 6A-6Z were discussed in the context of computer system 600 displaying a live preview and a camera user interface, one or more techniques as discussed above in relation to FIGS. 7A-7L can also be applied while computer system 600 is displaying a live preview and a camera user interface. In addition, the techniques discussed in relation to FIGS. 6A-6Z can also be applied in the context of computer system 600 displaying previously captured media, such as enlarged representation of media 724*a* and a media viewer user interface.

FIG. 8 is a flow diagram illustrating a method for managing visual content in media using a computer system in accordance with some embodiments. Method 800 is performed at a computer system (e.g., 100, 300, 500) that is in communication with a display generation component. Some operations in method 800 are, optionally, combined, the orders of some operations are, optionally, changed, and some operations are, optionally, omitted.

As described below, method 800 provides an intuitive way for managing visual content in media. The method reduces the cognitive burden on a user for managing visual content in media, thereby creating a more efficient human-machine interface. For battery-operated computing devices, enabling a user to manage visual content in media faster and more efficiently conserves power and increases the time between battery charges.

Method 800 is performed at a computer system (e.g., 600) (e.g., a smartphone, a desktop computer, a laptop, a tablet) that is in communication with a display generation component (e.g., a display controller, a touch-sensitive display system. In some embodiments, the computer system is in communication with one or more input devices (e.g., a touch-sensitive surface) and/or a first camera of one or more cameras (e.g., one or more cameras (e.g., dual cameras, triple camera, quad cameras, etc.) on the same side or different sides of the computer system (e.g., a front camera, a back camera))).

The computer system displays (802), via the display generation component, a camera user interface (e.g., a media capture user interface, a media viewing user interface a media editing user interface) that includes concurrently displaying a representation (e.g., 630) of media (e.g., photo media, video media) (e.g., live media, a live preview (e.g., media corresponding a representation of a field-of-view (e.g., a current field-of-view) of the one or more cameras that has not been captured (e.g., in response to detecting a request to capture media (e.g., detecting selection of a shutter affordance)), previously captured media (e.g., media corresponding a representation of a field-of-view (e.g., a previous field-of-view) of the one or more cameras that has been captured, a media item that has been saved and is able to be accessed by a user at a later time, a representation of media that was displayed in response to receiving a gesture on a thumbnail representation of media (e.g., in a media gallery)) and a media capture affordance (e.g., 610) (e.g., user interface object).

While (804) concurrently displaying the representation (e.g., 630) of media and the media capture affordance (e.g., 610) (e.g., user interface object), in accordance with a determination that a respective set of criteria is satisfied, where the respective set of criteria includes a criterion that is satisfied when respective text (e.g., 642*a*, 642*b*) (e.g., one or more characters represented in the media) is detected in the representation (e.g., 630) of media, the computer system displays (806) (e.g., concurrently with the representation of media) (e.g., in the user interface), via the display generation component, a first user interface object (e.g., 680) corresponding to one or more text management operations (e.g., concurrently with the representation of media and/or the first user interface object). In some embodiments, the plurality of options (e.g., 672, 682, 692) includes one or more options to copy the respective text (e.g., 682*a*), select the respective text (e.g., 682*b*), look-up the respective text (e.g., 682*c*), share the respective text (e.g., 682*d*), and translate the respective text.

While (804) concurrently displaying the representation (e.g., 630) of media and the media capture affordance (e.g., 610) (e.g., user interface object), in accordance with a determination that a respective set of criteria is not satisfied, the computer system forgoes displaying (808) the first user interface object.

While displaying the representation (e.g., 630) of media (e.g., while concurrently displaying the representation of media and the media capture affordance and the first user interface object), the computer system detects (810) a first input (e.g., 650*a*, 650*e*, 650*g*, 650*u*) (e.g., a mouse/trackpad click/activation, a keyboard input, a scroll wheel input, a hover gesture, a tap gesture, a swipe gesture) directed to the camera user interface (e.g., 602, 604, 606). In some embodiments, the first input is a non-tap gesture (e.g., a rotational gesture and/or a press-and-hold gesture).

In response to (812) detecting the first input (650*a*, 650*e*, 650*g*, 650*u*) (e.g., a first gesture) directed to the camera user interface and in accordance with a determination that the first input (e.g., 650*a*) corresponds to selection of the media capture affordance (e.g., 610) (e.g., a gesture directed to the media capture affordance, a gesture at a location corresponds to the media capture affordance), the computer system initiates (814) capture of media to be added to a media library (e.g., 612) associated with the computer system (e.g., 600) (e.g., without displaying an option to manage the respective text).

In response to (812) detecting the first input (650*a*, 650*e*, 650*g*, 650*u*) (e.g., a first gesture) directed to the camera user interface and in accordance with a determination that the first input (e.g., 650*e*, 650*g*, 650*u*) corresponds to selection of the first user interface object (e.g., 680), the computer system displays (816), via the display generation component, a plurality of options to manage the respective text (e.g., 672, 682, 692) (e.g., without initiating the capture of media to be added to the media library (e.g., as indicated by 624) associated with the computer system (e.g., 600)). In some embodiments, the plurality of options are displayed adjacent to the respective text (e.g., that is included in the representation of media. In some embodiments, the plurality of options (e.g., 672, 682, 692) includes one or more options to copy the respective text (e.g., 682*a*), select the respective text (e.g., 682*b*), look-up the respective text (e.g., 682*c*), share the respective text (e.g., 682*d*), and translate the respective text (e.g., as described above in relation to FIG. 6F). In some embodiments, in accordance with the determination that the first input (e.g., 650*e*, 650*g*, 650*u*) corresponds to selection of the first user interface object (e.g., 680), the first user interface object is in an active state (e.g., transitioned from being displayed in an inactive state to an active state (e.g., as described above in relation to FIG. 6F), where the first user interface object displayed in the active state (e.g., 680 in FIG. 6F) (e.g., bolded, a pressed state/appearance) has a different appearance from when the first user interface object is displayed in the inactive state (e.g., 680 in FIG. 6G) (e.g., not bolded, a de-pressed state/appearance)). In some embodiments, in accordance with the determination that the first input (e.g., 650*a*) corresponds to selection of the media capture affordance (e.g., 610), the first user interface object (e.g., 680) is in an inactive state (e.g., transitioned from being displayed in an inactive state to an active state). In some embodiments, in accordance with a determination that the first input (e.g., 650*e*, 650*g*, 650*u*) corresponds to selection of the first user interface object (e.g., 680) and the first user interface object is in an inactive state (e.g., 680 in FIG. 6E), the computer system displays a plurality of options (e.g., 672, 682, 692) to manage the respective text. In some embodiments, in accordance with a determination that the first input corresponds to selection of the first user interface object (e.g., 680) and the first user interface object is in an active state (e.g., 680 in FIG. 6F), the computer system forgoes displaying a plurality of options (e.g., 672, 682, 692) to manage the respective text (e.g., as described above in reference to FIG. 6F). In some embodiments, in accordance with a determination that the first input (650*a*) corresponds to selection of the media capture affordance, the first user interface object (e.g., 610) continues to be displayed. In some embodiments, in accordance with a determination that the first input (e.g., 650*a*) corresponds to selection of the media capture affordance (e.g., 610) or selection of the first user interface object (e.g., 680), one or more interface objects (e.g., the media capture affordance (e.g., 610), camera setting affordance(s), camera mode affordance(s) (e.g., 620)) cease to be displayed or are displayed as being inactive (e.g., dimmed) (e.g., not responsive to user input on the respective object) in the camera user interface. Displaying a plurality of options to manage respective text in accordance with a determination that the first input corresponds to selection of the first user interface object provides the user with the ability to quickly and efficiently manage the respective text without cluttering the user interface with additional user interface objects. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying a plurality of options to manage respective text when certain prescribed conditions are met (e.g., based on whether the first input corresponds to selection of a first user interface object) automatically provides the user with a variety of options for different ways to manage respective text. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first input (e.g., 650*e*, 650*g*, 650*u*) is a tap gesture (e.g., a tap input) that is directed to the first user interface object (e.g., 672, 682, 692) (e.g., a gesture at a location corresponds to the first user interface object).

In some embodiments, the representation (e.g., 630) of media includes the respective text (e.g., where the respective text is displayed when the representation of media is displayed). In some embodiments, after detecting the first input (e.g., 650*e*, 650*g*, 650*u*) (and while not displaying an indication that the text is selected and/or after detecting an input/gesture that corresponds to selection of the first user interface object and/or while the first user interface object is displayed as being in an active state and/or while displaying a plurality of options to manage the respective text), the computer system detects a second input (e.g., 650*j*) (e.g., a tap gesture and/or a swipe gesture) directed to the camera user interface. In some embodiments, the second input is a non-tap gesture (e.g., a rotational gesture and/or a press-and-hold gesture). In some embodiments, the first input is a non-swipe gesture (e.g., a rotational gesture, a press-and-hold gesture, a mouse/trackpad click/activation, a keyboard input, a scroll wheel input, a hover gesture, and/or a tap gesture). In some embodiments, in response to detecting the second input (e.g., 650*j*) directed to the camera user interface and in accordance with a determination that the second input corresponds to selection of first one or more portions the respective text, the computer system displays an indication (e.g., 642*b* in FIG. 6K) that the first one or more portions (e.g., 642*b*) of the respective text (e.g., 642*a*, 642*b*) is selected. In some embodiments, the indication is displayed around the respective text. In some embodiments, as a part of displaying an indication that the one or more portions of respective text are selected, the computer system emphasizes (e.g., highlighting, underling, bolding, increasing the size of) the one or more portions of respective text. In some embodiments, while displaying an indication that a first portion of the respective text is selected, the computer system does not display an indication that a second portion (e.g., that is different from the first portion of) the respective text is selected. In some embodiments, in accordance with a determination that the second input (650*j*) corresponds to selection of one or more portions (e.g., 642*a*) of the respective text and while the first user interface (e.g., 680) object is displayed as being in an active state (e.g., 680 as described above in relation to FIG. 6F), the computer system displays an indication that the first one or more portions (e.g., 642*a*) the respective text is selected (e.g., as described above in relation to FIGS. 6K and 6L). In some embodiments, in accordance with a determination that the second input (e.g., 650*j*) corresponds to selection of one or more portions (e.g., 642) of the respective text and while the first user interface object (e.g., 680) is displayed as being in an inactive state (e.g., as described above in relation to FIG. 6G) and/or not displayed (e.g., as discussed above in relation to FIGS. 7C, 7G), the computer system does not (e.g., forgoes to display) display an indication that the first one or more portions (e.g., 642*a*) the respective text is selected (e.g., as discussed above in relation to FIGS. 7C and 7G). Displaying an indication that the first one or more portions of the respective text is selected provides the user with visual feedback concerning whether text has been selected and which text is currently selected. Providing improved visual feedback to the user enhances the operability of the computer system and makes the computer system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Displaying an indication that the first one or more portions of the respective text is selected in accordance in response to detecting the second input and in accordance with a determination that the second input corresponds to selection of the first one or more portions of respective text provides the user with additional control to select text without cluttering the user interface with additional user interface objects. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second input (e.g., 650*j*) (e.g., second gesture) is a tap gesture (e.g., that is directed to the one or more portions of the respective text) or a swipe gesture (e.g., that is directed to the one or more portions of the respective text). In some embodiments, the first input is a first type of input and the second input is a second type of input that is different from the first type of input.

In some embodiments, in response to detecting the first input (e.g., 650*e*, 650*g*, 650*u*) directed to the camera user interface and in accordance with the determination that the first input (e.g., 650*e*, 650*g*, 650*u*) corresponds to selection of the first user interface object (e.g., 680), the computer system displays an indication (e.g., 684) (e.g., that was not previously displayed before the first input was detected) (e.g., an instruction) concerning (e.g., of how to) selecting text included in the representation (e.g., 630) of media (e.g., instructions that indicate one or more inputs that will cause the computer system to display text as being selected). In some embodiments, in response to detecting the first input directed to the camera user interface and in accordance with a determination that the first input corresponds to selection of the media capture affordance, the computer system does not display the indication concerning (e.g., of how to) select text included in the representation of media. In some embodiments, the indication (e.g., 684) concerning (e.g., of how to) select text included in the representation of media is concurrently displayed with the plurality of options (e.g., 682*a*, 682*b*, 682*c*, 682*d*) to manage the respective text (e.g., 642*b*). In some embodiments, the indication (e.g., 684) concerning selecting text is displayed when the first user interface object (e.g., 680) is displayed in an active state (e.g., 680 as described above in relation to FIG. 6F) and the indication (e.g., 684) concerning selecting text is not displayed when the first user interface object is displayed in an inactive state (e.g., 680 as described above in relation to FIG. 6G). Displaying an indication concerning how to select text that is included in the representation of media provides the user with visual feedback regarding the steps required to select text that the user wishes to select. Providing improved visual feedback to the user enhances the operability of the computer system and makes the computer system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, before detecting the first input (e.g., 650*e*, 650*g*, 650*u*), the representation (e.g., 630) of media is displayed with a first appearance (e.g., 630 in FIG. 6E) (e.g., with a first blur value, a first dim value). In some embodiments, in response to detecting the first input (e.g., 650*e*, 650*g*, 650*u*) directed to the camera user interface and in accordance with the determination that the first input (e.g., 650*e*, 650*g*, 650*u*) corresponds to selection of the first user interface object (e.g., 680), the computer system displays the representation (e.g., 630) of media with a second appearance (e.g., 630 in FIG. 6F) (e.g., with a second blur value, a second dim value) that is different from the first appearance (e.g., 630 in FIG. 6E) (e.g., while text is selected (e.g., in response to detecting the second input)). In some embodiments, as a part of displaying the representation of media with the second appearance that is different from the first appearance, the computer system blurs and/or dims at least a portion of the representation of media. In some embodiments, in response to detecting the first input directed to the camera user interface and in accordance with a determination that the first input corresponds to selection of the media capture affordance, the computer system displays the representation of media with a third appearance that is different from the second appearance. In some embodiments, the third appearance is the first appearance. In some embodiments, the third appearance (e.g., black, a solid color) is different from the first appearance (e.g., blurred version of a field-of-view of the one or more cameras). In some embodiments, the representation of media with the third appearance is displayed for a predetermined period of time (e.g., less than one second) that is not based on whether the first user interface object is displayed in the active state. In some embodiments, the representation of media with the second appearance is displayed when the first user interface object is displayed in the active state and not displayed when the first user interface object is displayed in the inactive state. In some embodiments, the representation of media with the first appearance is not displayed when the first user interface object is displayed in the active state and displayed when the first user interface object is displayed in the inactive state. Displaying the representation of media with a second appearance that is different from the first appearance of the representation in response to detecting the first input provides the user with visual feedback with respect to whether text has been selected by the user by de-emphasizing less relevant portions of the representation of the media. Providing improved visual feedback to the user enhances the operability of the computer system and makes the computer system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the representation (e.g., 630) of media includes the respective text (e.g., 642*a*, 642*b*) (e.g., where the respective text is displayed when the representation of media is displayed). In some embodiments, in accordance with the determination that the respective set of criteria is satisfied, the computer system emphasizes (e.g., highlighting, displaying an object (e.g., a shape, brackets (e.g., yellow brackets) around), underlining, enlarging) second one or more portions of the respective text (e.g., 642*a*, 642*b*). In some embodiments, in accordance with the determination that the respective set of criteria is satisfied, the computer system emphasizes the second one or more portions of the respective text without emphasizing another portion of the respective text and/or another portion of the representation of media that does not include the second or more portions of the respective text. Emphasizing second one or more portions of respective text provides the user with improved visual feedback regarding whether a particular portion of the respective text that is included in the media satisfies the respective set of criteria. Providing improved visual feedback to the user enhances the operability of the computer system and makes the computer system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of emphasizing the second one or more portions of the respective text, the computer system displays an indication (e.g., 636*a*, 636*b*, 736*c*, 736*d*) that respective text has been detected. In some embodiments, while the second one or more portions of the respective text (e.g., 642*a*, 642*b*) is emphasized, the computer system receives a request to display a second representation (e.g., 630 in FIG. 6F) of media (e.g., the same or different media than the media represented by the representation of media). In some embodiments, the request to display the second representation of media is detected when one or more changes in the field-of-view of one or more cameras that is in communication with the computer system are detected. In some embodiments, the request to display the second representation of media is detected when a request to zoom the representation of media out/in and/or pan the representation of media is detected. In some embodiments, the request to display the second representation of media is detected when the computer system is moved.

In some embodiments, in response to receiving the request to display the second representation (e.g., 630 in FIG. 6F) of media (e.g., that includes a portion of the respective text and/or second respective text that is different from the respective text), the computer system translates (e.g., moves) the indication (e.g., 636*a*, 636*b*, 736*c*, 736*d*) that respective text has been detected from a first position in the camera user interface to a second position in the camera user interface. In some embodiments, in response to receiving the request to display the second representation of media, the indication that respective text has been selected is modified to surround a different portion of the text than it surrounded before the request to display the second representation of media was received. Translating the indication that the respective text has been detected from a first position in the camera user interface to a second position in the camera user interface in response to receiving the request to display the second representation of media allows the user to maintain their view of the indication while the system is moved between a first position and a second position. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after detecting the first input (e.g., 650*e*, 650*g*, 650*u*) and in accordance with a determination (e.g., a first determination) that the first input (e.g., 650*e*, 650*g*, 650*u*) corresponds to selection of the first user interface object (e.g., 680) (and/or while the first user interface object is displayed as being in an active state and/or while displaying a plurality of options to manage the respective text), the representation (e.g., 630) of media includes the respective text (e.g., 642*a*, 642*b*) and an indication that a third one or more portions of the respective text (e.g., 642*a*, 642*b*) is selected. In some embodiments, the computer system receives a request to display a third representation (e.g., 630) of media (e.g., the same or different media than the media represented by the representation of media). In some embodiments, the request to display the third representation of media is detected when one or more changes in the field-of-view of one or more cameras that is in communication with the computer system are detected. In some embodiments, the request to display the third representation of media is detected when a request to zoom the representation of media out/in and/or pan the representation of media is detected. In some embodiments, the request to display the third representation of media is detected when the computer system is moved. In some embodiments, in response to receiving the request (e.g., 650*c*, 650*d*, 750*e*, 750*f*, 750*g*) to display the third representation (e.g., 630) of media, the computer system displays an indication that at least a portion of text included in the third representation (e.g., 630) of media is selected, wherein the indication (e.g., 636*a*, 636*b*, 736*c*, 736*d*) that at least the portion of text (e.g., 642*a*, 642*b*) included in the third representation of media is selected is different from the indication that the third one or more portions of the respective text (e.g., 642*a*, 642*b*) is selected. In some embodiments, the portion of text included in the third representation of media includes at least a portion of the text in the third one or more portions of the text. Displaying an indication that at least a portion of text included in the third representation of media is selected in response to receiving the request to display the third representation provides the user with an additional and efficient manner to control which portions of text are selected without cluttering the user interface. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after detecting the first input (e.g., 650*e*, 650*g*, 650*u*) and in accordance with a determination (e.g., a first determination) that the first input corresponds to selection of the first user interface object (and/or while the first user interface object is displayed as being in an active state and/or while displaying a plurality of options to manage the respective text), the representation (e.g., 630) of media includes the respective text (e.g., 642*b*), an indication that a fourth one or more portions of the respective text (e.g., 642*b*) is selected, and the fourth one or more portions of the respective text (e.g., 642*b*) is displayed at a third position in the camera user interface (and/or on a display). In some embodiments, the computer system detects a change in a physical environment that is within a field of view of one or more cameras in communication with the computer system. In some embodiments, in response to detecting the change (e.g., 660*a*, 660*b*) in the physical environment that is within the field of view of the one or more cameras, the computer system continues to display the fourth one or more portions of the respective text (e.g., 642*b*) at the third position in the camera user interface (and/or on a display). In some embodiments, the selected text is frozen. In some embodiments, at least a portion of a fourth representation of media is displayed (e.g., newly displayed in response to detecting the change in the physical environment) while maintaining display of the fourth one or more portions of the respective text). In some embodiments, the computer system freezes the selected text (e.g., and/or displays the selected text in the same location and/or at the same size) while updating the representation of the media (e.g., live preview) to reflect changes in the physical environment. Continuing to display the fourth one or more portions of the respective text at the third position in the camera user interface allows the user to maintain a view of text that has been selected by the user while the system is moved between a first point and a second point. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before detecting the first input (e.g., 650*e*, 650*g*, 650*u*) that is directed to the camera user interface: the computer system (e.g., 600) is in communication with one or more cameras; and the representation (e.g., 630) of media is a representation (e.g., 630) (e.g., a live camera preview) of one or more objects in a physical environment (e.g., physical space) in the field-of-view of the one or more cameras. In some embodiments, receiving the request to display a fourth representation of media (e.g., a representation of an updated field-of-view of the camera) includes detecting a change in the field-of-view of the camera. In some embodiments, the fourth representation of media includes the change in the field-of-view of the camera. In some embodiments, when one or more objects within the field-of-view (e.g., non-textual objects) are moving, the representation of media is updated to show that one or more objects are moving. In some embodiments, the representation of media is a live representation of the field-of-view of the camera. Displaying the representation of media that a representation (e.g., a live camera preview) of one or more objects in the physical space in the field-of-view of the one or more cameras provides the user with greater control over the computer system (e.g., changing the field-of-view of the camera of the system) to determine whether one or more objects in the physical space can be captured without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation (e.g., 630) of media is a first representation of media. In some embodiments, while displaying the first user interface object, the computer system detects a request (e.g., 750*k*) to display a fifth representation (e.g., 630) of media (e.g., the same or different media than the media represented by the first representation of media). In some embodiments, the request to display the fifth representation of media is detected when one or more changes in the field-of-view of one or more cameras that is in communication with the computer system are detected. In some embodiments, the request to display the fifth representation of media is detected when a request to zoom the representation of media out/in and/or pan the representation of media is detected. In some embodiments, the request to display the fifth representation of media is detected when the computer system is moved. In some embodiments, in response to detecting the request (e.g., 750*k*) to display the fifth representation of media and in accordance with a determination that the respective set of criteria are not satisfied (e.g., respective text is not detected in the fifth representation of media or respective text is detected but is not sufficiently prominent), the computer system ceases to display the first user interface object (e.g., 680). In some embodiments, in response to detecting the request to display the fifth representation of media and in accordance with a determination that respective text is detected in the fifth representation of media, the computer system continues to display the first user interface object. Ceasing to display the first user interface object when certain prescribed conditions are met (e.g., in response to detecting a request to display the fifth representation of media and in accordance with a determination that the respective set of criteria are not satisfied) automatically provides the user that an indication of whether the representation of media does not contain text that has been detected by the computer system. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the respective criteria includes a criterion that is satisfied when a determination is made that the respective text satisfies predetermined prominence criteria (e.g., the text is at a size or in a location in the representation of media that indicates that the text is important and/or relevant) (e.g., based on the context of the representation of media (e.g., important/relevant based on the context of the image), based on the respective text taking up a certain amount of space on the displayed the representation of media, when the respective text is in a particular location (e.g., middle) on the displayed representation of media, based on the respective text being of a particular type of text (e.g., e-mail, phone number, QR code, uniform access code location, etc.)) (e.g., determined to be relevant based on one or more techniques as described below in relation to FIGS. 7C, 7E-7J and FIG. 9) (e.g., show first user interface object when respective text is on a sign, do not show first user object when detected is on clothing) (e.g., prominent/salient with respect how the respective text is displayed).

In some embodiments, while displaying the representation (e.g., 630) of media (and, in some embodiments, after detecting an input that corresponds to selection of the first user interface object and/or while the first user interface object is displayed as being in an active state and/or while displaying a plurality of options to manage the respective text) and in accordance with a determination that the respective text (e.g., 642*a*-642*b*) includes a portion of text that is determined to be a respective type (e.g., a phone number, an e-mail) of text (e.g., based on one or more regular expression patterns that correspond to different types of text), the computer system displays an indication (e.g., 638*a*-638*b*) (e.g., an indication of a data detector) that the respective type of text has been detected. In some embodiments, as a part of displaying the indication that the respective type of text has been detected, the computer system emphasizes (e.g., highlights, underlines, brackets) the portion of text. In some embodiments, the indication that the respective type of text has been detected is displayed adjacent to, around, etc. the portion of text that is of the respective type of text. In some embodiments, in accordance with a determination that the respective text does not include a portion of text that is of a respective type (e.g., a phone number, an e-mail) of text, the computer system does not display (e.g., forgoes displaying) the indication that the respective type of text has been detected. Displaying an indication that a respective type of text has been detected in a representation of media provides the user with visual feedback with respect to whether the representation of media includes a certain type of text. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the plurality of options to manage the respective text (e.g., 680), the computer system receives a third input (e.g., 650*h*) (e.g., a tap input) directed to a portion of the camera user interface that does not include the respective text (e.g., a dimmed or otherwise obscured portion of the representation of media (e.g., a portion of the representation of media that does not include text) (and/or a dimmed portion of the camera user interface)). In some embodiments, in response to receiving the third input (e.g., 650*h*), the computer system ceases to display the plurality of options to manage the respective text (e.g., 680). In some embodiments, in response to receiving the third input, one or more interface objects (e.g., the media capture affordance, camera setting affordance(s), camera mode affordance(s)) are displayed (e.g., re-displayed) and/or are displayed as being active (e.g., not dimmed) (e.g., responsive to user input on the respective object) in the camera user interface. Ceasing to display the plurality of options to manage respective text in response to receiving an input directed to a portion of the camera user interface provides the user with more control over the system without cluttering the user interface with additional user interface objects. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while concurrently displaying the representation (e.g., 630) of media and the media capture affordance (e.g., 610) (e.g., before displaying the first user interface object) and in accordance with a determination that the representation (e.g., 630) of media includes a first machine-readable code (e.g., a linear barcode, a matrix barcode, or a QR code), the computer system: displays the first user interface object (e.g., 680); and displays a representation (e.g., 668) of a uniform resource locator that corresponds to the first machine-readable code. Displaying the first user interface object and displaying the representation of the uniform resource location improves security by informing of the location of a resource corresponding to the QR code before the user provides an input to navigate to the resource. Providing improved security reduces the unauthorized performance of secure operations which, additionally, reduces power usage and improves battery life of the computer system by enabling the user to use the computer system more securely and efficiently. Displaying the first user interface object and displaying the representation of the uniform resource location when certain prescribed conditions are met (e.g., in accordance with a determination that the representation of media includes a machine-readable code) informs the user of the resource that is associated with the machine-readable code prior to the user selecting the machine-readable code and provides the user with uniform resource locator that corresponds to the first machine-readable code. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that the first input (e.g., 650*u*) corresponds to selection of the first user interface object while the representation (e.g., 630) of media includes a second machine-readable code (and while the machine-readable code is selected), the plurality of options (e.g., 672) to manage the respective text includes one or more options to manage information (e.g., uniform resource location) corresponding to the second machine-readable code. In some embodiments, in accordance with a determination that the first input corresponds to selection of the first user interface object while the representation of media does not include a machine-readable code (and/or while the machine-readable code is not selected), the plurality of options to manage the respective text does not include one or more options to manage information. In some embodiments, one or more of the plurality of options to manage the respective text that are displayed when a machine-readable code is selected is different from one or more options to manage the respective text that are displayed when the text is selected that does not include a machine-readable code. Including in the plurality of options one or more options to manage information corresponding to the machine-readable code in accordance with a determination that the first input corresponds to selection of the first user interface provides the user with more control options (e.g., additional text management options) without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the camera user interface includes a plurality of camera setting affordances (e.g., 620*a*-620*e*) that are selectable to change settings of one or more cameras (e.g., flash affordance, timer affordance, filter effects affordance, f-stop affordance, aspect ratio affordance, live photo affordance, etc.) (e.g., a plurality of user interface objects for accessing a respective camera setting). In some embodiments, the camera user interface includes a plurality of camera mode affordances (e.g., 620) (e.g., a plurality of user interface objects for setting a respective camera mode). In some embodiments, the plurality of camera setting affordances (e.g., 602*a*, 602*b*) is displayed concurrently with the media capture affordance (e.g., 610) and/or the plurality of camera mode affordances (e.g., 620). In some embodiments, each camera mode (e.g., video (e.g., 620*b*), photo (e.g., 620*c*), portrait (e.g., 620*d*), slow-motion (e.g., 620*a*), panoramic (e.g., 620*e*) modes) (e.g., 620) has a plurality of settings (e.g., for a portrait camera mode: a studio lighting setting, a contour lighting setting, a stage lighting setting) with multiple values (e.g., levels of light for each setting) of the mode (e.g., portrait mode) that a camera (e.g., a camera sensor) is operating in to capture media (including post-processing performed automatically after capture). In this way, for example, camera modes are different from modes that do not affect how the camera operates when capturing media or do not include a plurality of settings (e.g., a flash mode having one setting with multiple values (e.g., inactive, active, auto). In some embodiments, camera modes allow user to capture different types of media (e.g., photos or video) and the settings for each mode can be optimized to capture a particular type of media corresponding to a particular mode (e.g., via post-processing) that has specific properties (e.g., shape (e.g., square, rectangle), speed (e.g., slow motion, time elapse), audio, video). For example, when the computer system is configured to operate in a still photo mode, the one or more cameras of the computer system, when activated, captures media of a first type (e.g., rectangular photos) with particular settings (e.g., flash setting, one or more filter settings); when the computer system is configured to operate in a square mode, the one or more cameras of the computer system, when activated, captures media of a second type (e.g., square photos) with particular settings (e.g., flash setting and one or more filters); when the computer system is configured to operate in a slow motion mode, the one or more cameras of the computer system, when activated, captures media that media of a third type (e.g., slow motion videos) with particular settings (e.g., flash setting, frames per second capture speed); when the computer system is configured to operate in a portrait mode, the one or more cameras of the computer system captures media of a fifth type (e.g., portrait photos (e.g., photos with artificially blurred backgrounds)) with particular settings (e.g., amount of a particular type of light (e.g., stage light, studio light, contour light), f-stop, blur); when the computer system is configured to operate in a panoramic mode, the one or more cameras of the computer system captures media of a fourth type (e.g., panoramic photos (e.g., wide photos) with particular settings (e.g., zoom, amount of field to view to capture with movement). In some embodiments, when switching between modes, the display of the representation of the field-of-view changes to correspond to the type of media that will be captured by the mode (e.g., the representation is rectangular while the computer system is operating in a still photo mode and the representation is square while the computer system is operating in a square mode).). Displaying a camera user interface that includes a plurality of camera setting affordances that are selectable to change settings of one or more cameras provides the user with the ability to adjust a plurality of camera settings without having to navigate to various different user interfaces. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the camera user interface includes an affordance (e.g., 612) that, when selected, causes one or more previously captured representations (e.g., 712) of media to be displayed (e.g., as described above in relation to FIGS. 6A and 7A). In some embodiments, the affordance includes a representation of previously captured media. In some embodiments, in response to detecting selection of the affordance (e.g., 612), displays representations (e.g., 712) of media that are in the media library associated with the computer system (e.g., as described above in relation to FIGS. 6A and 7A). Displaying a camera user interface that includes an affordance on the camera user interface provides the user with quick access to previously captured media item. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the respective text includes a phone number (e.g., that is detected in the respective text) and, in response to detecting input directed to the phone number, the computer system initiates a phone call to the phone number. In some embodiments, the respective text includes an e-mail address. In some embodiments, in response to detecting input directed to the e-mail address, the computer system launches (e.g., or opens) an e-mail application that includes the e-mail address (e.g., include the email address in the "to" field) and/or automatically sends an e-mail to the e-mail address.

Note that details of the processes described above with respect to method 800 (e.g., FIG. 8) are also applicable in an analogous manner to the other methods described herein. For example, method 800 optionally includes one or more of the characteristics of the various methods described herein with reference to methods 900, 1100, 1300, 1500, and 1700. For example, the one or more indications of detected features, as described in method 1100 (e.g., FIG. 11), can be displayed in the previously captured media item to identify features present in previously captured media item. For brevity, these details are not repeated below.

In some embodiments, one or more steps of method 800 described above can also apply to a representation of video media, such as one or more live frames and/or paused frames of video media. In some embodiments, one or more steps of method 800 described above can be applied to representation of media in user interfaces for applications that are different from the user interfaces described in relation to FIGS. 6A-6Z and 7A-7L, which include, but are not limited to, user interfaces corresponding to a productivity application (e.g., a note taking application, a spreadsheeting application, and/or a tasks management application), a web application, a file viewer application, and/or a document processing application, and/or a presentation application.

FIG. 9 is a flow diagram illustrating a method for managing visual indicators for visual content in media, in accordance with some embodiments. Method 900 is performed at a computer system (e.g., 100, 300, 500) that is in communication with a display generation component and one or more input devices. Some operations in method 900 are, optionally, combined, the orders of some operations are, optionally, changed, and some operations are, optionally, omitted.

As described below, method 900 provides an intuitive way for managing visual indicators for visual content in media. The method reduces the cognitive burden on a user for managing visual indicators for visual content in media, thereby creating a more efficient human-machine interface. For battery-operated computing devices, enabling a user to manage visual indicators for visual content in media faster and more efficiently conserves power and increases the time between battery charges.

Method 900 is performed at a computer system (e.g., a smartphone, a desktop computer, a laptop, a tablet) that is in communication with a display generation component (e.g., a display controller, a touch-sensitive display system) and one or more input devices (e.g., a touch-sensitive surface).

The computer system displays (902), via the display generation component, a first representation (e.g., 724*a* (e.g., 724*a* in FIG. 7B) (e.g., image or video) of a previously captured media item (e.g., photo media video media) (e.g., photo media or video media that was previously captured by receiving an input directed to a selectable user interface object for capturing media) (e.g., photo media or video media that is available for later use, editing, and/or viewing by a user) (e.g., a representation (e.g., a first portion of the previously captured media item) of the previously captured media item at a first zoom level). In some embodiments, the first representation of previously captured media was displayed in response to receiving an input on a thumbnail representation of the previously captured media (and/or by receiving an input (e.g., swipe gesture) directed to a representation of a different previously captured media.).

While displaying the first representation (e.g., 724*a* (e.g., 724*a* in FIG. 7B)) of the previously captured media item, the computer system detects (904), via the one or more input devices, an input (e.g., 750*b*, 750*d*, 750*e*, 750*f*, 750*g*, 750*k*) (e.g., a multi-finger pinch gesture, a multi-finger de-pinch gesture, a tap gesture, a directional swipe gesture, a movement of the computer system, a mouse/trackpad click/activation, a keyboard input, a scroll wheel input, a hover gesture, and/or a tap gesture) that corresponds to a request to display a second representation (e.g., 724*a* (e.g., 724*a* in FIG. 7C)) (e.g., image or video) of the previously captured media item. In some embodiments, the request to display a second representation of the previously captured media item is a request to zoom in/out (e.g., zoom in/out the first retransition). In some embodiments, the second representation is a zoomed in/out version of the first representation. In some embodiments, the request to display the second representation of the previously captured media item is a request to pan (e.g., pan (e.g., translate in a direction (left/right/up/down) the first representation). In some embodiments, the second representation includes or does not include additional content that was not included in the first representation. In some embodiments, displaying the second representation of the previously captured media item includes displaying content of the previously captured media item that was not included in the first representation and displaying content of the previously captured media item that was included in the first representation.

In response to detecting the input (e.g., 750*b*, 750*d*, 750*e*, 750*f*, 750*g*, 750*k*) that corresponds to a request to display a second representation (e.g., 724*a* (e.g., 724*a* in FIG. 7C)) of the previously captured media item, the computer system displays (906), via the display generation component, the second representation (e.g., 724*a* (e.g., 724*a* in FIG. 7C)) (e.g., a representation (e.g., the first portion of the previously captured media item or a second portion of the previously captured media item) of the previously captured media item at a second zoom level, different from the first zoom level) of the previously captured media item. In some embodiments, the second representation of the previously captured media item is displayed without detecting an input.

While (908) displaying the second representation (e.g., 724*a* (e.g., 724*a* in FIG. 7C)) of the previously captured media item and in accordance with a determination that (a display of) a portion of text (e.g., 642*a*, 642*b*) (e.g., a portion of the text, one or more characters included in the second representation of the previously captured media) (e.g., displayed text) included in (e.g., displayed in) the second representation (e.g., 724*a* (e.g., 724*a* in FIG. 7C)) of the previously captured media item satisfies a respective set of criteria (e.g., text is sufficiently prominent (e.g., the text takes up a certain percentage of the previously captured media item) (e.g., the text is relevant (e.g., relevant to the content of the previously captured media item (e.g., within and/or above a certain confidence threshold)) with respect to the content of the previously captured media item), the computer system displays (e.g., 910) (e.g., concurrently with the second representation of the previously captured media item), via the display generation component, a visual indication (e.g., 636*a*, 736*a*) corresponding to the portion of text (e.g., 642*a*, 642*b*) included in the second representation (e.g., 724*a* (e.g., 724*a* in FIG. 7C)) that was not displayed when the first representation (e.g., 724*a* (e.g., 724*a* in FIG. 7B)) of the previously captured media item was displayed (e.g., a visual to emphasize the detected text (e.g., highlight, bracket, change the size/color/shape of the text)) that is depicted in the representation of the previously captured media item, a bracket (e.g., a closed bracket, an open bracket) around text). In some embodiments, multiple visual indications (e.g., 636*a*, 636*b*, 736*a*, 736*c*-736*e*) are displayed for multiple instances of text being sufficiently prominent (e.g., as described above in relation to FIGS. 6C-6D). In some embodiments, the visual indication (e.g., 636*a*, 636*b*, 736*a*, 736*c*-736*e*) is not displayed while the first representation of the previously captured media item (e.g., 724*a* (e.g., 724*a* in FIGS. 7B-7D)) is displayed. In some embodiments, the visual indication (e.g., 636*a*, 636*b*, 736*a*, 736*c*-736*e*) is not displayed while the first representation of the previously captured media item (e.g., 724*a* (e.g., 724*a* in FIGS. 7B-7D)) is displayed, and the first representation (e.g., 742*a*) of the previously captured media item contains the portion of text (e.g., 642*a*, 642*b*). In some embodiments, the visual indication (e.g., 636*a*, 636*b*, 736*a*, 736*c*-736*e*) is not displayed while the first representation of the previously captured media item is displayed, and the first representation (e.g., 724*a*) of the previously captured media item does not contain the portion of text (e.g., 642*a*, 642*b*) (e.g., as described above in relation to FIGS. 7A-7C). In some embodiments, the first representation contains the portion of text (e.g., 642*a*, 642*b*) and contains a visual indication (e.g., 636*a*, 736*a*, 736*c*-736*e*) that corresponds to the portion of text because the portion of text satisfies the respective criteria (e.g., as described above in relation to FIGS. 7D-7F). In some embodiments, the portion of text in the first representation of the previously captured media item does not meet the respective set of criteria, and the visual indication is not displayed (e.g., as described above in relation to FIGS. 7A-7C). In some embodiments, the visual indication (e.g., 636*a*, 636*b*, 736*a*, 736*c*-736*e*) is displayed while the first representation (e.g., 724*a*) of the previously captured media item is displayed, but the visual indication ceases to be displayed after the input (e.g., 750*b*, 750*d*, 750*e*, 750*f*, 750*g*, 750*k*) is detected (e.g., as described above in relation to FIGS. 7K-7L). In some embodiments, the first representation (e.g., 724*a*) of the previously captured media item contains a portion (of text and contains a visual indication (e.g., 636*a*, 636*b*, 736*a*, 736*c*-736*e*) that corresponds to the portion (e.g., 642*a*, 642*b*, 742) of text, and the second representation (e.g., 724*a*) of the previously captured media item contains the same portion (e.g., 642*a*, 642*b*, 742) of text and contains the same visual indication (e.g., 636*a*, 636*b*, 736*a*, 736*c*-736*e*) that corresponds to the portion of text (e.g., 642*a*, 642*b*). In some embodiments, a visual indication is displayed in the first representation (e.g., 724*a* (e.g., 724*a* in FIG. 7B)) of the previously captured media item that corresponds to the portion of text, and the visual indication (e.g., 636*a*, 636*b*, 736*a*, 736*c*-736*e*) is displayed in the second representation of the previously captured media item and corresponds to a first portion (e.g., 642*b* in FIG. 7H) (e.g., less than the entirety of the portion of text displayed in the first representation) of the portion of text that is displayed in the first representation. In some embodiments, a first visual indication (e.g., 636*a*, 636*b*, 736*a*, 736*c*-736*e*) is displayed in the first representation (e.g., 724*a*) of the previously captured media item (e.g., 724*a* (e.g., 724*a* in FIG. 7B)) that corresponds to the portion of text, and a second visual indication (e.g., 636*a*, 636*b*, 736*a*, 736*c*-736*e*) is displayed in the second representation of the previously captured media item (e.g., 724*a* (e.g., 724*a* in FIG. 7C)) and corresponds to different a different portion of the text (e.g., portion of text that was not displayed in the first representation) (e.g., portion of text that was displayed in the first representation but was not associated with the visual indication) (e.g., as discussed above in relation to FIGS. 7E-7F). In some embodiments, the visual indication is displayed in the second representation (e.g., 724*a* of FIG. 7E) of the previously captured media item but not the first representation (e.g., 724*a* of FIG. 7D) of the previously captured media item. Automatically displaying a visual indication that corresponds to the portion of text in the second representation when prescribed conditions are satisfied, indicates to the user that the portion of the text in the second representation has been detected. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying the second representation that includes the visual indication that corresponds to the portion of text in the second representation provides a user with visual feedback that the detected text could be relevant. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the second representation (e.g., 724*a* (e.g., 724*a* in FIG. 7C)) of the previously captured media item (and, in some embodiments, after ceasing to display the first representation of the previously captured media item) and in accordance with a determination that the portion of text (e.g., 642*a*, 642*b*) included in the second representation of the previously captured media item does not satisfy the respective set of criteria, forgoing displaying the visual indication (e.g., 636*a*, 636*b*, 736*a*, 736*c*, 736*d*). In some embodiments, in accordance with a determination that the portion of text included in the second representation of the previously captured media item does not satisfy the respective set of criteria, the computer system displays the second representation of the previously captured media item without a respective visual indication displayed (e.g., on the second representation of the previously captured media item) that corresponds to any portion of text in the previously captured media item. Automatically forgoing displaying the visual indication when a set of prescribed conditions are satisfied (e.g., in accordance with a determination that the portion of text included in the second representation of the previously captured media item does not satisfy the respective set of criteria) automatically provides the user with the ability to determine that the respective representation does not contain text that satisfies the one or more criteria. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the second representation (e.g., 724*a* (e.g., 724*a* in FIG. 7D)) of the previously captured media item, the computer system detects, via the one or more input devices, an input (e.g., 750*d*, 750*e*, 750*f*, 750*g*, 750*j*, 750*k*) (e.g., a pinch gesture, a de-pinch gesture, a directional swipe gesture) that corresponds to a request to display a third representation (e.g., 724*a* (e.g., 724*a* in FIG. 7E)) of the previously captured media item. In some embodiments, the input is a non-pinch gesture, non-de-pinch gesture, and/or a non-directional swipe gesture (e.g., a rotational gesture, a press-and-hold gesture, a mouse/trackpad click/activation, a keyboard input, a scroll wheel input, a hover gesture, and/or a tap gesture). In some embodiments, in response to detecting the input (e.g., 750*e*, 750*f*) that corresponds to the request to display the third representation (e.g., 724*a* (e.g., 724*a* in FIG. 7E)) of the previously captured media item, the computer system displays, via the display generation component, the third representation of the previously captured media item (e.g., a representation of the previously captured media item at a different zoom level (e.g., greater than or less than) than the zoom level of the previous representation of the previously captured media item) (e.g. a representation of the previously captured media that has a different amount of pan than the previous representation of the previously captured media item). In some embodiments, while displaying the third representation of the previously captured media item and in accordance with a determination that a portion of text (e.g., 642*a*, 642*b*) included in the third representation of the previously captured media item satisfies the respective set of criteria, the computer system displays, via the display generation component, a visual indication (e.g., 636*a*, 636*b*, 736*a*, 736*c*, 736*d*) corresponding to the portion of text (e.g., 642*a*, 642*b*) included in the third representation (e.g., that was not displayed when the first representation of the previously captured media item was displayed and/or that was not displayed when the second representation of the previously captured media item was displayed). In some embodiments, in accordance with a determination that the portion of text included in the third representation of the previously captured media item does not satisfy the respective set of criteria, the computer system does not display the visual indication corresponding to the portion of text included in the second representation while displaying the third representation of the previously captured media item. In some embodiments, the portion of text included in the third representation includes (or is) the same text that is included in the second representation. In some embodiments, the portion of text included in the third representation has different characteristics (e.g., a different size, shape, font) than the portion of text included in the second representation. Automatically displaying a visual indication that corresponds to the portion of text included in the third representation when prescribed conditions are satisfied, automatically indicates to the user that the third representation includes a portion of text that could be relevant. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying the third representation that includes the visual indication that corresponds to the portion of text in the third representation provides a user with visual feedback that the detected text could be relevant. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first representation (e.g., 724*a* (e.g., 724*a* in FIG. 7A)) of the previously captured media item is a representation of the media item displayed at a first zoom level (e.g., 0.5-12×) and the second representation (e.g., 724*a* (e.g., 724*a* in FIG. 7B)) of the previously captured media item is a representation of the media item displayed at a second zoom level (e.g., 0.5-12×) that is different from the first zoom level. In some embodiments, the second zoom level is greater than (or less than) the first zoom level. In some embodiments, when the first representation of the previously captured media item is the representation of the media item displayed at a first zoom level and the second representation of the previously captured media item is the representation of the media item displayed at the second zoom level, the first input includes or is a pinch/de-pinch gesture. In some embodiments, the difference between the first zoom level and the second zoom level is based on the magnitude of the pinch/de-pinch gesture. Displaying the second representation that includes the visual indication that corresponds to the portion of text in the second representation after the zoom level of the representation has changed provides a user with visual feedback that the detected text could be relevant in the changed representation. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first representation (e.g., 724*a* (e.g., 724*a* in FIG. 7G)) of the previously captured media item is a representation of the media item displayed with a first amount of translation (e.g., the amount of translation shown in FIG. 7G) (e.g., media item is displayed at a first position at a particular location on the display) (e.g., a zero and/or a non-zero amount of translation) (e.g., relative to a respective position in the media item) and the second representation (e.g., 724*a* (e.g., 724*a* in FIG. 7H)) of the previously captured media item is a representation of the media item displayed with a second amount of translation (e.g., the amount of translation shown in FIG. 7H) (e.g., media item is displayed at a second position that is different from the first position at the particular location on the display) (e.g., a zero and/or a non-zero amount of translation) (e.g., relative to the respective position in the media item) that is different from the first amount of translation. In some embodiments, when the first representation of the previously captured media item is the representation of the media item displayed with the first amount of translation and the second representation of the previously captured media is the representation of the media item displayed with the second amount of translation that is different from the first amount, the first that corresponds to a request to display a second representation of the previously captured media item includes or is a swipe gesture. In some embodiments, the difference between the first translation amount and the second translation amount is based on the magnitude of the swipe gesture. Displaying the second representation that includes the visual indication that corresponds to the portion of text in the second representation after the representation has been translated provides a user with visual feedback that the detected text could be relevant in the changed representation. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first representation (e.g., 724*a* (e.g., 724*a* in FIG. 7B)) of the previously captured media item includes the portion of text (e.g., 642*a*, 642*b*). In some embodiments, the portion of text included (e.g., displayed) in the first representation does not satisfy the respective set of criteria (e.g., because the portion of text included in the first representation is smaller than a threshold size and/or has a prominence that is below a prominence threshold). Automatically choosing to display the visual indication based on the text that was included in the first representation and the second representation provides the user with visual feedback that the text could be relevant in the second representation and not in the first representation. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the input (750*b*, 750*d*, 750*e*, 750*f*, 750*g*, 750*j*, 750*k*) that corresponds to the request to display the second representation (e.g., 724*a* (e.g., 724*a* in FIG. 7C)) of the previously captured media item is an input that is detected on (e.g., at a single location on the display generation component) (e.g., at multiple locations on the display generation component) the display generation component. Detecting the input that corresponds to the request to display the second representation of the previously captured media item on the display generation component provides additional control over the computer system by allowing the user to perform the input to display the representation on the display generation component. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the second representation (e.g., 724*a* (e.g., 724*a* in FIG. 7H)) of the previously captured media item is displayed at a third zoom level. In some embodiments, while displaying the second representation of the previously captured media item at the third zoom level, the computer system detects, via the one or more input devices, an input (e.g., 750*b*, 750*d*, 750*e*, 750*f*, 750*k*) (e.g., a pinch gesture or a de-pinch gesture) that corresponds to a request to change the zoom level of the second representation of the previously captured media item. In some embodiments, the input is a non-pinch gesture, non-de-pinch gesture, and/or a non-directional swipe gesture (e.g., a rotational gesture, a press-and-hold gesture, a mouse/trackpad click/activation, a keyboard input, a scroll wheel input, a hover gesture, and/or a tap gesture). In some embodiments, in response to detecting the input that corresponds to the request to change the zoom level of the second representation of the previously captured media item, the computer system displays, via the display generation component, a fourth representation (e.g., 724*a* (e.g., 724*a* in FIG. 7L)) of the previously captured media item at a fourth zoom level (e.g., 0.5-12×) that is different (e.g., greater than or less than) from the third zoom level. In some embodiments, the fourth representation includes or does not include additional content that was not included in the second representation. In some embodiments, displaying the fourth representation of the previously captured media item includes displaying content of the previously captured media item that was not included in the second representation and displaying content of the previously captured media item that was included in the second representation. In some embodiments, while displaying the fourth representation of the previously captured media item at the fourth zoom level and in accordance with a determination that a first portion of text (e.g., 642*a*, 642*b*) (a portion of text that corresponds to the portion of text, a subset of the portion of text, and/or a portion of text that is a superset of the portion of text) included in the fourth representation of the previously captured media item does not satisfy the respective set of criteria, the computer system forgoes displaying the visual indication. In some embodiments, the first portion of text satisfies the respective set of criteria in the second representation of the previously captured media item. In some embodiments, the first portion of text includes text that was not included. Forgoing displaying the visual indication when prescribed conditions are met automatically provides the user with an indication that the input to zoom the representation has changed the representation such that the visual indication is not relevant. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the second representation (e.g., 724*a* (e.g., 724*a* in FIG. 7G)) of the previously captured media item, the computer system detects, via the one or more input devices, an input (e.g., 750*g*) (e.g., a horizontal or vertical swipe) (e.g., an input that is detected on the display generation component) that corresponds to a request to translate (e.g., and/or pan) the second representation of the previously captured media item. In some embodiments, the input is a non-horizontal swipe, and/or a non-vertical swipe gesture (e.g., a rotational gesture, a press-and-hold gesture, a mouse/trackpad click/activation, a keyboard input, a scroll wheel input, a hover gesture, and/or a tap gesture). In some embodiments, in response to detecting the input that corresponds to a request to translate the second representation of the previously captured media item, the computer system displays a fifth representation (e.g., 724*a* (e.g., 724*a* in FIG. 7H)) of the previously captured media item that includes a portion (e.g., the 'LO' in LOST in FIG. 7H) of the media item that was not included in the second representation of the previously captured media item. In some embodiments, the fifth representation of the previously captured media item includes a portion of the media item that was included in the second representation of the previously captured media item. In some embodiments, the fifth representation of the previously captured media item does not include a portion of the media item that was included in the second representation of the previously captured media item. In some embodiments, while displaying the fifth representation of the previously captured media item and in accordance with a determination that a second portion of text (e.g., the "1" from the phone number in FIG. 7H) (e.g., a portion of text that corresponds to the portion of text and/or a subset of the portion of text and/or different text than the portion of text) (e.g., text that was not included (e.g., displayed) in the second representation) (e.g., text that was included (e.g., displayed) in the second representation) included in (e.g., displayed) the fifth representation of the previously captured media item does not satisfy the respective set of criteria, the computer system forgoes displaying the visual indication. Forgoing displaying the visual indication when prescribed conditions are met automatically provides the user with an indication that the input to pan the representation has changed the representation such that the visual indication is not relevant. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the second representation (e.g., 724*a* (e.g., 724*a* in FIG. 7C)) of the previously captured media item, the computer system detects, via the one or more inputs devices, an input (e.g., 750*c*) (e.g., a single-tap gesture, and/or a double-tap gesture) that is a different type of input (e.g., different intensity, different number of inputs, detected at different locations on the display generation component), than the input (e.g., 750*b*) that corresponds to a request to display the second representation of the previously captured media item. In some embodiments, the input that is a different type of input than the input that corresponds to a request to display the second representation of the previously captured media item is a non-tap gesture (e.g., a swipe gesture, a press-and-hold gesture, a mouse/trackpad click/activation, a keyboard input, a scroll wheel input, a hover gesture, and/or a tap gesture). In some embodiments, in response to detecting the input that is a different type of input than the input that corresponds to a request to display the second representation of the previously captured media item, the computer system forgoes displaying the visual indication (e.g., irrespective of whether a portion of text included in the displayed representation (e.g., second representation and/or a representation displayed after receiving the input that is a different type of input than the input that corresponds to a request to display the second representation of the previously captured media item) of the previously captured media item does not satisfy the respective set of criteria). In some embodiments, while displaying the second representation of the previously captured media item and displaying the visual indication, the computer system detects, via the one or more inputs devices, the fifth input and, in response to detecting the input that is a different type of input than the input that corresponds to a request to display the second representation of the previously captured media item, ceases to display the visual indication. Forgoing displaying the visual indication in response to detecting the input provides the user with more control over the computer system by allowing the user the ability to control when the visual indication is displayed without cluttering the UI. Providing additional control of the computer system without cluttering the UI with additional displayed controls enhances the operability of the computer system and makes the user-computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the respective set of criteria includes a criterion that is satisfied when a determination is made that an amount of prominence of a respective portion (e.g., the first portion) of text included in a respective representation (e.g., second representation of the previously captured media item) of a respective previously captured media item (e.g., the previously captured media item) is above a prominence threshold (e.g., the amount of prominence associated with text portion 642*a* in FIG. 7E) (e.g., a threshold corresponding to one or more of a determined size, location, importance of displayed text) (e.g., a non-zero threshold).

In some embodiments, the amount of prominence being above the prominence threshold is based on (e.g., at least based on) the respective portion of text occupying more than a threshold amount (e.g., 20-100%) of the respective representation (e.g., the amount of space text portion 642*a* takes up in 724*a* in 7K). In some embodiments, the amount of prominence is directly proportional to the amount of the respective representation that the respective portion of text occupies.

In some embodiments, the amount of prominence being above the prominence threshold is based on (e.g., at least based on) the respective portion of text (e.g., text portion 642*a* in FIG. 7E) being displayed at a particular location (e.g., in the middle) (and/or in a particular portion (e.g., a central portion)) in the respective representation. In some embodiments, the amount of prominence is indirectly portioned to the distance between the respective portions of the text to the particular location.

In some embodiments, the amount of prominence being above the prominence threshold is based on the respective portion of text (e.g., the phone number that is included in text portion 642*b* in FIG. 7G) being a particular type (e.g., an e-mail, phone number, address, QR code, etc.) of text.

In some embodiments, the amount of prominence being above the prominence threshold is based on a relevance score (e.g., a non-zero amount) of the portion of text (e.g., text portions 642*a* and 642*b* in FIG. 7F in relation to the content (as discussed above in reference to text portion 742) (e.g., text content, visual content) of the respective previously captured media item satisfying a relevance score threshold (e.g., a non-zero amount) (e.g., the text on shirt is not relevant while text on the sign is relevant based on the context of an image).

In some embodiments, while displaying the second representation of the previously captured media item and in accordance with a determination that the portion of text (e.g., 642*a* as displayed in FIG. 7E) (e.g., the portion of text, a subset of the portion of text) included in the second representation (e.g., 724*a* (e.g., 724*a* in FIG. 7E)) of the previously captured media item satisfies the respective set of criteria, the computer system displays a first user interface object (e.g., 680) corresponding to one or more text management operations (e.g., a selectable user interface object) (e.g., as described above in relation to FIGS. 6A-6Z and FIG. 8). In some embodiments, in accordance with a determination that the portion of text (e.g., 642*a* or 642*b* in FIG. 7C) included in the second representation (e.g., 724*a* (e.g., 724*a* in FIG. 7C)) of the previously captured media item does not satisfy the respective set of criteria, the computer system forgoes displaying the first user interface object corresponding to one or more text management operations. Automatically displaying a first user interface object corresponding to one or more text management operations when prescribed conditions are met automatically indicates to the user when a user interface object corresponding to one or more text management options is relevant to the displayed text. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the second representation (e.g., 724*a* (e.g., 724*a* in FIG. 7K)) of the previously captured media item and displaying the first user interface object (680) corresponding to one or more text management options, the computer system detects, via the one or more input devices, an input (750*d*, 750*e*, 750*f*, 750*g*, 750*k*) (e.g., a directional swipe) corresponding to a request to change (e.g., pan away from, change size of) the second representation of the previously captured media item. In some embodiments, the input is a non-directional swipe (e.g., a rotational gesture, a press-and-hold gesture, a mouse/trackpad click/activation, a keyboard input, a scroll wheel input, a hover gesture, and/or a tap gesture). In some embodiments, in response to detecting the input corresponding to a request to change the second representation of the previously captured media item, the computer system displays a twelfth representation (e.g., 724*a* (e.g., 724*a* in FIG. 7L)) of the previously captured media item. In some embodiments, the twelfth representation includes or does not include additional content that was not included in the second representation. In some embodiment, displaying the twelfth representation of the previously captured media item includes displaying content of the previously captured media item that was not included in the second representation and displaying content of the previously captured media item that was included in the second representation. In some embodiments, while displaying the twelfth representation of the previously captured media item and in accordance with a determination that a respective portion of text (e.g., 642*a*, 642*b*) (e.g., 642*a*, 642*b* in FIG. 7L) (e.g., text that corresponds to the portion of text, text that is a subset of the portion of text and/or text that is a subset of the portion of text) included in the twelfth representation of the previously captured media item does not satisfy the respective set of criteria, the computer system forgoes displaying the first user interface object corresponding to one or more text management operations. Automatically forgoing displaying the first user interface object corresponding to one or more text management operations when prescribed conditions are met automatically indicates to the user that the user interface object corresponding to one or more text management options is relevant to the displayed text. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second representation of the previously captured media item is displayed at a fifth zoom level. In some embodiments, while displaying the second representation (e.g., 724*a* (e.g., 724*a* in FIG. 7E)) of the previously captured media item at the fifth zoom level and the visual indication (e.g., 636*a*, 636*b*, 736*a*, 736*c*, 736*d*), the computer system detects, via the one or more input devices, an input (e.g., 750*d*, 750*e*, 750*f*, 750*k*) (e.g., a de-pinch gesture) that corresponds to a request to zoom in on the second representation of the previously captured media item. In some embodiments, the input is a non-de-pinch gesture (e.g., a rotational gesture, a press-and-hold gesture, a mouse/trackpad click/activation, a keyboard input, a scroll wheel input, a hover gesture, and/or a tap gesture). In some embodiments, the input that corresponds to a request to zoom in on the second representation of the previously captured media item is the same type of input as the input that corresponds to a request to display a second representation of the previously captured media item. In some embodiments, in response to detecting the input that corresponds to the request to zoom in on the second representation of the previously captured media item, the computer system displays, via the display generation component, a seventh representation (e.g., 724*a* (e.g., 724*a* in FIG. 7F)) of the previously captured media item at a sixth zoom level (e.g., 0.5-12×) that is greater (e.g., larger) than the fifth zoom level, wherein the seventh representation of the previously captured media item includes a second portion of text (e.g., 642*b*) included in the second representation of the previously captured media item that is different from (e.g., the second portion of text includes words and numbers that are not included in the first portion of text, the second portion of text is displayed at a different location than the first portion of text, the second portion of text is displayed in a different orientation than the first portion of text) the portion of text included in the second representation. In some embodiments, the second portion of text includes a first subset of the portion of text included in the second representation of the previously captured media item and does not include a second subset of the portion of text included in the second representation of the previously captured media item. In some embodiments, while displaying the seventh representation of the previously captured media item and in accordance with a determination that the second portion of text satisfies the respective criteria, the computer system displays, via the display generation component, a visual indication (e.g., 636*a*, 636*b*, 736*a*, 736*c*, 736*d*) corresponding to the second portion of text (e.g., a visual indication that emphasizes the detected text (e.g., highlight, bracket, change the size/color/shape of the text)) that is depicted in the previously captured media item, a bracket (e.g., a closed bracket, an open bracket) around text) (e.g., that was included in the second representation of the previously captured media item and that was included in the seventh representation of the previously captured media item) that is different from the visual indication corresponding to the portion of text (e.g., around a different portion of text, a different size, a different color, and/or displayed at a different location). In some embodiments, in accordance with a determination that the second portion of text does not satisfy the respective criteria, the computer system forgoes displaying the visual indication corresponding to the second portion of text and the visual indication corresponding to the portion of text included in the second representation. Automatically displaying a visual indication corresponding to the second portion of text that is different from the visual indication corresponding to the portion of text provides the user with improved visual feedback that a portion of text that was determined to satisfy the criteria no longer satisfies the criteria (e.g., in response to the input being received). Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the second representation of the previously captured media is displayed at a seventh zoom level (e.g., 0.5-12×). In some embodiments, while displaying the second representation (e.g., 724*a* (e.g., 724*a* in FIG. 7K)) of the previously captured media item at the seventh zoom level (e.g., 0.5-12×) (e.g., and while displaying the visual indication), the computer system detects, via the one or more input devices, an input (e.g., 750*k*) (e.g., a pinch gesture) that corresponds to a request to zoom out of the second representation of the previously captured media item. In some embodiments, the input is a non-pinch gesture (e.g., a rotational gesture, a press-and-hold gesture, a mouse/trackpad click/activation, a keyboard input, a scroll wheel input, a hover gesture, and/or a tap gesture). In some embodiments, in response to detecting the input that corresponds to the request to zoom out of the second representation of the previously captured media item, the computer system displays, via the display generation component, an eighth representation (e.g., 724*a* (e.g., 724*a* in FIG. 7L)) of the previously captured media item at an eighth zoom level (e.g., 0.5-12×) that is less than the seventh zoom level. In some embodiments, the eighth representation includes or does not include additional content that was not included in the second representation. In some embodiments, displaying the eighth representation of the previously captured media item includes displaying content of the previously captured media item that was not included in the second representation and displaying content of the previously captured media item that was included in the second representation. In some embodiments, while displaying the eighth representation of the previously captured media item at the eighth zoom level (and while displaying the visual indication) and in accordance with a determination that a first respective portion of text (e.g., 642*a*, 642*b*) (e.g., no portion of text, a portion of text that corresponds to the portion of text) (e.g., a portion of text that is displayed in the eighth representation but not displayed in the second representation) (e.g., a portion of text that is displayed in the eight representation and the second representation) included in the eighth representation of the previously captured media item does not satisfy the respective set of criteria, the computer system ceases to display the visual indication. In some embodiments, in accordance with a determination the respective portion of text included in the eighth representation of the previously captured media item does not satisfy the respective set of criteria, the computer system displays the visual indication (e.g., the visual indication is displayed as inactive). Ceasing to display the visual indication when prescribed conditions are satisfied automatically provides the user with an indication of whether a portion of text could be relevant based on the respective criteria. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the visual indication (e.g., 636*a*, 636*b*, 736*a*, 736*c*, 736*d*) surrounds (e.g., brackets) the portion of the text (e.g., 642*a*, 642*b*) included in the second representation (e.g., 724*a* (e.g., 724*a* in FIG. 7E)). In some embodiments, the visual indication only surrounds a corresponding portion of text that is sufficiently prominent/salient (e.g., the corresponding portion of text satisfies a saliency threshold). Surrounding the portion of text with the visual indication provides the user with feedback to identify a portion of text that could be relevant. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the location (e.g., a particular location on the display generation component) of the display of the visual indication (e.g., 636*a*, 636*b*, 736*a*, 736*c*, 736*d*) corresponds (e.g., the location of the display of the visual indicator is dependent upon the location of the display of the portion of text) with the location of the portion of text (e.g., 642*a*, 642*b*) included in the second representation (e.g., 724*a* (e.g., 724*a* in FIG. 7E)). Displaying the visual indication at a location that corresponds with the location of the portion of text provides the user with feedback regarding which portions of text that could be relevant. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the second representation of the previously captured media item is displayed at a ninth zoom level (e.g., 0.5-12×). In some embodiments, while displaying the second representation (e.g., 724*a* (e.g., 724*a* in FIG. 7E)) of the previously captured media item at the ninth zoom level and the visual indication (e.g., 636*a*, 736*a*, 736*c*, 736*d*), the computer system detects, via one or more input devices, an input (e.g., 750*d*, 750*e*, 750*f*) (e.g., a de-pinch gesture) that corresponds to a request to zoom in on the second representation of the previously captured media item. In some embodiments, the first input is a non-de-pinch input (e.g., a rotational gesture, a press-and-hold gesture, a mouse/trackpad click/activation, a keyboard input, a scroll wheel input, a hover gesture, and/or a tap gesture). In some embodiments, the input is the same type of input as the input that corresponds to the request to display the second representation of the previously captured media item. In some embodiments, in response to detecting the input that corresponds to a request to zoom in on the second representation of the previously captured media item, the computer system displays, via the display generation component, a ninth representation (e.g., 724*a* (e.g., 724*a* in FIG. 7F)) of the previously captured media (e.g., a representation of the previously captured media item that includes a subset of content that was included in the second representation of the previously captured media item) item at a tenth zoom level (e.g., 0.5-12×) that is greater (e.g., larger than) than the ninth zoom level, wherein the ninth representation of the previously captured media item includes a respective portion of text (e.g., 642*a*, 642*b*) included in the second representation of the previously captured media that is different from (e.g., the second portion of text includes words and numbers that are not included in the first portion of text, the second portion of text is displayed at a different location than the first portion of text, the second portion of text is displayed at a different orientation that the first portion of text) the portion of text included in the second representation. In some embodiments, the second portion of text includes a first subset of the portion of text included in the second representation of the previously captured media item and does not include a second subset of the portion of text included in the second representation of the previously captured media item. In some embodiments, while displaying the ninth representation of the previously captured media item, the computer system ceases displaying the visual indication that corresponds to the portion of text. In some embodiments, while displaying the ninth representation of the previously captured media item and in accordance with a determination that the second respective portion of text satisfies the respective criteria, the computer system displays, via the display generation component, a visual indication (e.g., 636*a*, 636*b*, 736*a*, 736*c*, 736*d*) (e.g., a visual indication that emphasizes the detected text (e.g., highlight, bracket, change the size/color/shape of the text)) that is depicted in the previously captured media item, a bracket (e.g., a closed bracket, an open bracket) around text) (e.g., that is from the visual indication included in the second representation of the previously captured media item) corresponding to (e.g., surrounding) the second respective portion of text that is different (e.g., around a different portion of text, a different size, a different color, and/or displayed at a different location) from the visual indication corresponding to the portion of text. Ceasing displaying the visual indication that corresponds to the portion of text when prescribed conditions are met automatically provides an indication to the user that the previous input has changed the relevance of the portion of text. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, at least a first subset of the portion of text (e.g., 642*a*, 642*b*) is selectable (e.g., a second portion of the portion of text is not selectable). Having at least a first subset of the portion of text be selectable provides the user with additional control by the computer system by allowing the user the ability to select at least a first subset of the portion of text without cluttering the user interface with additional user interface objects. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the second representation of the previously captured media item includes a third portion of text (e.g., a subset of the portion of text, a portion of text that is different from the portion of text (e.g., displayed in a different location and/or contains different characters than the portion of text) that is not selectable. In some embodiments, while displaying the second representation (e.g., 724*a* (e.g., 724*a* in FIG. 7E)) of the previously captured media item, the computer system detects, via one or more input devices, an input (e.g., 750*b*, 750*d*, 750*e*, 750*f*) (e.g., a de-pinch gesture and/or a directional swipe gesture) that corresponds to a request to display a tenth representation of the previously captured media item (e.g., a request to change the second representation of the previously captured media item) (e.g., a representation of the previously captured media item that includes a subset of the content of the second representation) (e.g., a representation of the previously captured media at a different (e.g., greater than or less than) zoom level than then zoom level of the second representation (e.g., a representation of the previously captured media item that has a different (e.g., greater or less than) amount of translation than the second representation. In some embodiments, the input is a non-de-pinch gesture and/or a non-directional swipe gesture (e.g., a rotational gesture, a press-and-hold gesture, a mouse/trackpad click/activation, a keyboard input, a scroll wheel input, a hover gesture, and/or a tap gesture). In some embodiments, in response to detecting an input that corresponds to a request to display the tenth representation of the previously captured media item, the computer system displays the tenth representation of the previously captured media item that includes the portion of the text, wherein the third portion of the text included in the tenth representation of the previously captured media item is selectable. In some embodiments, a visual indication that corresponds to the third portion of text is displayed in the tenth representation. Displaying the tenth representation that includes a portion of text that is selectable in response to a request to display the tenth representation provides the user with greater control over the computer system by giving the user the ability to enable the selection of text. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, one or more steps of method 900 described above can also apply to a representation of video media, such as one or more live frames and/or paused frames of video media. In some embodiments, one or more steps of method 900 described above can be applied to representation of media in user interfaces for applications that are different from the user interfaces described in relation to FIGS. 6A-6Z and 7A-7L, which include, but are not limited to, user interfaces corresponding to a productivity application (e.g., a note taking application, a spreadsheeting application, and/or a tasks management application), a web application, a file viewer application, and/or a document processing application, and/or a presentation application.

Note that details of the processes described above with respect to method 900 (e.g., FIG. 9) are also applicable in an analogous manner to the other methods described herein. For example, method 900 optionally includes one or more of the characteristics of the various methods described herein with reference to methods 800, 1100, 1300, 1500, and 1700. For example, the one or more indications of detected features, as described in method 1100, can be displayed in the previously captured media item to identify features present in the previously captured media item. For brevity, these details are not repeated below.

FIGS. 10A-10AD illustrate exemplary user interfaces for inserting visual content in media in accordance with some embodiments. The user interfaces in these figures are used to illustrate the processes described below, including the processes in FIG. 11.

FIG. 10A illustrates computer system 600 displaying e-mail user interface 1002 (e.g., that is used to facilitate the transmission of electronic mail between computer system 600 and an external computer system). E-mail user interface 1002 includes send control 1004, e-mail address text entry region 1006, supplemental e-mail address text entry region 1008, subject text entry region 1010, message entry region 1012, and cancel control 1034. E-mail address text entry region 1006 and supplemental e-mail address text entry region 1008 are configured to accept text that corresponds to one or more e-mail addresses. In some embodiments, e-mail address text entry region 1006 and supplemental e-mail address text entry region 1008 do not accept text that does not identify a recipient with respect to a particular format (with an e-mail address and/or a phone number having a particular format). In some embodiments, one or more e-mail addresses can be entered in e-mail address text entry region 1006 and supplemental e-mail address text entry region 1008. In some embodiments, subject text entry region 1010 can accept plain text (e.g., text that is not of a particular format) to serve as a brief description for the subject of the e-mail message.

As illustrated in FIG. 10B, cancel control 1034 and send control 1004 are displayed near the top of e-mail user interface 1002. In some embodiments, in response to detecting an input directed to cancel control 1034, computer system 600 ceases display of e-mail user interface 1002 and re-displays an application that computer system 600 displayed immediately prior to displaying e-mail user interface 1002 (and/or displaying one or more hidden portions of an application that is concurrently displayed with e-mail user interface 1002). In some embodiments, in response to detecting an input directed to send control 1004, computer system 600 initiates a process for sending the e-mail message to one or more computer systems (and/or mail servers) that are associated with one or more e-mail addresses that are displayed in e-mail address text entry region 1006 and/or supplemental e-mail address text entry region 1008 (e.g., when the input directed to send control 1004 is received). At FIG. 10A, computer system 600 detects tap input 1050*a* that corresponds to a selection of e-mail address text entry region 1006.

As illustrated in FIG. 10B, in response to detecting tap input 1050*a*, computer system 600 updates the display of e-mail user interface 1002 to include the display of text cursor 1018 within e-mail address text entry region 1006 and contact control 1020 (e.g., that, when selected, displays a user interface that provides the user with a list of contacts that are stored locally on computer system 600). As illustrated in FIG. 10B, in response to detecting tap input 1050*a*, computer system 600 also displays virtual keyboard 1016 over a portion of message entry region 1012 (e.g., a portion of message entry region 1012 ceases to be displayed and another portion of message entry region 1012 remains displayed in response to detecting tap input 1050*a*). At FIG. 10B, computer system 600 displays text cursor 1018 to indicate that text that is selected via one or more inputs on virtual keyboard 1016 will be displayed in e-mail address text entry region 1006.

As illustrated in FIG. 10B, virtual keyboard 1016 includes keyboard control region 1014 that includes insertion control 1014*a*. Keyboard control region 1014 is displayed at the top of virtual keyboard 1016. In some embodiments, keyboard control region 1014 is displayed at another position of virtual keyboard 1016 and/or e-mail user interface 1002. In some embodiments, keyboard control region 1014 is not displayed when virtual keyboard 1016 is first displayed and, in response to detecting one or more inputs on virtual keyboard 1016, keyboard control region 1014 is displayed concurrently with virtual keyboard 1016. In some embodiments, in response to one or more inputs on virtual keyboard 1016, keyboard control region 1014 ceases to be displayed while other portions of virtual keyboard 1016 (e.g., letters on virtual keyboard 1016) remain displayed. At FIG. 10B, computer system 600 detects tap input 1050*b* that corresponds to selection of insertion control 1014*a*.

Figure 10D:
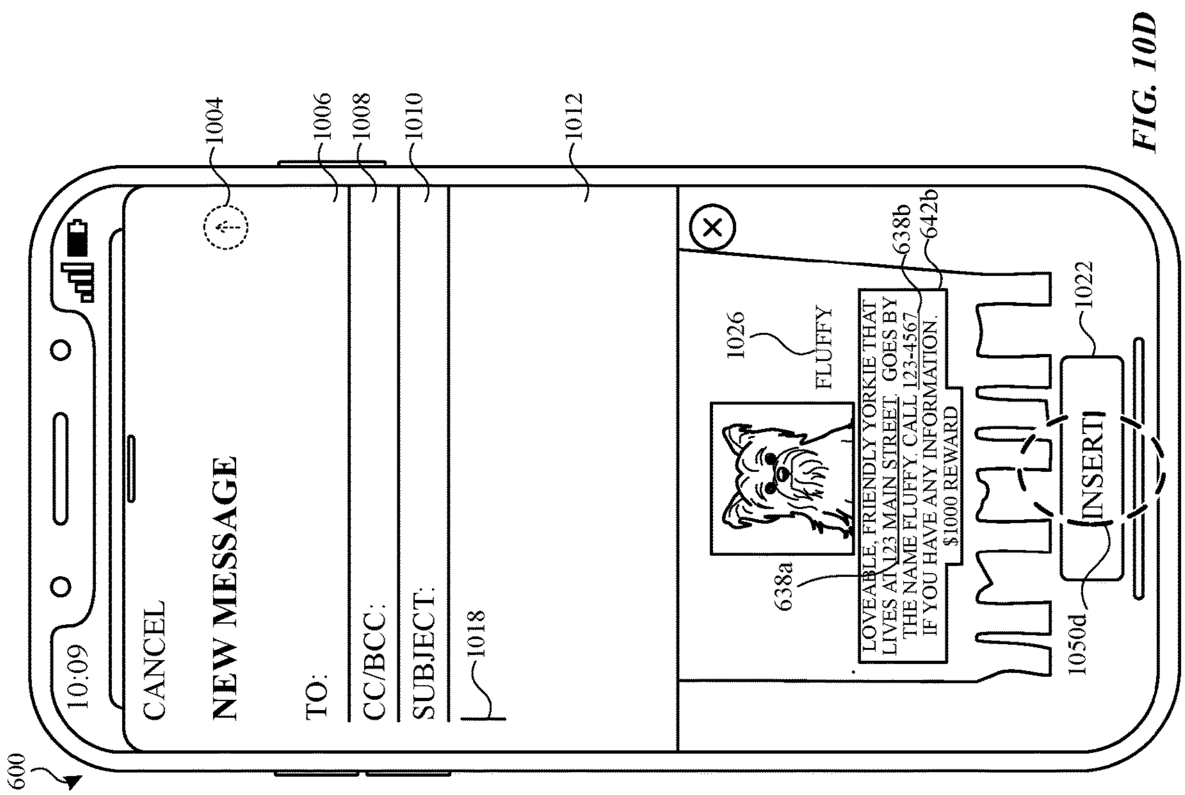
Figure 10C:
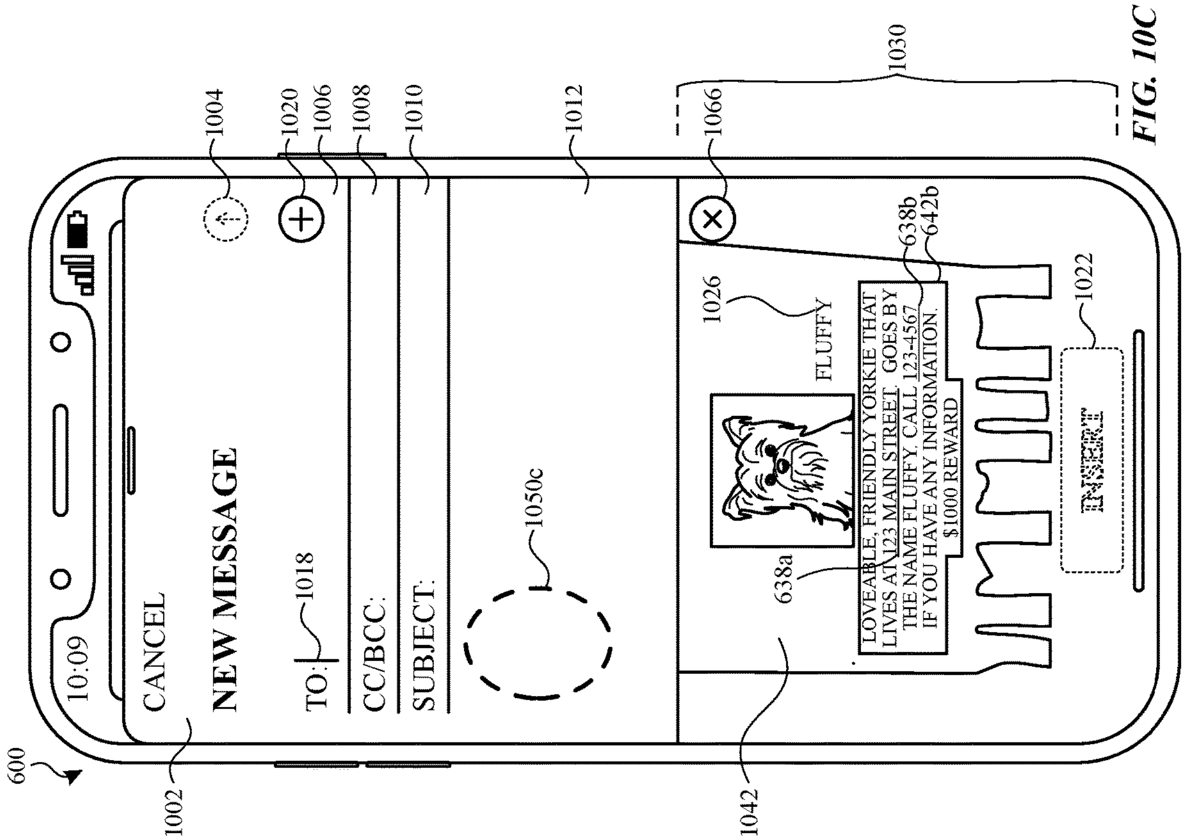

As illustrated in FIG. 10C, in response to detecting tap input 1050*b*, computer system 600 replaces the display of virtual keyboard 1016 with the display of a camera user interface that includes live preview 1030 and insertion control 1022. As illustrated in FIG. 10C, the camera user interface, displayed in response to detecting tap input 1050*b*, is displayed concurrently with the upper portion of e-mail user interface 1002. Live preview 1030 is a representation of the FOV. In some embodiments, live preview 1030 is displayed using one or more similar techniques as those discussed above in relation to the display of live preview 1030.

Live preview 1030 depicts sign 1042, which includes text portion 642*b* (e.g., paragraph of text that starts with "LOVEABLE") and text portion 1026 (e.g., "FLUFFY"). At FIG. 10C, a determination is made that text portion 642*b* satisfies one or more criteria (e.g., visual prominence criteria as discussed above in relation to FIGS. 6A-6M, 7A-7L, 8, and 9). As illustrated in FIG. 10C, because text portion 642*b* satisfies a set of prominence criteria, that text portion 642*b* is visually emphasized (e.g., text portion 642*b* is enlarged, surrounded by a box, displayed with a corresponding pair of brackets, underlined, and/or as highlighted). In particular, at FIG. 10C, there are no boxes around text portion 642*b* on sign 1042. However, at FIG. 10C, computer system 600 displays text portion 642*b* with a box surrounding it (and/or visually emphases text portion 642*b*) because text portion 642*b* satisfies the set of prominence criteria. As illustrated in FIG. 10C, computer system 600 displays a box surrounding text portion 1026 for similar reasons as those discussed above because text portion 1026 satisfies the set of prominence criteria. In some embodiments, no boxes are displayed around any text portion at FIG. 10C, irrespective of whether the text portion satisfies the set of prominence criteria. As illustrated in FIG. 10C, computer system 600 displays text-type indication 638*a* underneath "123 MAIN STREET" in text portion 642*b* to indicate that an address has been detected and displays text-type indication 638*b* underneath "123-4567" in text portion 642*b* to indicate that a phone number has been detected (e.g., using one or more similar techniques as discussed above in relation to FIGS. 6A-6M).

As illustrated in FIG. 10C, computer system 600 maintains display of text cursor 1018 within e-mail address text entry region 1006, which is associated with e-mail addresses. At FIG. 10C, a determination is made as to whether the text included in live preview 1030 includes an e-mail address because text cursor 1018 is within e-mail address text entry region 1006 (e.g., the computer system 600 has determined that a user is likely to want to type an e-mail address into e-mail address text entry region 1006). At FIG. 10C, a determination is made that the text displayed in live preview 1030 (e.g., text portions 642*b* and 1026) do not satisfy a set of text insertion criteria because the text displayed in live preview 1030 does not include an e-mail address. Because a determination is made that the text displayed in live preview 1030 does not satisfy the set of text insertion criteria, computer system 600 displays insertion control 1022 with a visual appearance (e.g., greyed out, dimmed, blurred out) that indicates that the insertion control 1022 is disabled (e.g., not selectable). In some embodiments, in response to detecting an input directed to insertion control 1022 of FIG. 10C, computer system 600 does not perform a text insertion operation (and/or does not perform any operations and/or maintains display of the user interface that was previously displayed before the input was detected). In some embodiments, in accordance with a determination that the text displayed in live preview 1030 does not satisfy the set of text insertion criteria, computer system 600 does not display insertion control 1022. At FIG. 10C, computer system 600 detects tap input 1050*c* in message entry region 1012.

As illustrated in FIG. 10D, in response to detecting tap input 1050*c*, computer system 600 displays text cursor 1018 within message entry region 1012 and ceases to display text cursor 1018 in e-mail address text entry region 1006. Message entry region 1012 is associated with a type of text (e.g., plain text, text having no particular type). At FIG. 10D, a determination is made that text portion 642*b* satisfies the set of text insertion criteria and text portion 1026 does not satisfy the text insertion criterion. Notably, at FIG. 10D, text portion 642*b* satisfies the set of text insertion criteria at least because message entry region 1012 does not accept a particular type of text that is not included in text portion 642*b* (e.g., as opposed to FIG. 10C when text portion 642*b* did not satisfy the set of text insertion criteria because e-mail address text entry region 1006 only accepted particular types of text that were not included in text portion 642*b*). In some embodiments, the determination is made that text portion 642*b* satisfies the set of text insertion criteria because text portion 642*b* satisfies a set of prominence criteria (e.g., using one or more techniques as discussed above in relation to FIGS. 6A-6M, 7A-7L, 8, and 9). In some embodiments, the determination is made that text portion 1026 does not satisfy the set of text insertion criteria because text portion 1026 does not satisfy the set of prominence criteria (e.g., using one or more techniques as discussed above in relation to FIGS. 6A-6M, 7A-7L, 8, and 9). In some embodiments, the determination is made that text portion 642*b* satisfies the set of text insertion criteria and text portion 1026 does not satisfy the text insertion criterion because text portion 642*b* is more visually prominent than text portion 1026 in FIG. 10D (e.g., using one or more techniques as discussed above in relation to FIGS. 6A-6M, 7A-7L, 8, and 9).

As illustrated in FIG. 10D, because a determination was made that a text portion (e.g., 1042*b*) satisfies the set of text insertion criteria, computer system 600 displays insertion control 1022 as being activated (e.g., as selectable, no dimming and/or greying-out). At FIG. 10D, computer system 600 detects tap input 1050*d* on insertion control 1022.

Figure 10F:
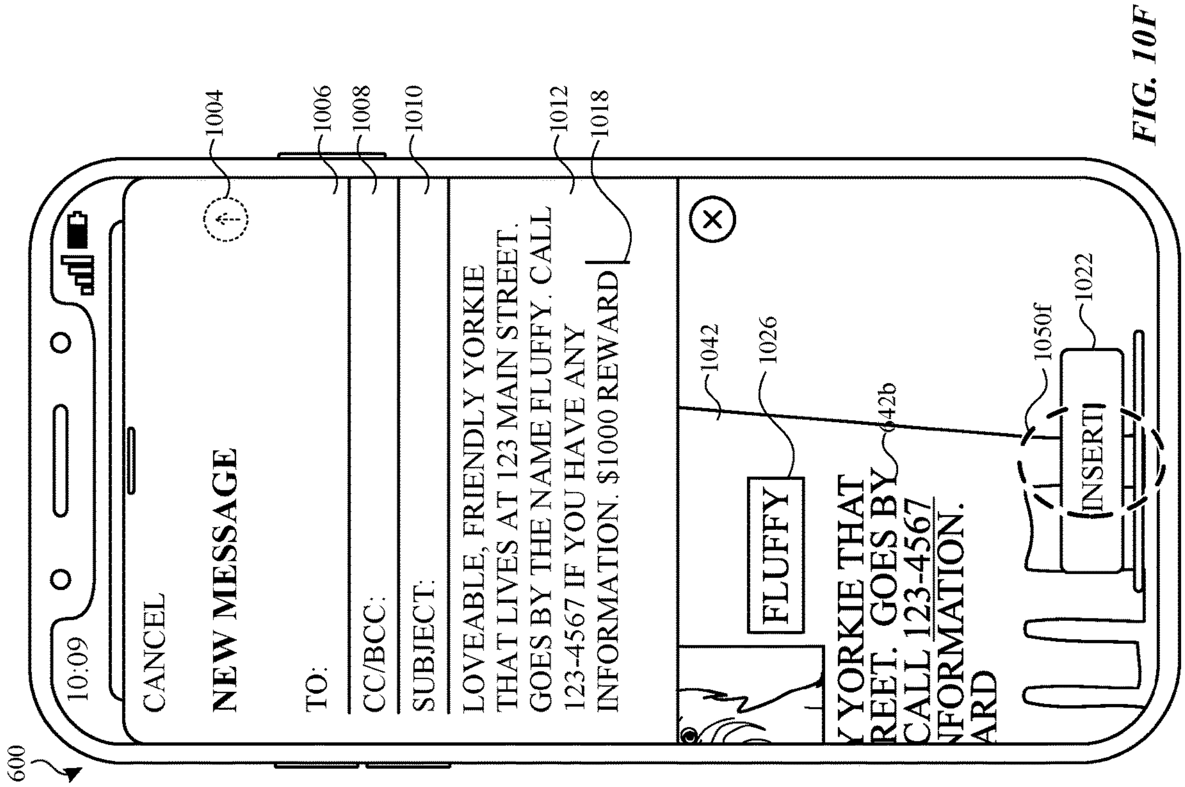
Figure 10E:
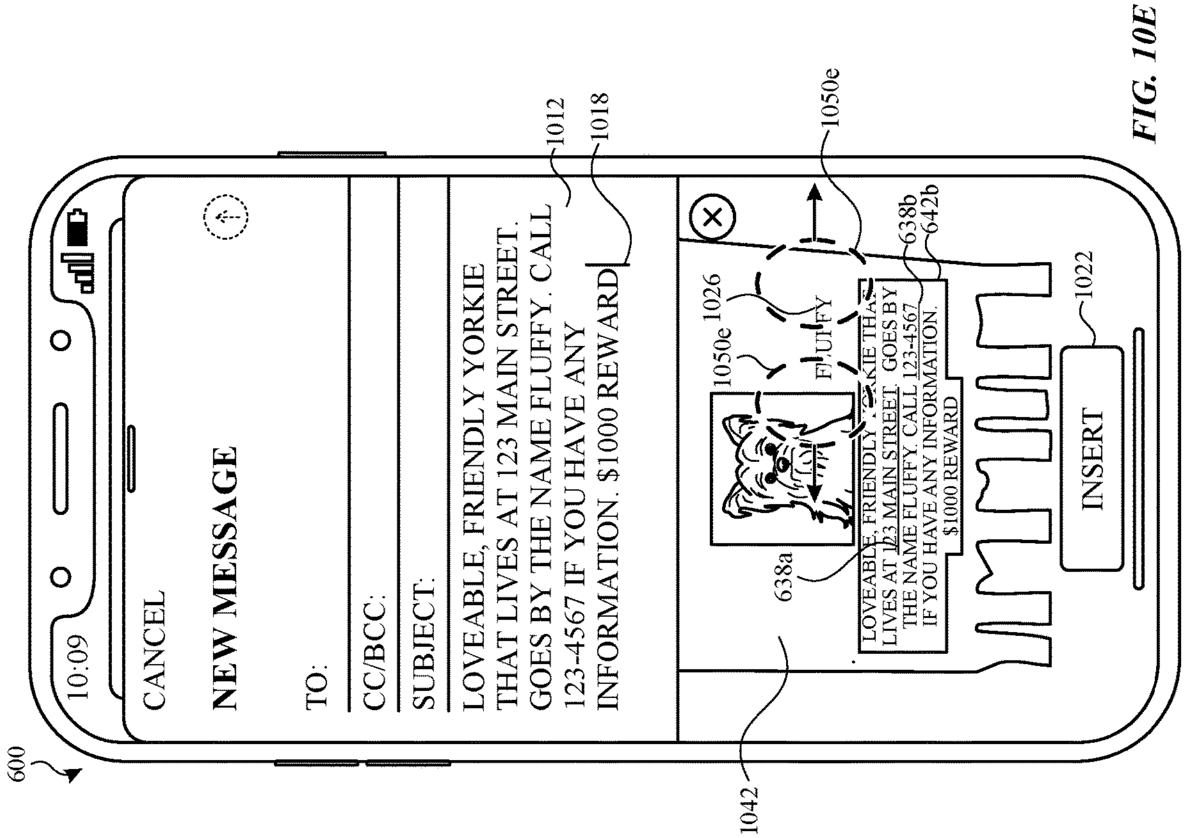

As illustrated in FIG. 10E, in response to detecting tap input 1050*d*, computer system 600 inserts text portion 642*b* into message entry region 1012. Because a determination was made that text portion 642*b* satisfied the set of insertion criteria and text portion 1026 does not satisfy the set of insertion criteria, computer system 600 inserts text portion 642*b* into message entry region 1012 and does not insert text portion 1026 into message entry region 1012. As illustrated in FIG. 10E, computer system 600 displays text cursor 1018 within message entry region 1012 at the end of the text that has been inserted into message entry region 1012. The placement of text cursor 1018 indicates that any additional text will be inserted from the position of text cursor 1018 of FIG. 10E. At FIG. 10E, computer system 600 detects de-pinch input 1050*e* on live preview 1030.

As illustrated in FIG. 10F, in response to detecting de-pinch input 1050*e*, computer system 600 updates live preview 1030 to reflect a change in zoom level, such live preview 1030 is displayed at a greater zoom level in FIG. 10F than live preview 1030 of FIG. 10E. As illustrated in FIG. 10F, sign 1042 is enlarged when live preview 1030 is displayed at the greater zoom level. In particular, sign 1042 is enlarged such that a subset of text portion 642*b* has ceased to be displayed, and a subset of text portion 642*b* has continued to be displayed. At FIG. 10F, determinations are made text portion 642*b* displayed in FIG. 10F does not satisfy a set of prominence criteria and text portion 1026 satisfies the set of prominence criteria. Thus, at FIG. 10F, computer system 600 de-emphasizes text portion 642*b* and emphasizes text portion 1026 because of these determinations (e.g., using one or more techniques as discussed above in reference to FIGS. 6A-6M, 7A-7L, 8, and 9). At FIG. 10F, computer system 600 detects tap input 1050*f* on insertion control 1022.

Figure 10H:
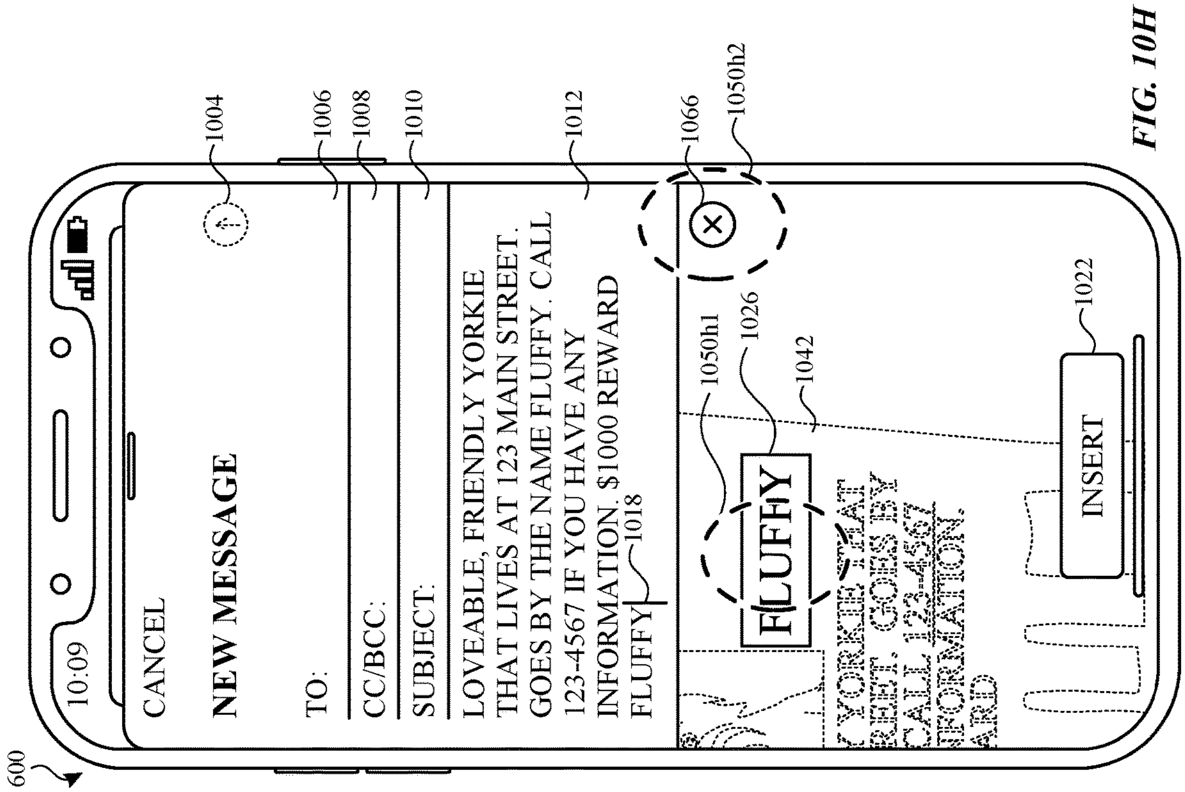
Figure 10G:
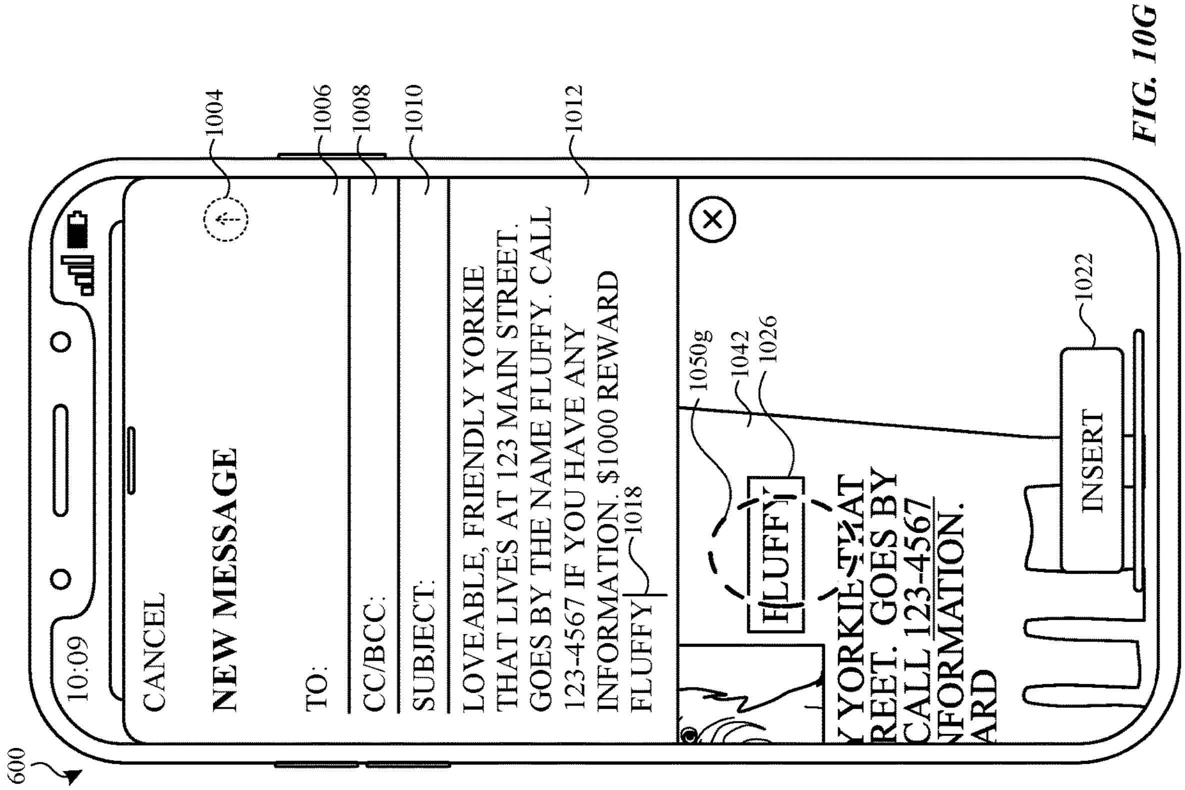

At FIG. 10G, a determination is made that text portion 1026 satisfies the set of text insertion criteria and text portion 1026 does not satisfy the set of text insertion criteria. As illustrated in FIG. 10G, in response to detecting tap input 1050*f*, computer system 600 inserts text portion 1026 (and not text portion 642*b*) into message entry region 1012 because the determination was made that text portion 1026 satisfies the set of text insertion criteria and text portion 1026 does not satisfy the text of satisfies the set of text insertion criteria. As illustrated in FIG. 10G, text portion 1026 is inserted (e.g., "Fluffy") beneath the text that was previously inserted into message entry region 1012. In some embodiments, text portion 1026 is inserted on the same line as text that was previously inserted into message entry region. At FIG. 10G, computer system 600 detects tap input 1050*g* on text portion 1026.

As illustrated in FIG. 10H, in response to detecting tap input 1050*g*, computer system 600 dims (e.g., and/or blurs) one or more portions of live preview 1030, except for text portion 1026. In some embodiments, computer system 600 does not respond to inputs that correspond to a selection of any portion of live preview 1030 that is dimmed. In some embodiments, computer system 600 reduces the saturation of the one or more portions of live preview 1030 and maintains the saturation of text portion 1026 (e.g., using one or more techniques as described above in relation to FIG. 6D).

As illustrated in FIG. 10H, computer system 600 increases the size of the display of text portion 1026 (e.g., in comparison to the size of the display of text portion 1026 of FIG. 10G) to indicate that text portion 1026 is selected (and that other dimmed text portions displayed in live preview 1030 are not selected). At FIG. 10H, computer system 600 detects tap input 1050*h*1 on text portion 1026 and tap input 1050*h*2 on exit control 1066.

Figure 10J:
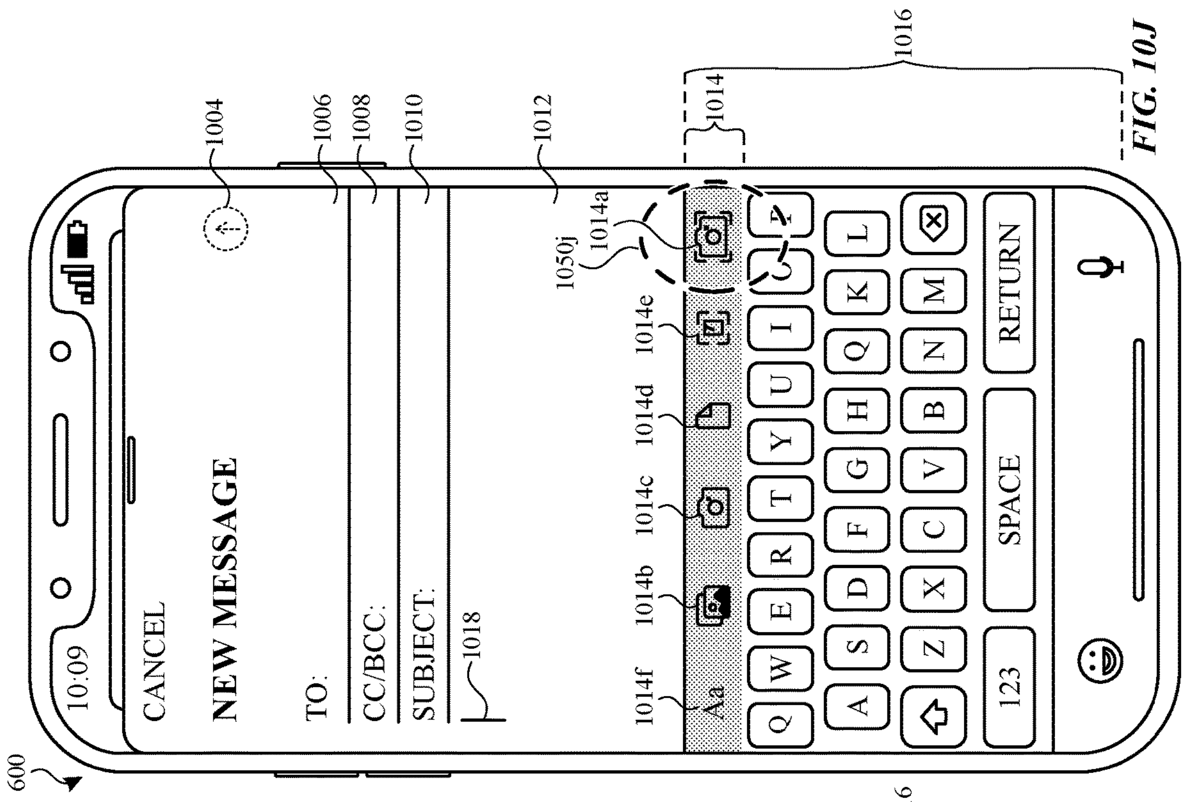
Figure 10I:
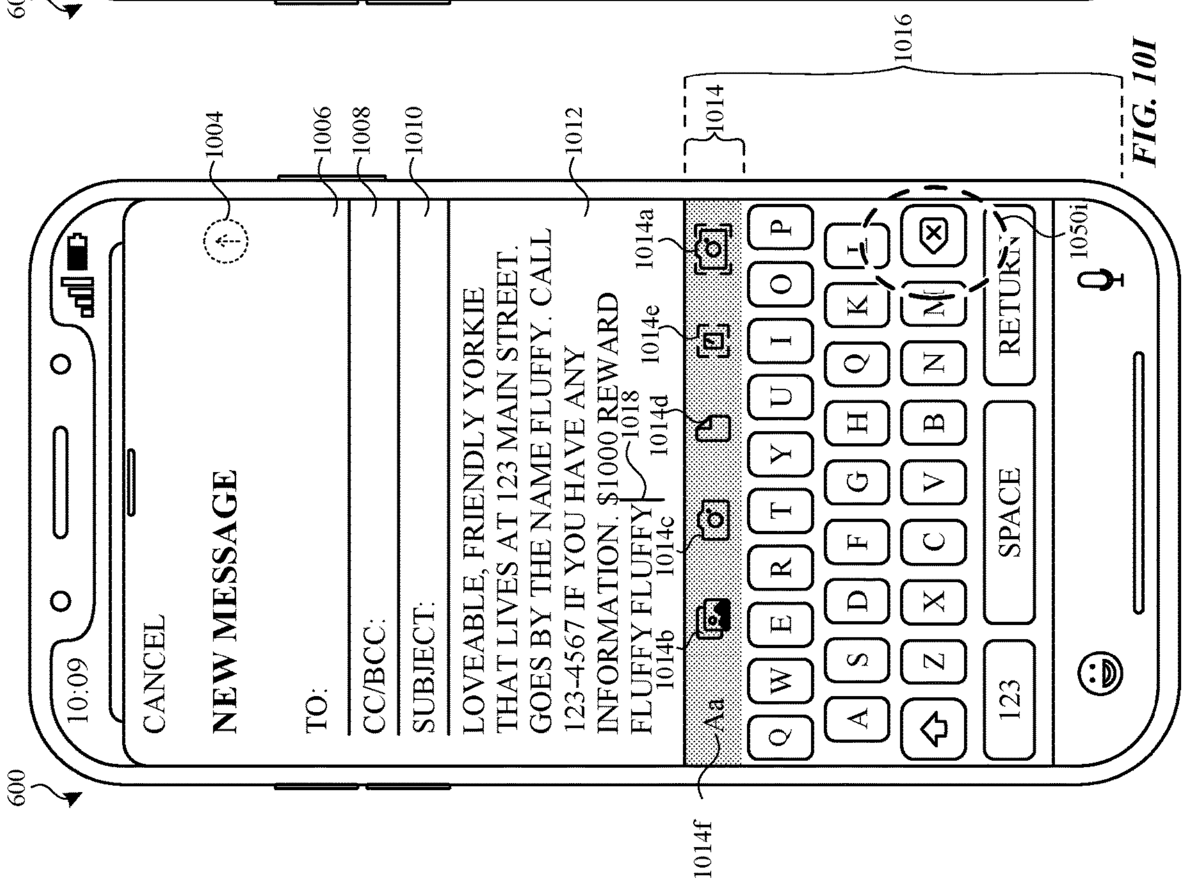

As illustrated in FIG. 10I, in response to detecting tap input 1050*h*1, computer system 600 inserts text portion 1026 into message entry region 1012 (e.g., starting at the position of text cursor 1018 of FIG. 10H).

As illustrated in FIG. 10I, in response to detecting tap input 1050*h*2, computer system 600 ceases to display the camera user interface (e.g., live preview 1030 and insertion control 1022) and re-displays the virtual keyboard 1016. As illustrated in FIG. 10I, virtual keyboard 1016 includes keyboard control region 1014. Keyboard control region 1014 of FIG. 10I is different from keyboard control region 1014 of FIG. 10B because the keyboard control region 1014 is context-specific. That is, the controls displayed in keyboard control region 1014 are included based on the field that text cursor 1018 is currently position within while keyboard control region 1014 is displayed. For example, because text cursor 1018 is displayed within e-mail address text entry region 1006 at FIG. 10B, computer system 600 displays keyboard control region 1014 with one set of controls (e.g., 1014*a*). As illustrated in FIG. 10I, because text cursor 1018 is displayed within message entry region 1012, keyboard control region 1014 includes text format control 1014*f* (e.g., that, when selected, causes computer system 600 to display controls for changing the format of text entered via virtual keyboard 1016), photo control 1014*b* (e.g., that, when selected, causes computer system 600 to display a number of media items that are stored locally saved on computer system 600 or remotely), camera control 1014*c* (e.g., that, when selected, computer system 600 displays a live preview without displaying an insertion control (e.g., the camera user interface described above in relation to FIGS. 6A-6M), files control 1014*d* (e.g., that, when selected, causes computer system to display a plurality of thumbnail representations of documents (e.g., word documents, pdf documents) that are stored locally on computer system 600 or remotely, scan control 1014*e* (e.g., that, when selected, causes computer system to display a user interface that allows a user to perform a scan of a document), and insertion control 1014*e*. In some embodiments, one or more other different controls are displayed as a part of keyboard control region 1014. In some embodiments, keyboard control region 1014 includes a control that, when selected, causes computer system 600 to display additional controls in keyboard control region 1014.

As discussed above, selection of either camera control 1014*c* or insertion control 1014*a* causes computer system 600 to display user interfaces that include a live preview. However, the user interface that is displayed in response to selection of insertion control 1014*a* differs from the user interface that is displayed in response to selection of camera control 1014*c*. The user interface that is displayed in response to selection of insertion control 1014*a* provides a user with the control of inserting text into a text entry region, while the user interface that is displayed in response to selection of camera control 1014*c* does not provide the user with a control to insert text into a text entry region.

Turning back to FIG. 10I, computer system 600 detects tap input 1050*i* that corresponds to selection of a backspace key of virtual keyboard 1016. As illustrated in FIG. 10J, in response to detecting tap input 1050*i*, computer system 600 deletes the text that was previously inserted into message entry region 1012. At FIG. 10J, computer system 600 detects tap input 1050*j* on insertion control 1014*a*. As illustrated in FIG. 10K, in response to detecting tap input 1050*j*, computer system 600 replaces the display of virtual keyboard 1016 with the display of live preview 1030, using one or more similar techniques to those as described above in relation to FIG. 10C. At FIG. 10K, computer system 600 detects swipe input 1050*k* on live preview 1030.

Figure 10L:
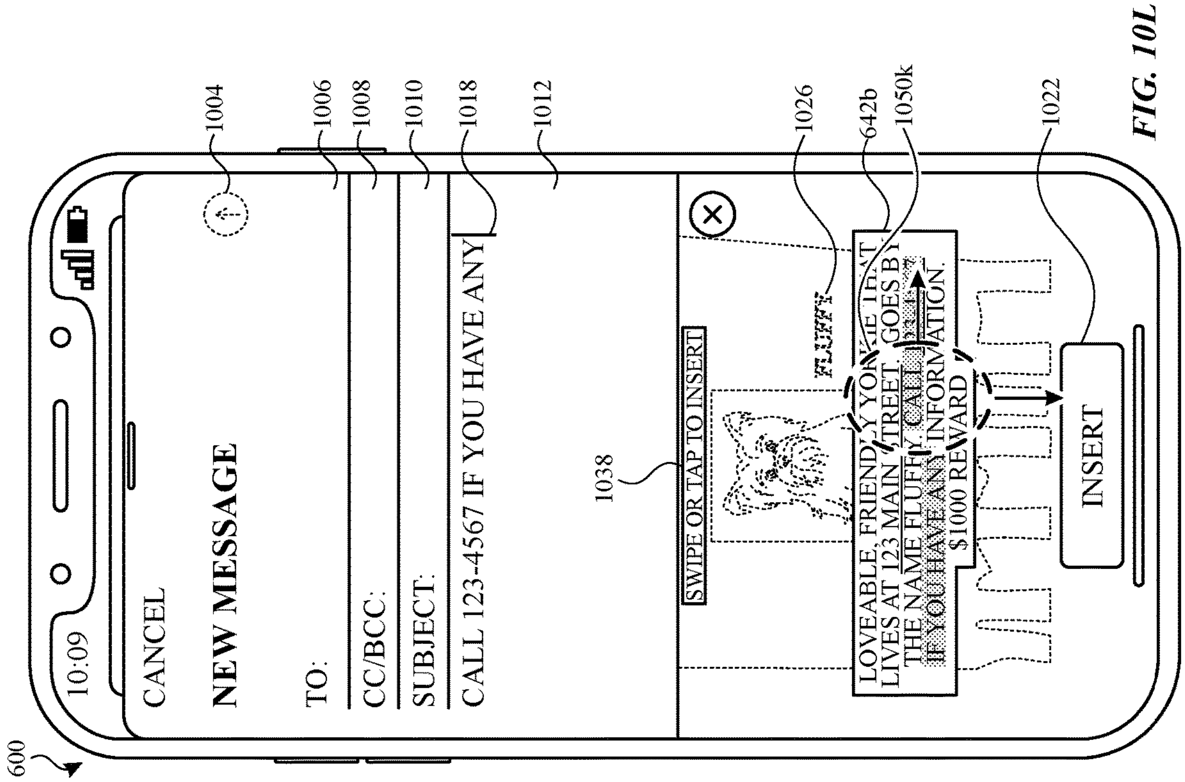
Figure 10K:
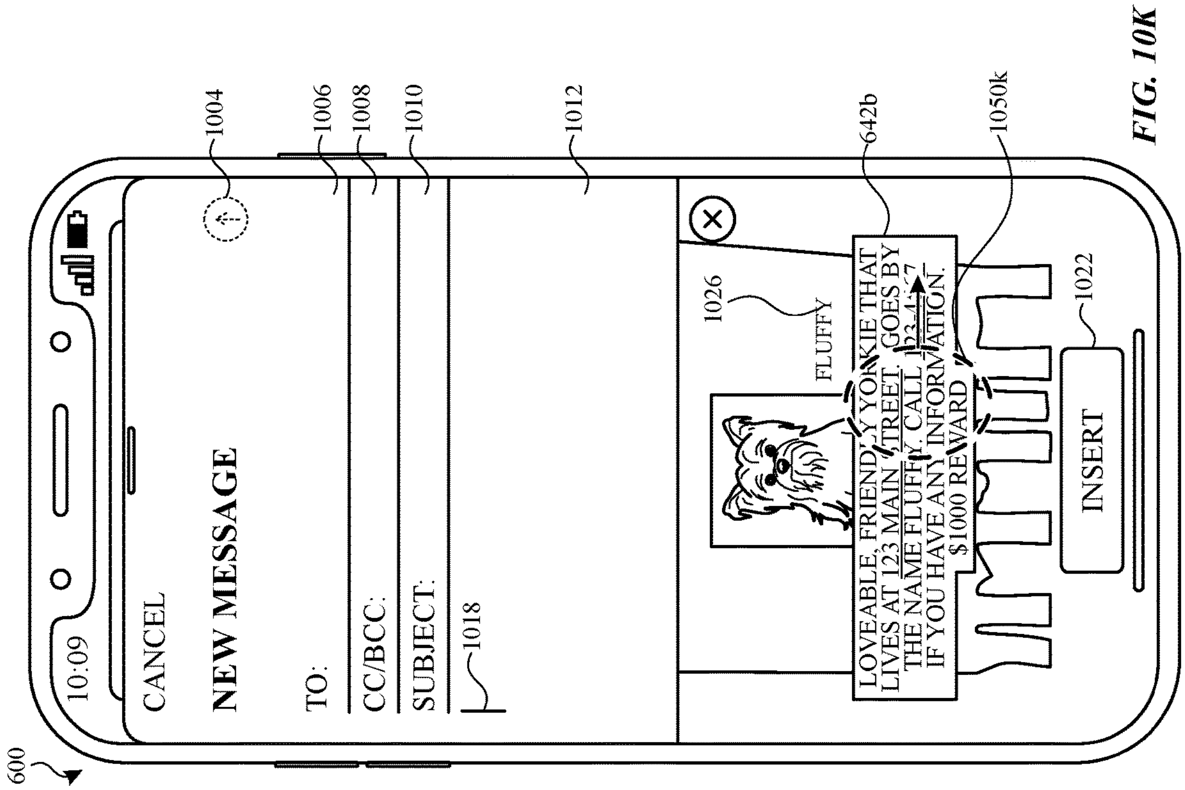

As illustrated in FIG. 10L, in response to detecting swipe input 1050*k*, computer system 600 highlights and/or selects a subset (e.g., "CALL 123-4567 IF YOU HAVE ANY") of text portion 642*b* based on swipe input 1050*k*. In other words, at FIG. 10L, computer system 600 visually emphasizes the subset of text portion 642*b* relative to the other text in text portion 642*b*. As illustrated in FIG. 10L, in response to detecting swipe input 1050*k*, computer system 600 also dims portions of live preview 1030, except for the emphasized subset of text portion 642*b*. As illustrated in FIG. 10L, in response to detecting swipe input 1050*k*, computer system 600 further displays instructions 1038 overlaid on top of live preview 1030 that provide guidance to the user for how to insert text that is included in text portion 642*b* into message entry region 1012.

As illustrated in FIG. 10L, in response to detecting swipe input 1050*k*, computer system 600 automatically (e.g., without additional intervening user input) inserts a preview of the selected text into message entry region 1012. That is, computer system 600 inserts a preview of a respective portion of text included in text portion 642*b* into message entry region 1012 as computer system 600 detects swipe input 1050*k* (e.g., computer system 600 does not insert the entirety of "CALL 123-4567 IF YOU HAVE ANY" at one time; rather, computer system 600 displays an animation of each individual letter of the subset of text being inserted into message entry region 1012 over a period of time). In some embodiments, computer system 600 inserts "CALL 123-4567 IF YOU HAVE ANY" into message entry region 1012, on a word-by-word basis, as swipe input 1050*k* progresses over each word in the above phrase. In some embodiments, after computer system 600 has inserted a preview of the selected text into message entry region 1012, and while the inserted text remains selected, computer system 600 detects a change in the direction of swipe input 1050*k* (e.g., in the opposite direction) and removes one or more of the letters of text that is displayed via the preview of the selected text from message entry region 1012. At FIG. 10L, computer system 600 continues to detect swipe input 1050*k* on live preview 1030.

Figure 10N:
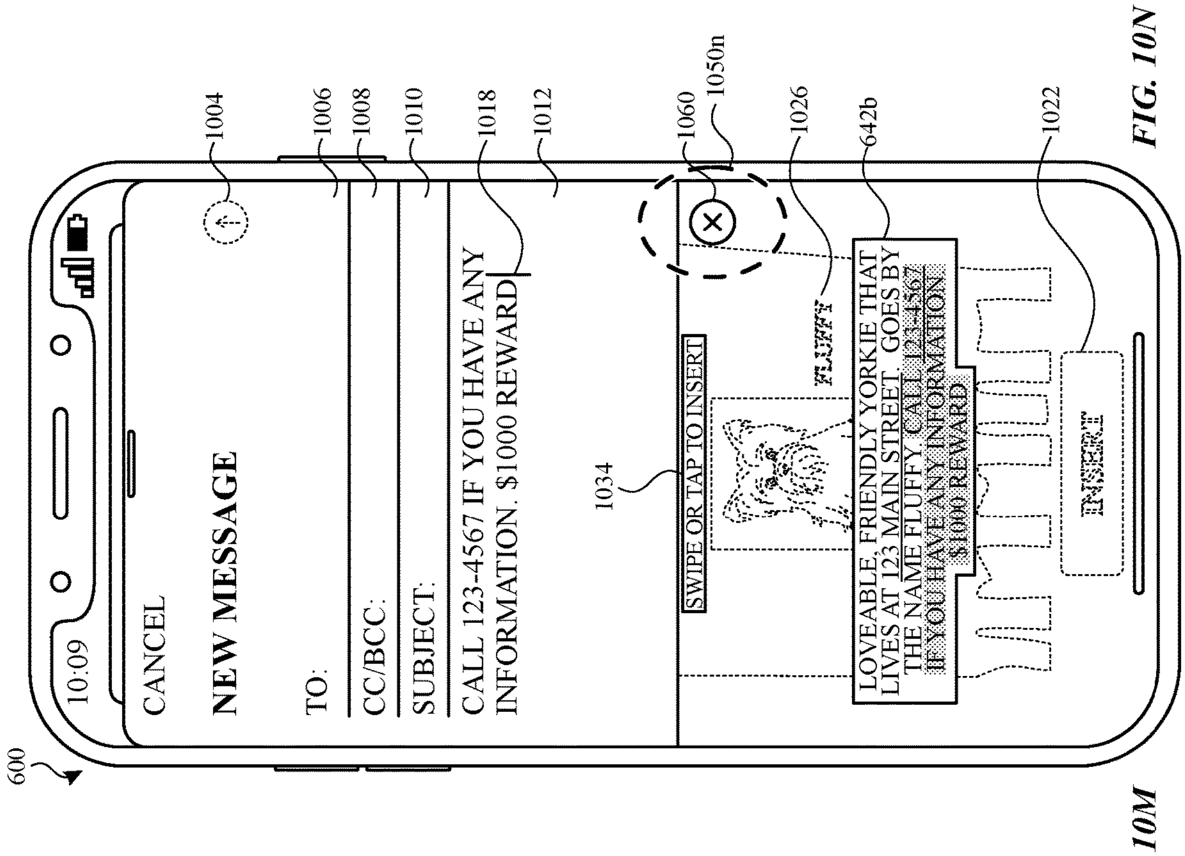
Figure 10M:
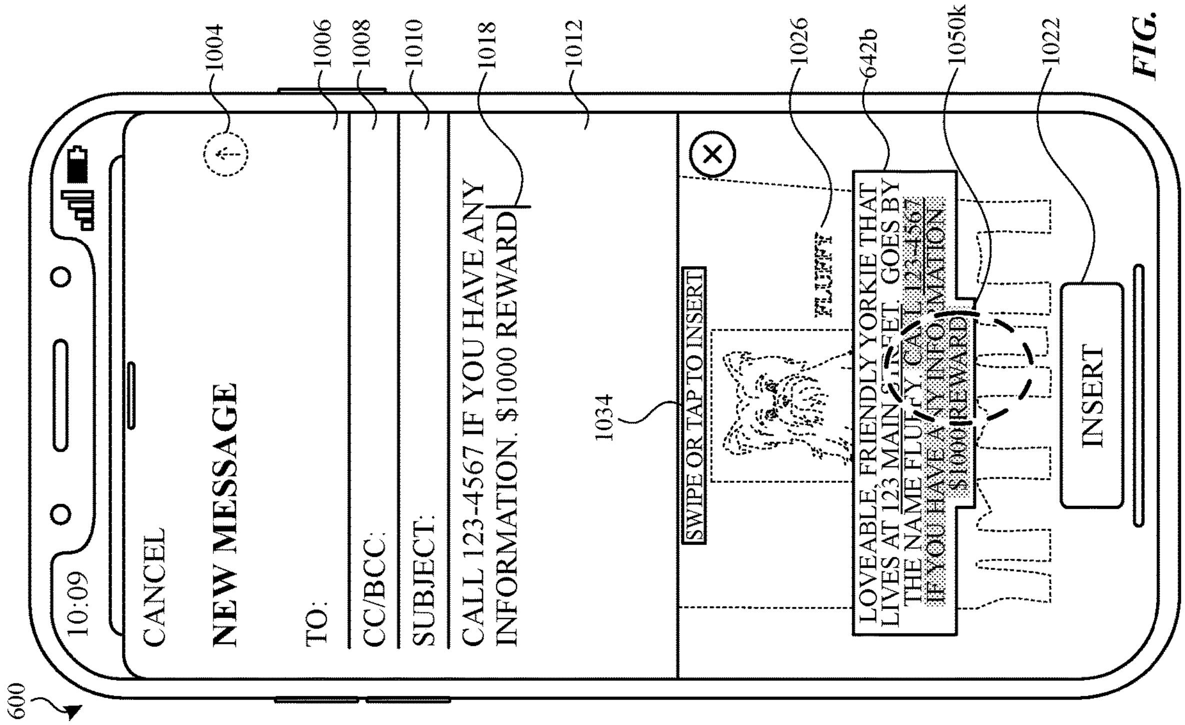

As illustrated in FIG. 10M, in response to detecting swipe input 1050*k*, computer system visually emphasizes (e.g., highlights) the text "INFORMATION. $1000 REWARD" that is included in text portion 642*b*, using one or more techniques to those described above in relation to FIG. 10L. As illustrated in FIG. 10M, computer system 600 has visually emphasized "CALL 123-4567 IF YOU HAVE ANY" AND "INFORMATION. $1000 REWARD" of text portion 642*b*. As illustrated in FIG. 10M, in response to detecting swipe input 1050*k*, computer system 600 inserts a preview of the emphasized subset of text portion 642*b* into message entry region 1012, using one or more techniques as described above in relation to FIG. 10L. At FIG. 10M, computer system 600 detects liftoff of swipe input 1050*k* (e.g., dragging input).

As illustrated in FIG. 10N, in response to detecting liftoff of swipe input 1050*k*, computer system 600 inserts the emphasized subset of text portion 642*b* of FIG. 10M into message entry region 1012, such that one or more other inputs on live preview 1030 would not cause the text inserted into text portion 642*b* to be changed (e.g., excluded from) from message entry region 1012.

As illustrated in FIG. 10N, in response to detecting liftoff of swipe input 1050*k*, computer system 600 dims insertion control 1022 and/or displays insertion control 1022 as not being selectable. In some embodiments, in response to detecting liftoff of swipe input 1050*k*, computer system 600 ceases to display insertion control 1022. In some embodiments, computer system 600 displays insertion control 1022 as being selectable in response to detecting liftoff of swipe input 1050*k*. At FIG. 10N, computer system 600 detects tap input 1050*n* on exit control 1066.

Figure 10P:
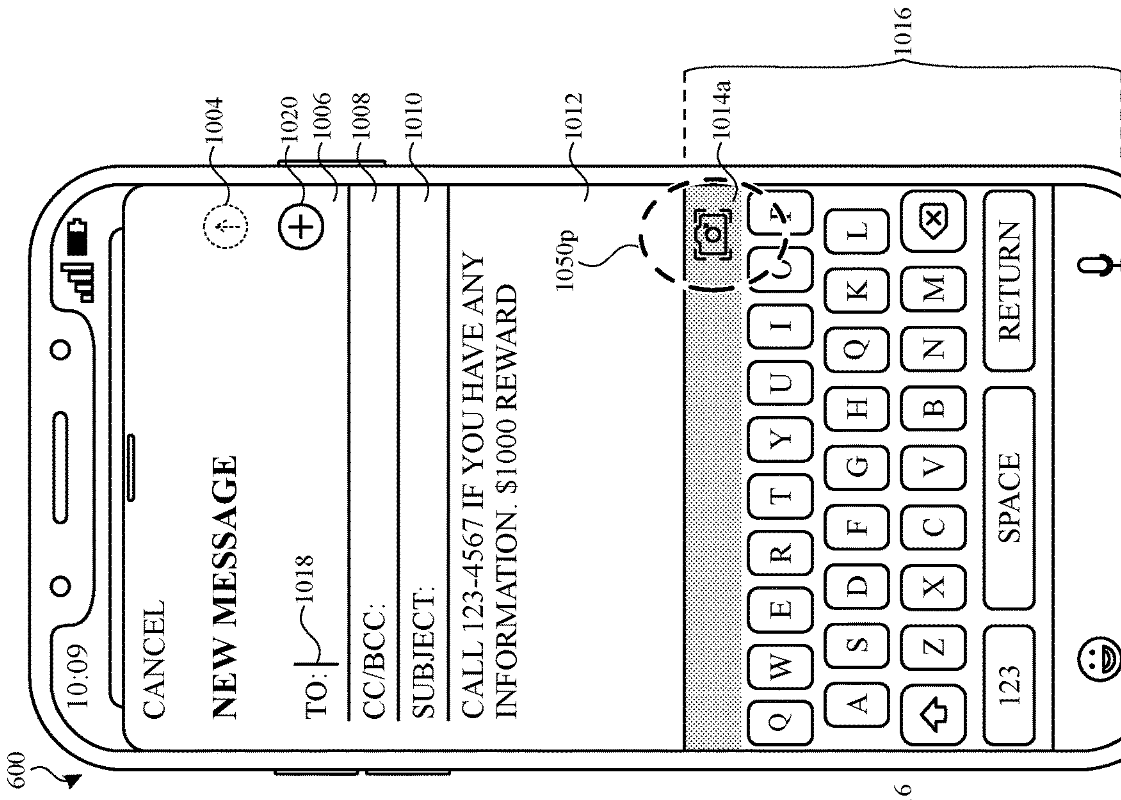
Figure 10O:
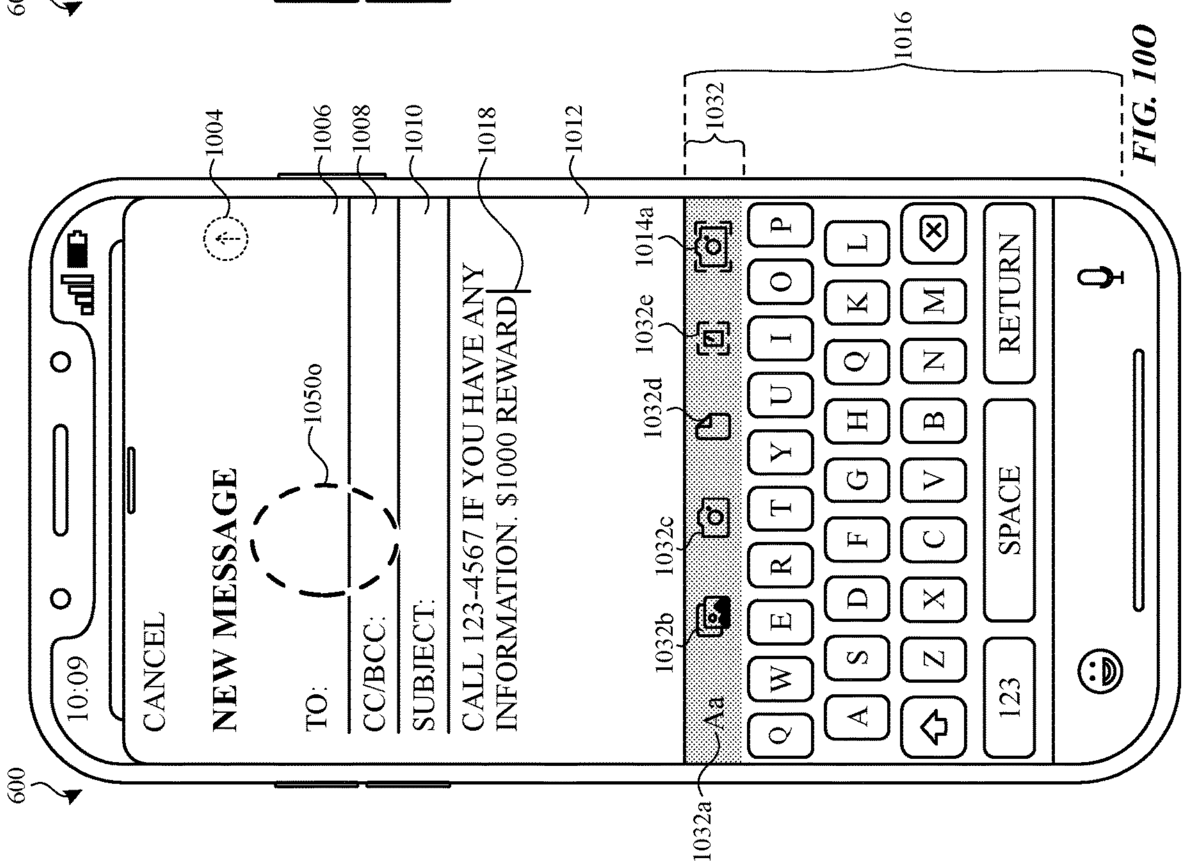

As illustrated in FIG. 10O, in response to detecting tap input 1050*n*, computer system 600 ceases to display live preview 1030 and displays virtual keyboard 1016. At FIG. 10O, computer system 600 detects tap input 1050*o* on e-mail address text entry region 1006.

As illustrated in FIG. 10P, in response to detecting tap input 1050*o*, computer system 600 displays text cursor 1018 within e-mail address text entry region 1006. At FIG. 10P, computer system 600 detects tap input 1050*p* on insertion control 1014*a*.

Figure 10R:
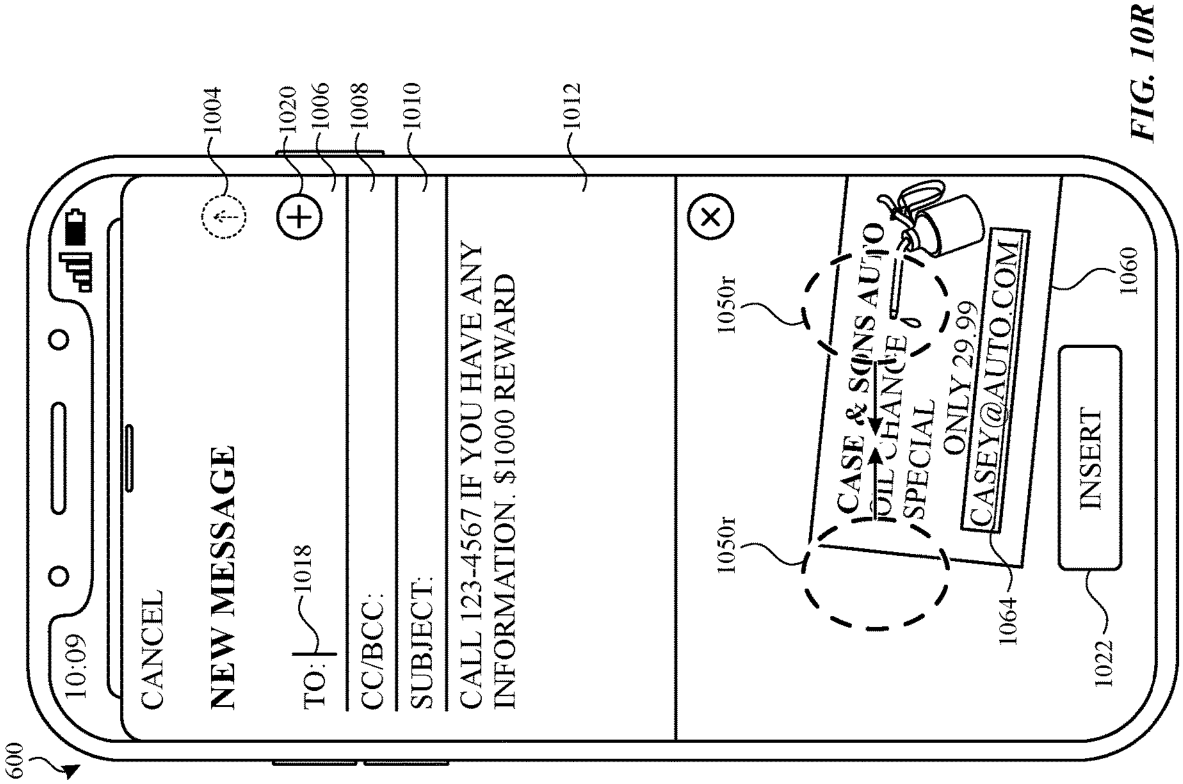
Figure 10Q:
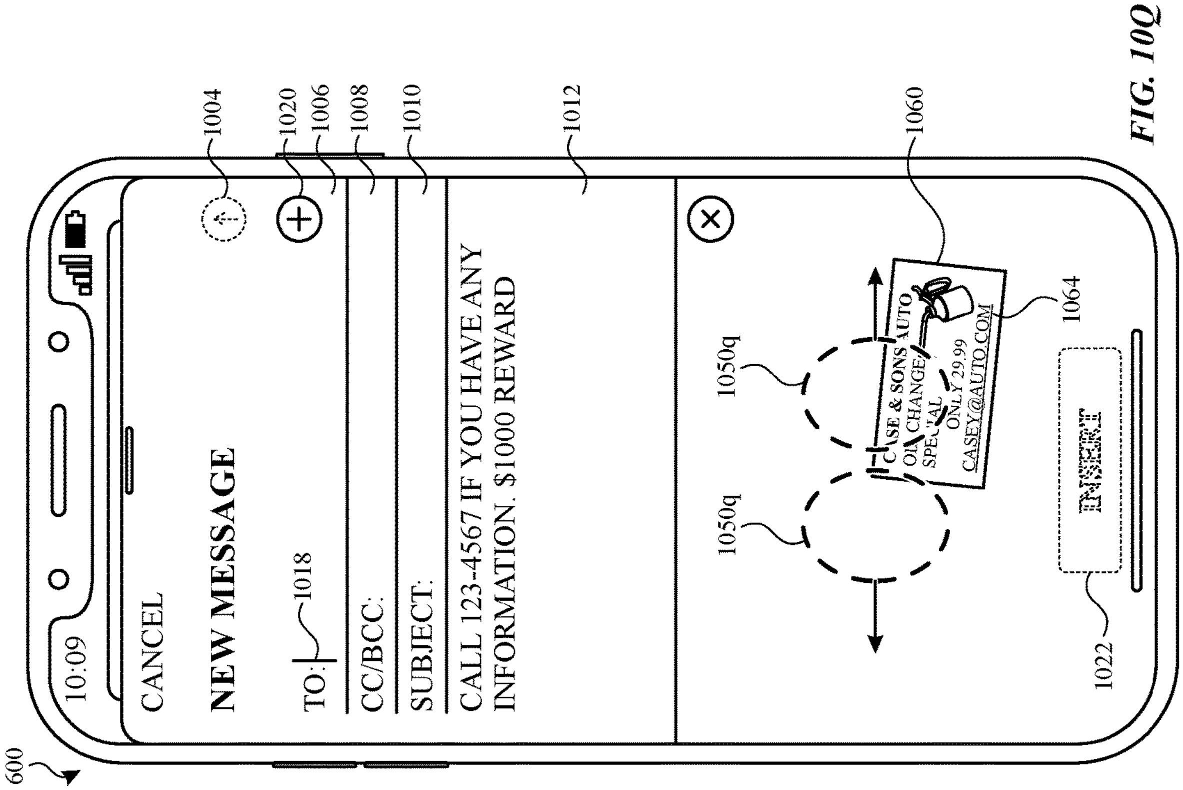

As illustrated in FIG. 10Q, in response to detecting tap input 1050*p*, computer system 600 replaces the display of virtual keyboard 1016 with the display of live preview 1030. Live preview 1030 of FIG. 10Q includes representation of business card 1060. Representation of business card 1060 includes a listing of an e-mail address (e.g., "CASEY@AUTO.COM"). Because representation of business card 1060 includes an e-mail address, computer system 600 displays text type indication 1064 underneath the e-mail address to indicate to a user that an e-mail address has been detected. At FIG. 10Q, a determination is made that the text that is included in representation of business card 1060 does not satisfy a set of text insertion criteria. As illustrated in FIG. 10Q, because a determination is made that none of the text included in representation of business card 1060 does not satisfy a set of text insertion criteria, computer system 600 displays insertion control 1022 with a visual appearance that indicates that the insertion control 1022 is inactive (e.g., not selectable). In some embodiments, none of the text of representation of business card 1060 is selectable (e.g., because the determination is made that the text included in representation of business card 1060 does not satisfy a set of text insertion criteria). In some embodiments, the text of business card 1060 is not selectable and/or does not satisfy a set of text insertion criteria because the displayed text is not above a threshold size (e.g., 14 pt. text) as displayed in live preview 1030. In some embodiments, when it is determined that no text in representation of business card 1060 satisfies one or more criteria, computer system 600 does not display insertion control 1022. At FIG. 10Q, computer system 600 detects de-pinch input 1050*q* on live preview 1030.

As illustrated in FIG. 10R, in response to detecting de-pinch input 1050*q*, computer system 600 increases the zoom level of live preview 1030, which increases the size of business card 1060. At FIG. 10R, computer system 600 makes a determination that the e-mail address that is included in representation of business card 1060 satisfies the set of text insertion criteria and a set of visual prominence criteria. Because a determination is made that the e-mail address included in representation of business card 1060 satisfies the visual prominence criteria, computer system 600 visually emphasizes the e-mail address (e.g., computer system 600 displays the e-mail address with a box around it, as highlighted, or with brackets surrounding the e-mail address). As illustrated in FIG. 10R, text cursor 1018 is displayed within e-mail address text entry region 1006 that is associated with e-mail addresses. At FIG. 10R, a determination is made that the e-mail address included in representation of business card 1060 satisfies the set of visual prominence criteria and/or the set of text insertion criteria because business card 1060 includes an e-mail (CASEY@AUTO.COM) and the text of the e-mail is above a threshold size. As illustrated in FIG. 10R, because the determination is made that the set of text insertion criteria are met. Accordingly, computer system 600 displays insertion control 1022 with a visual appearance (e.g., no blurring and/or dimming) that indicates to the user that insertion control 1022 is selectable. At FIG. 10R, computer system 600 detects pinch input 1050*r* in live preview 1030.

Figure 10T:
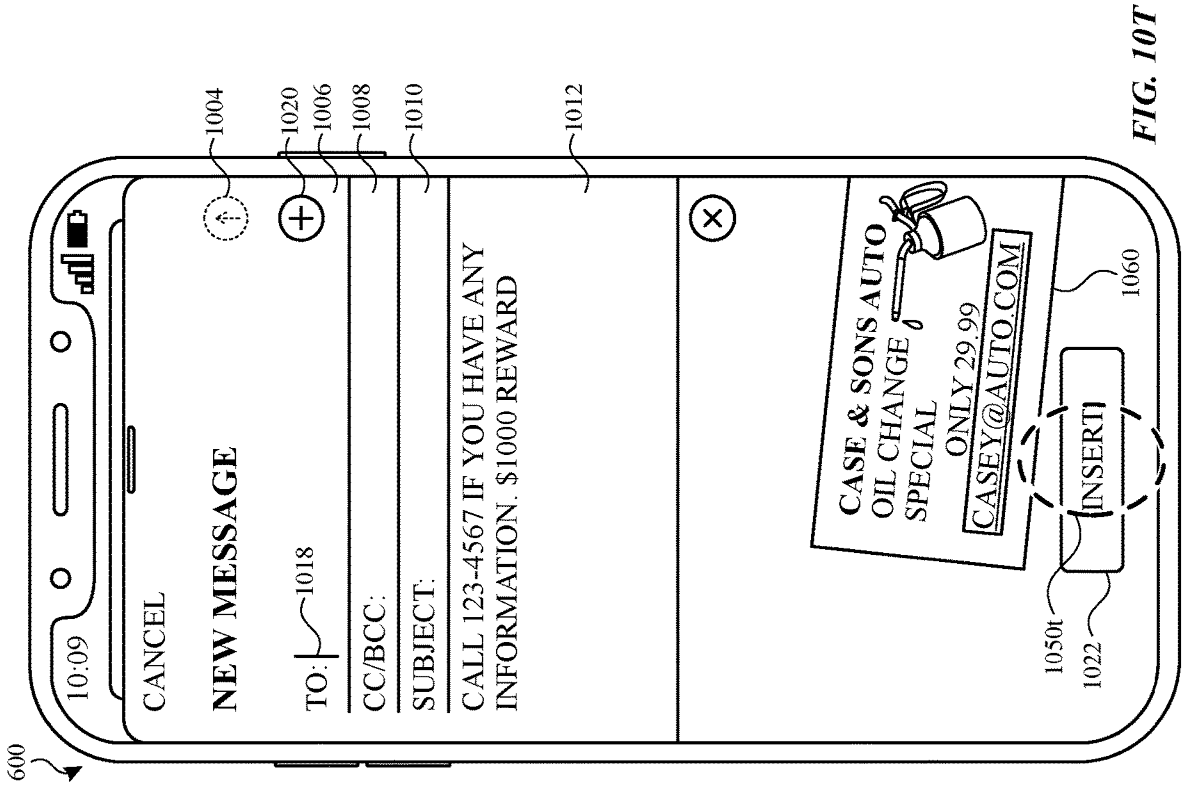
Figure 10S:
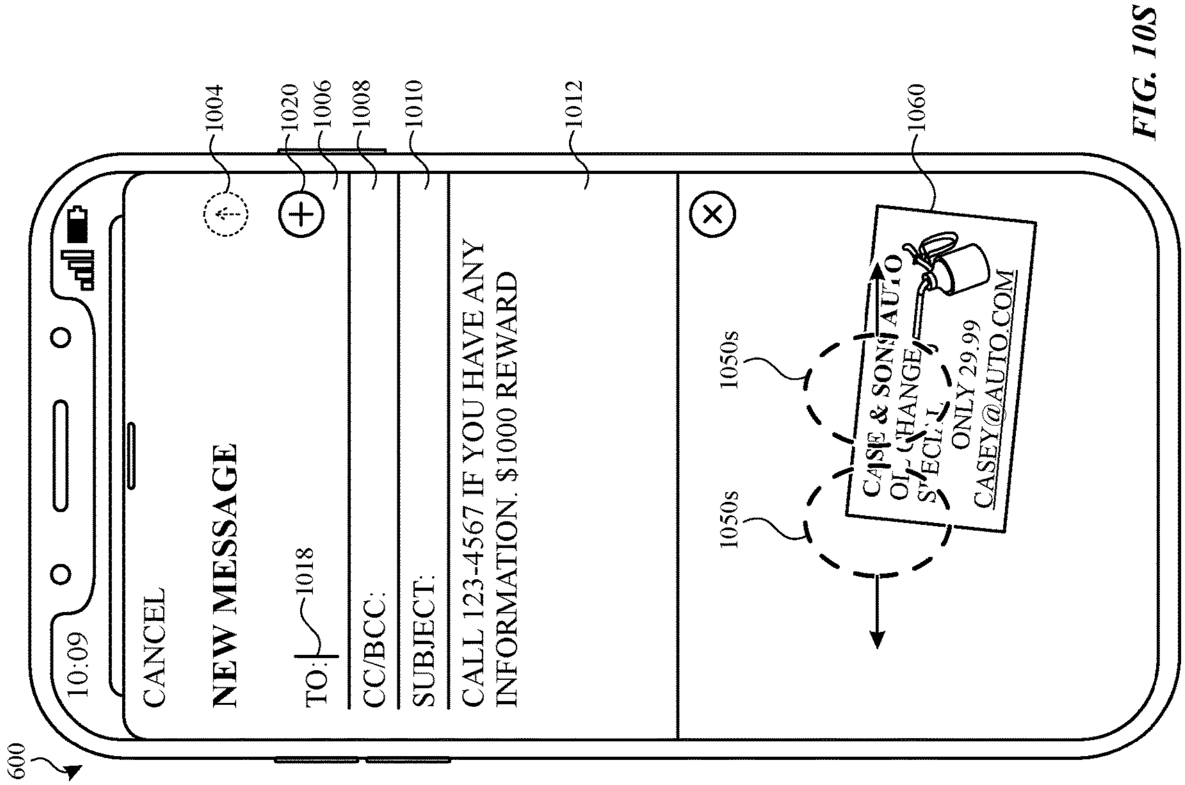

As illustrated in FIG. 10S, in response to detecting pinch input 1050*r*, computer system 600 zooms live preview 1030, such that representation of business card 1060 is displayed with an increased size. As illustrated in FIG. 10S, a determination is made that the text that is included in representation of business card 1060 does not satisfy the set of prominence criteria. As illustrated in FIG. 10S, computer system 600 does not display insertion control 1022 because the text that is included in representation of business card 1060 does not satisfy the set of prominence criteria. At FIG. 10S, computer system 600 detects de-pinch input 1050*s* on live preview 1030.

As illustrated in FIG. 10T, in response to detecting de-pinch input 1050*s*, computer system 600 updates the display of representation of business card 1060 in live preview 1030 to reflect a change in zoom level, such that representation of business card 1060 is displayed at an increased zoom level in comparison to the display of representation of business card 1060 in FIG. 10S. At FIG. 10T, a determination is made that the e-mail address included in representation of business card 1060 satisfies one or more criteria (e.g., a set of text insertion criteria and/or a set of visual prominence criteria) and representation of business card 1060 includes text in the form of an e-mail. Accordingly, computer system 600 displays insertion control 1022 with a visual appearance (e.g., no blurring and/or dimming) that indicates to the user that insertion control 1022 is selectable. At FIG. 10T, computer system detects tap input 1050*t* that corresponds to a selection of insertion control 1022.

Figure 10V:
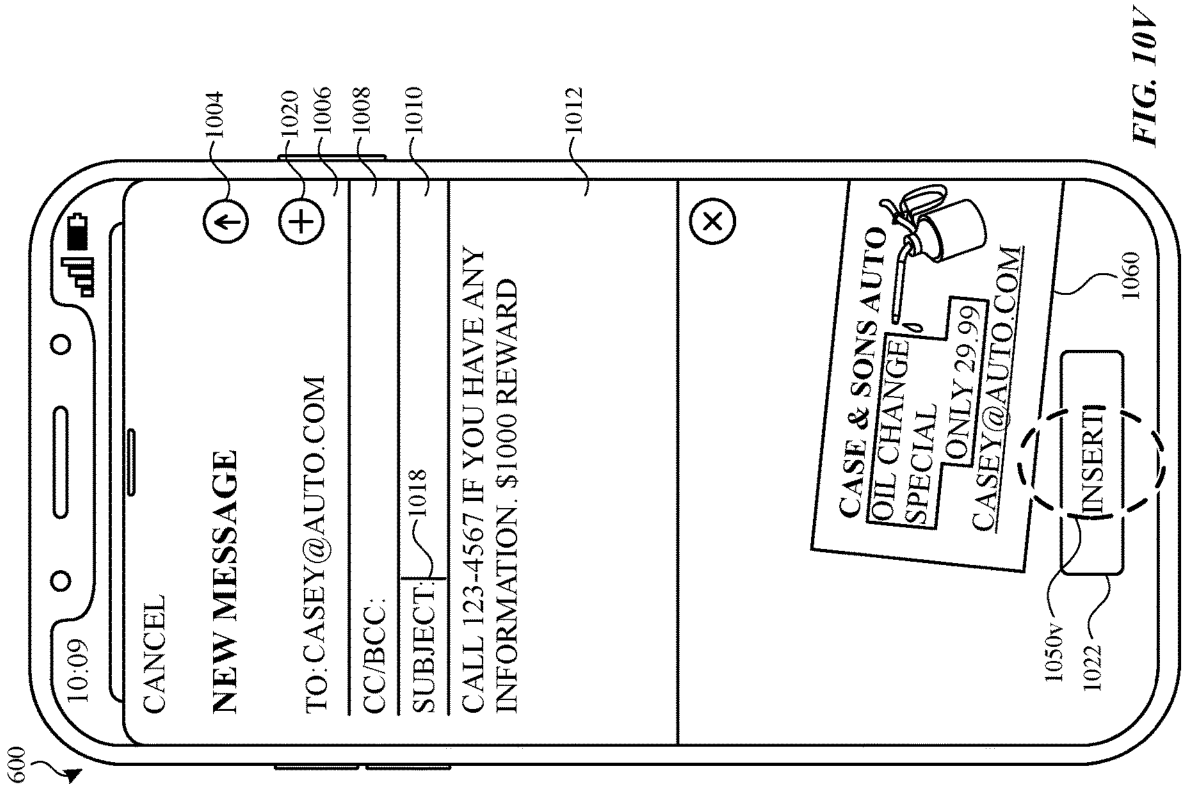
Figure 10U:
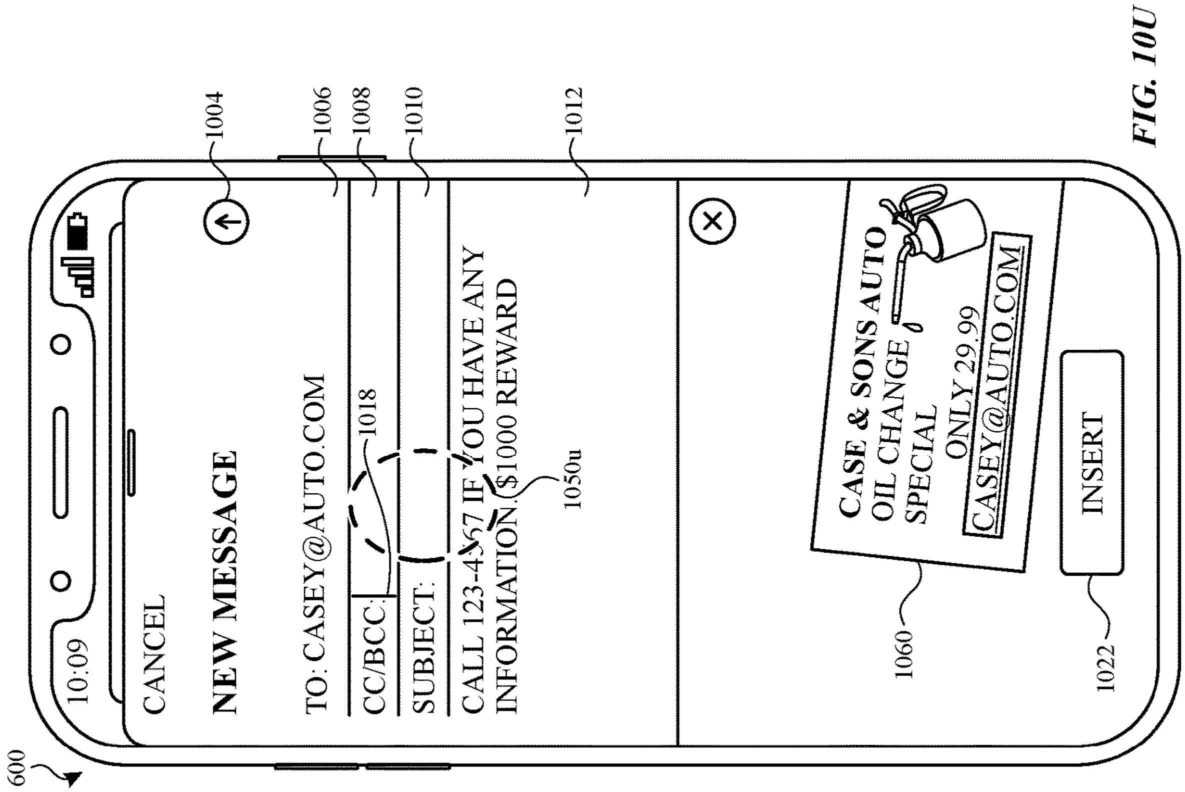

As illustrated in FIG. 10U, in response to detecting tap input 1050*t*, computer system 600 inserts the e-mail address that is included in representation of business card 1060 into e-mail address text entry region 1006. In response to detecting tap input 1050*t*, computer system 600 moves display of text cursor 1018 e-mail address text entry region 1006 to supplemental e-mail address text entry region 1008. In some embodiments, in response to detecting tap input 1050*t*, computer system 600 maintains display of text cursor 1018 in e-mail address text entry region 1006.

As illustrated in FIG. 10U, computer system 600 maintains display of insertion control 1022 as activated (e.g., as selectable) because supplemental e-mail address text entry region 1008 is associated with e-mail addresses and representation of business card 1060 includes text in the form of an e-mail address that satisfies the set of one or more criteria (e.g., as indicated by the visual emphasis that surrounds the e-mail address in representation of business card 1060). In some embodiments, computer system 600 displays insertion control 1022 as inactive in response to detecting tap input 1050*t*. At FIG. 10U, computer system 600 detects tap input 1050*u* that corresponds to selection of subject text entry region 1010.

As illustrated in FIG. 10V, in response to detecting tap input 1050*u*, computer system 600 displays text cursor 1018 within subject text entry region 1010. Subject text entry region 1010 is associated with a certain type of text (e.g., text types that are used to provide brief descriptions of e-mail messages). At FIG. 10V, a determination is made that a phase, "OIL CHANGE SPECIAL ONLY 29.99" (e.g., displayed on business card 1060), constitutes the type of text that is associated with subject text entry region 1010 and, thus, satisfies a set of visual prominence criteria. As illustrated in FIG. 10V, because the phrase satisfies the set of visual prominence criteria, computer system 600 visually emphasizes the phrase (e.g., "OIL CHANGE SPECIAL ONLY 29.99").

Notably, at FIG. 10V, a determination is made that the e-mail address that is included in representation of business card 1060 does not constitute that text type that is associated with subject text entry region 1010 and, thus, does not satisfy the set of visual prominence criteria. Thus, because the e-mail address does not satisfy the set of visual prominence criteria at FIG. 10V, the e-mail address is not visually emphasized in FIG. 10V. At FIG. 10V, computer system 600 detects tap input 1050*v* that corresponds to selection of insertion control 1022.

Figure 10X:
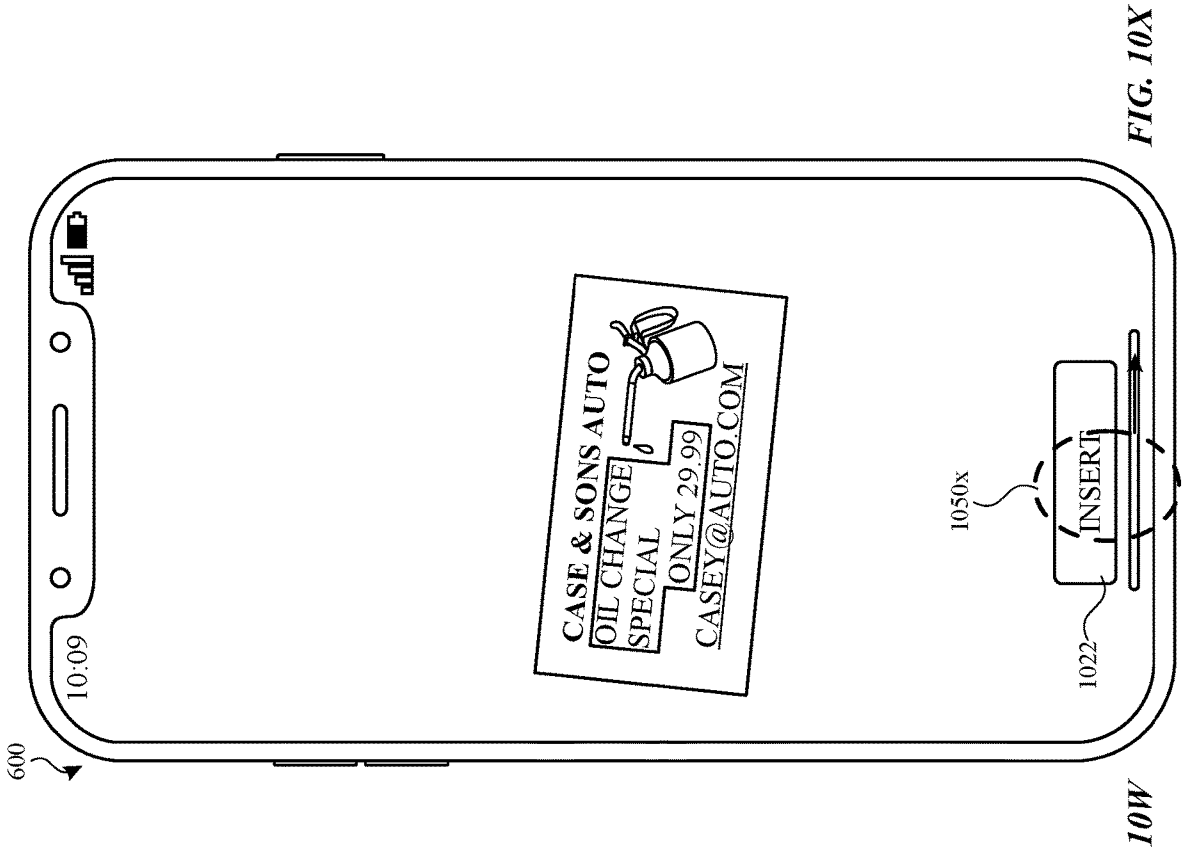
Figure 10W:
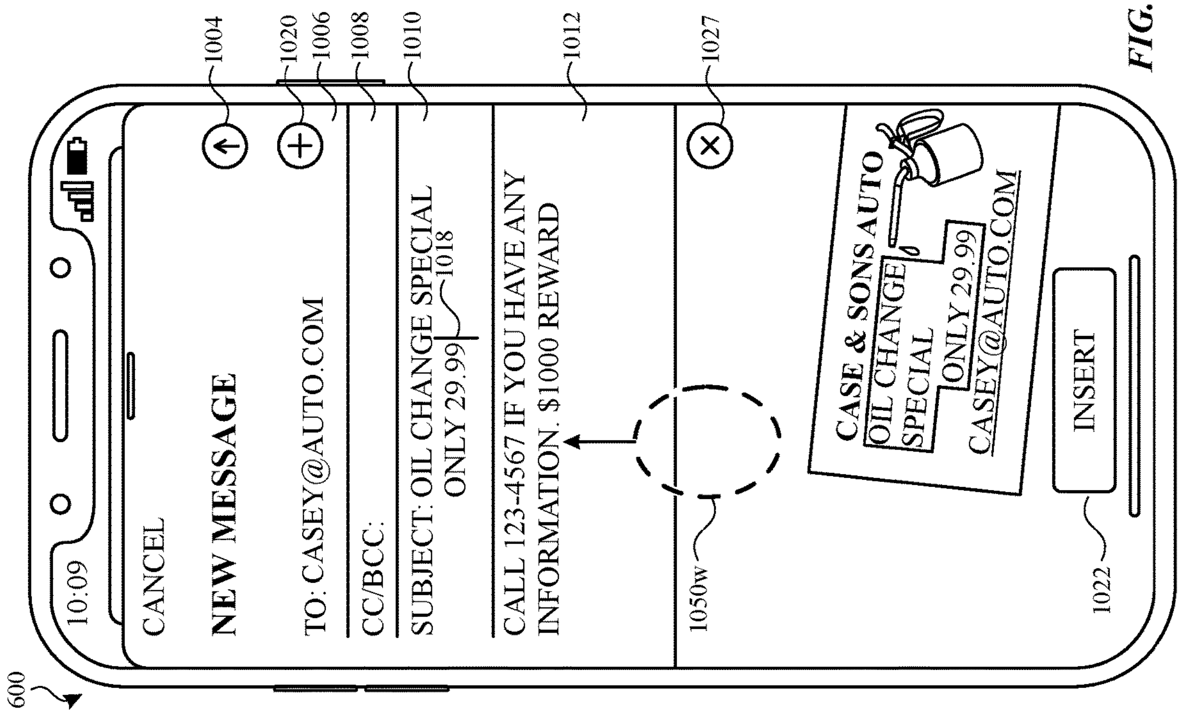

As illustrated at FIG. 10W, in response to detecting tap input 1050*v*, computer system 600 inserts the phrase (e.g., "OIL CHANGE SPECIAL ONLY 29.99") into subject text entry region 1010 based on a determination that the phrase satisfies a set of visual prominence criteria. While computer system 600 maintains displaying with visual emphases after detecting tap input 1050*v*, computer system 600 continues to display insertion control 1022 as active because a determination is made the set of text insertion criteria is satisfied. In some embodiments, while computer system 600 maintains displaying with visual emphases after detecting tap input 1050*v*, computer system 600 displays insertion control 1022 as inactive (e.g., greyed out, blurred out) because computer system 600 has already inserted the phrase "OIL CHANGE SPECIAL ONLY 29.99" and, thus, the set of text insertion criteria is not satisfied in FIG. 10W. At FIG. 10W, computer system 600 detects upward swipe input 1050*w* on a boundary between live preview 1030 and message entry region 1012.

As illustrated in FIG. 10X, in response to detecting upward swipe input 1050*w*, computer system 600 expands the display of live preview 1030, such that computer system 600 no longer displays e-mail user interface 1002. Although e-mail user interface 1002 ceases to be displayed, computer system 600 maintains display of insertion control 1022 as active based on the one or more determinations discussed with reference to FIG. 10W. In some embodiments, computer system 600 displays an animation of live preview 1030 sliding up and replacing portions of e-mail user interface 1002. In some embodiments, a portion of e-mail user interface 1002 is displayed after live preview 1030 has been expanded. In some embodiments, at FIG. 10X, computer system 600 displays insertion control 1022 with a visual appearance that indicates that insertion control 1022 is inactive while computer system 600 displays the expanded version of live preview 1030. In some embodiments, while computer system 600 displays the expanded version of live preview 1030 and in response to detecting an input that corresponds to selection of insertion control 1022, computer system 600 can insert text (e.g., text that computer system 600 displays as visually emphasized) that is included in live preview 1030 into a text entry region (e.g., that is included in a user interface that is displayed immediately prior to the display of the expanded version of live preview 1030) that contains text cursor 1018 (e.g., using one or more techniques discussed above in relation to FIGS. 10A-10X).

While FIGS. 10A-10X are described above in relation to computer system 600 detecting and inserting text in the FOV (e.g., live preview 1030). In some embodiments, computer system 600 detects and inserts text in a representation of previously displayed media, using one or more similar techniques as discussed above in relation to FIGS. 10A-10X.

Figures 10Y, 10Z:
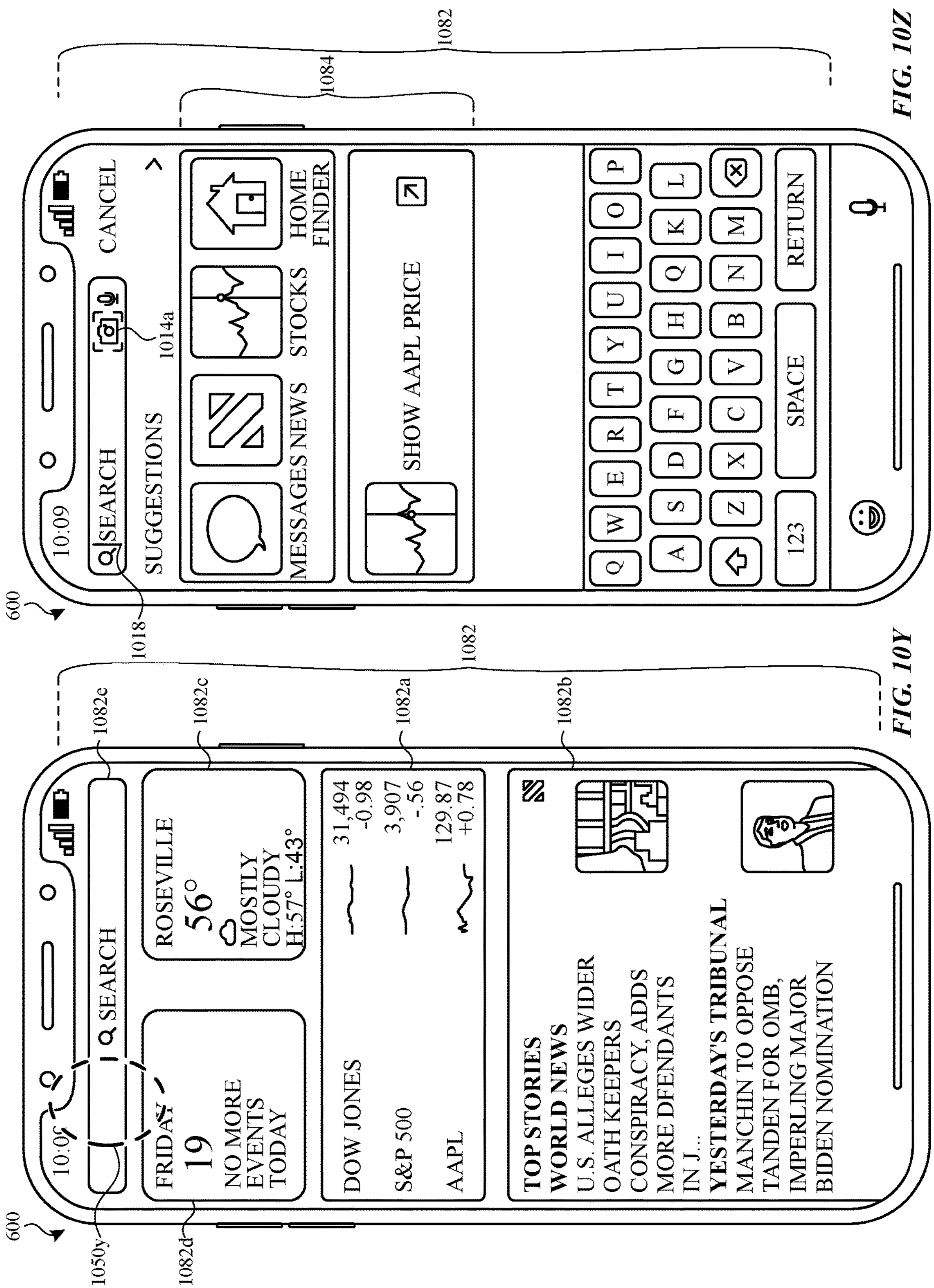
Figure 10A:
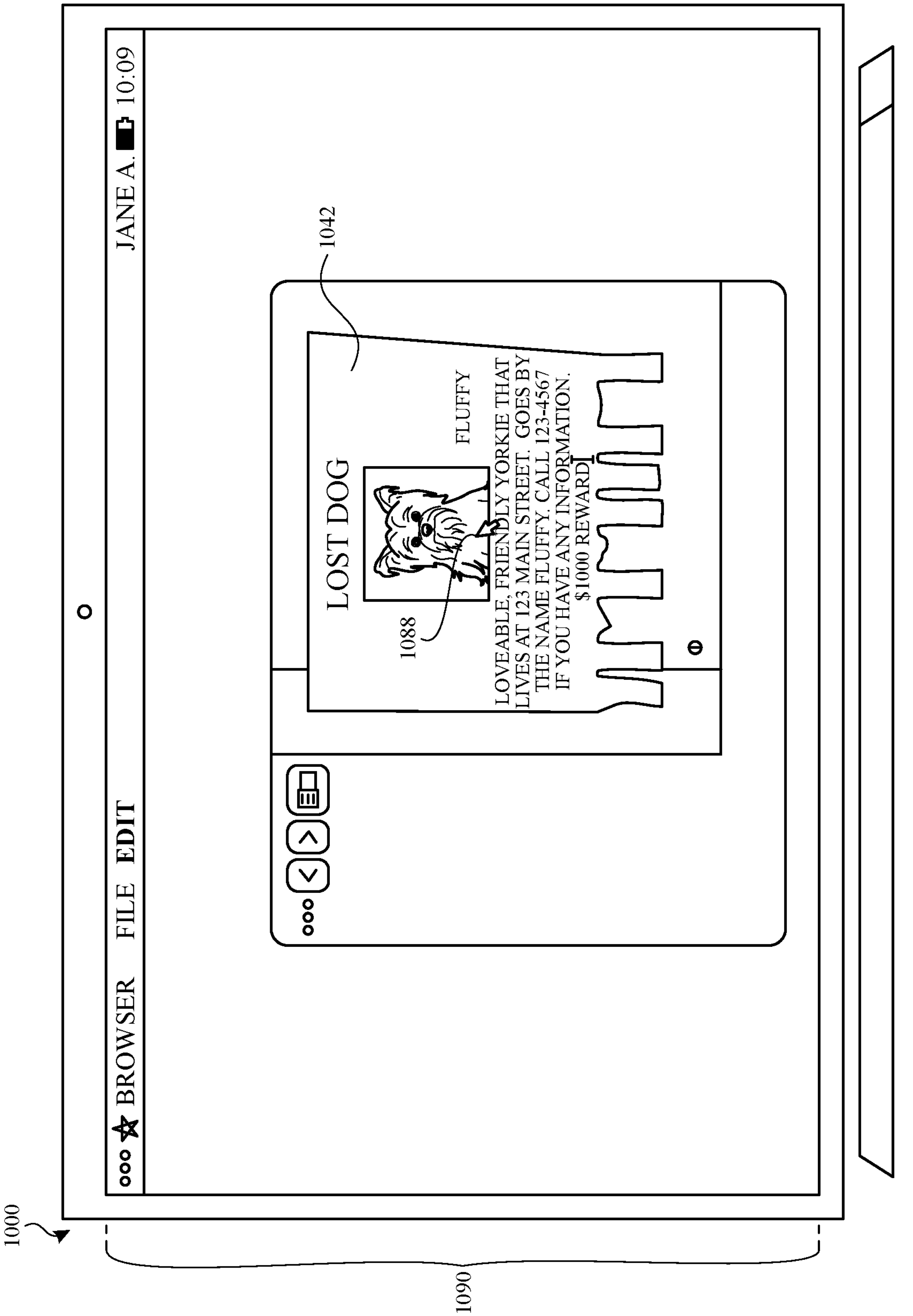
Figure 10A:
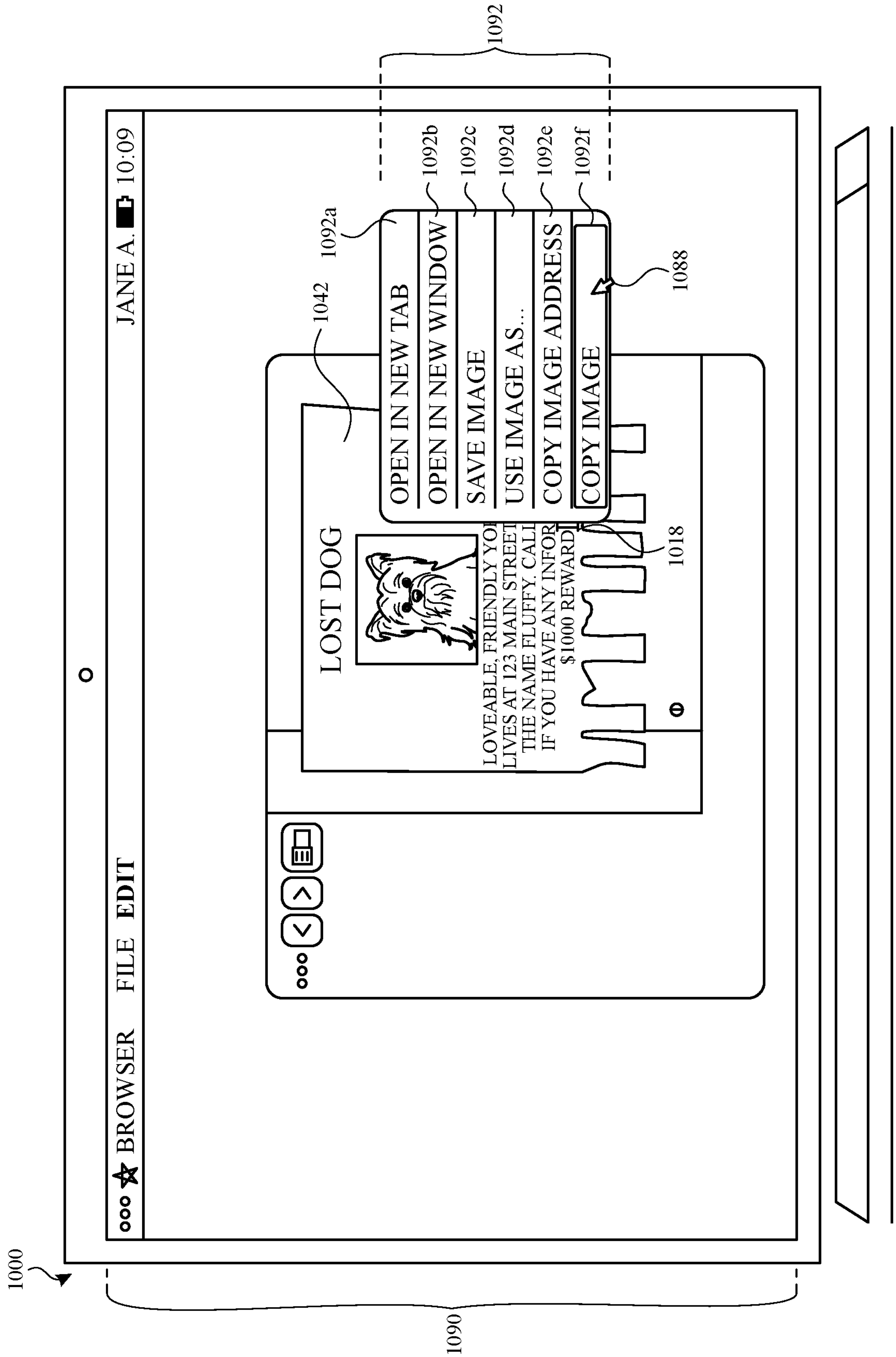
Figure 10A:
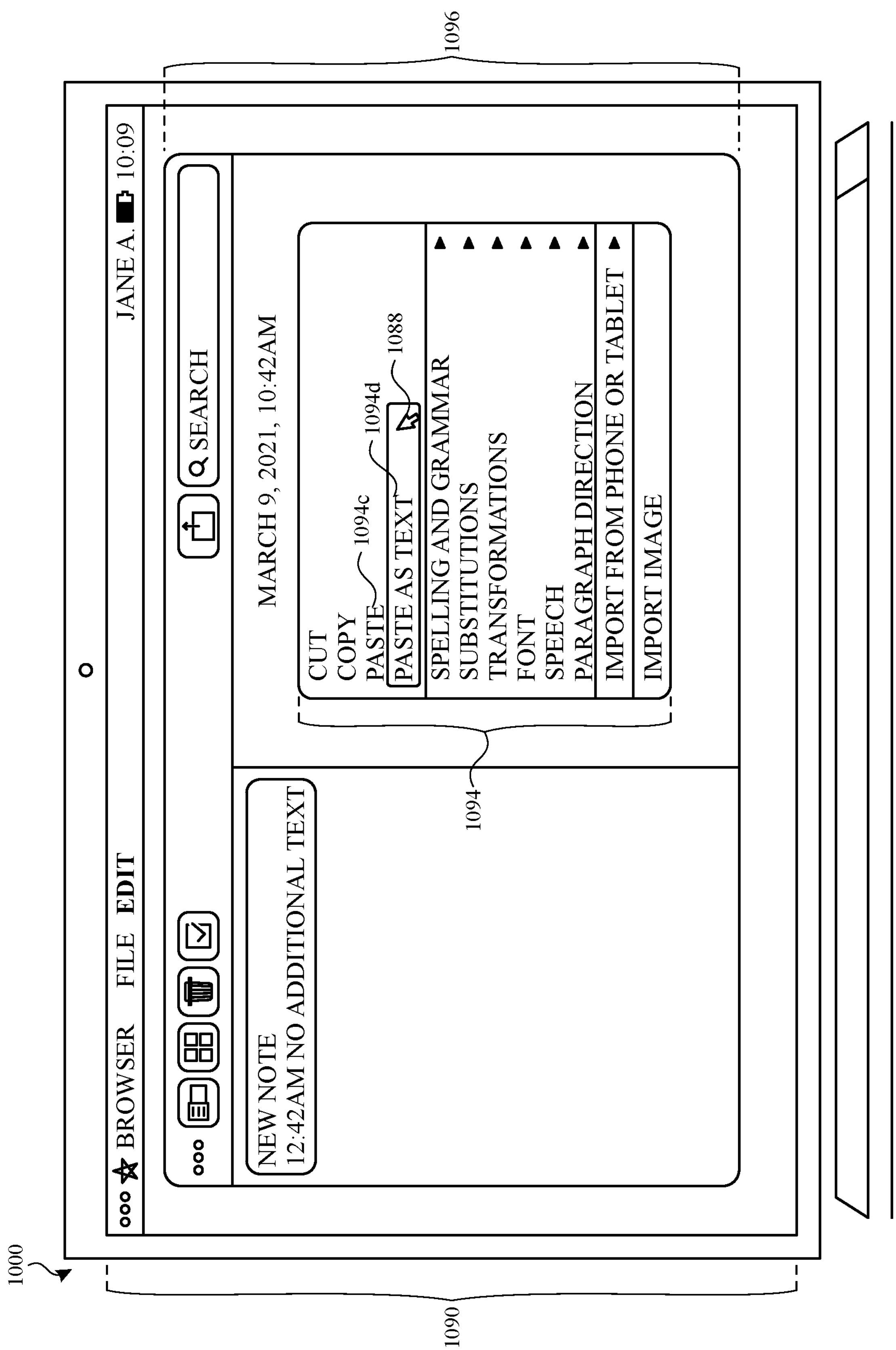
Figure 10A:
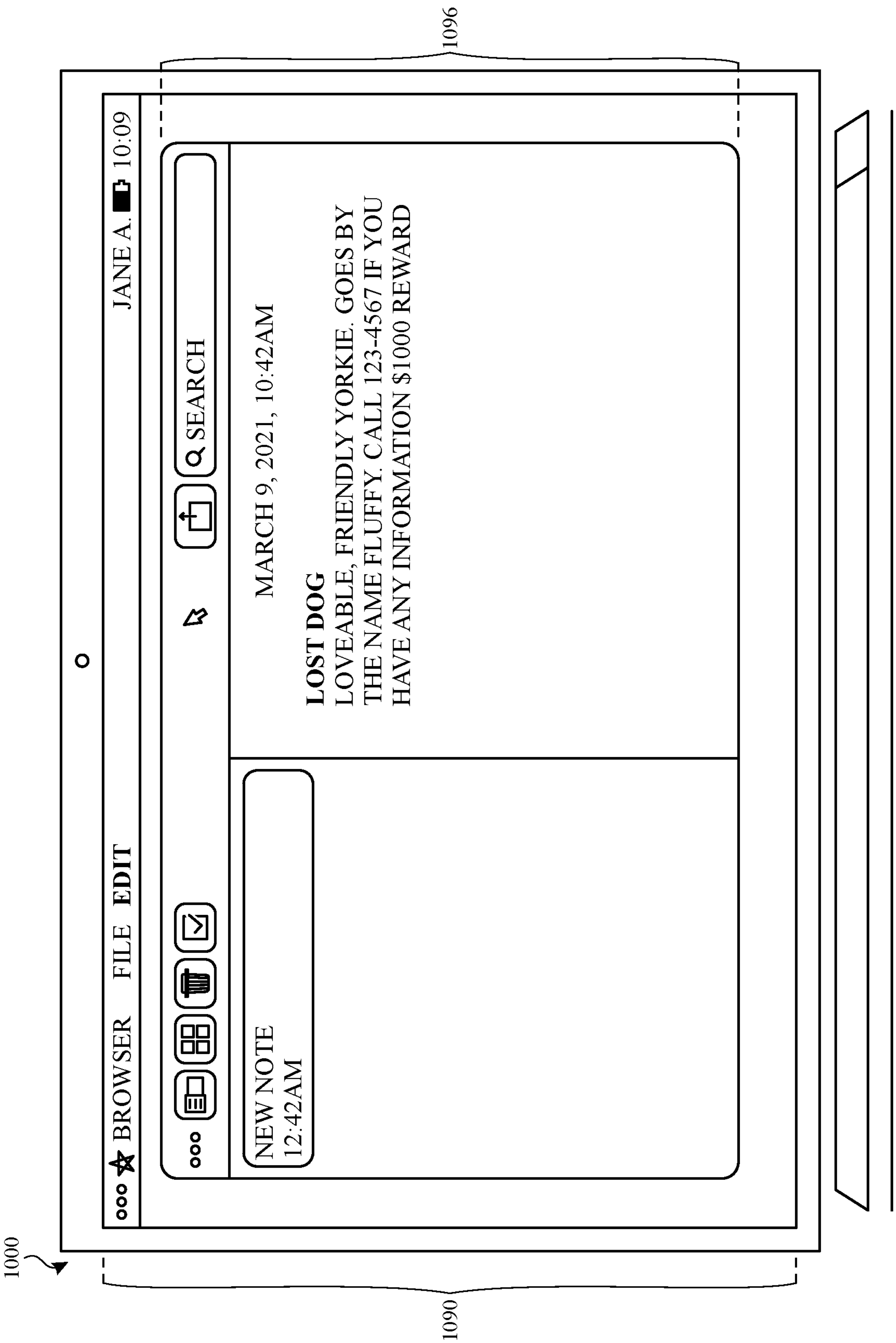

FIGS. 10Y-10Z illustrate an exemplary embodiment where a search user interface is displayed to show that an insertion control can be displayed on user interface objects that are different from the virtual keyboard. As illustrated in FIG. 10Y, search user interface 1082 includes stock widget 1082*a* (e.g., that includes real-time stock information), news widget 1082*b* (e.g., that includes news headlines), weather widget 1082*c* (e.g., that includes weather information for a particular location), calendar widget 1082*d* (e.g., that includes information regarding event), and search text entry region 1082*e*. At FIG. 10Y, computer system 600 detects tap input 1050*y* in search text entry region 1082*e*.

At illustrated in FIG. 10Z, in response to detecting tap input 1050*y*, computer system 600 updates display of search user interface 1082 to include text cursor 1018 and insertion control 1014*a* within search text entry region 1082*e*. Further, computer system 600 updates search user interface 1082, such that virtual keyboard 1016 and suggestion banner 1084 are displayed and ceases to display stock widget 1082*a*, news widget 1082*b*, weather widget 1082*c*, calendar widget 1082*d*. As described above in relation to FIGS. 10B and 10C, selection of insertion control 1014*a* of FIG. 10Z causes computer system 600 to replace the display of virtual keyboard 1016 with a camera user interface that includes a live preview and an insertion affordance. Further, computer system 600 can insert text that is detected in live preview into search text entry region 1082*e* of FIG. 10Z, using one or more techniques as discussed above in relation to FIGS. 10A-10X.

FIGS. 10AA-10AD illustrates an exemplary embodiment, where computer system 1000 (e.g., a desktop computer) utilizes one or more techniques that are similar to those discussed above in relation to FIGS. 10A-10X to insert text. As illustrated in FIG. 10AA, computer system 1000 displays internet browser user interface 1090. Internet browser user interface 1090 includes a representation of sign 1042 that includes text portion 642*b* and text portion 1026. At FIG. 10AA, the representation of sign 1042 is a previously captured image and is not a live preview. In some embodiments, the representation of sign 1042 is a live preview of the field-of-view of one or more cameras of computer system 1000.

As illustrated in FIG. 10AA, computer system 1000 displays mouse indicator 1088 overlaid on top of the representation of sign 1042. As illustrated in FIG. 10AA, computer system 1000 displays mouse cursor as a pointer. At FIG. 10AA, computer system 1000 detects a mouse click on text portion 642*b*.

As illustrated in FIG. 10AB, in response to detecting the mouse click on text portion 642*b*, computer system 1000 displays control menu 1092. Control menu 1092 includes open in new tab control 1092*a*, open in new window control 1092*b*, save image control 1092*c*, use image as control 1092*d*, copy image address control 1092*e* and copy image control 1092*f*. At FIG. 10AB, computer system 1000 detects mouse click on copy image control 1092*f*.

At FIG. 10AB, in response to detecting the mouse click that corresponds to selection of text portion 642*b*, computer system 1000 copies the representation of sign 1042 into a text buffer.

As illustrated in FIG. 10AC, computer system 1000 displays word processer user interface 1096 overlaid on top of internet browser user interface 1090. Word processor user interface 1096 includes control menu 1094. Control menu 1094 includes a variety of controls that can be selected to interact with an application (e.g., word processor user interface 1096), such as paste control 1094*c* and paste-as-text control 1094*d*. In some embodiments, while computer system 1000 displays control menu 1094, computer system 1000 also displays insertion control 1014*a* while displaying control menu 1094. At FIG. 10AC, computer system 1000 detects a mouse click on paste-as-text control 1094*d*.

As illustrated in FIG. 10AD, in response to detecting the mouse click on paste-as-text control 1094*d*, computer system 1000 the text from sign 1042 of FIGS. 10AA-10AB into word processor user interface 1096. Notably, at FIG. 10AD, an image of the representation of sign 1042 of FIGS. 10AA-10AB is not inserted in response to detecting the mouse click on paste-as-text control 1094*d*. In some embodiments, in response to detecting the mouse click on paste control 1094*c*, computer system 1000 inserts an image of the representation that includes sign 1042 (as shown in FIG. 10AA-10AB). Thus, in some embodiments, a selection of paste control 1094*c* and a selection of paste-as-text control 1094*d* causes computer system 600 to perform two different operations (e.g., paste an image, paste text from an image). In some embodiments, when the image is pasted, computer system 600 can use one or more techniques as discussed above in relation to FIGS. 6A-6M and 7A-7L to interact with the image.

FIG. 11 is a flow diagram illustrating a method for inserting visual content in media in accordance with some embodiments. Method 1100 is performed at a computer system (e.g., 100, 300, 500, and/or 600) that is in communication with one or more cameras, one or more input devices, and a display generation component. Some operations in method 1100 are, optionally, combined, the orders of some operations are, optionally, changed, and some operations are, optionally, omitted.

As described below, method 1100 provides an intuitive way for inserting visual content in media. The method reduces the cognitive burden on a user for inserting visual content in media, thereby creating a more efficient human-machine interface. For battery-operated computing devices, enabling a user to insert visual content in media faster and more efficiently conserves power and increases the time between battery charges.

A computer system (e.g., 600) (e.g., a smartphone, a desktop computer, a laptop, a tablet) that is in communication with one or more cameras (e.g., one or more cameras (e.g., dual cameras, triple camera, quad cameras, etc.) on the same side or different sides of the computer system (e.g., a front camera, a back camera))), one or more input devices, (e.g., a touch-sensitive surface) and a display generation component (e.g., a display controller, a touch-sensitive display system). In some embodiments, the computer system is in communication with one or more input devices (e.g., a touch-sensitive surface).

The computer system displays (1102) a first user interface (e.g., 1002) that includes a text entry region (e.g., 1006, 1008, 1010, 1012) (e.g., a text entry field).

While displaying the first user interface (e.g., 1002) that includes the text entry region (e.g., 1006, 1008, 1010, 1012), the computer system detects (1104) a request, (e.g., 1050*b*, 1050*j*, 1050*p*) (e.g., via one or more input devices) to display a camera user interface (e.g., that can include 1022, 1066, and 1030) (e.g., detecting invocation of a camera). In some embodiments, the request to display the camera user interface is detected when a gesture (e.g., a tap gesture, a mouse/trackpad click/activation, a keyboard input, a scroll wheel input, a hover gesture) on a camera invocation user interface object (e.g., a selectable user interface object) is detected. In some embodiments, the camera invocation user interface object is included in a keyboard (e.g., a keyboard user interface object).

In response to (1106) detecting the request (e.g., 1050*b*, 1050*j*, 1050*p*) to display the camera user interface (e.g., that can include 1022, 1066, and 1030), the computer system displays (e.g., concurrently with the user interface that includes the text entry region), via the display generation component, a camera user interface (e.g., that can include 1022, 1066, and 1030) that includes: a representation (1108) of the field-of-view of the one or more cameras; and in accordance with a determination that the representation of the field-of-view of the one or more cameras includes detected text that satisfies one or more criteria (e.g., text selection criteria that specify a minimum size, minimum prominence, and/or predetermined location of the text in the field-of-view of the one or more cameras that needs to be met in order for the detected text to be available for inserting into the text entry region), displaying (e.g., 1022) a text insertion user interface object that is selectable to insert at least a portion of the detected text (e.g., 642*b*, 1026) into the text entry region (e.g., 1006, 1008, 1010, 1012) (e.g., an affordance). In some embodiments, the representation of the field-of-view of the one or more cameras is a representation of the previously captured media (e.g., saved media (e.g., saved, stored for retrieval by a user at a later time)). In some embodiments, the representation of the previously captured media was also displayed in response to receiving an input directed to a thumbnail representation of the previously captured media (e.g., that was displayed in a media gallery). In some embodiments, the representation of the field-of-view of the one or more cameras is a live preview and/or a representation of media that is not saved media and/or currently being captured.

While concurrently displaying the representation of the field-of-view and the text insertion user interface object (e.g., 1022), the computer system detects (1112), via the one or more input devices, an input (e.g., 1050*f*, 1050*t*, 1050*v*) corresponding to selection (e.g., via a tap gesture on and/or directed to) of the text insertion user interface object (e.g., 1022).

In response to detecting the input (e.g., 1050*f*, 1050*t*, 1050*v*) corresponding to selection of the text insertion user interface object (e.g., 1022), the computer system inserts (1114) at least a portion of the detected text (e.g., 642*b*, 1026) into the text entry region (e.g., 1006, 1008, 1010, 1012) (e.g., at the position of a cursor that is displayed in the text entry region). In some embodiments, as a part of inserting the respective text into the text entry region, the computer system displays the respective text inside of the test entry field. In some embodiments, in response to detecting selection of the text insertion user interface object, the computer system ceases display of the representation of the field-of-view of the one or more cameras, the text insertion user interface object, and/or one or more other camera user interface objects. In some embodiments, the input is a non-tap gesture (e.g., a rotational gesture, a press-and-hold gesture, a mouse/trackpad click/activation, a keyboard input, a scroll wheel input, a hover gesture). Automatically displaying the text insertion user interface object when prescribed conditions are met automatically indicates to the user that the detected text could be relevant to the user without the need for the user to provide additional input. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Concurrently displaying the representation of the field-of-view with the text insertion user interface object provides the user with improved visual feedback by providing the user with the option to insert detected text while the user is able to analyze and view the contents of the representation of the field-of-view of the one or more cameras. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of displaying the camera user interface in response to detecting the request to display the camera user interface, in accordance with a determination that the representation of field-of-view of the one or more cameras does not include detected text (e.g., 642*b*, 1026) that satisfies one or more criteria, the computer system foregoes displaying the text insertion user interface object. Forgoing displaying the text insertion user interface object when prescribed conditions are satisfied automatically indicates to the user that the representation that does not include text detected in the field-of-view may not be relevant. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of displaying the camera user interface (e.g., that can include 1022, 1066, and 1030) in response to detecting the request (e.g., 1050*b*, 1050*j*, 1050*p*) to display the camera user interface and in accordance with a determination that the representation of the field-of-view of the one or more cameras includes detected text (e.g., 642*b*, 1026) that satisfies one or more criteria and that the representation of field-of-view of the one or more cameras does not include detected text that satisfies one or more criteria, the computer system displays the text insertion user interface object (e.g., 1022), wherein the text insertion user interface object is not selectable (e.g., greyed-out, inactive). In some embodiments, while concurrently displaying the representation of the field-of-view of the one or more cameras and the text insertion user interface object as being non-selectable, the computer system detects, via the one or more input devices, a respective input corresponding to selection of the text insertion user interface object; and in response to detecting the second input corresponding to selection of the text insertion user interface object, the computer system does not insert at least a portion of the detected text into the text entry region. In some embodiments, text insertion user interface object is selectable (e.g., not grey-out, active). Displaying the text insertion user interface object as not selectable when prescribed conditions are satisfied automatically indicates to the user that the representation of the field-of-view does not include text that could be relevant. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of displaying the camera user interface in response to detecting the request to display the camera user interface and in accordance with a determination that the text insertion user interface object (1022) is not selectable, the computer system displays the text insertion user interface object with a visual appearance (e.g., grey-out, dimmed, de-saturated, pressed) that indicates that text insertion user interface object is disabled (e.g., 1022 (e.g., 1022 in FIG. 10C)) (e.g., not selectable). In some embodiments, in accordance with a determination that the text user interface object is selectable, the text insertion user interface object is displayed with a visual appearance (e.g., not grey-out, de-pressed) that indicates that the text insertion user interface object is enabled. In some embodiments, the visual appearance that indicates that the text insertion user interface object is enabled is different from the visual appearance that indicates that the text insertion user interface object is disabled. Displaying the text insertion user interface object with a visual appearance that indicates that the text insertion user interface object is disabled provides the user with improved feedback by indicating to the user that the text insertion user interface object is disabled and may not cause the computer system to perform an action when an input is directed towards the text insertion user interface object is selected. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the camera user interface (e.g., that can include 1022, 1066, and 1030) is not displayed (e.g., on the display generation component) before the request (e.g., 1050*b*, 1050*j*, 1050*p*) to display the camera user interface is detected.

In some embodiments, the user interface includes an input entry user interface element (e.g., 1016) (e.g., a keyboard, a search entry field (e.g., a search bar)) (e.g., a selectable user interface object), the input entry user interface element including a user interface object (e.g., 1014*a*) (e.g., a text insertion camera user interface object) (e.g., a selectable user interface object) that is displayed at a location (e.g., upper left, upper right, above one or more input objects (e.g., keys of a keyboard)) in the input entry user interface element. In some embodiments, the request to display the camera user interface is received when an input (e.g., a tap gesture, a mouse/trackpad click/activation, a keyboard input, a scroll wheel input, and/or a hover gesture) directed to the second user interface object is detected. Displaying the second user interface object at a location in the input entry user interface element provides the user with feedback by providing a second user interface object that may be relevant when the user interacts with the input entry user interface element. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the first user interface (1022) that includes a text entry region (e.g., 1006, 1008, 1010, 1012) and before detecting the request to display the camera user interface (e.g., that can include 1022, 1066, and 1030), the computer system detects, via the one or more input devices, an input (e.g., a tap gesture) directed to the text entry region (1050*c*) (e.g., an input inside of the text entry region). In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the input directed to the text entry region, the computer system displays, via the display generation component, a third user interface object (e.g., 1014*a*) (e.g., the second user interface object) (e.g., in the first user interface). In some embodiments, the request to display the camera user interface is received when an input (e.g., a tap gesture, a mouse/trackpad click/activation, a keyboard input, a scroll wheel input, and/or a hover gesture) directed to the third user interface object is detected. In some embodiments, in response to detecting the input directed to the text entry region, the computer system displays a cursor in the text entry region. Displaying the third user interface object in response to detecting the input directed to the text entry region provides the user with additional control of the computer system without cluttering the user interface by allowing the user to control when the third user interface object is displayed by the computer system. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, a fourth user interface object (e.g., 1094*d*) that, when selected, causes the computer system (e.g., 600) to display copied text (and, in some embodiments, insert copied text at the location of a cursor and/or in a field and/or in a document) is concurrently displayed with the third user interface object (e.g., 1014*a*). Displaying the fourth user interface object that, when selected, causes the computer system to display copied text concurrently with the third user interface objects provides the user with additional control of the computer system by concurrently providing with a control to paste copied text and a control to insert text without requiring additional input to display the controls and without cluttering the UI. Reducing the number of inputs needed to perform an operation and providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, before (e.g., prior to) detecting the request (e.g., 1050*b*, 1050*j*, 1050*p*) to display the camera user interface (e.g., that can include 1022, 1066, and 1030), the first user interface (e.g., 1002) includes a keyboard (e.g., 1016) (e.g., a soft keyboard) that is displayed at a first location (e.g., below the text entry region) in the first user interface. In some embodiments, the second user interface object is displayed on the keyboard. In some embodiments, as a part of displaying the camera user interface (e.g., that can include 1022, 1066, and 1030), the computer system replaces display of the keyboard (e.g., ceasing to display the keyboard) at the first location with the display of the camera user interface at the first location. Replacing the display of the keyboard with the display of the camera user interface object when displaying the camera user interface provides the user with visual feedback that the keyboard is not relevant to the camera user interface and de-clutters the user interface. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the camera user interface (e.g., 1002) is displayed at a first size. In some embodiments, while displaying the camera user interface at a first size, the computer system detects, via the one or more input devices, an input (1050*w*) (e.g., a swipe gesture) directed to the camera user interface (e.g., that can include 1022, 1066, and 1030). In some embodiments, the input is a non-swipe gesture (e.g., a rotational gesture, a press-and-hold gesture, a mouse/trackpad click/activation, a keyboard input, a scroll wheel input, a hover gesture and/or tap gesture). In some embodiments, in response to detecting the input directed to the camera user interface, the computer system changes a size of the camera user interface from a first size (e.g., a non-zero size) to a second size (e.g., a non-zero size) that is different from (e.g., greater than, less than) the first size. In some embodiments, as a part of changing the size of the camera user interface from the first size to the second size, the computer system expands the camera user interface from the first size to the second size. In some embodiments, as a part of changing the size of the camera user interface from the first size to the second size, the computer system reduces the size of the camera user interface from the first size to the second size. In some embodiments, as a part of changing the size of the camera user interface, the size of the representation of the field-of-view of the one or more cameras is increased/decreased. In some embodiments, in response to detecting the input directed to the camera user interface, the computer system ceases display of the text entry region. In some embodiments, in response to detecting the input directed to the camera user interface, the computer system replaces display of the text entry region (and/or the first user interface) with the camera user interface. In some embodiments, the camera user interface is displayed at the first size while the first user interface that includes the text entry region is displayed. Changing a size of the camera user interface from a first size to a second size that is different from the first size provides the user with an improved visual feedback by allowing the user to view and analyze the contents of the camera user interface more easily. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Changing a size of the camera user interface from a first size to a second size that is different from the first size in response to detecting the input directed to the camera user interface provides the user with more control over the computer system by allowing the user to determine the size of the display of the camera user interface without cluttering the user interface with the display of additional user interface objects. Providing additional control of the system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the detected text (e.g., 642*b*, 1026) includes a first portion of text and a second portion of text. In some embodiments, at least the inserted portion of the detected text, in accordance with a determination that the first portion of text is more salient (e.g., 1026 (e.g., 1026 in FIG. 10F)) (e.g., more prominent as described above in relation to FIGS. 6A-6H, 7B-7L, 8, and 9 and/or more relevant to a current input field) than the second portion of text (e.g., 642*b* (e.g., 642*b* in FIG. 10F)) in the representation of the field-of-view of the one or more cameras, includes the first portion of the text and does not include the second portion of the text. In some embodiments, in accordance with a determination that the first portion of text is less salient than the second portion of text in the representation of the field-of-view of the one or more cameras, at least the portion of the detected text includes the second portion of the text and does not include the first portion of the text. Automatically including the first portion of text and not the second portion of text as part of the portion of detected text in the inserted text when prescribed conditions are satisfied automatically allows the computer system to insert text that is determined to be relevant. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the text entry region (e.g., 1006, 1008, 1010, 1012) is associated with a first type of text (e.g., the street address or the phone number included in text portion 642*b*) and the one or more criteria includes a respective criterion that is satisfied when a respective portion of the detected text (e.g., 642*b*, 1026) is detected to be the first type of text (e.g., email, web address, phone number, address). In some embodiments, the particular type of text is based on the type of text entry region associated with (e.g., of) the text entry region. For example, the particular type of text is an e-mail when the text entry region is an e-mail field, the particular type of text is a phone number when the testy entry is field is an entry field for entering a phone number, the particular type of text is a website when the text entry region is a web address (e.g., uniform resource locator) entry field. In some embodiments, the computer system determines that text of the first type more salient than text of other types even if other text is larger than the respective portion of the detected text. Displaying the text insertion user interface object based on a respective portion of the detected text being detected as the first type of text allows the computer system to display the text insertion user interface object when a determination is made that the detected text is relevant to the user. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the input (e.g., 1050*f*, 1050*t*, 1050*v*) corresponding to selection of the text insertion user interface object (1022) and in accordance with a determination that the representation of the field-of-view of the one or more cameras includes detected text (e.g., 642B, and 1026) that satisfies one or more criteria, wherein a third portion (e.g., 1026 in FIG. 10G) of the detected text satisfies the respective criterion and a fourth portion (e.g., of the detected text does not satisfy the respective criterion, the at least a portion of the detected text includes the third portion of the detected text but does not include the fourth portion of the detected text. In some embodiments, in response to detecting the input corresponding to selection of the text insertion user interface object and in accordance with a determination that the representation of the field-of-view of the one or more cameras includes detected text that satisfies one or more criteria. In some embodiments, the first portion of the detected text does not satisfy the respective criterion and a second portion of the detected text does satisfy the respective criterion, the at least a portion of the detected text includes the second portion of the detected text but does not include the first portion of the detected text. Inserting the least a portion of the detected text that includes the third portion of the detected text but does not include the fourth portion of the detected text when prescribed conditions are met allows the computer system to display the text insertion user interface object when a determination is made that the detected text is relevant to the user. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the text entry region (e.g., 1006, 1008, 1010, 1012) is associated with (e.g., requires, accepts, is designated to as accepting) a second particular type of text (e.g., kind) (e.g., email, web address, phone number, address). In some embodiments, the representation of the field-of-view includes the detected text (e.g., 642*b*, 1026). In some embodiments, in accordance with a determination that the detected text does not satisfy the one or more criteria, wherein the one or more criteria include a criterion that is satisfied when a portion of the detected text is the second particular type of text (e.g., particular type of text associated with the text entry region), the computer system forgoes displaying the text insertion user interface that is selectable. In some embodiments, as a part of forgoing displaying the text insertion user insertion object (e.g., 1022) that is selectable, the computer system displays the text user insertion object (e.g., 1022) as being non-selectable and/or inactive (e.g., 1022 (e.g., 1022 in FIG. 10C)). In some embodiments, as a part of forgoing displaying the text insertion user interface that is selectable, the computer system does not display the text insertion user insertion object. Forgoing displaying the text insertion user interface that is selectable based on a respective portion of the detected text being a first particular type allows the computer system to not display the text insertion user interface object as being selectable when a determination is made that the detected text does not correspond and/or is not relevant to the text entry region (e.g., that the text will be inserted into). Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the detected text (e.g., 642*b*, 1026) includes a fifth portion of text (e.g., 1026 (e.g., 1026 in FIG. 10G) (e.g., a portion of text that was detected as being a distinct chunk of text) and a sixth portion of text (e.g., 642*b* (e.g., 642*b* in FIG. 10G) (e.g., a portion of text that was detected as being a distinct chunk of text). In some embodiments, while concurrently displaying the representation of the field-of-view and the text insertion user interface object (1022) and before detecting the input (1050*f*, 1050*t*, 1050*v*) corresponding to selection of the text insertion user interface object, the computer system detects, via the one or more input devices, a request (1050*g*) corresponding to a selection of the fifth portion of text. In some embodiments, the request corresponding to a selection of the fifth portion of the text is an input directed to the fifth portion of the text and/or a swipe input directed to the fifth portion of the text. In some embodiments, in response to detecting the request to select the fifth portion of text, the computer system selects the fifth portion of the text without selecting the sixth portion of the text. In some embodiments, as a part of selecting the fifth portion of the text without selecting the sixth portion of the text, the computer system displays an indication that the fifth portion of the text is selected and the sixth portion of the text is not selected. In some embodiments, the input corresponding to selection of the text insertion user interface object is detected while the fifth portion of the text is selected and the sixth portion of the text is not selected. In some embodiments, in response to detecting the input corresponding to selection of the text insertion user interface object is detected while the fifth portion of the text is selected and the sixth portion of the text is not selected, the computer system inserts the fifth portion of the text without inserting the sixth portion of the text (and/or the at least a portion of the detected text includes the first portion of the text and does not include the sixth portion of the text). Selecting the fifth portion of text without selecting the sixth portion of text in response to a request corresponding to a selection of the fifth portion of text provides the user with more control over the computer system by allowing the user to decide which portions of text are selected and which portions of text are not selected without cluttering the UI. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the detected text includes a seventh portion of the text and an eighth portion of the text. In some embodiments, as a part of inserting the portion of the detected text into the text entry region and in accordance with a determination that the seventh portion of the text (e.g., 642*b* in FIG. 10D) satisfies text selection criteria and an eighth portion of the text (e.g., 1026 (e.g., 1026 in FIG. 10D)) does not satisfy a set of text selection criteria (e.g., that includes the first criterion, that is based on the saliency of the text (e.g., whether an amount of prominence (e.g., salience) of the respective portion of the text is above a prominence threshold (e.g., as described above in relation to FIGS. 6A-6H, 7B-7L, 8, and 9), the computer system inserts the seventh portion of the text into the text entry region (e.g., 1012) (and does not include the eighth portion of the text). In some embodiments, as a part of inserting the portion of the detected text into the text entry region and in accordance with a determination that the seventh portion of the text (e.g., 642*b* (e.g., 642*b* in FIG. 10F) does not satisfy text selection criteria, and an eighth portion of the text satisfies (e.g., 1026 (e.g., 1026 in FIG. 10F) the set of text selection criteria, the computer system inserts the eighth portion of the text into the text entry region (and does not include the seventh portion of the text).

In some embodiments, the determination that a second respective portion (e.g., 642*b*, 1026) of the text satisfies the set of text selection criteria is based on the location of the one or more cameras and a direction of the one or more cameras relative to an external environment (e.g., based on the field-of-view of the one or more cameras) (e.g., using similar techniques as described above in relation to FIGS. 6L-6M) (e.g., as discussed above in relation to FIGS. 10E-10F). In some embodiments, changes in the field of view (e.g., as described above in relation to FIGS. 6L-6M) changes whether the determination is made that the respective portion of the text satisfies the set of text selection criteria. In some embodiments, a user can change which text meets the selection criteria by moving the one or more cameras (e.g., using similar techniques as described above in relation to FIGS. 6L-6M) and/or by moving the detected text in the field-of-view of the one or more cameras.

In some embodiments, the detected text includes a ninth portion (e.g., 642*b*) of text and a tenth portion of text (e.g., 1026). In some embodiments, while concurrently displaying the representation (e.g., 1030) of the field-of-view and the text insertion user interface object (e.g., 1022), the computer system displays a first visual indication (e.g., the box that surrounds text portion 642*b* in FIG. 10C and the box that surrounds text portion 1026 in FIG. 10G) that corresponds to (e.g., emphasizes (e.g., a bracket around the text, highlighting of text)) the ninth portion of text (e.g., the first visual indication is not associated with the tenth portion of text) and a second visual indication (e.g., the box that surrounds text portion 642*b* in FIG. 10C and the box that surrounds text portion 1026 in FIG. 10G) corresponds to (e.g., emphasizes (e.g., a bracket around the text, highlighting of text)) the tenth portion of text (e.g., the second visual indication does not correspond to the ninth portion of text). In some embodiments, the second visual indication is different from (e.g., a different size than, is separate from) the first visual indication (e.g., the box in FIG. 10H is smaller than the box in FIG. 10C). Displaying a first visual indication that corresponds to the ninth portion of text and a second visual indication that corresponds to the tenth portion of text provides the user with improved feedback by indicating to different chunks of the portion of text. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, detected text (e.g., 642*b*, 1026) displayed in the representation of the field-of-view of the one or more cameras has a first visual appearance (e.g., 642*b* (e.g., 642*b* as shown in FIG. 10E)) (e.g., 1026 (e.g., 1026 as shown in FIG. 10F)) (e.g., highlighted, underlined). In some embodiments, detected text in the field-of-view of the one or more cameras (e.g., detected text that is captured by the one or more cameras) has a second visual appearance (e.g., not highlighted, not underlined) that is different from the first visual appearance. In some embodiments, detected text (e.g., 642*b*, 1026) in the field-of-view of the one or more cameras is changed to have a different visual appearance when the detected text (e.g., 642*b*, 1042) is displayed in representation of the field-of-view of the one or more cameras (e.g., as discussed above in relation to FIG. 10). Displaying detected text differently than the text detected in the field-of-view provides the user with improved visual feedback by alerting to the user which text is selected to be inserted. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the representation of the field-of-view of the one or more cameras and a fifth user interface object (e.g., a mouse cursor (e.g., an arrow), a representation of user input), the computer system detects a request to move the fifth user interface object (e.g., 1088). In some embodiments, in response to detecting the request to move the fifth user interface object and in accordance with a determination that the fifth user interface object is within a predetermined distance from a location (e.g., over) of the detected text (642*b*, 1026) that satisfies the one or more criteria, the computer system displays, via the display generation component, a sixth user interface object (e.g., a text cursor) that is different (e.g., a different type of user interface object, a different shape) from the fifth user interface object. In some embodiments, in accordance with a determination that the fifth user interface object (e.g., 1088) is within a predetermined distance from a location of the detected text (e.g., 642*b*, 1026), the computer system ceases to display the fifth user interface object (e.g., 1088) and/or replaces display of the fifth user interface object (e.g., 1088) with display of the sixth user interface object (e.g., 1018) (e.g., 1088 with a different visual appearance (e.g., a visual appearance similar to a text cursor)). In some embodiments, in accordance with a determination that the fifth user interface object (e.g., 1088) is not within a predetermined distance from a location of detected text (e.g., 642*b*, 1026) that satisfies the criteria and/or in accordance with a determination that the fifth user interface object (e.g., 1088) is within a predetermined distance from a location of text (e.g., detected text (e.g., 642*b*, 1026) in a representation that does not satisfy the criteria, the computer system forgoes displaying, via the display generation component, a sixth user interface object (e.g., 1018) (e.g., a text cursor) that is different (e.g., a different type of user interface object, a different shape) from the fifth user interface object (e.g., 1088). In some embodiments, the location of the display of the fifth user interface (e.g., 1088) object corresponds (e.g., depends upon, correlates to) to an input (e.g., as discussed above in relation to FIGS. 10AA-10AD) (e.g., a directional gesture (e.g., detected on a touch-sensitive surface), a gesture that results in the displacement of an external device) that is performed by a user. In some embodiments, the sixth user interface object was not displayed before the request to move the fifth user interface object was detected. Automatically displaying a sixth user interface object when prescribed conditions are satisfied automatically provides the user with an indication that a user interface object is near/on a representation of detected text that satisfies the one or more criteria. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the detected text includes an eleventh portion of text. In some embodiments, after inserting at least the portion of the detected text into the text entry region (e.g., 1006, 1008, 1010, 1012) and while concurrently displaying the representation of the field-of-view and the text insertion user interface object (1022), the computer system detects, via one or more input devices, an input (e.g., 1050*k*) (e.g., a swipe gesture) directed to the eleventh portion of text (e.g., 642*b* (e.g., 642B as shown in FIG. 10L and FIG. 10M)) in the representation of the field-of-view (e.g., an input to highlight a portion (e.g., eleventh portion) of text in the representation of the field-of-view). In some embodiments, the input is a non-swipe gesture (e.g., a rotational gesture, a press-and-hold gesture, a mouse/trackpad click/activation, a keyboard input, a scroll wheel input, and/or a hover gesture). In some embodiments, in response to detecting the input directed to the eleventh portion of text in the representation of the field-of-view (and in response to detecting an end of the input directed to the eleventh portion of text in the representation of the field-of-view), the computer system inserts the eleventh portion of text into the text entry region (e.g., 1006, 1008, 1010, 1012). In some embodiments, in response to detecting the input (e.g., 1050*k*) directed to the eleventh portion of text (e.g., 642*b*) in the representation of the field-of-view, the computer system changes the visual appearance (e.g., highlights) the eleventh portion of the text (e.g., 642*b* (e.g., 642*b* in FIG. 10L). In some embodiments, the computer system highlights the eleventh portion of the text (e.g., 642*b* (e.g., 642*b* in FIG. 10L) while the input (e.g., 1050*k*) is being detected. Inserting the eleventh portion of text into the text entry region in response to detecting the input directed to the eleventh portion of text provides the user more control over the computer system by allowing the user to control the text to be inserted into the text entry region without cluttering the user interface. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the detected text (e.g., 642*b*) includes a twelfth portion of text. In some embodiments, after inserting at least the portion of the detected text (e.g., 642*b*) into the text entry region (e.g., 1012) and while concurrently displaying the representation of the field-of-view and the text insertion user interface object (1022), the computer system detects, via one or more input devices, an input (e.g., 1050*k*) (e.g., a swipe gesture) directed to the twelfth portion (e.g., 642*b*) of text. In some embodiments, the input is a non-swipe gesture (e.g., a rotational gesture, a press-and-hold gesture, a mouse/trackpad click/activation, a keyboard input, a scroll wheel input, a hover gesture, and/or tap gesture). In some embodiments, in response to detecting the input (e.g., 1050*k*) directed to the twelfth portion of text (e.g., 642*b*) and in accordance with a determination that the twelfth portion of text (e.g., 642*b*) is above a threshold size (e.g., 4-10 sized font), the computer system selects the twelfth portion of text (e.g., displaying the twelfth portion of text as being selected (e.g., 642*b* (e.g., 642*b* in FIG. 10L)) (e.g., highlighting the twelfth portion of text)) (e.g., as discussed in relation to FIGS. 10K-10L). In some embodiments, in response to detecting the input directed to the twelfth portion of text and in accordance with a determination that the twelfth portion of text is not above the threshold size, the computer system forgoes selecting the twelfth portion of text. In some embodiments, in response to detecting the input corresponding to selection of the text insertion user interface object and in accordance with a determination that the twelfth portion of text is above a threshold size, the at least the portion of the detected text includes the twelfth portion of text. In some embodiments, in response to detecting the input corresponding to selection of the text insertion user interface object and in accordance with a determination that the twelfth portion of text is not above a threshold size, the at least the portion of the detected text does not include the twelfth portion of text.

In some embodiments, the detected text includes a thirteenth portion of text that is not selectable. In some embodiments, after inserting at least the portion of the detected text into the text entry region (e.g., 1006, 1008, 1010, 1012) and while concurrently displaying the representation of the field-of-view and the text insertion user interface object (1022), the computer system detects, via the one or more input devices, a first request (e.g., 1050*e*, 1050*q*) to change (e.g., zoom in on the representation of the field-of-view, translate/pan the representation of the field-of-view, and/or movement of the one or more cameras from a first position in the physical environment to a second position in the physical position that is different from the first position) the representation of the field-of-view of the one or more cameras (e.g., when a swipe gesture, a pinch gesture is detected). In some embodiments, in response to detecting the first request to display the second camera user interface, the computer changes the thirteenth portion of text to be selectable. In some embodiments, in response to detecting an input corresponding to selection of the text insertion user interface object, the computer system inserts selectable portions of text but does not inset non-selectable portions of text.

In some embodiments, after inserting at least the portion of the detected text into the text entry region and while concurrently displaying the representation of the field-of-view and the text insertion user interface object (e.g., 1022), the computer system detects, via the one or more input devices, a second request (e.g., 1050*r*) to change (e.g., zoom out of the representation of the field-of-view, translate/pan the representation of the field-of-view) the representation of the field-of-view of the one or more cameras (e.g., when a swipe gesture, a de-pinch gesture is detected. In some embodiments, in response to detecting the second request (e.g., 1050*r*) to change the representation of the field-of-view of the one or more cameras (e.g., as described above in relation to FIGS. 10R-10T) (and in accordance with a determination that the changed representation of the field-of-view of the one or more cameras does not include detected text that meets one or more criteria), the computer system forgoes displaying the text insertion user interface object (e.g., 1022). In some embodiments, in response to detecting the second request (e.g., 1050*r*) to change the representation of the field-of-view of the one or more cameras (e.g., as described above in relation to FIGS. 10R-10T), the computer system displays the change representation of the field-of-view of the one or more cameras (e.g., as described above in relation to FIGS. 10R-10T). Forgoing displaying the text insertion user interface object in response to the computer system detecting the second request to change the representation of the field-of-view of the one or more cameras provides the user with greater control over the computer system by allowing the user to control when the text insertion user interface object is displayed without displaying additional user interface controls. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the representation of the field-of-view of the one or more cameras of the one or more cameras is displayed concurrently with a portion of the first user interface (e.g., 1002) that includes the text entry region (e.g., 1006, 1008, 1010, 1012). Displaying the field-of-view of the one or more cameras concurrently with the portion of the first user interface that includes the text entry region provides the user with improved visual feedback by allowing the user to concurrently view and analyze the contents of the representation of the field-of-view and the text entry region. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, one or more steps of method 1100 described above can also apply to a representation of video media, such as one or more live frames and/or paused frames of video media. In some embodiments, one or more steps of method 1100 described above can be applied to representation of media in user interfaces for applications that are different from the user interfaces described in relation to FIGS. 10A-10AD, which include, but are not limited to, user interfaces corresponding to a productivity application (e.g., a note taking application, a spreadsheeting application, and/or a tasks management application), a web application, a file viewer application, and/or a document processing application, and/or a presentation application.

Note that details of the processes described above with respect to method 1100 (e.g., FIG. 11) are also applicable in an analogous manner to the other methods described herein. For example, method 1100 optionally includes one or more of the characteristics of the various methods described herein with reference to methods 800, 900, 1300, 1500, and 1700. For example, the first user interface object that corresponds to one or more text management operations, as described in method 800, can be selected to display a plurality of options to manage text that has been inserted. For brevity, these details are not repeated below.

FIGS. 12A-12L illustrate exemplary user interfaces for identifying visual content in media in accordance with some embodiments. The user interfaces in these figures are used to illustrate the processes described below, including the processes in FIG. 13.

Figure 12A:
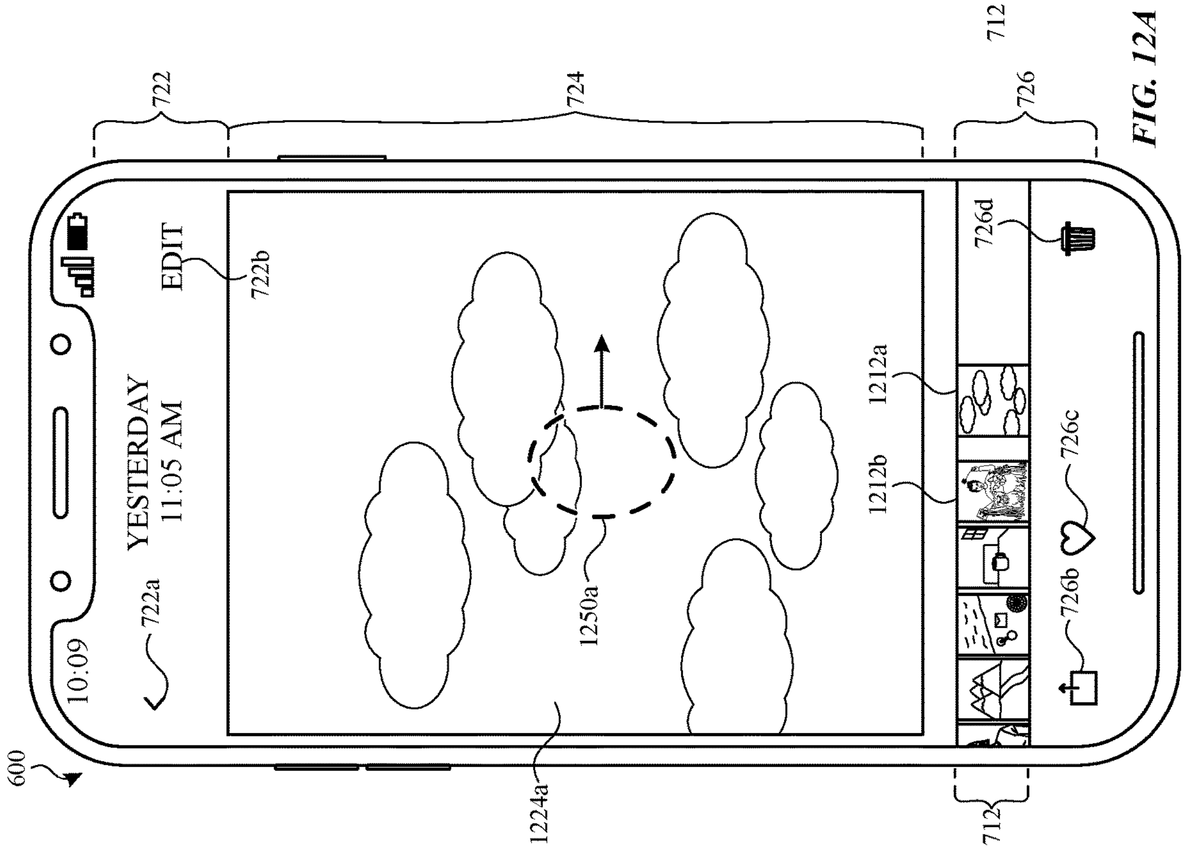
Figure 13:
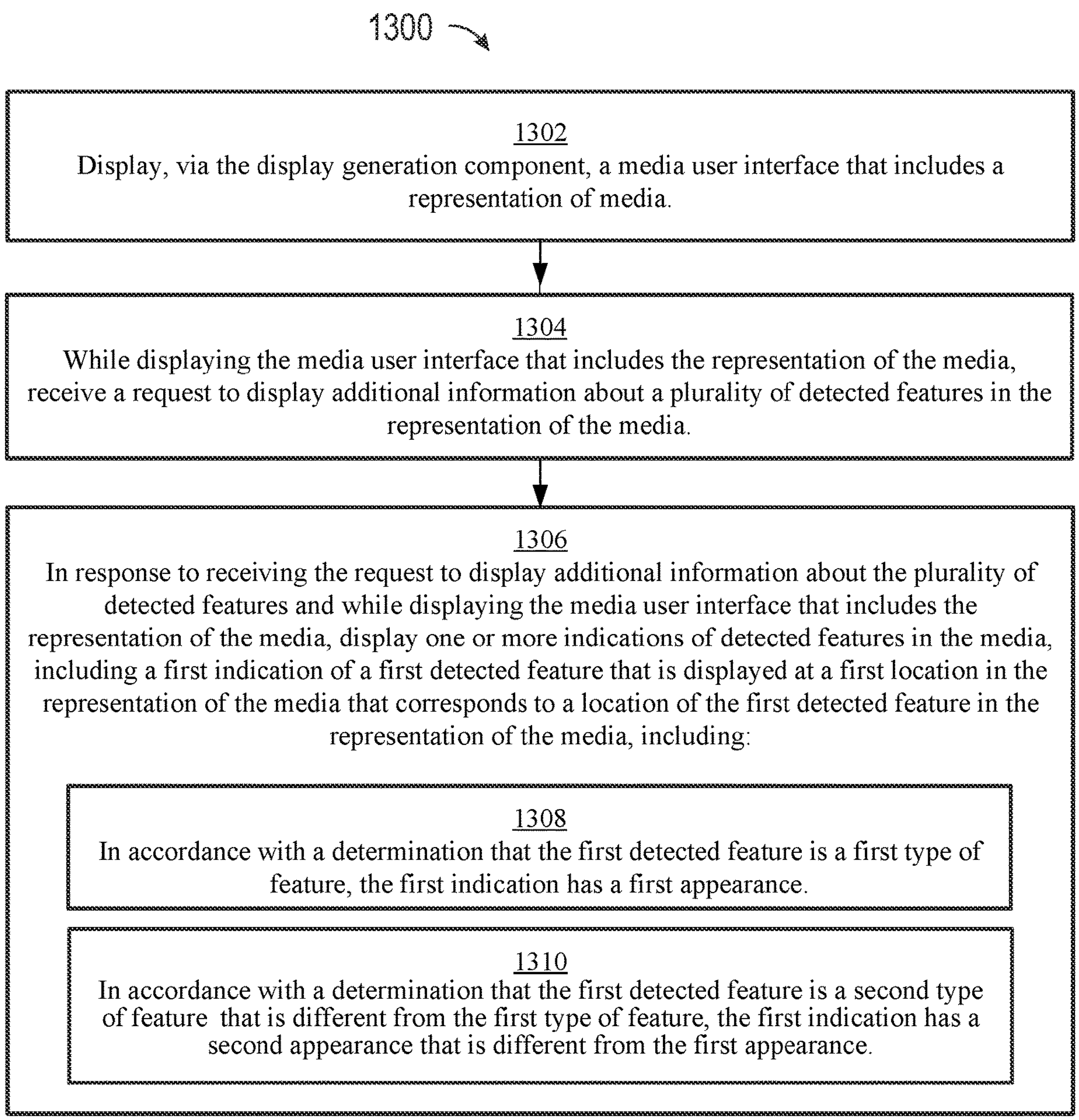
FIG. 13 is a flow diagram illustrating a method for identifying visual content in media in accordance with some embodiments.

FIG. 12A illustrates computer system 600 displaying a media viewer user interface that includes media viewer region 724 positioned between application control region 722 and application control region 726. The media viewer user interfaces of FIG. 12A is displayed using one or more techniques as described above in relation to the media user interface of FIG. 7B.

As illustrated in FIG. 12A, media viewer region 724 includes enlarged representation 1224*a*. Enlarged representation 1224*a* is an image of a sky with clouds. As illustrated in FIG. 12A, application control region 722 includes an indicator of a date/time (e.g., "Yesterday," "11:05 AM" in FIG. 12A) when the image of the sky was taken. In addition, application control region 722 includes back control 722*a* and edit control 722*b* are displayed using one or more techniques as described above in relation to FIG. 7B. As illustrated in FIG. 12A, application control region 726 includes thumbnail media representations 712 that are displayed in a single row. Thumbnail media representations 712 of FIG. 12A include thumbnail representations 1212*a*-1212*b*. Because enlarged media representation 1224*a* is displayed in media viewer region 724, thumbnail representation 712*a* is displayed as being selected using one or more techniques as described above in relation to FIG. 7B. In addition, application control region 726 includes send control 726*b*, favorites control 726*c*, and trash control 726*d*, using one or more techniques as described above in relation to FIG. 7B. At FIG. 12A, computer system 600 detects rightward swipe input 1250*a* in media viewer region 724.

As illustrated in FIG. 12B, in response to detecting rightward swipe input 1250*a*, computer system 600 displays enlarged representation 1224*b* and ceases to display enlarged representation 1224*a* in media viewer region 724. Enlarged representation 1224*b* is an image of person 1230 wearing shirt 1232 and holding dandelion 1234 and book 1236 in each hand. In enlarged representation 1224*b*, person 1230 is also positioned behind dog 1238 and dog 1240, where the two dogs are relatively close together. Dog 1238 is a Yorkie and is positioned on the left side of enlarged representation 1224*b*. Dog 1240 is a Boston Terrier and is positioned on the right side of enlarged representation 1224*b* near lavender plant 1242.

At FIG. 12B, a determination is made that enlarged representation 1224*b* includes at least one detected feature (e.g., shirt 1232, dandelion 1234, book 1236, dog 1238, dog 1240, and lavender plant 1242) that belongs to one or more of a set of predetermined categories of features (e.g., and/or is one of a predetermined types of features). For example, at FIG. 12B, a determination is made that shirt 1232 is an article of clothing (e.g., where clothing is a category (e.g., type) in the predetermined categories (e.g., types) of features), a determination is made that book 1236 is a book (e.g., where books are a category in the predetermined categories of features), separate determinations are made that dandelion 1234 and lavender plant 1242 are plants (e.g., where plants is a category in the predetermined categories of features), and separate determinations are made that dog 1238 and dog 1240 are dogs (e.g., where dogs are a category in the predetermined categories of features). In some embodiments, the one or more predetermined categories and/or types of features include dogs, flowers, plants, landmarks, books, cats, paintings, album art, movie posters, shoes, accessories, clothing, groceries, animals, apple products, furniture, people, etc.

As illustrated in FIG. 12B, because the determination is made that enlarged representation 1224*b* includes at least one detected feature that belongs to one or more predetermined categories of features, computer system 600 displays additional information control 1226*a*. Additional information control 1226*a* is shown positioned between favorites control 726*c* and trash control 726*d* in application control region 726 of FIG. 12B. In some embodiments, as a part of displaying additional information control 1226*a*, computer system 600 displays an animation of additional information control 1226*a* fading in, fading out, and/or reducing/increasing in size at FIG. 12B. In some embodiments, additional information control 1226*a* is displayed with a badge (e.g., a badge that is representative of a group of one or more predetermined categories of features and/or the detected feature) (e.g., a graphical indicator that corresponds to a group of one or more predetermined categories of features and/or the detected feature) at FIG. 12B. In some embodiments, because a determination is made that at least one detected feature belongs to a first set of predetermined categories of features (e.g., objects, pets, and/or landmarks), computer system 600 displays the animation of additional information control 1226*a* fading in, fading out, and/or reducing/increasing in size and/or displays additional information control 1226*a* with the badge. In some embodiments, because a determination is made that at least one detected feature does not belong to the first set of predetermined categories of features (e.g., objects, pets, and/or landmarks), computer system 600 does not display the animation of additional information control 1226*a* fading in, fading out, and/or reducing/increasing in size and/or does not display additional information control 1226*a* with the badge.

Looking back at FIG. 12A, a determination was made that enlarged representation 1224*a* (e.g., the image of the sky) displayed in FIG. 12A did not include at least one detected feature that belongs to one or more of the set of categories of features. As illustrated in FIG. 12A, computer system 600 does not display additional information control 1226*a* in the media viewer user interface of FIG. 12A because of this determination (e.g., the determination was made that enlarged representation 1224*a* displayed in FIG. 12A did not include at least one detected feature that belongs to one or more categories of features). Thus, when looking at FIGS. 12A-12B, computer system 600 only displays additional information control 1226*a* when at least one detected feature belongs to one or more of the set of categories of features. In some embodiments, additional information control 1226*a* is displayed, irrespective of whether at least one detected feature in the displayed representation belongs to one or more of the set of categories of features. In some embodiments, a feature is detected in enlarged representation 1224*b* at FIG. 12B but a determination is made that the detected feature does not belong to one or more of the set of categories of features. In some embodiments, when the determination is made that the detected feature does not belong to one or more of the set of categories of features, computer system 600 does not display additional information control 1226*a*.

FIGS. 12B-12E illustrate an exemplary animation that is displayed in response to computer system 600 receiving a request to display additional information (e.g., in response to computer system 600 detecting an input directed to additional information control 1226*a*). The animation of FIGS. 12B-12E is an animation where feature indicators are revealed (e.g., gradually) in each of FIGS. 12B-12E until feature indicators 1260*a*-1260*c* and 1262*d*-1262*e* displayed concurrently in FIG. 12E. At FIG. 12B, computer system 600 detects tap input 1250*b* on additional information control 1226*a*.

Figure 12D:
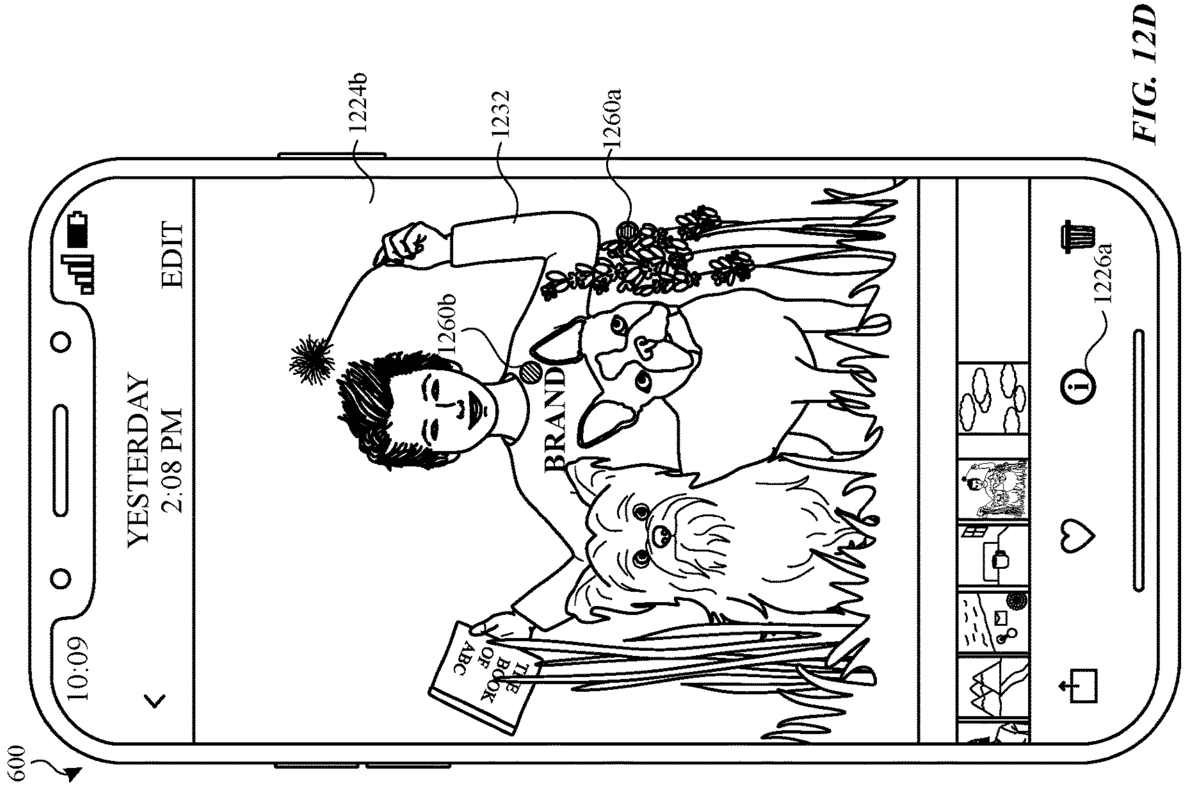
Figure 12C:
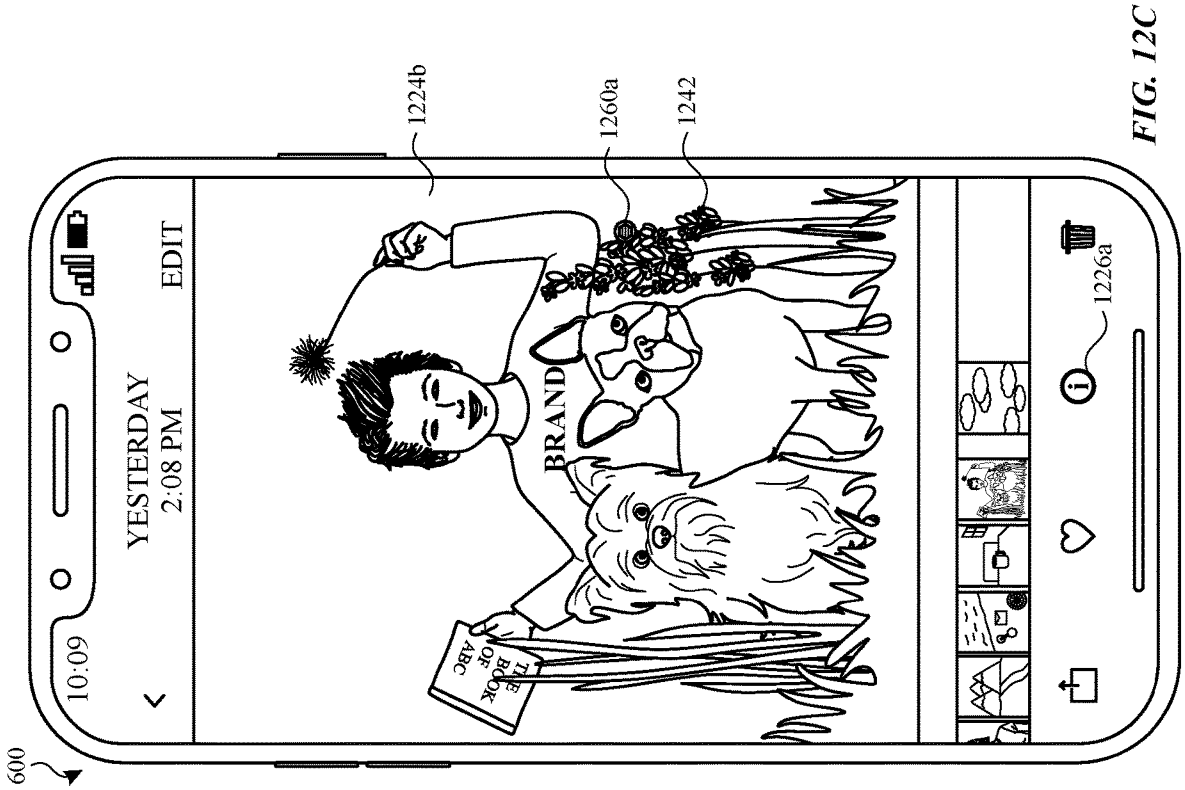

As illustrated in FIG. 12C, in response to detecting tap input 1250*b*, computer system 600 displays feature indicator 1260*a* at a location near lavender plant 1242. At FIG. 12C, feature indicator 1260*a* is displayed near lavender plant 1242 because a determination was made that a feature indicator should be displayed on/near lavender plant 1242 (e.g., on/near the detected feature displayed in enlarged representation 1224*b*). In some embodiments, the determination is made that the feature indicator should be displayed on/near a corresponding feature when it is determined that the feature is displayed close to multiple detected features, when a detected feature is partially obscured from view by one or more other objects and/or detected features, when the feature indicator obstructs the view of a particular portion or a particular amount of the detected feature, etc. In some embodiments, this determination (e.g., whether the feature indicator should be displayed on/near the corresponding feature) is made to improve the chances that the feature indicator is interpreted to identify the correct feature (e.g., the corresponding feature).

As illustrated in FIG. 12D, sometime after displaying feature indicator 1260*a* in FIG. 12C, computer system 600 displays feature indicator 1260*b* at a location on shirt 1232. At FIG. 12D, computer system 600 displays feature indicator 1260*b* at the location on shirt 1232 because a determination was made that a feature indicator should be displayed on/near shirt 1232 (e.g., using similar techniques as described above in relation to feature indicator 1260*a* in FIG. 12C). As illustrated in FIG. 12D, feature indicator 1260*a* is displayed concurrently with feature indicator 1260*b*.

Figure 12F:
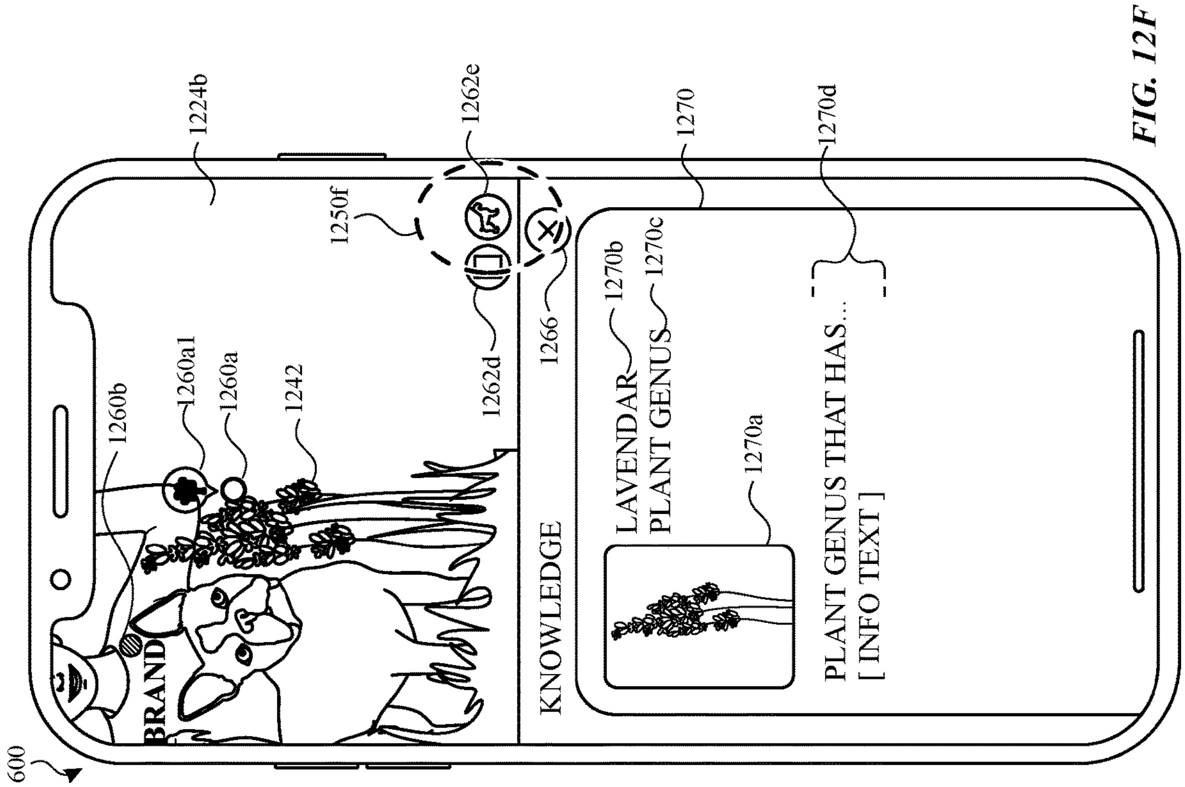
Figure 12E:
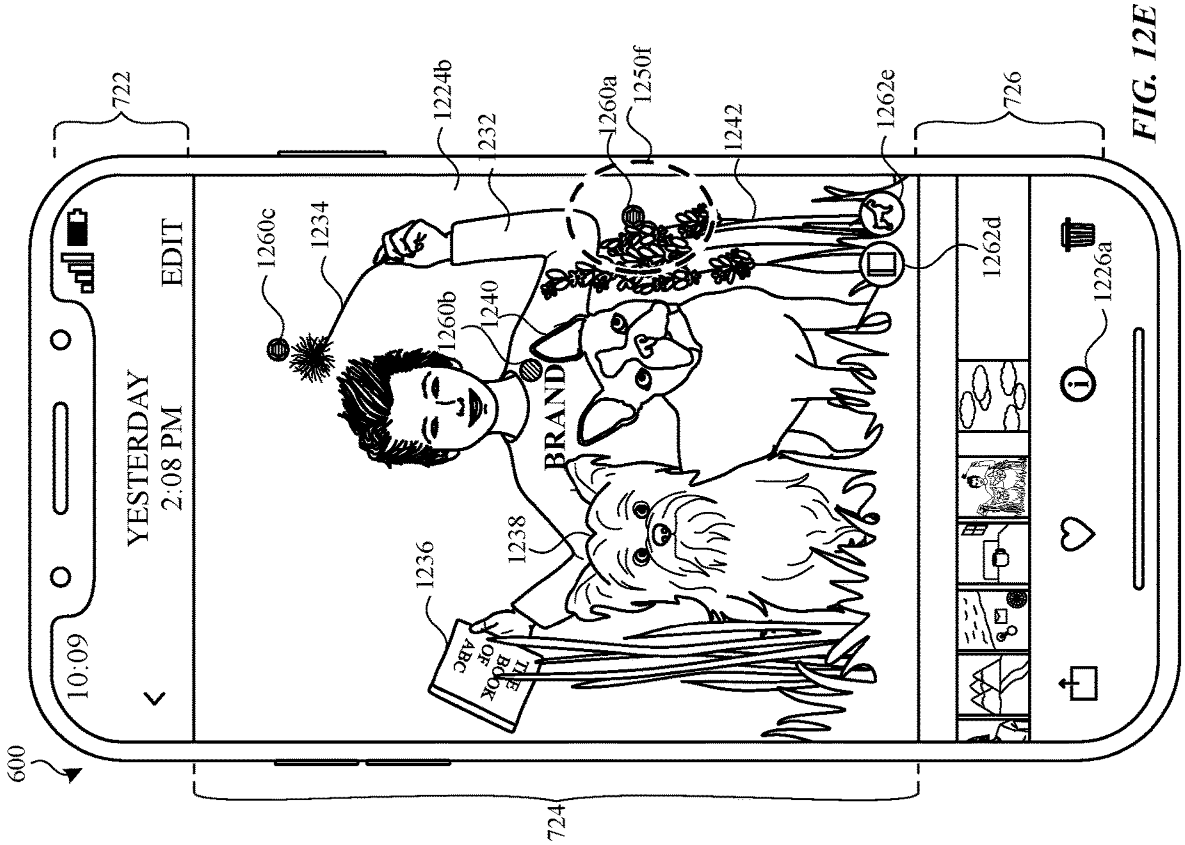

As illustrated in FIG. 12E, sometime after displaying feature indicator 1260*b* in FIG. 12D, computer system 600 displays feature indicator 1260*c* at a location near dandelion 1234. At FIG. 12E, computer system 600 displays feature indicator 1260*c* at the location on dandelion 1234 because a determination was made that a feature indicator should be displayed near dandelion 1234 (e.g., using similar techniques as described above in relation to feature indicator 1260*a* in FIG. 12C). As illustrated in FIG. 12E, feature indicator 1260*a* is displayed concurrently with feature indicator 1260*b* and feature indicator 1260*c*. Notably, at FIG. 12E, feature indicator 1260*a* and feature indicator 1260*c* are illustrated with having the same pattern (e.g., horizontal lines) because each of the feature indicators corresponds to features (e.g., lavender plant 1242 and dandelion 1234) that belong to the same category (e.g., plant category). Feature indicator 1260*a* and feature indicator 1260*c* are displayed with the same visual appearance (e.g., pattern, color, shape, etc.), although each of the feature indicators corresponds to a different detected feature. Moreover, feature indicator 1260*b* is displayed with a different pattern (e.g., diagonal lines) than the pattern with which feature indicators 1260*a* and 1260*c* are displayed because feature indicator 1260*b* corresponds to a feature that belongs to a different category (e.g., clothing category) than the plant category. Thus, feature indicators that belong to the same category have the same and/or a similar visual appearance, and feature indicators that belong to different categories are displayed with a different visual appearance. In order words, the visual appearance of a feature indicator is based on a visual appearance associated with a particular predetermined category. In some embodiments, one or more of feature indicators 1260*a*-1260*c* include (e.g., inside the area of the feature indicator, as the feature indicator) a graphical indicator representing the predetermined category of features that corresponds to each respective feature indicator (e.g., like feature indicators 1262*d*-1262*e*). In some embodiments, one or more of feature indicators 1260*a*-1260*c* that belong to the same predetermined category of features include the same graphical indicator. In some embodiments, one or more of feature indicators 1260*a*-1260*c* that belong to different predetermined categories of features include different graphical indicators.

As illustrated in FIG. 12E, sometime after displaying feature indicator 1260*b* in FIG. 12D, computer system 600 concurrently displays feature indicators 1262*d*-1262*e* with feature indicators 1260*a*-1260*c*. Feature indicators 1262*d*-1262*e* are representative of a books category and a dogs category, respectively. In particular, feature indicator 1262*d* corresponds to book 1236, and feature indicator 1262*e* corresponds to dog 1238 and dog 1240.

As illustrated in FIG. 12E, feature indicators 1262*d*-1262*e* are different from feature indicators 1260*a*-1260*c*. For instance, feature indicators 1262*d*-1262*e* include a graphical image (and/or symbol) that represents each respective category (e.g., graphical representation of a book, graphical representation of a dog) to which feature indicators 1262*d*-1262*e* corresponds. However, feature indicators 1262*d*-1262*e* do not include a graphical image that represents each respective category to which feature indicators 1262*d*-1262*e* correspond. In addition, feature indicators 1262*d*-1262*e* are not displayed near the respective feature to which each corresponds, unlike feature indicators 1260*a*-1260*c*. Instead, feature indicators 1262*d*-1262*e* are displayed in a predetermined area (or at predetermined locations) (e.g., bottom-right) of enlarged representation 1224*b*. In some embodiments, the predetermined area is in the corner of enlarged representation 1224*b* and/or media viewer region 724. In some embodiments, the predetermined area is separated from enlarged representation 1224*b* (e.g., below/above enlarged representation 1224*b*).

At FIG. 12E, computer system 600 displays feature indicators 1262*d*-1262*e* in bottom-right of media viewer region 724 because a determination was made that a feature indicator should not be displayed on/near each respective feature to which the feature indicators 1262*d*-1262*e* correspond. In some embodiments, the determination was made that a feature indicator should not be displayed on/near book 1236 because a portion of book 1236 is obscured by one or more other objects (e.g., grass/weeds) in enlarged representation 1224*b*. In some embodiments, the determination was made that a feature indicator should not be displayed on/near dog 1238 because dog 1238 is too close to dog 1240 (or vice-versa). In some embodiments, the determination was made that a feature indicator should not be displayed near/on book 1236, dog 1238, and/or dog 1238 because of how each of book 1236, dog 1238, and/or dog 1240 are positioned in enlarged representation 1224*b*.

Notably, feature indicator 1262*d* corresponds to one detected feature (i.e., book 1236) in enlarged representation 1224*b*, and feature indicator 1262*e* corresponds to multiple detected features (e.g., dog 1238, dog 1240). Thus, in FIG. 12E, only one feature indicator is displayed that corresponds to a particular predetermined category of features in the predetermined area of enlarged representation 1224*b* (e.g., irrespective of the amount of feature indicators that belong to the particular category that are determined to not be able to be displayed on/near each of their detected features). In some embodiments, computer system 600 displays a feature indicator on/near a feature that belongs to a particular category and displays a feature indicator in the predetermined area of enlarged representation 1224*b* for a different detected feature that belongs to the particular predetermined category of features (e.g., when a determination is made a feature indicator should be displayed on/near a detected feature that belongs to a particular predetermined category of features and a determination is made that a feature indicator should not be displayed on/near a different detected feature that belongs to the predetermined particular category of features). In some embodiments, computer system 600 displays multiple feature indicators in the predetermined area of enlarged representation 1224*b* when a determination is made that multiple detected feature indicators should be displayed on/near each respective detected feature that belongs to the same predetermined category of features.

As discussed above, FIGS. 12B-12E illustrate an exemplary animation that is displayed in response to computer system 600 receiving a request to display additional information. In some embodiments, the feature indicators are faded in over the duration of the animation. In some embodiments, the feature indicators are faded in a sequence, such as the sequence shown in FIGS. 12B-12E, over the duration of the animation. In some embodiments, the feature indicators are gradually faded-in over the duration of time. In some embodiments, one or more of the feature indicators are displayed with a pulsing animation. At FIG. 12E, computer system 600 detects tap input 1250*e* on feature indicator 1260*a*.

As illustrated in FIG. 12F, in response to detecting tap input 1250*e*, computer system 600 zooms in on enlarged representation 1224*b*, such that feature indicator 1260*a* is enlarged and displayed near (or at) the center of enlarged representation 1224*b* that is shown in FIG. 12F. When comparing FIGS. 12E-12F, computer system 600 ceases to display at least one feature indicator (e.g., 1260*c*) and maintains display of at least one indicator (e.g., 1260*b*) when enlarging and displaying feature indicator 1260*a* near the center of enlarged representation 1224*b*. In particular, feature indicator 1260*c* ceases to be displayed because it is a further distance away from feature indicator 1260*c* than feature indicator 1260*b* is from feature indicator 1260*c*. Thus, feature indicator 1260*c* is cropped out of enlarged representation 1224*b* by the zooming operation. However, as illustrated in FIG. 12F, the feature indicators that are displayed in the predetermined area of enlarged representation 1224*b* continue to be displayed in the predetermined area of enlarged representation 1224*b* and are not cropped out by the zooming operation.

As illustrated in FIG. 12F, in response to detecting tap input 1250*e*, computer system 600 indicates that feature indicator 1260*a* is selected by changing the color of feature indicator 1260*a* (e.g., the color of feature indicator 1260*a* does not contain horizontal lines). Thus, the visual appearance of feature indicator 1260*a* changes when feature indicator 1260*a* is selected. In addition to indicating that feature indicator 1260*a* is selected, computer system 600 displays category indicator 1260*a*1 (e.g., picture of a plant) in response to detecting tap input 1250*e*. As illustrated in FIG. 12F, category indicator 1260*a*1 is displayed near/on top of feature indicator 1260*a*. Category indicator 1260*a*1 indicates the category that corresponds to the selected feature indicator (e.g., feature indicator 1260*a*) and/or detected feature to which the selected feature indicator corresponds. Although feature indicator 1260*b* is displayed in FIG. 12F, a category is not displayed near or above feature indicator 1260*b* because feature indicator 1260*b* is not selected. In addition, because feature indicator 1260*b* was not selected, the visual appearance of feature indicator 1260*b* of FIG. 12F is the same as the visual appearance of feature indicator 1260*b* before tap input 1250*e* was detected. As illustrated in FIG. 12F, feature indicator 1260*a* and category indicator 1260*a*1 are displayed on enlarged representation 1224*b* and, thus, are surrounded by the content shown by enlarged representation 1224*b*.

As illustrated in FIG. 12F, in response to detecting tap input 1250*e*, computer system 600 displays feature card 1270. In particular, computer system 600 ceases to display portions of enlarged representation 1224*b* and the media viewer user interface, including application control region 722 and application control region 726 (as shown in FIGS. 12E-12F) that were previously displayed in response to detecting tap input 1250*e*. In some embodiments, one or more portions of application control region 722 of FIG. 12E and application control region 726 of FIG. 12E remain while less of enlarged representation 1224*b* is displayed in response to detecting tap input 1250*e*. In some embodiments, in response to detecting tap input 1250*e*, computer system 600 displays an animation of feature card 1270 sliding up from the bottom (e.g., near/at application control region 726) of computer system 600, where a portion of enlarged representation 1224*b* also moves up towards the top (e.g., near/at application control region 722 of FIG. 12E) of the computer system 600 as feature card 1270 slide up.

Feature card 1270 includes exit control 1266, feature image 1270*a*, feature identifier 1270*b*, feature information 1270*c*, and feature information 1270*d*. Notably, feature image 1270*a* is not a different image and/or a generic image (e.g., from a source other than the enlarged representation) of a lavender plant and is, instead, a representation of a portion of enlarged representation 1224*b* that includes lavender plant 1242. By displaying, a representation of the portion of enlarged representation 1224*b* that includes lavender plant 1242, feature card 1270 can is more easily identifiable as being associated with lavender plant 1242, as shown in enlarged representation 1224*b*. Feature identifier 1270*b* includes a description of the feature ("Lavender Plant"). Feature information 1270*c* includes information concerning the feature ("PLANT GENIUS") and, in some embodiments, denotes the category of the feature (e.g., lavender plant 1242) that corresponds to feature card 1270. Feature information 1270*d* includes additional information concerning the feature. In some embodiments, feature identifier 1270*b*, feature information 1270*c*, and/or feature information 1270*d* is retrieved from an online source and displayed as a part of feature card 1270. At FIG. 12F, computer system 600 detects tap input 1250*f* on feature indicator 1262*e*.

Figure 12H:
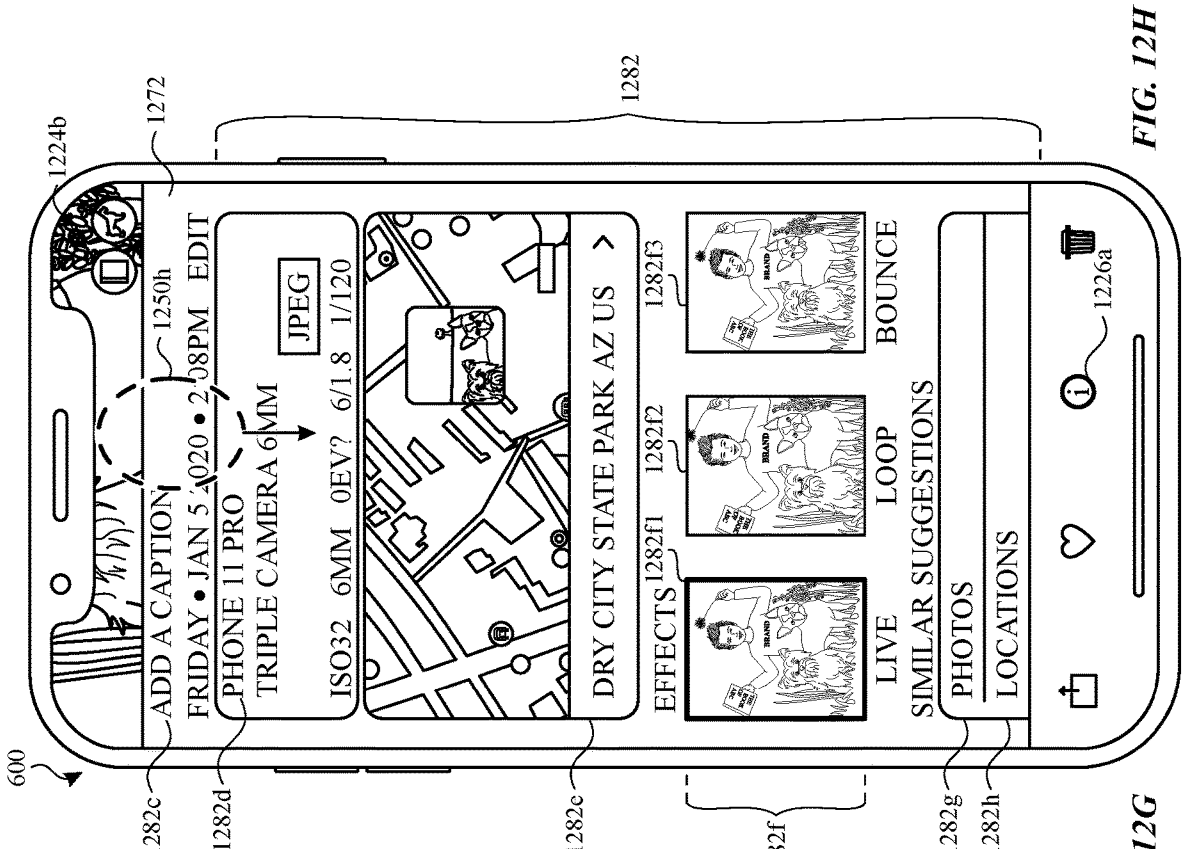
Figure 12G:
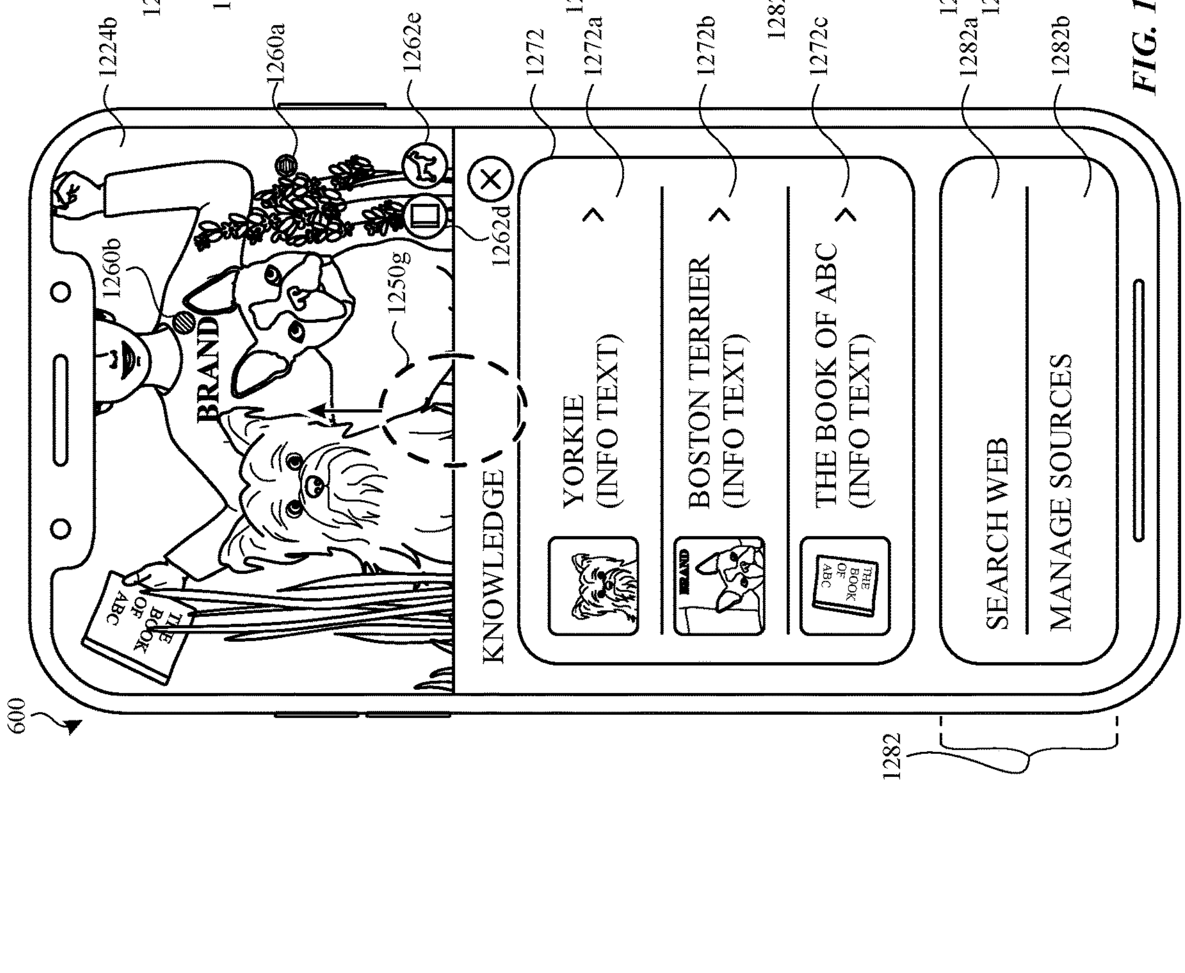

As illustrated in FIG. 12G, in response to detecting tap input 1250*f*, computer system 600 ceases to display feature card 1270 and displays feature card 1272 (and/or replaces display of feature card 1270 with display of feature card 1272). Feature card 1272 includes feature controls 1272*a*-1272*c* and additional information 1282, which is concurrently displayed with at least one of feature indicators 1260*a*-1260*c*. As illustrated in FIG. 12G, additional information includes search control 1282*a* (e.g., that, when selected, would initiate a web search) and source management control 1282*b* (e.g., that, when selected, would cause display of source management user interface).

At FIG. 12G, feature controls 1272*a*-1272*c* correspond to different respective detected features (e.g., dog 1238, dog 1240, book 1236), where a determination was that a feature indicator should not be on/near the respective detected feature. In particular, feature control 1272*a* corresponds to dog 1238, feature control 1272*b* corresponds to dog 1240, and feature control 1272*c* corresponds to book 1236. Thus, in response to detecting tap input 1250*f* on feature indicator 1262*e*, a feature card is displayed that includes feature controls for the detected features, where a determination was that a feature indicator should not be on/near the respective detected feature. In some embodiments, in response to detecting tap input 1250*f*, feature control 1272*c* is not displayed because feature control 1272*c* corresponds to a feature that belongs to a category that is not the same category as feature indicator 1262*e* (e.g., the feature indicator that was selected via tap input 1250*f*).

In some embodiments, in response to detecting tap input directed to feature indicator 1262*d*, computer system 600 displays feature card 1272. In some embodiments, when computer system 600 displays feature card 1272 in response to detecting tap input directed to feature indicator 1262*d*, feature controls 1272*a*-1272*c* are re-ordered, such that feature control 1272*c* is displayed near the top of feature card 1272. In some of these embodiments, feature controls 1272*a*-1272*c* are re-ordered because a determination is made that feature control 1272*c* corresponds to a feature that is in the category that is represented by feature indicator 1262*d* (e.g., or the feature indicator that was selected by the input).

In some embodiments, in response to detecting an input directed to feature control 1272*a*, computer system 600 displays a feature card (e.g., similar to feature card 1270 of FIG. 12F or feature card 1274 of FIG. 12K) for dog 1238 and ceases to display feature card 1272. In some embodiments, in response to detecting an input directed to feature control 1272*b*, computer system 600 displays a feature card (e.g., similar to feature card 1270 of FIG. 12F or feature card 1274 of FIG. 12K) for dog 1240 and ceases to display feature card 1272. In some embodiments, in response to detecting an input directed to feature control 1272*c*, computer system 600 displays a feature card (e.g., similar to feature card 1270 of FIG. 12F or feature card 1274 of FIG. 12K) for book 1236 and ceases to display feature card 1272.

As illustrated in FIG. 12G, in response to detecting tap input 1250*f*, computer system 600 zooms out of enlarged representation 1224*b*, such that feature indicator 1260*a* is no longer near the center of the display and not enlarged. Moreover, in response to detecting tap input 1250*f*, feature indicator 1260*a* is displayed with a visual appearance that corresponds to the category of feature indicator 1260*a* to show that feature indicator 1260*a* is no longer selected. Notably, feature indicator 1260*c* is not displayed in FIG. 12G because feature card 1272 is occupying a portion of the display (e.g., as compared to FIG. 12C when no feature card was displayed because enlarged representation 1224*b* has been moved towards the top of the media viewer interface). At FIG. 12G, computer system 600 detects upward swipe input 1250*g* on feature card 1272.

As illustrated in FIG. 12H, in response to detecting upward swipe input 1250*g*, computer system 600 slides feature card 1272 towards the top of computer system 600 and ceases to display a portion of enlarged representation 1224*b* (e.g., that was previously displayed before upward swipe input 1250*g* was detected in FIG. 12G). In response to detecting upward swipe input 1250*g*, computer system 600 scrolls the information (e.g., feature controls 1272*a*-1272*c*, search control 1282*a*, source management control 1282*b*) displayed on feature card 1272 of FIG. 12H towards the top of computer system 600 until the additional information displayed on feature card 1272 of FIG. 12H is displayed. In some embodiments, computer system 600 scrolls the information of feature card 1272 based on the movement (e.g., speed, direction, etc.) of swipe input 1250*g*.

As illustrated in FIG. 12H, feature card 1272 includes more of additional information 1282, which includes add-a-caption control 1282*c*, image capture metadata 1282*d*, location metadata 1282*e*, effects 1282*f* (e.g., including live effects 1282*f*1-1282*f*3), photo-suggestion control 1282*g*, and location-suggestion control 1282*h*. In some embodiments, additional information includes other types of additional information, such as additional information associated with people that are identified in the photo. In some embodiments, in response to detecting an input directed to add-a-caption control 1282*c*, computer system 600 displays an input field, where text input into the field would be saved as a caption for the media represented by enlarged representation 1224*b*. In some embodiments, image capture metadata 1282*d* includes one or more representations of the format (e.g., "JPEG") of the media represented by enlarged representation 1224*b*, one or more configurations/settings (e.g., "ISO32" and/or "6MM") of the computer system that captured the media represented by enlarged representation 1224*b*, and/or one or more identifiers (e.g., "PHONE 11 PRO" and/or "Triple Camera 6MM") of the computer system that captured the media represented by enlarged representation 1224*b*. In some embodiments, location metadata 1282*e* includes a map of a location that is associated with (e.g., where) the media represented by enlarged representation 1224*b*. In some embodiments, in response to detecting an input directed to location metadata 1282*e*, computer system 600 displays an interface of a maps application that includes the location (e.g., "DRY CITY STATE PARK AZ US") that corresponds to location metadata 1282*e*. In some embodiments, in response to detecting an input directed to one of effects 1282*f*1-1282*f*3, computer system 600 applies an effect associated with the effect that was selected by the input directed to one or effects 1282*f*1-1282*f*3. In some embodiments, in response to detecting an input directed to photo-suggestion control 1282*g*, computer system 600 displays one or more representations of photos that are associated with the media represented by enlarged representation 1224*b* (e.g., where the photos are chosen based on the context of the media represented by enlarged representation 1224*b*). In some embodiments, in response to detecting an input directed to location-suggestion control 1282*h*, computer system 600 displays one or more representations of media that are associated with location metadata (e.g., as included in location metadata 1282*e*) of the media represented by enlarged representation 1224*b*.

Looking back at FIGS. 12B-12E, in response to detecting input 1250*b* on additional information control 1226*a*, computer system 600 displays some of the information included in additional information 1282. In some embodiments, in response to detecting input 1250*b*, additional information 1282 is displayed concurrently with feature indicators 1260*a*-1260*c* and 1262*d*-1262*e*, in some embodiments. For example, at FIG. 12E, computer system 600 can display add-a-caption control 1282*c*, image capture metadata 1282*d*, location metadata 1282*e*, effects 1282*f* (e.g., including live effects 1282*f*1-1282*f*3), photo-suggestion control 1282*g*, location-suggestion control 1282*h*, etc. concurrently with feature indicators 1260*a*-1260*c* and 1262*d*-1262*e* in response to detecting input 1250*b* on additional information control 1226*a*. Returning back to FIG. 12H, computer system 600 detects downward swipe input 1250*h* on feature card 1272.

Figure 12I:
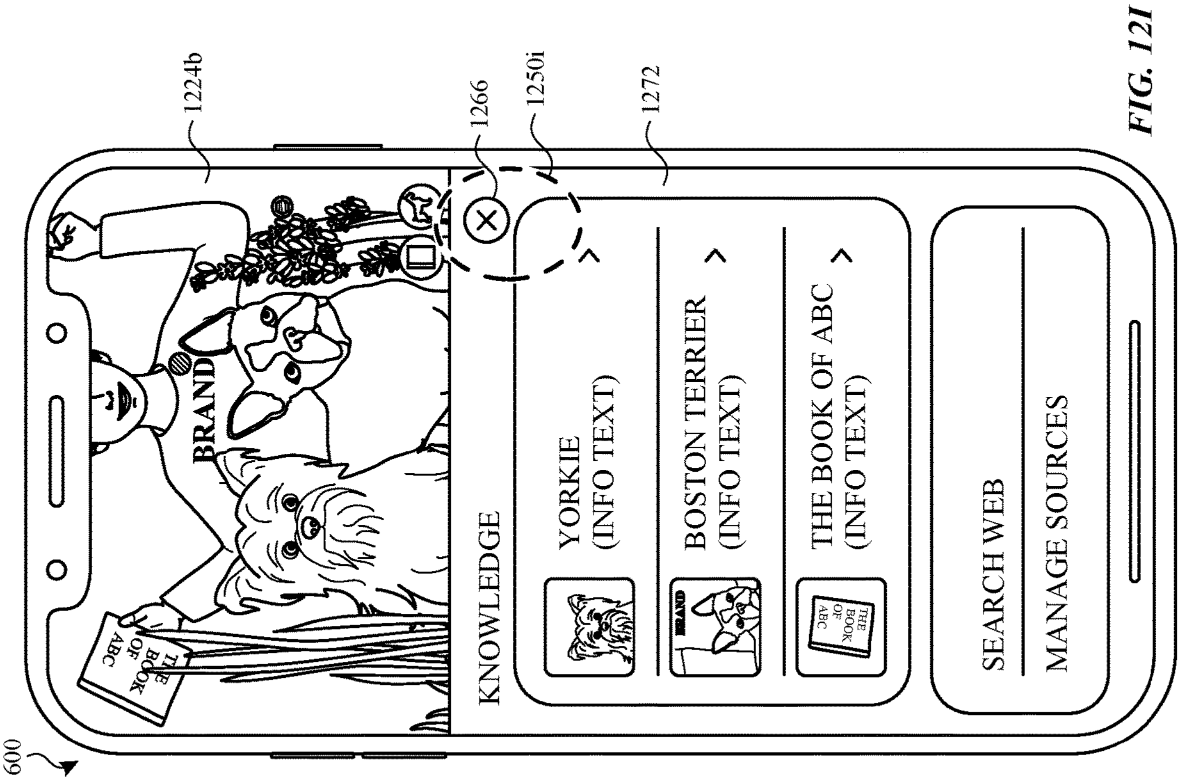

As illustrated in FIG. 12I, in response to detecting downward swipe input 1250*h*, computer system 600 slides feature card 1272 based on movement of downward swipe input 1250*h*, using one or more techniques as described above in relation to FIGS. 12G-12H. At FIG. 12I, computer system 600 detects tap input 1250*i* on exit control 1266.

Figure 12J:
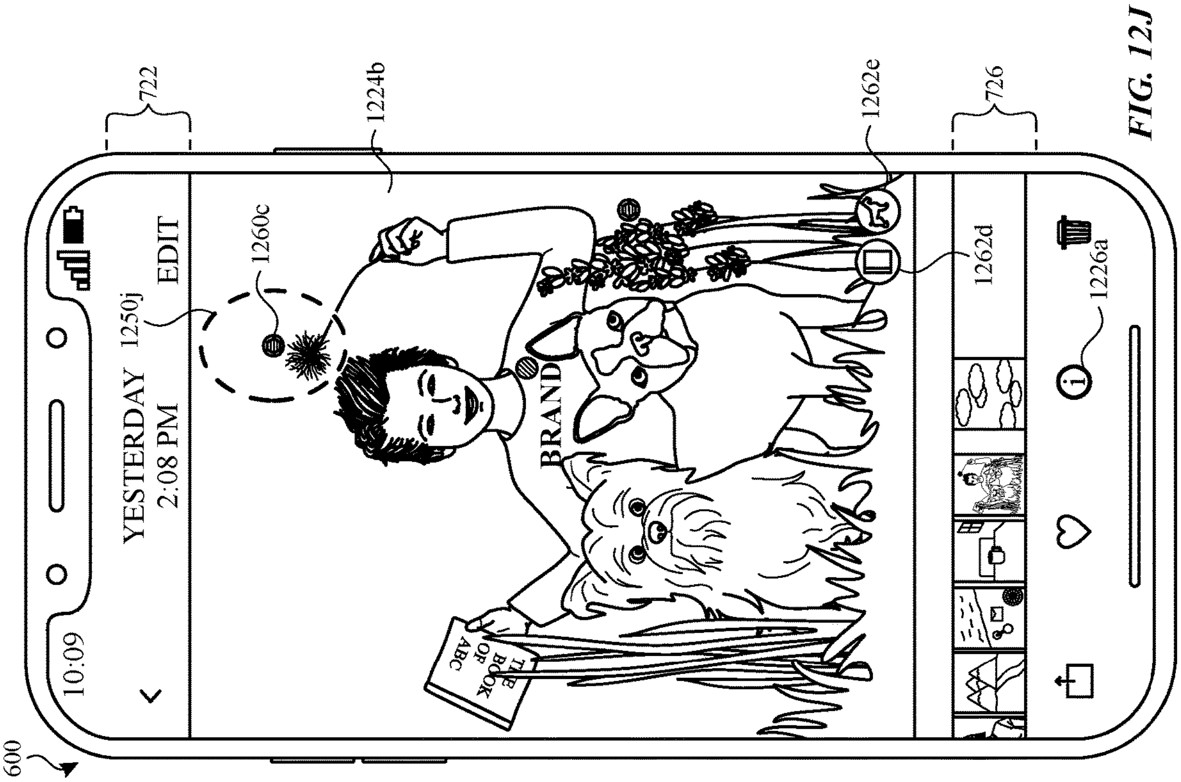

As illustrated in FIG. 12J, in response to detecting tap input 1250*i*, computer system 600 expands enlarged representation 1224*b*, ceases to display feature card 1272, and re-displays application control region 722 and application control region 726. At FIG. 12J, computer system 600 detects tap input 1250*j* on feature indicator 1260*c*.

Figure 12L:
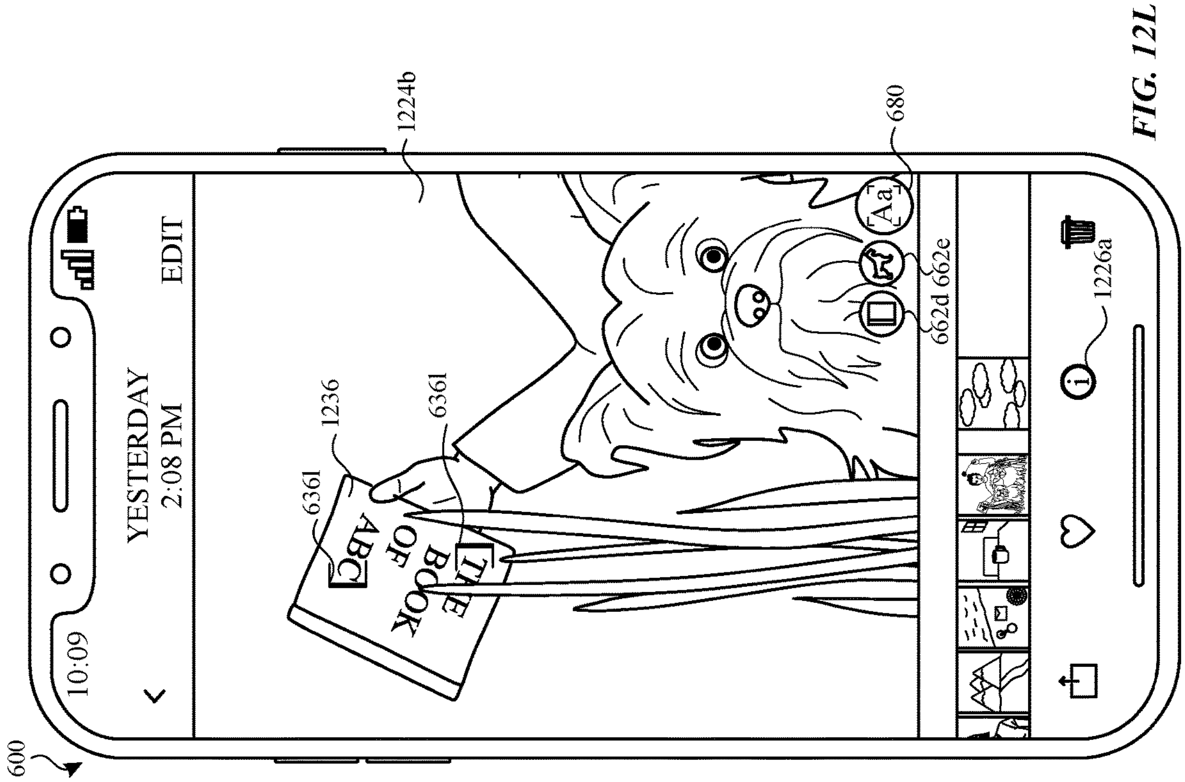
Figure 12K:
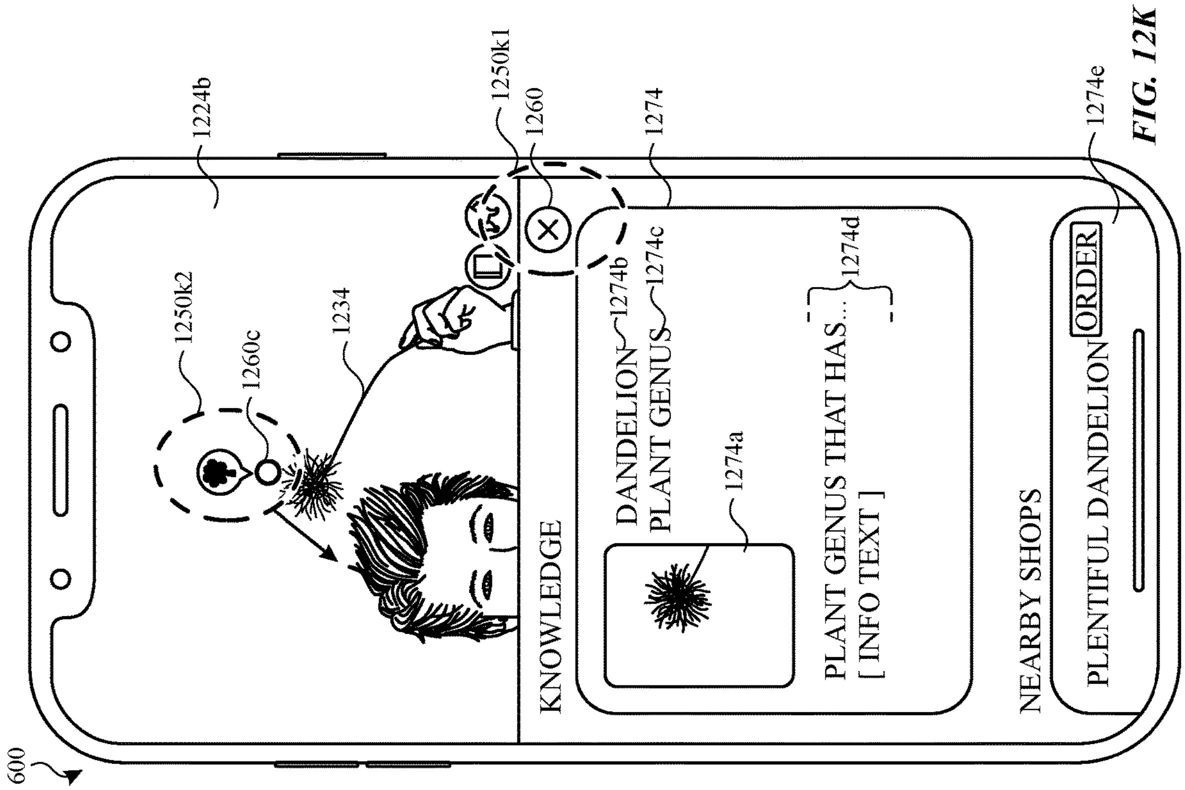

As illustrated in FIG. 12K, in response to detecting tap input 1250*j*, computer system 600 zooms in on enlarged representation 1224*b*, such that feature indicator 1260*c* is enlarged and displayed near (or at) the center of enlarged representation 1224*c* that is shown in FIG. 12K. In response to detecting tap input 1250*j*, computer system 600 changes the visual appearance of feature indicator 1260*c* to indicate that it is selected and display category indicator 1260*c*1. Category indicator 1260*c*1 is the same as category indicator 1260*a*1 of FIG. 12F because feature indicator 1260*c* and feature indicator 1260*a* are feature indicators for features that belong to the same predetermined category of features (e.g., plant category). In some embodiments, when feature indications belong to different predetermined categories of features, the category indicators displayed near (e.g., next to) each respective feature indicator (e.g., when the feature indicator is selected) are different.

As illustrated in FIG. 12K, in response to detecting tap input 1250*j*, computer system 600 displays feature card 1274, using one or more similar techniques as described above in relation to the display of feature card 1270. Feature card 1274 is a feature card for dandelion 1234. In addition, feature card 1274 includes exit control 1266, feature image 1274*a*, feature identifier 1274*b*, feature information 1274*c*, feature information 1274*d*, which function and provide similar information concerning dandelion 1234, using similar techniques as described above in relation to feature card 1270. In addition, feature card 1274 includes order controls. In some embodiments, in response to detecting an input on feature card 1274, computer system 600 initiates an order process to purchase dandelions (e.g., and/or the detected feature). In some embodiments, initiating an order process to purchase dandelions includes displaying a website for purchasing the dandelions. In some embodiments, a feature card includes one or more controls for performing a particular action. In some embodiments, the one or more controls for performing a particular action are selected based on the predetermined category to which the feature card corresponds. In some embodiments, the one or more controls for performing one or more particular actions include a control to order the detected feature (e.g., order dandelions, purchase movie ticket), a control to look-up/obtain the detected feature (e.g., make a reservation), a control to launch an application associated with the detected feature (e.g., launching a dog walking application), an control to initiate out of the detected feature (e.g., play music, play movie). At FIG. 12K, computer system 600 detects tap input 1250*k*1 on exit control 1266 and swipe input 1250*k*2 on enlarged representation 1224*b*.

As illustrated in FIG. 12L, in response to detecting tap input 1250*k*1, computer system 600 ceases to display feature card 1270. In addition, in response to detecting swipe input 1250*k*2, computer system 600 translates (or pans) enlarged representation 1224*b* such that book 1236 is enlarged and is displayed. Because a determination is made that a portion of the text (e.g., or the entire text) of book 1236 satisfies a set of prominence criteria, computer system 600 displays text management control 680 and bracket 6361 around a portion of the words of book 1236, using one or more techniques as described above in relation to FIGS. 6A-6M. As illustrated in FIG. 12L, text management control 680 is displayed concurrently with additional information control 1226*a*. As illustrated in FIG. 12L, text management control 680 is displayed to the left of feature indicators 1262*d*-1262*e*, which have been moved to the right. In some embodiments, text management control 680 is displayed at another location on computer system 600 and feature indicators 1262*d*-1262*e* are moved to accommodate the display of text management control 680. In some embodiments, text management control 680 is displayed at another location on computer system 600 and feature indicators 1262*d*-1262*e* remain in the position in which they were previously displayed before text management control 680 is displayed.

In some embodiments, when a determination is made that at least one feature cannot be detected that belongs to a set of predetermined categories and/or when determination is made that a portion of the text in a displayed enlarged representation does not satisfy a set of prominence criteria, computer system 600 ceases to display additional information control 1226*a* and/or text management control 680. In some embodiments, in response to detecting an input directed to additional information control 1226*a*, computer system 600 ceases to display the feature indicators that are displayed before the input was received and displays additional information control 1226*a* in an inactive state (e.g., de-emphasizes (e.g., does not bold) additional information control 1226*a*)). In some embodiments, in response to detecting an input directed to text management control 680, computer system 600 displays text management options using one or more techniques as described above in relation to FIGS. 6A-6Z.

While FIGS. 12A-12L are described above in the context of computer system 600 displays previously captured media. In some embodiments, computer system 600 uses one or more techniques described above in relation to FIGS. 12A-12L while computer system 600 is displayed a live preview (e.g., 630 of FIGS. 6A-6M). Thus, in some embodiment, computer system 600 can detect features and display feature indicators and feature cards while computer system 600 is displaying a live preview that represents the field of view of the one or more cameras.

FIG. 13 is a flow diagram illustrating a method for identifying visual content in media in accordance with some embodiments. Method 1300 is performed at a computer system (e.g., 100, 300, 500, and/or 600) that is in communication with a display generation component. Some operations in method 1300 are, optionally, combined, the orders of some operations are, optionally, changed, and some operations are, optionally, omitted.

As described below, method 1300 provides an intuitive way for identifying visual content in media. The method reduces the cognitive burden on a user for identifying visual content in media, thereby creating a more efficient human-machine interface. For battery-operated computing devices, enabling a user to identify visual content in media faster and more efficiently conserves power and increases the time between battery charges.

Method 1300 is performed at a computer system (e.g., 600) (e.g., a smartphone, a desktop computer, a laptop, a tablet) that is in communication with (in some embodiments, one or more cameras (e.g., dual cameras, triple camera, quad cameras, etc.) on the same side or different sides of the computer system (e.g., a front camera, a back camera))) a display generation component (e.g., a display controller, a touch-sensitive display system). In some embodiments, the computer system is in communication with one or more input devices (e.g., a touch-sensitive surface).

The computer system displays (1302), via the display generation component, a media user interface (e.g., a media capture user interface, a media viewing user interface, a media editing user interface) that includes a representation (e.g., 1224*a*, 1224*b*) of media (e.g., photo media, video media) (e.g., live media, a live preview (e.g., media corresponding a representation of a field-of-view (e.g., a current field-of-view) of the one or more cameras that has not been captured (e.g., in response to detecting a request to capture media (e.g., detecting selection of a shutter affordance)), previously captured media (e.g., media corresponding a representation of a field-of-view (e.g., a previous field-of-view) of the one or more cameras that has been captured, a media item that has been saved and is able to be accessed by a user at a later time, a representation of media that was displayed in response to receiving an input on a thumbnail representation of the media (e.g., in a media gallery)).

While displaying the media user interface that includes the representation of the media, the computer system receives (1304) a request (e.g., 1250*b*) to display additional information about (e.g., concerning, regarding) a plurality of detected features (e.g., automatically detected (e.g., detected without intervening user input and/or gestures, detected without a request to detect the features being received) in the representation of the media. In some embodiments, the request to display additional information is received in response to receiving an input (e.g., 1250*b*) (e.g., a tap gesture) on a selectable user interface object (e.g., 1226*a*) for displaying additional information, an input/gesture that corresponds to a swipe up gesture (e.g., 1224*b*) (e.g., swipe up) on the media user interface. In some embodiments, the request to display additional information is received in response to receiving a request to display a changed (e.g., 1250*g*) (e.g., zoomed in/out, panned left/right/up/down) version of a previous representation (e.g., 1224*b*) of a media item that was displayed (e.g., receiving a pinch/de-pinch gesture and/or a swipe gesture on the previous representation (e.g., 1224*b*) of the media that was displayed).

In response to receiving the request (e.g., 1250*b*) to display additional information about the plurality of detected features and while displaying the media user interface that includes the representation of the media, the computer system displays (1306) one or more indications (e.g., 1260*a*-1260*c*, 1262*d*-1262*e*) of detected features in the media, including a first indication (e.g., 1260*a*-1260*c*, 1262*d*-1262*e*) (e.g., a visual representation that is a shape (e.g., a circle)) of a first detected feature (e.g., 1232, 1234, 1236, 1238, 1240, 1242) that is displayed at a first location in the representation of the media that corresponds to a location (e.g., displayed on/adjacent to) (e.g., displayed to represent that the first detected feature has been detected) of the first detected feature in the representation of the media, including: in accordance with (1308) a determination that the first detected feature is a first type of feature (e.g., 1232, 1234, 1236, 1238, 1240, 1242) (e.g., belongs to a first category (e.g., dogs, flowers and plants, landmarks, books, cats, paintings, album art, movie posters, shoes, accessories, clothing, groceries, animals, products (e.g., products for a particular company), furniture, people) of detected features), the first indication has a first appearance (e.g., a shape (e.g., circle, diamond) that has a particular color, highlighting); and in accordance with (1310) a determination that the first detected feature is a second type of feature (e.g., 1232, 1234, 1236, 1238, 1240, 1242) (e.g., belongs to a first category (e.g., dogs, flowers and plants, landmarks, books, cats, paintings, album art, movie posters, shoes, accessories, clothing, groceries, animals, products (e.g., products for a particular company), furniture, people) of detected features) that is different from the first type of feature, the first indication (e.g., 1260*a*-1260*c*, 1262*d*-1262*e*) has a second appearance (e.g., a shape (e.g., circle, diamond) that has a particular color, highlighting) that is different from the first appearance (e.g., different in a visual property (e.g., color, shape, highlighting, etc.) other than a location of the first indication in the representation of the media). Displaying the first indication with a different appearance based on the type of the detected feature provides the user with visual feedback of which type of detected feature has been detected. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the one or more indications (e.g., 1260*a*-1260*c*, 1262*d*-1262*e*) of detected features (e.g., 1232, 1234, 1236, 1238, 1240, 1242) in the media includes a second indication (e.g., 1260*a*-1260*c*, 1262*d*-1262*e*) of a second detected feature (e.g., 1232, 1234, 1236, 1238, 1240, 1242) that is displayed at a second location in the representation of the media that corresponds to a location (e.g., displayed on/adjacent to) (e.g., displayed to represent that the second detected feature has been detected) of the second detected feature of the representation of the media, including: in accordance with a determination that the second detected feature is the first type of feature (e.g., 1232, 1234, 1236, 1238, 1240, 1242), the second indication (e.g., 1260*a*-1260*c*, 1262*d*-1262*e*) has the first appearance (or another appearance (e.g., a third appearance)); and in accordance with a determination that the second detected feature is the second type of feature that is different from the first type of feature (e.g., 1232, 1234, 1236, 1238, 1240, 1242), the second indication (e.g., 1260*a*-1260*c*, 1262*d*-1262*e*) has the second appearance (or another appearance (e.g., an appearance that is different from the third appearance)) that is different from the first appearance. Displaying the second indication with a different appearance based on the type of the detected feature provides the user with visual feedback of which type of detected feature has been detected. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first indication (e.g., 1260*a*-1260*c*, 1262*d*-1262*e*) of the first detected feature is concurrently displayed with the second indication (e.g., 1260*a*-1260*c*, 1262*d*-1262*e*) of the second detected feature. In some embodiments, the first detected feature is the first type of feature (e.g., 1232, 1234, 1236, 1238, 1240, 1242) and the second feature is the second type of feature (e.g., 1232, 1234, 1236, 1238, 1240, 1242) (and, in some embodiments, the first indication is displayed with a different visual appearance (e.g., a different color, a shape, etc., where each color of a respective indication corresponds to the respective type of features) as the second indication). Concurrently displaying the first indication of the first detected feature that is the first type of feature and the second indication of the second detected feature that is the second type of feature provides, at one instance in time, the user with visual feedback that multiple features have been detected. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first indication (e.g., 1260*a*-1260*c*, 1262*d*-1262*e*) of the first detected feature (e.g., 1232, 1234, 1236, 1238, 1240, 1242) is concurrently displayed with the second indication (e.g., 1260*a*-1260*c*, 1262*d*-1262*e*) of the second detected feature. In some embodiments, the first detected feature is different from the second detected feature (e.g., 1232, 1234, 1236, 1238, 1240, 1242). In some embodiments, the first detected feature is the first type of feature and the second feature is the first type of feature (and, in some embodiments, the first indication is displayed with the same visual appearance (e.g., a color, a shape, etc. that corresponds to the first type of feature) as the second indication). Concurrently displaying the first indication of the first detected feature that is the first type of feature and the second indication of the second detected feature that is the first type of feature provides, at one instance in time, the user with visual feedback that multiple features have been detected that are the same type of feature. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first indication (or any indication) (e.g., 1260*a*-1260*c*, 1262*d*-1262*e*) that has the first appearance is displayed with a first color (e.g., a first color that is representative of the first type of feature). In some embodiments, the first indication (or any indication) (e.g., 1260*a*-1260*c*, 1262*d*-1262*e*) that has the second appearance is not displayed with the first color. In some embodiments, the first indication that has the second appearance is displayed with a second color that is different from the first color. In some embodiments, the computer system displays indications that have detected features of different types of detected features as having different colors. Displaying the first indication that has the first appearance is displayed with a first color or displaying the first indication that has the second appearance is not displayed with the first color provides the user with visual feedback and gives the user the ability to differentiate an indication of a detected feature that is a first type of feature from an indication of a detected feature that is a second type of feature. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first indication (or any indication) (e.g., 1260*a*-1260*c*, 1262*d*-1262*e*) that has the first appearance is displayed with a first graphical representation (e.g., 1260*a*1, 1260*c*1) (e.g., an icon, a glyph) of the first type of feature. In some embodiments, the first indication (or any indication) (e.g., 1260*a*-1260*c*, 1262*d*-1262*e*) that has the second appearance is displayed with a second graphical representation (e.g., 1260*a*1, 1260*cl*) (e.g., an icon, a glyph) of the second type of feature that is different from the first graphical representation. In some embodiments, the computer system displays indications that have detected features of different types of detected features with different graphical representations. Displaying the first indication that has the first appearance with a different graphical representation that is displayed with the first indication that has the second appearance provides the user with visual feedback and gives the user the ability to differentiate, via the graphical representation, between an indication of a detected feature that is a first type of feature from an indication of a detected feature that is a second type of feature. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the one or more indications (e.g., 1260*a*-1260*c*, 1262*d*-1262*e*) of detected features (e.g., 1232, 1234, 1236, 1238, 1240, 1242) in the media includes a third indication (e.g., 1260*a*-1260*c*, 1262*d*-1262*e*) of a third detected feature that is the first type of feature, a fourth indication (e.g., 1260*a*-1260*c*, 1262*d*-1262*e*) of a fourth detected feature that is the first type of feature, and a fifth indication (e.g., 1260*a*-1260*c*, 1262*d*-1262*e*) of a fifth detected feature that is the second type of feature. In some embodiments, the third indication (e.g., 1260*a*-1260*c*,

1262*d*-1262*e*) is displayed with the same appearance (e.g., first visual appearance) as the fourth indication (e.g., because the third indication and the fourth indication have detected features that are the same type of detected features). In some embodiments, the third indication is displayed with a different appearance (e.g., second visual appearance) than the fifth indication (e.g., because the third indication and the fifth indication have detected features that are a different type of detected feature). Displaying indications of detected features of the same type with a different appearance than indications of detected features of a different type provides the user with visual feedback and gives the user the ability to differentiate between indications of detected features of the same type from indications of detected features of the different type. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of receiving the request to display additional information about the plurality of detected features the representation of the media, the computer system detects an input (e.g., a swipe gesture) (e.g., 1250*g*) directed to a media library (e.g., a media library that is displayed as a part of the media user interface, a plurality of representation of media) (e.g., 1212*a*, 1212*b*). In some embodiments, the input is a non-swipe gesture (e.g., a rotational gesture, a press-and-hold gesture, a mouse/trackpad click/activation, a keyboard input, a scroll wheel input, a hover gesture, and/or tap gesture). In some embodiments, in response to detecting the input (e.g., 1250*g*) directed to the media library and in accordance with a determination that the input is in a first direction (e.g., direction of 1250*g*), the computer system receives the request to display additional information about the plurality of detected features (e.g., information shown in 1282). In some embodiments, in response to detecting the input (1250*h*) directed to the media library and in accordance with a determination that the input is in a second direction (e.g., direction that is not the same or opposite direction of 1250*g*) that is different from the first direction, the request to display additional information about the plurality of the detected features is not received (e.g., as described above in relation to FIG. 12G). In some embodiments, in response to detecting the input directed to the media library and in accordance with a determination that the input is in the second direction (e.g., as described above in relation to FIG. 12G), the computer system displays information about the media library (e.g., 682) and does not display information (e.g., 672) about the one or more indications of the detected features (e.g., as described above in relation to FIG. 12G). Receiving the request to display additional information about the plurality of detected features the representation of the media via detecting an input directed to a media library provides the user with additional control over the computer system by allowing a user to perform an input to display additional information without cluttering the user interface with additional user interface objects. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, while displaying the first indication of the first detected feature, the computer system detects a first input (e.g., 1250*e*, 1250*f*, 1250*j*) (e.g., a tap gesture) directed to the first indication of the first detected feature. In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the first input (e.g., 1250*e*, 1250*f*, 1250*j*) directed to the first indication (e.g., 1260*a*-1260*c*, 1262*d*-1262*e*) of the first detected feature, the computer system displays, via the display generation component, a first user interface object (e.g., 1270, 1272, 1274) (e.g., a card (e.g., a knowledge card)) that includes information about the first detected feature (e.g., 1232, 1234, 1236, 1238, 1240, 1242) (e.g., a photo (e.g., a portion of the representation of the media) of the first detected feature, text concerning the detected feature (e.g., text describing the detected feature, a hyperlink concerning the detected feature)). In some embodiments, displaying the first user interface object includes sliding the first user interface object up from the bottom portion of the display generation component. Displaying the first user interface object that includes information about the first detected feature in response to detecting the first input directed to the first indication of the first detected feature provides the user with additional control over the computer system by allowing a user to control when more information about the first detected feature is displayed. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the information about the first detected feature includes a representation (e.g., 1270*a*, 1272*a*-1272*c*, 1274) of a portion of the media that corresponds to (e.g., that includes a representation of the first detected feature) the first detected feature (e.g., 1232, 1234, 1236, 1238, 1240, 1242). Displaying information about the first detected feature includes a representation of a portion of the media that corresponds to the first detected feature provides the user with visual feedback and allows the user to identify that the displayed information corresponds to the first detected feature that is displayed in the representation of the media. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the one or more indications of detected feature in media include a sixth indication (e.g., 1260*a*-1260*c*, 1262*d*-1262*e*) of a sixth detected feature (e.g., 1232, 1234, 1236, 1238, 1240, 1242). In some embodiments, while displaying the first user interface object (e.g., 1270) that includes information about the first detected feature and the sixth indication (e.g., 1260*a*-1260*c*, 1262*d*-1262*e*) of the sixth detected feature, the computer system detects an input (e.g., a tap gesture) (e.g., 1250*f*) directed to the sixth indication of the sixth detected feature. In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the input (e.g., **1250*f*) directed to the sixth indication of the sixth detected feature, the computer system displays, via the display generation component, a second user interface object (e.g., 1272) (e.g., a card (e.g., a knowledge card)) that includes information about the sixth detected feature; and ceases to display, via the display generation component, the first user interface object (e.g., 1270) that includes information about the first detected feature. In some embodiments, in response to detecting the input (e.g., 1250*f*) directed to the sixth indication (e.g., 1260*a*-1260*c*, 1262*d*-1262*e*) of the sixth detected feature (e.g., 1232, 1234, 1236, 1238, 1240, 1242), the computer system replaces display of the first user interface object (e.g., 1270) with display of the second user interface object (e.g., 1272**). Displaying a second user interface object that includes information about the sixth detected feature and ceasing to display the first user interface object that includes information about the first detected feature in response to detecting the input directed to the sixth indication of the sixth detected feature provides the user with additional control over the computer system by allowing a user to control when information about a particular detected feature is displayed. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently. Displaying a second user interface object that includes information about the sixth detected feature and ceasing to display the first user interface object that includes information about the first detected feature in response to detecting the input directed to the sixth indication of the sixth detected feature provides the user with visual feedback that information about the sixth detected feature has been requested to be displayed and information about the first detected feature has not been requested to be displayed. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the information about the first detected feature includes an option (e.g., **1274*e*) to perform an action (e.g., related to the first detected feature) (e.g., perform an action to obtain (e.g., display, buy, order, launch an application associated with) the first detected feature) (e.g., launch an application associated with (e.g., corresponding to) the detected feature, buy the detected feature (e.g., buy a movie ticket), make a reservation concerning the detected feature, playing a song associated with the detected feature). In some embodiments, in response to detecting an input directed to the option to perform an action, the computer system initiates a process for performing the action (e.g., displaying a user interface for performing the action). Displaying information that includes information to perform an action provides the user with visual feedback that an action can be performed that is related to the first detected feature. In some embodiments, the information about the first detected feature includes text (e.g., description(s), hour(s), article(s)) concerning the detected feature. In some embodiments, the information about the first detected feature includes a link to more content concerning the detected feature. In some embodiments, to display the information about the first detected feature, the computer system ceases to display one or more user interface objects (e.g., 1410, 1420, 1470*a*, 1470*b*, 1470*a*1, 1470*b*1, 1472*a*, 1472*a*1, 1472*b*, 1472*b*1**) and/or replaces display of the one or more user interface object with display of the information. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Displaying information that includes information to perform an action provides the user with additional control over the computer system by allowing a user to cause an action to be performed when the option is selected. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the one or more indications include a seventh indication of a seventh detected feature. In some embodiments, as a part of displaying, via the display generation component, the one or more indications of detected feature in the media, the computer system displays an animation (e.g., one or more of **1260*a*-1260*c*, 1262*d*-1262*e* in FIGS. 12B-12E) of the first indication being displayed before the seventh indication of the seventh feature (e.g., 1232, 1234, 1236, 1238, 1240, 1242) is displayed (and an eighth indication of the eighth feature being displayed before the first indication). In some embodiments, after displaying the animation, the first indication (e.g., one or more of 1260*a*-1260*c*, 1262*d*-1262*e*) is concurrently displayed with the seventh indication (e.g., one or more of 1260*a*-1260*c*, 1262*d*-1262*e***) (and the eighth indication). In some embodiments, the animation is an animation of the one or more indications gradually being displayed (e.g., in a sequence) (e.g., fading in) (e.g., where one indication fades in one after each other). Displaying an animation of the first indication being displayed before the seventh indication of the seventh feature is displayed provides the user with visual feedback concerning detected features in the representation of the media while allowing time for the detected features to be displayed on the display in sequence. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the first indication (e.g., 1260*a*-1260*c*, 1262*d*, 1262*e*) of the first detected feature, the computer system detects a second input (e.g., 1250*j*) (e.g., a tap gesture) (e.g., directed to the first indication of the first detected feature (e.g., 1232, 1234, 1236, 1238, 1240, 1242). In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the second input (e.g., 1250*j*) directed to the first indication of the first detected feature, the computer system displays, via the display generation component, a third graphical representation (e.g., an icon, a glyph) (e.g., 1260*a*1, 1260*c*1) of the first type of feature (e.g., concurrently with the first indication). In some embodiments, in response to detecting the second input directed to the first indication of the first detected feature, the first indication changes color. In some embodiments, the third graphical representation is displayed on top of a portion of the representation of the media and/or the third graphical representation is surrounded by content in the media. In some embodiments, the third graphical representation is displayed at a location that is adjacent to and/or next to the first indication. Displaying a third graphical representation of the first type of feature in response to detecting the second input directed to the first indication of the first detected feature provides the user with feedback concerning the type of feature that to which the first indication corresponds. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the one or more indications (e.g., 1260*a*-1260*c*, 1262*d*, 1262*e*) of detected feature in media include a ninth indication (e.g., 1260*a*-1260*c*, 1262*d*, 1262*e*) of a ninth detected feature (e.g., 1232, 1234, 1236, 1238, 1240, 1242). In some embodiments, while displaying the third graphical representation (e.g., 1260*a*1) of the first type of feature and the ninth indication of the ninth detected feature, the computer system detects an input (e.g., 1250*f*) (e.g., a tap gesture) directed to the ninth indication of the ninth detected feature. In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the input (e.g., 1250*f*) directed to the ninth indication of the ninth detected feature, the computer system ceases to display, via the display generation component, the third graphical representation (e.g., 1260*a*1) of the first type of feature. In some embodiments, in response to detecting the input directed to the ninth indication of the ninth detected feature, the computer system displays a fourth graphical representation of a type of feature that corresponds to (e.g., is) the ninth detected feature. In some embodiments, the fourth graphical representation of the type of feature is displayed adjacent to (e.g., above) the ninth indication. Ceasing to display a third graphical representation of the first type of feature in response to detecting the input directed to the ninth indication of the ninth detected feature provides the user with feedback that the ninth indication does not correspond to the third graphical representation. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the first indication (e.g., 1260*a*-1260*c*, 1262*d*, 1262*e*) of the first detected feature (e.g., 1232, 1234, 1236, 1238, 1240, 1242), the computer system detects a third input (e.g., 1250*f*) (e.g., a tap gesture) directed to the first indication of the first detected feature. In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the third input (e.g., 1250*f*) directed to the first indication of the first detected feature, the computer system displays, via the display generation component, a first user interface object (e.g., a card (e.g., a knowledge card)) (e.g., 1272) that includes information (e.g., 1272*a*-1272*c*) about the first detected feature (e.g., 1232, 1234, 1236, 1238, 1240, 1242) (e.g., a photo (e.g., a portion of the representation of the media) of the first detected feature, text concerning the detected feature (e.g., text describing the detected feature, a hyperlink concerning the detected feature)) and information (e.g., 1280) (e.g., a map (e.g., a map with a detected location (e.g., a location where the media was taken) corresponding to the media), metadata (e.g., a caption, an address, other metadata concerning to the representation of the media), people (e.g., one or more people detected in the representation of the media), memories (e.g., one or more memories and/or categories of the representation of the media), representations of one or more other media that was taken nearby the representation of the media and/or on the same day of the representation of the media, etc.) that correspond to the representation of the media and does not correspond to the first detected feature (e.g., 1232, 1234, 1236, 1238, 1240, 1242). In some embodiments, as a part of displaying the first user interface object, the computer system slides (e.g., moves) the first user interface object up from the bottom portion of the display generation component. In some embodiments, information about the first detected feature is concurrently displayed with information that corresponds to the representation of media and does not correspond to the first detected feature. In some embodiments, while displaying the first user information object, at least some information about the detected feature is display while information that corresponds to the representation of the media and does not correspond to the first detected feature is not displayed, the computer system detects an input directed to the first user interface object and, in response to detecting the input directed to the first user interface object, the computer system ceases to display at least some information about the detected feature and displays at least some information that corresponds to the representation of media and does not correspond to the first detected feature (and, in some embodiments, the computer systems scrolls the first user interface object to display at least some information that corresponds to the representation of media and does not correspond to the first detected feature. Displaying a first user interface object includes information about the first detected feature and information that corresponds to the representation of the media and does not correspond to the first detected feature provides the user with feedback concerning the information related to the first detected feature and information related to the representation of the media in general without the need to display an additional user interface object. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the information that corresponds to the representation of the media and does not correspond to the first detected feature includes metadata (e.g., one or more of 1280) (e.g., a location) corresponding to the representation of the media (e.g., metadata corresponds to where the representation of media was taken). Displaying information that corresponds to the representation of the media and does not correspond to the first detected feature that includes metadata corresponding to the representation of the media provides the user with feedback concerning information related to the representation of the media. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the information that corresponds to the representation of the media and does not correspond to (e.g., concern) the first detected feature includes one or more options (e.g., **1282*f***) (or a plurality of options) for applying an effect (e.g., an animated image effect (e.g., displaying a sequence of images of the media in a loop, not displaying the sequence of images in the loop, applying an exposure (e.g., long exposure) to at least one of the images in the media, shaking and/or bouncing (e.g., moving the representation of media back and forth) the representation of the media) to the media)). In some embodiments, in response to detecting selection (e.g., a gesture directed to) the option for applying the effect to the media, the computer system applies the effect to the media. In some embodiments, the information that corresponds to the representation of the media and does not correspond to (e.g., concern) the first detected feature is also displayed concurrently with information that corresponds to another detected feature. Displaying information that corresponds to the representation of the media and corresponds to the first detected feature includes one or more options for applying an effect provides the user with additional control by allowing a user to cause an effect to be applied to the displayed representation. Providing additional control of the computer system without cluttering the UI with additional displayed controls enhances the operability of the computer system and makes the computer system interface more efficient (e.g., by helping the user to provide proper inputs and reducing user mistakes when operating/interacting with the computer system) which, additionally reduces power usage and improves battery life of the computer system by enabling the user to use the computer system more quickly and efficiently.

In some embodiments, the information that corresponds to the representation of the media and does not correspond to the first detected feature includes one or more links (e.g., **1282*g*, 1282*h***) to related content in a media library (e.g., a media library (e.g., a media gallery) that can be accessed by the computer system (e.g., where the computer system can display a user interface corresponding to the media library)) (e.g., links to related media (e.g., photos, videos), locations, people associated with (e.g., included in) the representation of the media). Displaying information that corresponds to the representation of the media and does not correspond to the first detected feature that includes one or more links to related content in a media library provides the user with feedback concerning external information related to the representation of the media. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first indication (e.g., **1260*a*-1260*c*, 1262*d*, 1262*e*) is displayed at a first location on the display generation component in response to receiving the request to display additional information about the plurality of detected features. In some embodiments, the representation of the media (e.g., 1224) is displayed with a first zoom level (before/after receiving the request to display additional information about the plurality of detected features). In some embodiments, while displaying the first indication (e.g., 1260*a*-1260*c*, 1262*d*, 1262*e*) of the first detected feature at the first location and the representation (e.g., 1224*b*) of the media is displayed with a second zoom level, the computer system detects a fourth input (e.g., 1250*f*) (e.g., a tap gesture) directed to the first indication of the first detected feature. In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the fourth input (e.g., 1250*f*) directed to the first indication of the first detected feature, the computer system enlarges (e.g., zooming in/on) the representation (e.g., 1224*b***) of the media and displays the representation of the media at a second location, wherein the second location is closer to the center of the display generation component than the first location. In some embodiments, as a part of enlarging (e.g., zooming in/on) the representation of the media and displaying the first location at a second location, the computer system zooms in and pans the representation of the media, such that the indication that the input was directed to (e.g., first indication) is near and/or at the center of the displayed portion of the representation (and/or the center of the display). Enlarging the representation of the media and displaying the first location at a second location in response to detecting the fourth input directed to the first indication of the first detected feature provides the user with feedback that the first indication has been selected and/or information is being displayed that corresponds to the first indication. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the plurality of detected feature includes a tenth detected feature (e.g., 1236, 1238, 1240) that is a tenth type of detected feature. In some embodiments, as a part of displaying, via the display generation component, the one or more indications, the computer system, in accordance with a determination that a tenth location in the representation of the media that corresponds to a location of the tenth detected feature cannot be determined, displays, via the display generation component, a tenth indication (e.g., 1262*d*-1262*e*) that corresponds to the tenth detected feature at a predetermined location on the media user interface (e.g., below representation of the media, at a corner of the representation of the media) (e.g., a predetermined location that is different from the tenth location). In some embodiments, in accordance with a determination that the tenth location in the representation of the media that corresponds to a location of the tenth detected feature (e.g., 1232, 1234, 1242) can be determined, the computer system displays the tenth indication (e.g., 1260*a*-1260*c*) at the tenth location (e.g., as discussed above in relation to FIGS. 12B-12E). In some embodiments, in accordance with a determination that a tenth location in the representation of the media that corresponds to a location of the tenth detected feature (e.g., 1236, 1238, 1240) cannot be determined, the tenth indication (e.g., 1262*d*-1262*e*) has a fifth visual appearance (e.g., as discussed above in relation to FIGS. 12B-12E). In some embodiments, in accordance with a determination that a tenth location in the representation of the media that corresponds to a location of the tenth detected feature (e.g., 1236, 1238, 1240) cannot be determined, the tenth indication (e.g., 1262*d*-1262*e*) has a sixth visual appearance that is different from the fifth visual appearance (e.g., as discussed above in relation to FIGS. 12B-12E). Automatically displaying, via the display generation component, a tenth indication that corresponds to the tenth detected feature at a predetermined location on the media user interface when prescribed conditions are satisfied allows the computer system to display an indication when a determination that a respective location in the representation of the media that corresponds to a respective location of a respective detected feature cannot be determined. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the tenth indication (e.g., 1262*d*-1262*e*) displayed at the predetermined location (e.g., for places where the computer system could not figure out where to put an indication (e.g., a hotspot)) is concurrently displayed with the first indication (e.g., 1260*a*-1260*c*) that is displayed at the first location (e.g., for places where the computer system could figure out where to put an indication).

In some embodiments, the plurality of detected features includes an eleventh detected feature (e.g., 1236, 1238, 1240). In some embodiments, as a part of displaying, via the display generation component, the one or more indications, the computer system: in accordance with a determination that an eleventh location in the representation of the media that corresponds to a location of the tenth detected feature cannot be determined and a twelfth location that corresponds to a location of the eleventh detected feature cannot be determined and in accordance with a determination that the tenth detected feature and eleventh detected feature are a different type of detected feature, displays, via the display generation component, an eleventh indication (e.g., 1262*d*-1262*e*) that corresponds to type of feature (e.g., 1236, 1238, 1240) of (e.g., of) eleventh detected feature at a second predetermined location in the media user interface; and in accordance with a determination that an eleventh location in the representation of the media that corresponds to a location of the tenth detected feature cannot be determined and a twelfth location that corresponds to a location of the eleventh detected feature cannot be determined and in accordance with a determination that the tenth detected feature and eleventh detected feature are a same type of detected feature (e.g., 1236, 1238, 1240), forgoes displaying, via the display generation component, the eleventh indication (e.g., 1262*d*-1262*e*). Choosing whether to display the eleventh indication based on when prescribed conditions are satisfied allows the computer system to reduce the amount of indications that are displayed when a location of multiple detected features cannot be determined based on whether the detected features are the same type of detected or a different type of feature. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the tenth indication, the computer system detects an input (e.g., a tap gesture) directed to the tenth indication (e.g., 1262*e*) when the tenth detected feature and eleventh detected feature are the same type of detected feature. In some embodiments, the input is a non-tap gesture (e.g., a rotational gesture, a press-and-hold gesture, a mouse/trackpad click/activation, a keyboard input, a scroll wheel input, and/or a hover gesture). In some embodiments, in response to detecting the input (e.g., 1250*f*) directed to the tenth indication (e.g., 1262*e*), the computer system displays, via the display generation component, a user interface object (e.g., 1272) that includes information about the tenth detected feature and information about the eleventh detected feature. In some embodiments, in accordance with a determination that the tenth detected feature (e.g., 1236, 1238, 1240) and eleventh detected feature (e.g., 1236, 1238, 1240) are different types of detected features, and while displaying the eleventh indication (e.g., 1262*d*-1262*e*), the computer system detects an input (e.g., 1250*f*) directed to the eleventh indication (e.g., 1262*d*-1262*e*) and, in response to detecting the input directed to the eleventh indication, displays information (e.g., 1272) about the eleventh detected feature without displaying information about the tenth detected feature (e.g., as discussed above in relation to FIGS. 12F-12G). In some embodiments, in accordance with a determination that the tenth detected feature and eleventh detected feature are different types of detected features, and while displaying the tenth indication, the computer system detects an input (e.g., 1250*f*) directed to the tenth indication and, in response to detecting the input directed to the tenth indication, displays information about the tenth detected feature without displaying information about the eleventh detected feature (e.g., as discussed above in relation to FIGS. 12F-12G). Displaying a user interface object that includes information about the tenth detected feature and information about the eleventh detected feature in response to detecting the input directed to the tenth indication provides the user with feedback concerning detected features of the same type via one user interface object. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of displaying the media user interface, the computer system displays a first user interface object (e.g., 1226*a*) for displaying additional information (e.g., a user interface object that includes an "i" icon) concurrently with a user interface object for (e.g., 680) corresponding to one or more text management operations (e.g., as described above in relation to FIGS. 6A-6M, FIGS. 7E-7L, FIG. 8 and FIG. 9). In some embodiments, in response to detecting an input directed to the first user interface object for displaying information, the computer system receiving the request to display additional information.

In some embodiments, while displaying the representation of the media, the computer system receives a request (e.g., 1250*k*2) to display a second representation (e.g., 1224*b*) of second media that is different from (e.g., a different media file having different content and/or data) the representation of the media. In some embodiments, the request to display a second representation of second media is received when the computer system detects a swipe gesture on the representation of the media when the computer system detects a tap gesture on a thumbnail representation of the media. In some embodiments, in response to receiving (e.g., 1250*k*2) the request to display the second representation of second media that is different from the media and in accordance with a determination that the representation of the second media (and/or the media) includes one or more detected features, the computer system displays, via the display generation component, a second user interface object (e.g., 1226*a*) for displaying additional information (e.g., a user interface object that includes an "i" icon) (concurrently with the second representation of the second media). In some embodiments, in response to receiving (e.g., 1250*k*2) the request to display the second representation of second media that is different from the media and in accordance with a determination that the representation of the media does not include the one or more detected feature, the computer system forgoes displaying, via the display generation component, the second user interface object (e.g., 1226*a*) for displaying additional information (e.g., while displaying the second representation of the second media). In some embodiments, while displaying the user interface object for displaying additional media, the computer system detects an input directed to the user interface object for displaying additional information and, in response to detecting the input directed to the user interface object for displaying additional information, the request to display additional information about a plurality of detected features is received. Choosing whether to display user interface object for displaying additional information when prescribed conditions are satisfied allows the computer system to de-clutter the user interface by displaying the user interface object for displaying additional information when a determination is made that the respective representation of the media includes one or more detected features. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, one or more steps of method 1300 described above can also apply to a representation of video media, such as one or more live frames and/or paused frames of video media. In some embodiments, one or more steps of method 1300 described above can be applied to representation of media in user interfaces for applications that are different from the user interfaces described in relation to FIGS. 12A-12L, which include, but are not limited to, user interfaces corresponding to a productivity application (e.g., a note taking application, a spreadsheeting application, and/or a tasks management application), a web application, a file viewer application, and/or a document processing application, and/or a presentation application.

Note that details of the processes described above with respect to method 1300 (e.g., FIG. 13) are also applicable in an analogous manner to the other methods described herein. For example, method 1300 optionally includes one or more of the characteristics of the various methods described herein with reference to methods 800, 900, 1100, 1500, and 1700. For example, detected features can be translated using method 1500. For brevity, these details are not repeated below.

FIGS. 14A-14N illustrate exemplary user interfaces for translating visual content in media in accordance with some embodiments. The user interfaces in these figures are used to illustrate the processes described below, including the processes in FIG. 15.

FIG. 14A illustrates computer system 600 displaying a translation application user interface that includes translation control region 1402, translation input field 1408, and translation control region 1406. Translation control region 1402 includes language input control 1402*a* and language output control 1402*b*. In FIG. 14A, language input control 1402*a* indicates that computer system 600 will identify words (e.g., detected audio, text) to be translated as being German, and language output control 1402*b* indicates that computer system 600 output translated language in the English (United States) language. In other words, at FIG. 14A, computer system 600 is configured to translate German words (and/or sentences, paragraphs, etc.) into English words (and/or sentences, paragraphs, etc.). In some embodiments, in response to detecting an input directed to language input control 1402*a*, computer system 600 displays selectable options that allow a different input language to be chosen. In some embodiments, in response to detecting an input directed to language output control 1402*b*, computer system 600 displays selectable options that allow a different output language to be chosen.

As illustrated in FIG. 14A, translation input field 1408 is displayed above translation control region 1402 and below translation control region 1406. Translation input field 1408 includes the instruction "ENTER TEXT" and is a text entry field that allows inserted text to be translated. As illustrated in FIG. 14A, voice input control 1416 is displayed on top of a portion of translation input field 1408. In some embodiments, in response to detecting an input directed to voice input control 1416, computer system 600 initiates a process to capture audio (e.g., live audio) and, after receiving the audio, computer system 600 can output a translation of the captured audio.

As illustrated in FIG. 14A, translation control region 1406 includes translation input control 1406*a*, camera translation control 1406*b*, conversation translation control 1406*c*, and favorites control 1406*d*. As illustrated in FIG. 14A, translation input control 1406*a* is displayed as being selected because the translation application user interface of FIG. 14A is displayed. In some embodiments, in response to receiving an input directed to translation input control 1406*a*, computer system 600 displays the translation application user interface of FIG. 14A. In some embodiments, in response to detecting an input directed to conversation translation control 1406*c*, computer system 600 displays a conversation user interface, where computer system 600 is configured to perform bi-directional translation (e.g., translation between two languages, regardless of which language is output and/or input).

As illustrated in FIG. 14A, computer system 600 is positioned over menu 1440. German words 1444 (e.g., menu items) are on the left side of menu 1440 and include German words 1444*a*-1444*u*. Thus, menu 1440 is a menu for people who can read and understand German. The right side of menu 1440 includes background images (e.g., of a building, of a flag) and no words. As illustrated in FIG. 14A, computer system 600 is positioned over the right side of menu 1440. At FIG. 14A, computer system 600 detects tap input 1450*a* on camera translation control 1406*b*.

As illustrated in FIG. 14B, in response to detecting tap input 1450*a*, computer system 600 displays camera translation control 1406*b* as being selected (e.g., "bolded") and ceases to display translation input control 1406*a* as being selected (e.g., "not bolded"). As illustrated in FIG. 14B, in response to detecting tap input 1450*a*, computer system 600 ceases to display translation input field 1408 of FIG. 14A and displays camera control region 1404 at the location at which translation input field 1408 was previously displayed in FIG. 14A. As illustrated in FIG. 14B, camera control region 1404 includes media gallery control 1424 (e.g., that, when selected, causes computer system 600 to display a media gallery), media capture control 1410 (e.g., that, when selected, causes computer system 600 to pause the capture of one or more objects), and flashlight control 1426 (e.g., that, when selected, causes computer system 600 to turn on/off an external light that is in communication with computer system 600).

As illustrated in FIG. 14B, camera control region 1404 also includes live preview 1430. At FIG. 14B, computer system 600 initiates one or more cameras of computer system 600 to capture data, such that computer system 600 is currently capturing one or more objects in the field-of-view of the one or more cameras in FIG. 14B. Live preview 1430 is a representation of the FOV (e.g., and/or data being captured). In some embodiments, live preview 1430 is displayed using one or more similar techniques as discussed above in relation to the display of live preview 630 of FIGS. 6A-6Z.

Similar to FIG. 14A, computer system 600 is displayed over the right side of menu 1440 that includes the background images and no words in FIG. 14B. As a result, in FIG. 14B, live preview 1430 includes a portion of the background images on the right side of menu 1440 because the right side of the menu is in the FOV. At FIG. 14B, leftward movement of computer system 600 is initiated.

As illustrated in FIG. 14C, computer system 600 is positioned over the left side of menu 1440 in FIG. 14B, which includes German words 1444*a*-1444*u* (e.g., shown in FIG. 14A). As illustrated in FIG. 14C, computer system 600 updates live preview 1430. At FIG. 14C, live preview 1430 is updated to show the portion of the left side of menu 1440 that is in the FOV, which includes German words 1444*c*1-1444*n* (e.g., as shown in FIG. 14A). While displaying the portion of the left side of menu 1440 that is in the FOV, computer system 600 replaces (e.g., automatically without detecting an input on the display of computer system 600 and/or to control whether translation occurs) German words 1444*c*1-1444*n* (e.g., shown in FIG. 14A) with translation objects 1446 (e.g., 1446*c*1-1446*n*) at FIG. 14C. Each of translation objects 1446*c*1-1446*n* include an English translation of the corresponding German word that each of the translation objects 1446*c*1-1446*n* is position on top of in FIG. 14C. In FIG. 14C, translation objects 1446*c*1-1446*n* are computer-generated objects, which are displayed over (e.g., at the position of) each of German words 1444*c*1-1444*n* to which each translation objects 1446*c*1-1446*n* corresponds. Thus, in FIG. 14C, portions of German words 1444*c*1-1444*n* (as shown in FIG. 14A) are not represented in live preview 1430 because translation objects 1446*c*1-1446*n* are displayed on top of German words 1444*c*1-1444*n*. In some embodiments, translation objects 1446*c*1-1446*n* have visual appearances that are determined by the visual appearance of content (e.g., words, images, background) of menu 1440. In some embodiments, one or more of translation objects 1446*c*1-1446*n* are the same color, texture, size, shape and/or include text in the same font as the content of menu 1440. In some embodiments, all of the translation objects 1446*c*1-1446*n* do not have the same visual appearance (e.g., background color, texture, size, font, tone, and/or shape). In some embodiments, the visual appearance of one or more of translation objects 1446*c*1-1446*n* is determined by the particular underlying content positioned underneath translation objects 1446*c*1-1446*n*. At FIG. 14C, computer system 600 detects tap input 1450*c* on translation object 1446*e* ("EGGS").

As illustrated in FIG. 14D, in response to detecting tap input 1450*c*, computer system 600 displays translation card 1470 and ceases to display a portion of live preview 1430 that was previously displayed in FIG. 14C and translation control region 1406 (e.g., in FIG. 14A). While displaying translation card 1470, computer system 600 continues to display some of translation objects 1446 that were previously displayed in FIG. 14C (e.g., 1446*c*1-1446*j* of FIG. 14C) and ceases to display some of translation objects 1446 (e.g., 1446*k*-1446*n* of FIG. 14C) that were previously displayed in FIG. 14C. In some embodiments, computer system 600 slides translation card 1470 up from the bottom of the display in response to detect tap input 1450*c*.

As illustrated in FIG. 14D, translation card 1470 is a translation card for the word "EGGS" that corresponds to translation object 1446*e*. Translation card 1470 includes exit control 1466 (e.g., that, when selected, causes translation card 1470 to cease to be displayed), source word section 1470*a*, translated word section 1470*b*, copy-translation control 1480, and add-to-favorites control 1482. Source word section 1470*a* includes an indication of the source word ("EIR") (e.g., word to be translated), the language ("GERMAN") of the source word, and source word output control 1470*a*1. As used herein, the source word is captured by one or more cameras of computer system 600 and is a part of menu 1440 (e.g., 1444*e* in FIG. 14A). Translated word section 1470*b* includes an indicator of the translated word (e.g., "EGGS"), the language of the translated word (e.g., "ENGLISH"), and translated word output control 1470*b*1. The translated word (e.g., EGGS) is included in the selected translated object (e.g., 1446*e* that was selected via tap input 1450*c* at FIG. 14C). In some embodiments, in response to detecting an input directed to source word output control 1470*a*1, computer system 600 output an audible indication (e.g., voice output) corresponding to (e.g., of) the source word. In some embodiments, in response to detecting an input directed to translated word output control 1470*b*1, computer system 600 outputs an audible indication (e.g., voice output) corresponding to (e.g., of) the translated word (e.g., an audible uttering of the translated word). In some embodiments, the audible indication of a word includes audible output of a pronunciation of the word, a phrase that includes the words, the definitions of the word, etc. In some embodiments, in response to detecting an input directed to copy-translation control 1480, computer system 600 copies the translated word and/or copies the translated card into a copy buffer so that the translated word and/or translated card can be pasted in one or more applications. In some embodiments, in response to detecting an input directed to add-to-favorites control 1482, computer system 600 adds (or saves) the translation card to a list of translation cards (e.g., a predetermined list, a user-designated and/or created list). In some embodiments, computer system 600 displays an option to share the translation card concurrently with translation card 1470. In some embodiments, in response to detecting an input directed to the option to share while translation card 1470 is displayed, computer system 600 initiates a process for sharing the translation card with one or more other computer systems and/or via one or more applications (e.g., a messaging application, an e-mail application, a video conferencing application, a word processing application, etc.). In some embodiments, computer system 600 indicates that translation object 1446*e* is selected while translation card 1470 is concurrently displayed with translation object 1446*e*. At FIG. 14D, computer system 600 detects tap input 1450*d* on translation object 1446*d* ("CHICKEN").

As illustrated in FIG. 14E, in response to detecting tap input 1450*d*, computer system 600 ceases to display translation card 1470 and displays translation card 1472 at the position in which translation card 1470 was previously displayed (e.g., replaces translation card 1470 with translation card 1472). While displaying translation card 1472, computer system 600 continues to display translation objects 1446 that were previously displayed in FIG. 14D. Translation card 1472 is a translation card for the word "CHICKEN" that corresponds to translation object 1446*d* (e.g., translation card 1470 of FIG. 14C corresponds to a different word than translation card 1472 of FIG. 14D). Translation card 1472 includes exit control 1466, source word section 1472*a*, translated word section 1472*b*, copy-translation control 1480, and add-to-favorites control 1482. Source word section 1472*a* includes an indication of the source word ("HÅNCHMEN"), the language ("GERMAN") of the source word, and source word output control 1472*a*1. Translated word section 1472*b* includes an indication of the translated word ("CHICKEN"), the language ("ENGLISH") of the translated word, and translated word output control 1472*b*1. In some embodiments, computer system 600 using one or more similar techniques with those described in relation to display and response to source word output control 1472*a*1 and translated word output control 1472*b*1 as described above in relation to source word output control 1470*a*1 and translated word output control 1470*b*1, respectively. In some embodiments, translation card 1472 is displayed using one more techniques as described above in relation to displaying translation card 1472 of FIG. 14D. At FIG. 14E, computer system 600 detects tap input 1450*e*1 on add-to-favorites and detects tap input 1450*e*2 on exit control 1466. In addition, downward movement of computer system 600 is initiated.

At FIG. 14F, in response to detecting tap input 1450*e*1, computer system 600 adds translation card 1472 to a list of translation cards (e.g., that can be retrieved by a user selecting favorites control 1406*d*, which is further discussed below in relation to FIG. 14K).

At FIG. 14F, in response to detecting tap input 1450*e*2, computer system 600 ceases to display translation card 1472 and re-displays translation control region 1406 along with media gallery control 1424, media capture control 1410, and flashlight control 1426. In addition, because no translation card is displayed, computer system 600 increases the area of live preview 1430 (e.g., re-displays a portion of live preview 1430 that was not previously displayed while translation card 1472 was displayed).

As illustrated in FIG. 14F, computer system 600 has moved downward and is positioned over a lower portion of menu 1440 that it was previously positioned over in FIG. 14E. As illustrated in FIG. 14F, computer system 600 updates live preview 1430, such that translation objects 1446*p*-1446*u* are shown over the position of German words 1444*p*-1444*u* on menu 1440 (e.g., as shown in FIG. 14A). Thus, at FIG. 14F, computer system 600 displays translation objects for words that are in the FOV, such that the words in the FOV are translated and displayed in live preview 1430 dynamically (e.g., as computer system 600 is moved around menu 1440). While FIG. 14F is not illustrated with a translation card displayed (e.g., such as translation cards 1470-1472), computer system 600 can also update live preview 1430 dynamically (e.g., as described above in relation to FIGS. 14E-14F) while a respective translation card is displayed. In some embodiments, whether or not computer system 600 displays a translation card does not impact computer system 600's ability to update live preview 1430 dynamically (e.g., as described above in relation to FIGS. 14E-14F). However, in some embodiments, while a translation card is displayed, computer system 600 maintains display of live preview 1430 without updating live preview 1430 dynamically. In some embodiments, computer system 600 displays translation objects 1446*p*-1446*u*, using one or more similar techniques as those described above in relation to translation objects 1446*c*1-1446*n* in FIG. 14C. At FIG. 14F, upward movement of computer system 600 is initiated.

As illustrated in FIG. 14G, computer system 600 has moved upward back to the position in which it was at FIGS. 14C-14E. Thus, computer system 600 displays translation objects 1446 of FIG. 14G using one or more similar techniques as those described above in relation to FIG. 14C-14E. At FIG. 14G, computer system 600 detects de-pinch input 1450*g* on live preview 1430.

As illustrated in FIG. 14H, in response to detecting de-pinch input 1450*g*, computer system 600 increases the zoom level of live preview 1430, such that's objects in the FOV are displayed at an enlarged size as compared to how the objects were displayed in FIG. 14G. While live preview 1430 is displayed at an increased zoom level in FIG. 14H, computer system 600 increases the sizes of some of translation objects 1446 that were displayed in FIG. 14G while ceasing to display some of the translation objects 1446 that were displayed in FIG. 14G. At FIG. 14H, computer system 600 detects tap input 1450*h* on media capture control 1410.

At FIG. 14I, in response to detecting tap input 1450*h*, computer system 600 pauses the capture of data (e.g., media) in the FOV and/or freezes (e.g., ceases to dynamically update) live preview 1430. In addition, computer system 600 replaces media capture control 1410 of FIG. 14H with media capture control 1412 (e.g., "X") of FIG. 14I and continues to display media gallery control 1424. As illustrated in FIG. 14I, in response to detecting tap input 1450*h*, computer system 600 displays share control 1428 along with media capture control 1412. In particular, computer system 600 replaces flashlight control 1426 of FIG. 14H with share control 1428 of FIG. 14I. In some embodiments, in response to detecting an input directed to share control 1428, computer system 600 initiates a process to share an image of live preview 1430 (e.g., that includes translation objects 1446) with one or more computer systems and/or applications (e.g., messaging application, e-mail applications, video conference applications, word processing applications, etc.). In some embodiments, in response to detecting an input directed to share control 1428, computer system 600 initiates a process to share an image of live preview 1430 while a translation card is not displayed. At FIG. 14I, downward movement of computer system 600 is initiated.

As illustrate in FIG. 14J, computer system 600 has moved down to the position in which computer system 600 was previously at FIG. 14H. As illustrated in FIG. 14J, computer system 600 does not update live preview 1430 after being moved. Thus, unlike in FIG. 14H when computer system 600 updated live preview 1430 after being moved, computer system 600 does not update live preview 1430 of FIG. 14J after being moved because computer system 600 has paused the capture of data (e.g., media) in the FOV and/or frozen (e.g., ceases to dynamically update) live preview 1430. At FIG. 14J, computer system 600 detects tap input **1450*j*1 on media capture control 1412 and detects tap input 1450*j*2 on favorites control 1406*d***.

At FIG. 14K, in response to detecting tap input **1450*j*1, computer system 600 continues the capture of data (e.g., media) in the FOV and/or is configured to dynamically update live preview 1430**.

As illustrated in FIG. 14K, in response to detecting tap input **1450*j*2, computer system 600 displays favorites user interface 1488. Favorites user interface 1488 includes saved translation card 1462 that corresponds to translation card 1472 of FIG. 14E (e.g., that was saved and/or added to the list of translation cards in response to the detection of tap input 1450*e*1). Translation card 1462 includes one or more user interface objects that were included in translation card 1472, such as source word section 1472*a* (e.g., "GERMAN", "HÅNCHMEN"), translated word section 1472*b* (e.g., "EGGS", "CHICKEN"), and audio output control 1462*d*. Translation card 1462 also includes one or more user interface objects that were not included in translation card 1472, such as translation image 1462*c*. Translation image 1462*c* is an image of a portion of the menu 1440 (e.g., as evident by the portion of an egg displayed next to "HÅNCHMEN" being displayed on menu 1440 and in translation image 1462*c*) that includes the word (e.g., "HÅNCHMEN," 1444*d* in FIG. 14A) corresponding to translation card 1462. In some embodiments, favorites user interface 1488** includes one or more other translation cards that correspond to translation cards that have been selected (e.g., favorited) by a user of the computer system to be included in the list of favorited translation cards.

Notably, in FIG. 14K, favorites user interface 1488 does not display a translation card as a favorite translation card that corresponds to translation card 1470 of FIG. 14D. This is at least because translation card 1470 was not selected as being a favorite in FIG. 14D (e.g., add-to-favorites control 1482 was not selected while translation card 1470 was displayed). However, favorites user interface 1488 does include translation card 1460 that corresponds to translation card 1470 as a recent translation card and/or a translation card that was recently accessed and/or displayed (e.g., via detecting an input directed to a translation object). At FIG. 14K, computer system 600 detects tap input **1450*k* on camera translation control 1406*b***.

As illustrated in FIG. 14L, in response to detecting tap input **1450*k*, computer system 600 ceases to display favorites user interface 1488 and re-displays camera control region 1404 that includes live preview 1430 and media gallery control 1424. At FIG. 14L, computer system 600 detects tap input 14501 on media gallery control 1424**.

As illustrated in FIG. 14M, in response to detecting tap input 14501, computer system 600 ceases to display the controls in translation control region 1406 and display of media gallery control 1424, media capture control 1410, and flashlight control 1426. In addition, in response to detecting tap input 14501, computer system 600 displays thumbnail representations 1432, where are thumbnails that correspond to previously captured media. Thumbnail representations 1432 occupy two rows and take up the position that translation control region 1406, media gallery control 1424, media capture control 1410, and flashlight control 1426 occupied previously in FIG. 14L. Thumbnail representations 1432 includes thumbnail representation **1432*a*, which is a representation of a phone of a sign with German language that reads, "FAHRRADSTRAßE ANLIEGER FREI". At FIG. 14M, computer system 600 detects tap input 1450*m* on thumbnail representation 1432*a***.

As illustrated in FIG. 14N, in response to detecting tap input **1450*m*, computer system 600 displays enlarged representation 1454*a*, which corresponds to the same media item represented by thumbnail representations 1432. As illustrated in FIG. 14N, enlarged representation 1454*a* includes translation objects 1496*a*-1496*c*, which is the English translation (e.g., "BIKE STREET RESIDENT FREE") of the German language (e.g., "FAHRRADSTRAßE ANLIEGER FREI") on the sign shown in thumbnail representation 1432*a*. As illustrated in FIG. 14N, translation objects 1496*a*-1496*c* is displayed over (e.g., in the position of) each of the individual German words on the sign represented in enlarged representation 1454*a*, using one or more similar techniques as discussed above in relation to FIG. 14C. Thus, as shown in FIGS. 14M-14N, computer system 600 can translate text/symbols included in previously captured media as well as text/symbols included in the FOV (e.g., as described above in relation to FIGS. 14A-14**L) and/or while displaying a live preview of media.

FIG. 15 is a flow diagram illustrating a method for translating visual content in media in accordance with some embodiments. Method 1500 is performed at a computer system (e.g., 100, 300, 500, and/or 600) that is in communication with one or more cameras, one or more input devices, and a display generation component. Some operations in method 1500 are, optionally, combined, the orders of some operations are, optionally, changed, and some operations are, optionally, omitted.

As described below, method 1500 provides an intuitive way for translating visual content in media. The method reduces the cognitive burden on a user for translating visual content in media, thereby creating a more efficient human-machine interface. For battery-operated computing devices, enabling a user to translate visual content in media faster and more efficiently conserves power and increases the time between battery charges.

Method 1500 is performed at a computer system (e.g., 600) (e.g., a smartphone, a desktop computer, a laptop, a tablet) that is in communication with one or more cameras (e.g., one or more cameras (e.g., dual cameras, triple camera, quad cameras, etc.) on the same side or different sides of the computer system (e.g., a front camera, a back camera))), a display generation component (e.g., a display controller, a touch-sensitive display system), and one or more input devices (e.g., a touch-sensitive surface).

The computer system receives (1502) a request (e.g., 1450*a*) to display a representation (e.g., 1224*a*, 1224*b*) (e.g., live media, a live preview, a previously captured media) of the field-of-view of the one or more cameras. In some embodiments, the request to display a representation of the field-of-view of the one or more cameras when the computer system is moved, when an input/gesture has been detected on a selectable user interface object (e.g., a user interface object for opening a media capture user interface, a user interface object for translating captured media).

In response to (1504) receiving (e.g., 1450*a*) the request to display the representation of the field-of-view of the one or more cameras, the computer system displays (1506), via the display generation component, the representation (e.g., 1430) of the field-of-view of the one or more cameras, wherein the representation includes text (e.g., original text, text captured in the field-of-view of the one or more cameras) (e.g., one or more words) that is in the field-of-view of the one or more cameras.

In response to (1504) receiving (e.g., 1450*a*) the request to display the representation of the field-of-view of the one or more cameras, the computer system automatically (e.g., without intervening user input and/or gestures, without receiving a request to display the translated text) displays (1508) (e.g., concurrently with (and/or on) the representation of the field-of-view of the one or more cameras), via the display generation component, a plurality of indications (e.g., 1446) of translated text (textual indications (e.g., textual indications with highlighting)) that include a first indication (e.g., 1446) of a translation of a first portion (e.g., 1444) of the text and a second indication (e.g., 1446) of a translation of a second portion (e.g., 1444) of the text. In some embodiments, the plurality of indications is displayed at a location corresponding to the original text that has been translated. In some embodiments, automatically displaying the plurality of indications (textual indications (e.g., textual indications with highlighting)) includes automatically translating the text of the representation of the field-of-view of the one or more cameras. In some embodiments, as a part of displaying the plurality of indications (e.g., 1446), the computer system replaces the respective portion of the text (e.g., "EIER" as shown in FIG. 14B, 1444*e* in FIG. 14A) with the respective translated portion of the text (e.g., "EGGS" as shown in FIG. 14C, 1446*e*) (and maintains display of one or more portions of the text that have not been translated and/or maintains one or more portions (e.g., picture of waffle in FIGS. 14C-14F) of the representation of the field-of-view of the one or more cameras that does not include text (e.g., an image and/or background in the representation of the field-of-view of the one or more cameras that does not include the text)) (e.g., as described above in relation to FIGS. 14C-14F).

The computer system, while displaying, via the display generation component, the first indication (e.g., 1446) and the second indication (e.g., 1446), receives (1510), via the one or more inputs devices, a request (e.g., 1450*c*, 1450*d*) to select a respective indication (e.g., 1446) of the plurality of translated portions (e.g., a symbol (e.g., box) surrounding and/or covering the original text (e.g., untranslated, original text)).

In response to receiving the request (e.g., 1450*c*, 1450*d*) to select the respective indication, in accordance with a determination that the request is a request to select the first indication (e.g., 1446), the computer system displays (1512), via the display generation component, a first translation user interface object (e.g., 1470, 1472) (e.g., a translation card) that includes the first portion (e.g., 1470*a*, 1472*a*) of the text and the translation (e.g., 1470*b*, 1472*b*) of the first portion of the text without including the translation of the second portion (e.g., 1470*b*, 1472*b*) of the text (e.g., without displaying a translation user interface object that corresponds to a second incitation of the plurality of indications, where the second indication is different from the first indication and corresponds to a translation of the second portion text (e.g., that is different from the first portion of the text) that is different from the translation of the first portion of the text). In some embodiments, the first indication (e.g., 1446*e*) includes the translation of the first portion (e.g., 1444*e*) of the text (and does not include the translation of the second portion (e.g., 1444*d*) of the text). In some embodiments, the first translation user interface object (e.g., 1470, 1472) is displayed concurrently with the plurality of indications (e.g., 1446) and/or the representation (e.g., 1430) of the field-of-view of the one or more cameras (e.g., is displayed with the text (e.g., the original text or the untranslated portion of the text that corresponds to the first portion of the text) and/or a translation of one or more portions of the text) (e.g., as described above in relation to FIGS. 14C and 14D). In some embodiments, in response to receiving the request (1450*c*, 1450*d*) to select the first indication (e.g., 1446), the first indication is updated to show that the first indication is selected (e.g., highlighted) (e.g., changes from being in an unselected visual state to a selected visual state) (e.g., without the second indication being updated to show that the second indication is selected).

In some embodiments, in response to receiving (e.g., 1450*c*, 1450*d*) the request to select the respective indication, in accordance with a determination that the request is a request to select the second indication, the computer system displays, via the display generation component, a second translation user interface object (e.g., 1470, 1472) that includes a second portion of the text (e.g., 1470*a*, 1472*a*) and the translation (e.g., 1470*b*, 1472*b*) of the second portion of the text without including a translation (e.g., 1470*b*, 1472*b*) of the first portion of the text. In some embodiments, the second indication includes the translation of the second portion of the text (and does not include the translation of the first portion of the text). In some embodiments, the second translation user interface object (e.g., 1470, 1472) is displayed concurrently with the plurality of indications (e.g., 1446) and/or the representation (e.g., 1430) of the field-of-view of the one or more cameras (e.g., is displayed with the text (e.g., the original text or the untranslated portion of the text that corresponds to the first portion of the text) and/or a translation of one or more portions of the text) (e.g., as described above in relation to FIGS. 14C and 14D). In some embodiments, in response to receiving (e.g., 1450*c*, 1450*d*) the request to select the second indication (e.g., 1446*d*, 1446*e*), the second indication is updated to show that the second indication is selected (e.g., highlighted) (e.g., changes from being in an unselected visual state to a selected visual state) (e.g., without the first indication being updated to show that the first indication is selected) (e.g., as discussed above in relation to FIGS. 14D-14E). Displaying the second translation user interface object when certain prescribed conditions are satisfied (e.g., in response to receiving the request to select the respective indication and in accordance with the determination that the request is a request to select the second indication) automatically provides the user with the ability to decide what portion of text the user would like to have translated. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first translation user interface object (e.g., 1470, 1472) includes (e.g., one or more of) a pronunciation option (e.g., 1470*a*1, 1472*a*1) (e.g., a play icon) that, when activated, causes the computer system to output an indication of how to pronounce the first portion (e.g., 1470*a*, 1472*a*) of text and a pronunciation option (e.g., 1470*b*1, 1472*b*1) (e.g., a play icon) that, when activated, causes the computer system to output an indication of how to pronounce the translation (e.g., 1470*b*, 1472*b*) of the first portion of text. In some embodiments, the pronunciation option that indicates how to pronounce the first portion of text is displayed adjacent to and/or on the same row and/or column as the first portion of the text. In some embodiments, the pronunciation option (e.g., 1470*a*1, 1472*a*1) (e.g., a play icon) that indicates how to pronounce the translation of the first portion of text (e.g., 1470*a*, 1472*a*) is displayed adjacent to and/or on the same row and/or column as the translation (e.g., 1470*b*, 1472*b*) of the first portion of the text. In some embodiments, the computer system detects selection of the pronunciation option (e.g., 1470*a*1, 1472*a*1) that indicates how to pronounce the first portion of text (e.g., 1470*a*, 1472*a*), and in response to detecting a selection of the pronunciation option that indicates how to pronounce the first portion of text, the computer system outputs (e.g., via one or more speakers of the computer system) a response (e.g., an audible response, a visual response) includes a pronunciation of the first portion of the text (e.g., and does not include a pronunciation of the translation of the first portion of text (e.g., as described above in relation to FIG. 14E). In some embodiments, the computer system detects selection of the pronunciation option (e.g., 1470*b*1, 1472*b*1) that indicates how to pronounce the translation of first portion of text (e.g., 1470*b*, 1472*b*), and in response to detecting a selection of the pronunciation option that indicates how to pronounce the first portion of text, the computer system outputs (e.g., via one or more speakers of the computer system) a response (e.g., an audible response, a visual response) includes a pronunciation of the translation (e.g., 1470*b*, 1472*b*), of the first portion of the text (e.g., and does not include a pronunciation of the first portion of text) (e.g., as described above in relation to FIG. 14E). Including a pronunciation option that, when activated, causes the computer system to output an indication of how to pronounce the first portion of text in the first translation user interface object provides the user with visual feedback regarding the accurate pronunciation of the first portion of text. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Including a pronunciation option that, when activated causes the computer system to output an indication of how to pronounce the translation of the first portion of text provides the user with visual feedback regarding the accurate pronunciation of the translation of the first portion of text. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the representation (e.g., 1430) of the field-of-view of the one or more cameras is a representation (e.g., 1454*a*) of the previously captured media (e.g., media that is displayed and/or has previously been displayed as being a part of a media gallery) (e.g., a representation of a still photo). In some embodiments, the representation of the previously captured media does not change as one or more objects in the field-of-view of the one or more cameras change (e.g., move out/in the field-of-view of the one or more cameras, move within the field-of-view of the one or more cameras).

In some embodiments, the representation of the field-of-view of the one or more cameras is a representation (e.g., 1430) (e.g., live representation) of the field-of-view of the one or more cameras that is currently being captured (e.g., a representation of non-previously captured media and/or media that is not displayed and/or has not been previously displayed as being a part of a media gallery) (e.g., not a representation of a still photo). In some embodiments, the representation of the field-of-view of the one or more cameras that is currently being captured changes as one or more objects in the field-of-view of the one or more cameras change (e.g., move out/in the field-of-view of the one or more cameras, move within the field-of-view of the one or more cameras).

In some embodiments, after (and/or while) displaying the first translation user interface object (e.g., 1470, 1472), the computer system receives, via the one or more input devices, a request (e.g., input on 1428) to share the first translation user interface object that includes an input detected while displaying the translation user interface object. In some embodiments, the request to share the first translation user interface object is detected when the first translation user interface object has been saved for later retrieval by a user. In some embodiments, the request to share the first translation user interface object includes a series of inputs (e.g., a first input on a share affordance and a second input that corresponds to selection of a recipient). In some embodiments, in response to receiving the request (e.g., input on 1428) to share the first translation user interface object, the computer system transmits (e.g., indirectly (e.g., via one or more services) and/or directly transmitting) media corresponding to the first translation user interface object (e.g., 1470, 1472) to one or more other computer systems. In some embodiments, the media corresponding to the first translation user interface object includes the first portion of text and the translation of the first portion of text and/or one or more other components (e.g., portion of the representation of the field-of-view of one or more cameras that corresponds to first translation user interface object (e.g., a photo of the first portion of the text from the field-of-view of the one or more cameras, where, in some embodiments, the photo does not include the second portion of the text)). In some embodiments, as a part of receiving the request to share the first user interface object, the computer system detects an input directed to a selectable user interface object and, in response to detecting the input directed to a selectable user interface object, initiates a process for sharing. In some embodiments, in response to receiving an input on the option to share, the computer system transmits media corresponding to the representation (e.g., 1430) of the field of view of the one or more cameras that includes one or more translation objects (e.g., 1446) (e.g., when the first user interface object is not displayed when the input on the option to share is received). Transmitting media corresponding to the first translation user interface object when certain prescribed conditions are satisfied (e.g., in response to receiving the request to share the first user interface object) automatically allows the user the ability to quickly and efficiently distribute the translation of various texts among a plurality of various computer systems. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Transmitting media corresponding to the first translation user interface object to one or more computer systems in response to receiving the request to share the first user interface object reduces the number of inputs the user must perform to share media corresponding to the first translation user interface object. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the first translation user interface object (e.g., 1470, 1472), the computer system receives, via the one or more input devices, a request (e.g., 1450*e*1, input on 1480) to save the first translation user interface object. In some embodiments, in response to receiving the request (e.g., 1450*e*1, input on 1480) to save the first translation user interface object (e.g., 1470, 1472), the computer system saves media corresponding to the first translation user interface object to a library of translations (e.g., 1404 in FIG. 14K) that is accessible on the computer system (e.g., 600). In some embodiments, as a part of saving media corresponding to the first translation user interface object, the computer system adds media corresponding to the first translation user interface object to a plurality of previously saved user interface objects and/or saving media corresponding to the first translation user interface object as a favorite media item. In some embodiments, after saving the media corresponding to the first translation user interface object and in response to receiving a request to display previously saved media items (e.g., previously favorited media items), the computer system displays the media corresponding to the first translation user interface object. In some embodiments, media (e.g., 1462*c*) corresponding to the first translation user interface object (e.g., 1470, 1472) is visually different (e.g., includes one or more components (e.g., a photo of the first portion of the text) that are not included in the first translation user interface object and includes one or more components (e.g., the first portion of the text, translation of the first portion of the text) that are included in the first translation user interface object) from the first translation user interface object (e.g., as described above in relation to FIG. 14K). Saving the media corresponding to the first translation user interface object to a library of translations that is accessible on the computer system when certain prescribed conditions are satisfied (e.g., in response to receiving the request to save the first translation user interface object reduces the number of inputs the user must perform to save media corresponding to the first translation user interface object) automatically allows a user the ability to quickly access the translation of the text at a future date in time. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Saving the media corresponding to the first translation user interface object to a library of translations that is accessible on the computer system in response to receiving the request to save the first translation user interface object reduces the number of inputs the user must perform to save media corresponding to the first translation user interface object. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the representation (e.g., 1430) of the field-of-view of the one or more cameras and the plurality of indications (e.g., 1446), the computer system receives, via the one or more inputs devices, a request (e.g., an input on 1428) to share the representation of the field-of-view of the one or more cameras. In some embodiments, in response to receiving the request (e.g., an input on 1428) to share the representation of the field-of-view of the one or more cameras, the computer system transmits media (e.g., a photo) that includes at least a portion of the representation (e.g., 1430) of the field-of-view of the one or more cameras and the plurality of indications (e.g., 1446). In some embodiments, as a part of receiving the request to share (e.g., an input on 1428) the first user interface object (e.g., 1428), the computer system detects, while displaying the representation of the field-of-view of the one or more cameras and the plurality of indications, an input/gesture directed to a selectable user interface object (e.g., 1428) that, when selected, initiates a process for sharing (e.g., as described above in relation to FIG. 14I). Transmitting media that includes at least a portion of the representation of the field-of-view of the one or more cameras and the plurality of indications when certain prescribed conditions are satisfied (e.g., in response to a request to share the representation of the field-of-view) automatically allows the user the ability to quickly and efficiently distribute the plurality of indications and the representation of the field-of-view of the one or more cameras among a plurality of various computer systems. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Transmitting both the media that includes at least a portion of the representation of the field-of-view of the one or more cameras and the plurality of indications in response to a request to share the representation of the field-of-view reduces the number of inputs the user must perform to transmit the media. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system is in communication with a light source (e.g., a light source that is adjacent to at least one of the one or more cameras). In some embodiments, in response to receiving the request to display the representation of the field-of-view of the one or more cameras, the computer system: in accordance with a determination that the computer system is in a first active capture state (e.g., a non-paused captured state) (e.g., as evident by displaying 1410), displays at a first location in the user interface, via the display generation component, a selectable user interface object (e.g., 1426) that, when selected, changes an operation state (e.g., on/off) of the light source (e.g., on a display, on a user interface) location (e.g., without displaying the second selectable user interface object); and in accordance with a determination that the computer system is not in the first active capture state (e.g., a paused capture state) (e.g., as evident by displaying 412), displaying at the first location in the user interface, via the display generation component, a selectable user interface object (e.g., 1428) that, when selected, initiates a process for sharing (e.g., sharing media (e.g., a photo) corresponds to translation of at least a portion of the representation of the field-of-view, sharing media corresponding to the first translation user interface object) (e.g., without displaying the selectable user interface object that changes the operation state of the light source). In some embodiments, in response to detecting a selection (e.g., input/gesture directed to the selectable user interface object controlling a light) of the selectable user interface object (e.g., 1426), the light source is turned on/off (e.g., as described above in relation to FIG. 14H). In some embodiments, as a part of initiating the process for sharing (e.g., by selection of 1428), the computer system causes media that corresponds to a translation of at least a portion of the representation of the field-of-view to be sent to one or more other devices (e.g., as described above in relation to FIG. 14I). In some embodiments, in response to detecting a selection (e.g., input/gesture directed to the selectable user interface object (e.g., 1428) that initiates the process for sharing) of the second selectable user interface object, the computer system transmits media corresponding to the translation of at least a portion of the representation of the field-of-view to be sent to one or more other devices (e.g., as described above in relation for FIG. 14I). In some embodiments, the selectable user interface object that changes an operation of the light source is visually different from the selectable user interface object that initiates a light source for sharing. In some embodiments, a user interface object (e.g., 1412) is displayed that, when selected, causes the computer to be in the first active capture state and/or a user interface object (e.g., 1410) is displayed that, when selected, causes the computer to not be in the first active capture state. Displaying at the first location in the user interface a first selectable user interface object when prescribed conditions are satisfied (e.g., in accordance with a determination that the computer system is not in the active captured state) automatically provides the user with an indication with respect to the state of the system. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying at the first location in the user interface the first selectable user interface object in accordance with a determination that the computer system is in a first active capture state and displaying at the first location in the user interface the second selectable user interface object in accordance with a determination that the computer system is not in the first active capture state provides the user the ability to perform a variety of state-specific functions without cluttering the user interface with additional user interface objects. Providing additional control of the computer system without cluttering the UI with additional displayed controls enhances the operability of the system and makes the user-system interface more efficient (e.g., by helping the user to provide proper inputs and reducing user mistakes when operating/interacting with the system) which, additionally reduces power usage and improves battery life of the system by enabling the user to use the system more quickly and efficiently.

In some embodiments, the first translation user interface object (e.g., 1470, 1472) is displayed irrespective of whether or not the computer system is in a second active capture state (e.g., a non-paused captured state, the first active capture state). In some embodiments, while displaying a favorited user interface, the computer system displays media corresponding to the first translation user interface object. In some embodiments, the media corresponding to the first translation user interface object is visually different (e.g., includes one or more components (e.g., a photo of the first portion of the text) that are not included in the first translation user interface object and includes one or more components (e.g., the first portion of the text, translation of the first portion of the text) that are included in the first translation user interface object) from the first translation user interface object. Displaying the first user interface object irrespective of whether or not the computer system is in a second active capture state provides the user with constant improved visual feedback regarding the translation of selected text while the capture state of the computer system varies between active capture states. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, a first portion of the representation (e.g., 1430) (e.g., at least a portion) of the field-of-view of the one or more cameras (e.g., a representation of previously captured media and/or a representation of the field-of-view of the one or more cameras that is currently being captured) is concurrently displayed with the first translation user interface object (e.g., 1470, 1472). Concurrently displaying the first portion of the representation of the field-of-view of the one or more cameras with the first translation user interface object provides the user with improved visual feedback by allowing the user to view and analyze the contents the field of view of the one or more cameras of the system while also viewing and analyzing the contents of the first translation user interface object. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of displaying, via the display generation component, the representation (e.g., 1430) of the field-of-view of the one or more cameras, the computer system, in response to a change (e.g., in response to detecting a change) in the field-of-view of the one or more cameras: in accordance with a determination that the computer system is in a third active capture state (e.g., a non-paused captured state, the first active capture state), updating, via the display generation component, the representation (e.g., 1430 in FIGS. 14E-14G) of the field-of-view of the one or more cameras to reflect the change in the field-of-view of the one or more cameras (e.g., while the first translation user interface object is displayed); and in accordance with a determination that the computer system is not in the active capture state (e.g., a paused capture state), forgoing updating, via the display generation component, the representation (e.g., 1430 in FIGS. 14I-14J) of the field-of-view of the one or more cameras to reflect the change in the field-of-view of the one or more cameras (e.g., while the first translation user interface object is displayed). In some embodiments, the change in the field-of-view of the one or more cameras is a change is detected when movement of the one or more cameras is detected, when one or more objects are detected to have moved in the field-of-view of the one or more cameras (e.g., irrespective of whether the one or more cameras has moved, etc.). In some embodiments, while the computer system is in the active capture state, a shutter selectable user interface object (e.g., a circle) is displayed, and an exit icon or a pause selectable user interface object (e.g., "X") is not displayed. In some embodiments, while the computer system is not in the active capture state, a shutter selectable user interface object (e.g., a circle) is not displayed, and an exit selectable user interface object or a pause selectable user interface object (e.g., "X") is displayed. Forgoing updating the representation of the field-of-view of the one or more cameras to reflect that change in the field-of-view when prescribed conditions are satisfied (e.g., in accordance with a determination that the computer system is not in the active captured state) automatically provides the user with an indication with respect to the state of the system. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the updated representation (e.g., 1430) of the field-of-view of the one or more cameras is displayed concurrently with the first translation user interface object (e.g., 1470). Concurrently displaying the updated representation of the field-of-view of the one or more cameras with the first translation user interface object provides the user with improved visual feedback by allowing the user to maintain a view of the first translation user interface object while the user changes (e.g., pans the computer system) the field-of-view of the one or more cameras. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, a second portion (e.g., an upper portion) of the representation (e.g., at least a portion) of the field-of-view of the one or more cameras (e.g., a representation of previously captured media and/or a representation of the field-of-view of the one or more cameras that is currently being captured) is concurrently displayed with the first translation user interface object. In some embodiments, while displaying, via the display generation component, the second portion of the representation (e.g., 1430) of the field-of-view of the one or more cameras concurrently with the first translation user interface object (e.g., 1470, 1472), the computer system receives, via the one or more input devices, a request (e.g., **1450*e*2) to cease displaying the first translation user interface object. In some embodiments, in response to receiving the request (e.g., 1450*e*2) to the computer system ceases displaying the first user interface object, ceasing to display, via the display generation component, the first translation user interface object (e.g., 1470, 1472) and displaying a portion (e.g., a bottom portion) of the representation (e.g., 1430 in FIGS. 14E-14**F) that was not previously displayed while the first translation user interface object was displayed (e.g., that is different from the second portion of the representation). In some embodiments, the portion of the representation that was not previously displayed was displayed before the first translation user interface object was displayed and/or before the request to select the respective indication of the plurality of translated portions was received.

In some embodiments, as a part of automatically displaying, via the display generation component, the plurality of indications (e.g., 1446) of translated text, the computer system displays the first indication (e.g., 1446 (e.g., **1446*d*)) of the translation of the first portion (e.g., 1444 (e.g., 1444*d***)) of text on top of (at least a subset/portion of) the first portion of the text. In some embodiments, when the first indication of the translation of the first portion is displayed on top of (at least a subset/portion of) the first portion of the text, the (at least a subset/portion of) first portion of the text is not visible and/or the computer system does not display the first portion of the text. Displaying the first indication of the translation of the first portion of text on top of the first portion of text provides the user with improved visual feedback regarding which portion of text corresponds to each indication in the plurality of indications. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first portion (e.g., 1444) of text is displayed with (e.g., has) a first color (e.g., the first portion of text is the first color and/or the first portion of text is displayed on top of content and/or an object (e.g., in the field-of-view of the one or more cameras) that is (or includes) the first color. In some embodiments, the first indication (e.g., 1446) (e.g., the background of a portion of the indication, the translation of the first portion of the text) of the translation is displayed with the first color. In some embodiments, the second portion (e.g., 1444) of text is displayed with a second color (e.g., the second portion of text is the second color and/or the second portion of text is displayed on top of content or an object (e.g., in the field-of-view of the one or more cameras) that is (or includes) the second color) that is different from the first color. In some embodiments, the second indication (e.g., 1446) (e.g., the background of a portion of the indication, the translation of the second portion of the text) is displayed with the second color. In some embodiments, the first indication of the translation is not displayed with the second color. In some embodiments, the second indication is not displayed with the first color. Displaying the first portion of text with a first color where the first indication of the translation has the first color and displaying the second portion of text with a second color where the second indication has the second color provides that user with improved visual feedback that allows the user to easily and efficiently determine the portion of text that is associated with the first indication and the second indication. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first indication (e.g., 1446) is displayed at a third location corresponding to the first portion (e.g., 1444) of the text (e.g., the first indication is displayed on top of at least a subset/portion of the first portion of the text). In some embodiments, while displaying the first indication (e.g., 1446) at the third location and the representation (e.g., 1430 in FIG. 14G) of the field-of-view of the one or more cameras, the computer system receives a request (e.g., 1450*g*) to display a second representation of the field-of-view of the one or more cameras. In some embodiments, the request to display a second representation of the field-of-view of the one or more cameras is received when a request to zoom in on and/or zoom out of the representation of the field-of-view of the one or more cameras is received (e.g., via a de-pinch/pinch input/gesture that is detected on the representation of the field-of-view of the one or more cameras). In some embodiments, the request to display a second representation of the field-of-view of the one or more cameras is received when a request to pan (e.g., translate) the representation of the field-of-view of the one or more cameras is received (e.g., via a swipe gesture that is detected on the representation of the field-of-view of the one or more cameras). In some embodiments, in response to receiving the request (e.g., 1450*g*) to display a second representation (e.g., 1430 in FIG. 14H) of the field-of-view of the one or more cameras and in accordance with a determination that the second representation includes the first portion of the text, the computer system: displays the second representation (e.g., 1430 in FIG. 14H) of the field-of-view of the one or more cameras; and continues to display the first indication (e.g., 1446) at the third location (e.g., corresponding to the first portion of the text) (e.g., continuing to display the first indication being on top of at the subset/portion of the first portion of the text) (e.g., while displaying the second representation of the field-of-view of the one or more cameras). In some embodiments, the second representation of the field-of-view of the one or more cameras is a zoomed in/out and/or panned (e.g., translated) version of the representation of the field-of-view of the one or more cameras (e.g., as discussed above in relation to FIG. 14E-14F). In some embodiments, in response to receiving the request to display a second representation of the field-of-view of the one or more cameras and in accordance with a determination that the second representation includes the first portion of the text, the computer system ceases to display the representation of the field-of-view of the one or more cameras (e.g., as described above in relation to FIGS. 14E-14F). In some embodiments, in response to receiving the request to display the second representation of the field-of-view of the one or more cameras, one or more of the plurality of indications ceases to be displayed, and/or one or more indication of a translation are newly displayed (e.g., as described above in relation to FIGS. 14E-14F). Continuing to display the first indication at the third location when certain prescribed conditions are satisfied (e.g., in response to the computer system receiving the request to display a second representation of the field-of-view-of the one or more cameras) automatically provides the user with the ability to view the information that is associated with the first indication while the field-of-view of the system's camera is changed. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first translation user interface object (e.g., 1470) is displayed at a third location (e.g., on a display, in a user interface). In some embodiments, while displaying the first translation user interface object (e.g., 1470) at the third location and the plurality of indications, the computer system receives, via the one or more input devices, a second request (e.g., 1450*d*) to select the respective indication (e.g., a tap gesture on an indication). In some embodiments, in response to receiving the second request (e.g., 1450*d*) to select the respective indication (e.g., 1446*d*), in accordance with a determination that the second request is a request to select the second indication (e.g., 1446*d*), the computer system replaces, at the third location, display of the first translation user interface object (e.g., 1470) with display of a third translation user interface object (e.g., 1472) (e.g., second translation user interface object) that includes a third portion (e.g., 1472*a*) of the text and the translation (e.g., 1472*b*) of the third portion of the text without including a translation of the first portion of the text (and the second portion of the text). In some embodiments, in response to receiving the second request (e.g., 1450*d*) to select the respective indication (e.g., 1446 (e.g., 1446*e* in FIG. 14D)), in accordance with a determination that the second request is a request to select the first indication (e.g., 1446 (e.g., 1446*e* in FIG. 14D)), the computer system continues to display the first translation user interface object (e.g., 1470) at the third location (e.g., without displaying the third translation user interface object). In some embodiments, the first translation user interface object can be added to a favorite list (e.g., 1448) and/or a user-preferred list of other translation user interface objects (e.g., as discussed above in relation to FIGS. 14F and 14K). Replacing display of the first user interface object with display of a third translation user interface object in response to receiving the second request and in accordance with a determination that the second request is a request to select the second indication provides the user with more control over the system by allowing the ability to decide which user interface object is displayed by the system without cluttering the user interface with additional user interface objects. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally reduces power usage and improves battery life of the system by enabling the user to use the system more quickly and efficiently.

In some embodiments, one or more steps of method 1500 described above can also apply to a representation of video media, such as one or more live frames and/or paused frames of video media. In some embodiments, one or more steps of method 1500 described above can be applied to representation of media in user interfaces for applications that are different from the user interfaces described in relation to FIGS. 14A-14N, which include, but are not limited to, user interfaces corresponding to a productivity application (e.g., a note taking application, a spreadsheeting application, and/or a tasks management application), a web application, a file viewer application, and/or a document processing application, and/or a presentation application.

Note that details of the processes described above with respect to method 1500 (e.g., FIG. 15) are also applicable in an analogous manner to the other methods described herein. For example, method 1500 optionally includes one or more of the characteristics of the various methods described herein with reference to methods 800, 900, 1100, 1300, and 1700. For example, method 1500 optionally includes one or more of the characteristics of the various methods described herein with reference to methods 800, 900, 1100, and 1300, and 1700. For example, the one or more indications of detected features, as described in method 1100, can be displayed in the representation of the field-of-view of the one or more cameras to indicate a detected feature. For brevity, these details are not repeated below.

FIGS. 16A-16O illustrate exemplary user interfaces for managing user interface objects for visual content in media in accordance with some embodiments. FIG. 17 is a flow diagram illustrating a method for managing user interface objects for visual content in media in accordance with some embodiments. The user interfaces for FIGS. 16A-16O are used to illustrate the process described below, including the processes in FIG. 17.

FIGS. 16A-16D illustrate an exemplary scenario where computer system 600 displays one or more user interface objects for visual content in media that includes contact information in accordance with some embodiments. As illustrated in FIG. 16A, computer system 600 displays media viewer user interface 720 that includes media viewer region 724 positioned between application control region 722 and application control region 726. Media viewer region 724 includes enlarged representation 1624*a* and text management control 1680. Enlarged representation 1624*a* is a representation of a photo and depicts business card 1660. Business card 1660 includes text 1662, and text 1662 is composed of name 1662*a* ("John Smith"), contact number 1662*b* ("565-123-4567"), and e-mail 1662*c* ("John.Smith@mail.com"). Text management control 1680 is displayed using one or more techniques and/or for similar reasons (such as text 1662 being detected in enlarged representation 1624*a*) as described above in relation to text management control 680 of FIGS. 6A-6Z and FIGS. 7B-7L. In some embodiments, computer system 600 displays media viewer user interface 720, including media viewer region 724, application control region 722, and application control region 726, using one or more similar techniques to those discussed above in relation to FIG. 7B. At FIG. 16A, computer system 600 detects tap input 1650*a* on (e.g., and/or directed to) text management control 1680.

As illustrated in FIG. 16B, in response to detecting tap input 1650*a* on text management control 1680 (and because a determination is made that a set of criteria is satisfied, such as the prominence criteria described above in relation to FIGS. 6A-6C and FIG. 7C), computer system 600 displays text management options 1682, which includes select-all option 682*b*, copy option 682*a*, translate option 1682*a*, and additional operations option 1682*b*. Copy option 682*a* and select-all option 682*b* are displayed and perform one or more operations in response to selection of each respective option using similar techniques as described above in relation to FIG. 6F. Translate option 1682*a*, when selected, causes computer system 600 to translate a portion of detected text (e.g., text 1662) into a language that is different from the language of the detected text, using similar techniques as described below in relation to selecting translate control 1690*f*. Additional operations option 1682*b*, when selected, causes computer system 600 to display a menu that includes additional options, such as look-up option 682*c* and/or share option 682*d* of FIG. 6F. In some embodiments, text management control 1680 includes one or more options that are included in text management control 680 of FIG. 6F, such as look-up option 682*c* and/or share option 682*d*. In some embodiments, text management control 1680 includes (and/or selection of additional operations option 1682*b* causes computer system 600 to display) one or more options that are included in phone number management options 692 of FIG. 6O, such as call option 692*a*, send message option 692*b*, add-to-contacts option 692*c*, and copy option 692*d*.

As illustrated in FIG. 16B, in response to detecting tap input 1650*a* on text management control 1680 (and because a determination is made that a set of criteria is satisfied, such as the prominence criteria described above in relation to FIGS. 6A-6C and FIG. 7C), computer system 600 deemphasizes a portion of business card 1660 that does not include the text 1662 (e.g., the wrench and screw in FIG. 16B being dotted) relative to text 1662 (e.g., the detected text). As illustrated in FIG. 16B, in response to detecting tap input 1650*a*, computer system 600 displays box 1636*a* that indicates that computer system 600 has detected text including name 1662*a* was detected, box 1636*b* that indicates that computer system 600 has detected text including contact number 1662*b*, and box 1636*c* that indicates that computer system 600 has detected text including e-mail 1662*c*. Box 1636*a*, box 1636*b*, and box 1636*c* are displayed using similar techniques and for similar reasons as described above in relation to bracket 636*a* of FIG. 6C. In some embodiments, boxes 1636*a*-1636*c* indicate that portions of text 1662 are visually emphasized. In some embodiments, computer system 600 emphasizes portions of detected text in other means, such as by enlarging, highlighting, and/or increasing the size of the detected text.

At FIG. 16B, in response to detecting tap input 1650*a* on text management control 1680 (and because a determination is made that a set of criteria is satisfied, such as the prominence criteria described above in relation to FIGS. 6A-6C and FIG. 7C), a determination is made that one or more portions of text 1662 has certain properties. In particular, a determination is made that text 1662 has one or more properties that are consistent with contact information, a determination is made that contact number 1662*b* has one or more properties that are consistent with a phone number, and a determination is made that one or more portions of text 1662 can be copied. As illustrated in FIG. 16B, because the determination is made that text 1662 has one or more properties that are consistent with contact information, computer system 600 displays add-contact control 1690*a*. Moreover, because the determination is made that contact number 1662*b* has one or more properties that are consistent with a phone number, computer system 600 displays call control 1690*b*, and because the determination is made that text 1662 can be copied, computer system 600 displays copy control 1690*c*. At FIG. 16B, computer system 600 detects tap input 1650*b*1 on call control 1690*b*, tap input 1650*b*2 on add-contact control 1690*a*, or tap input 1650*b*3 on text management control 1680.

As illustrated in FIG. 16C, in response to detecting tap input 1650*b*1 on call control 1690*b*, computer system 600 initiates a phone call to a device that is reached by calling contact number 1662*b*, displays phone dialer user interface 1640, and ceases to display media viewer user interface 720. Phone dialer user interface 1640 includes indication 1620*b*, which indicates that an outgoing phone call is in-progress to phone number 1620*a*. Phone number 1620*a* is the same number as contact number 1662*b*, which computer system 600 detected on enlarged representation 1624*a* of FIGS. 16A-16B. At FIG. 16D, in response to detecting tap input 1650*b*2 on add-contact control 1690*a*, computer system 600 performs a different operation (e.g., creating a new contact and/or updating an existing content based on detected text) from the operation (e.g., initiating a phone call based on detected text) performed based on detecting tap input 1650*b*1. As illustrated in FIG. 16D, in response to detecting tap input 1650*b*2, computer system 600 displays contact information user interface 1642. Contact information user interface 1642 includes multiple fields for entering contact information, where first name field 1642*a*, last name field 1642*b*, phone field 1642*c*, and e-mail field 1642*d* have been filled in. As illustrated in FIG. 16D, first name field 1642*a* and last name field 1642*b* is filled in with text corresponding to name 1662*a* of FIG. 16B, phone field 1642*c* is filled in with text corresponding to contact number 1662*b* of FIG. 16B, and e-mail field 1642*d* corresponding to e-mail 1662*c* of FIG. 16B. Thus, in response to detecting tap input 1650*b*2, computer system 600 initiates a process to create a new contact and pre-fill information for the new contact based on text that has been detected in media (e.g., previously captured media and/or live media). In some embodiments, in response to detecting tap input 1650*b*2, computer system 600 initiates a process to update an existing contact based on text that has been detected in media. In some embodiments, computer system 600 updates an existing based on a determination that is made that a portion of the detected text (e.g., one or more of portions of text 1662 of FIG. 16B matches information for an existing contact). In some embodiments, in response to detecting tap input 1650*b*3 on text management control 1680 at FIG. 16B, computer system 600 re-displays the user interface of FIG. 16A, including ceasing to display boxes 1636*a*-1636*c*, add-contact control 1690*a*, call control 1690*b*, and copy control 1690*c*.

FIGS. 16E-16H illustrate an exemplary scenario where computer system 600 displays one or more user interface objects for visual content in media that includes a unit of measurement. As illustrated in FIG. 16E, computer system 600 displays a camera user interface, which includes live preview 630 and zoom controls 622. The camera user interface is displayed using one or more techniques as discussed above in relation to the camera user interface of FIG. 6A, including with respect to displaying zoom controls 622 and live preview 630. At FIG. 16E, live preview 630 includes text, where a portion of the text includes temperature 1630*a* (e.g., "13° C.") and another portion of the text includes statement 1630*b* (e.g., "Complimentary Caprese Salad with any purchase (Mod-Wed 12 pm-2 pm)"). At FIG. 16E, computer system 600 detects tap input 1650*e* on text management control 1680.

As illustrated in FIG. 16F, in response to detecting tap input 1650*e* on text management control 1680 (and because a determination is made that a set of criteria is satisfied, such as the prominence criteria described above in relation to FIGS. 6A-6C and FIG. 7C), computer system 600 displays text management options 1682, box 1636*a* around temperature 1630*a*, and box 1636*b* around statement 1630*b* using one or more similar techniques as discussed above in relation to FIG. 16B. At FIG. 16F, a determination is made that temperature 1630*a* has one or more properties that are consistent with a unit of measurement and a determination is made that statement 1630*b* can be copied. In some embodiments, a determination is made that temperature 1630*a* and statement 1630*b* can be copied. As illustrated in FIG. 16F, because a determination is made that statement 1630*b* can be copied, computer system 600 displays copy control 1690*c*. Moreover, because the determination was made that temperature 1630*a* is consistent with a unit of measurement, computer system 600 displays convert-measurement control 1690*d*. As illustrated in FIG. 16F, in response to detecting tap input 1650*e*, computer system 600 ceases to display zoom affordance 622 of FIG. 16E and displays copy control 1690*c* and convert-measurement control 1690*d*. At FIG. 16F, computer system 600 detects tap input 1650*f*1 on copy control 1690*c* or detects tap input 1650*f*2 on convert-measurement control 1690*d*.

At in FIG. 16G, in response to detecting tap input 1650*f*1 on copy control 1690*c*, computer system 600 copies statement 1630*b* in a copy buffer, so computer system 600 can paste statement 1630*b* in response to detecting an input. As illustrated in FIG. 16G, in response to detecting tap input 1650*f*1 on copy control 1690*c*, computer system 600 ceases to display live preview 630 and displays e-mail user interface 1002 that includes text 1634*a*. At FIG. 16G, text 1634*a* corresponds to statement 1630*b* of FIG. 16F in the body of the e-mail message. In some embodiments, e-mail user interface 1002 is displayed using one or more techniques as described above in relation to FIG. 10A. In some embodiments, computer system 600 copies statement 1630*b* to one or more applications that are different from an e-mail application that corresponds to e-mail user interface 1002. In some embodiments, in response to detecting tap input 1650*f*1, computer system 600 continues to display live preview 630. In some embodiments, in response to detecting an input on copy control 1690*c* at FIG. 16B, computer system 600 copies including e-mail 1662*c* to the "to:" field of e-mail user interface 1002.

At FIG. 16H, in response to detecting tap input 1650*f*2 on convert-measurement control 1690*d*, computer system 600 displays conversion 1612 ("55° F.") above temperature 1630*a*. Conversion 1612 is a conversion of temperature 1630*a*, which is a conversion from Celsius to Fahrenheit. Thus, in response to detecting tap input 1650*f*2, computer system 600 provides a conversion for a unit of measurement in a portion of detected text. At FIG. 16H, computer system 600 detects tap input 1650*h* on convert-measurement control

1690*d* and, in response to detecting tap input 1650*h*, computer system 600 re-displays the user interface of FIG. 16F. In some embodiments, convert-measurement control 1690*d* is displayed as being inactive (e.g., not bolded) in response to detecting tap input 1650*h* (e.g., instead of displayed as being active (e.g., bolded)).

FIGS. 16I-16J illustrate an exemplary scenario where computer system 600 displays one or more user interface objects for visual content in media that includes a data table. As illustrated in FIG. 16I, computer system 600 displays live preview 630, which includes selection indicator 696 (e.g., "gray highlighting") around all of the words ("Name", "Maria", "Kate", "Sarah", and "Ashley") in name column 648*a* and the "position" header of position column 648*b*. Selection indication 696 is displayed in response to detecting a swipe input, using one or more techniques described above in relation to detecting swipe input 650*u* in FIGS. 6U-6V. At FIG. 16I, computer system 600 displays extract control 1690*e* in response to detecting an input on text management control 1680, using one or more techniques as described above in relation to FIG. 16A. In particular, computer system 600 displays extract control 1690*e* because a determination is made that text in table 648 has one or more properties that are consistent with the text being in a table. At FIG. 16I, computer system 600 detects input 1650*i* on extract control 1690*e*. As illustrated in FIG. 16J, in response to detecting input 1650*i*, computer system 600 displays spreadsheet user interface 1646 that includes text 1646*a*. Thus, in response to detecting an input directed to extract control 1690*e*, computer system 600 copies and/or extracts detected text from a media item to an application that is different from the application that displayed the media item. Looking back at FIG. 16I, in some embodiments, computer system 600 displays a control that, when selected, changes the text that is selected in table 648 (e.g., updates display of selection indicator 696).

FIGS. 16K-16L illustrate an exemplary scenario where computer system 600 displays one or more user interface objects for visual content in media that includes a barcode. As illustrated in FIG. 16K, computer system 600 displays live preview 630, which includes barcode 1652 and text management control 1680 (e.g., which is displayed for similar reasons as discussed above in relation to text management control 680). At FIG. 16K, computer system 600 detects input 1650*k*1 on text management control 1680 or input 1650*k*2 on barcode 1652. As illustrated in FIG. 16L, in response to detecting input 1650*k*1 on text management control 1680 or input 1650*k*2 on barcode 1652, computer system 600 displays barcode description 1654, which is a description of a product that is associated with barcode 1652. At FIG. 16L, because a determination is made that barcode 1652 has one or more properties that are consistent with a barcode, computer system 600 ceases to display text management control 1680 and displays barcode scan control 1688. In some embodiments, barcode scan control 1688 is displayed at FIG. 16K, in addition to or in lieu of text management control 1680. In some embodiments, in response to detecting an input (e.g., tap input 16501) on barcode scan control 1688, computer system 600 initiates a process to scan barcode 1652 and/or scans barcode 1652. In some embodiments, after scanning barcode 1652, additional information concerning barcode 1652 is displayed (e.g., a greater amount of information than the information included in bar code description 1654). In some embodiments, computer system 600 displays a control for redeeming a gift card in response to detecting an input on text management control 1680 while computer system 600 is displaying a representation of a gift card. In some embodiments, in response to displaying the control for redeeming the gift card, computer system 600 redeems the gift card and/or adds a reminder to redeem a gift card in a productivity application.

FIGS. 16M-16O illustrate an exemplary scenario where computer system 600 displays one or more user interface objects for visual content in media that includes text in a foreign language. As illustrated in FIG. 16M, computer system 600 displays live preview 630 that includes text 1656, which is in Spanish. At FIG. 16M, computer system 600 detects tap input 1650*m*1 on text 1656 or tap input 1650*m*2 on text management control 1680. As illustrated in FIG. 16N, in response to detecting tap input 1650*m*1 or tap input 1650*m*2, computer system 600 displays translation 1658, which is an English translation of text 1656. At FIG. 16N, computer system 600 automatically translates text 1656 in response to detecting tap input 1650*m*1 or tap input 1650*m*2. In some embodiments, computer system 600 does not automatically translate text 1656 in response to detecting tap input 1650*m*1 or tap input 1650*m*2, as further discussed below.

As illustrated in FIG. 16M, computer system 600 displays translation 1658 because a determination was made that text 1656 of FIG. 16M has one or more properties that are consistent with text that should be translated (e.g., the language of the text does match a language that is associated with a location (e.g., based on a device setting, based on a device region setting, and/or based on current geolocation data) of computer system 600). As illustrated in FIG. 16N, because the determination was made that text 1656 of FIG. 16M has one or more properties that are consistent with text that should be translated, computer system 600 displays translation control 1690*f*. In addition, at FIG. 16N, computer system 600 displays scan control 1690*g* because a determination is made that text 1656 has one or more properties that are consistent with text that should be scanned (e.g., text is positioned in a book, text is positioned on a page, and/or text is positioned in an article), and computer system 600 displays copy control 1690*c* because a determination is made that text 1656 can be copied. At FIG. 16N, computer system detects tap input 1650*n*1 on translation control 1690*f*. As illustrated in FIG. 16O, in response to detecting tap input 1650*n*1, computer system 600 re-displays text 1656 and/or reverts the translated version of the text to the original version of the text. At FIG. 16O, computer system 600 detects input 1650*o* on translation control 1690*f*, computer system 600 re-displays text 1656 of FIG. 16N and/or translates the original version of the text. Thus, as illustrated in FIGS. 16N-16O, translation control 1690*f* can be used to toggle between the translated version and the original version of the text. In some embodiments, in response to detecting tap input 1650*m*1 or tap input 1650*m*2 at FIG. 16M, computer system 600 displays the user interface of FIG. 16O instead of the user interface of 16N. Thus, in some embodiments, computer system 600 does not automatically translate the original text in response to detecting tap input 1650*m*1 or tap input 1650*m*2 at FIG. 16M.

Looking back at FIG. 16N, computer system 600 detects input 1650*n*2 on scan control 1690*g*. In some embodiments, in response to detecting scan control 1690*g*, computer system 600 initiates a process to scan the text shown in live preview 630 and/or the book shown in live preview 630. In some embodiments, as a part of initiating the process to scan, computer system 600 scans the text shown in live preview 630 and/or the book shown in live preview 630. At FIG. 16N, computer system 600 detects input 1650*n*3 on text management control 1680. In some embodiments, in response to detecting input 1650*n*3, computer system 600 re-displays the user interface of FIG. 16M and ceases to display translation control 1690*f*, scan control 1690*g*, and copy control 1690*c*, using one or more techniques and for similar reasons as discussed above in relation to detecting tap input 1650*b*3 at FIG. 16B.

It should be understood that, while the particular scenarios described above in relation to FIGS. 16A-16O described detecting different characteristics of text (e.g., business card information, a bar code, a unit of measurement, and/or text in a table) in a particular media item (e.g., live media, such as live preview 630, and/or previously captured media, such as the media represented by enlarged representation 1624*a*), the type of text that is detected is not limited to whether computer system 600 is displaying live media or previously captured media. In some embodiments, the media is photo media, such as a previously captured photo or a screenshot. In some embodiments, the media is video media and/or a frame of video media, such as previously captured video media or live video media. In some embodiments, computer system 600 can detect other types of text (e.g., such as a list of items) and displays one or more different controls because of the detection of other types of text, such as a control that, when select, causes the computer system 600 to add a detected list of items to a productivity application (e.g., grocery management application and/or a task application).

FIG. 17 is a flow diagram illustrating a method for managing user interface objects for visual content in media in accordance with some embodiments. Method 1700 is performed at a computer system (e.g., 600) (e.g., a smartphone, a desktop computer, a laptop, and/or a tablet) that is in communication with a display generation component (e.g., a display controller, a touch-sensitive display system): In some embodiments, the computer system is in communication with one or more input devices (e.g., a touch-sensitive surface). Some operations in method 1700 are, optionally, combined, the orders of some operations are, optionally, changed, and some operations are, optionally, omitted.

As described below, method 1700 provides an intuitive way for managing user interface objects for visual content in media in accordance with some embodiments. The method reduces the cognitive burden on a user for managing user interface objects for visual content in media in accordance with some embodiments, thereby creating a more efficient human-machine interface. For battery-operated computing devices, enabling a user to manage user interface objects for visual content in media in accordance with some embodiments faster and more efficiently conserves power and increases the time between battery charges.

While displaying a user interface (e.g., 720 and/or the camera user interface that includes 630) (e.g., a media capture user interface, a media viewing user interface, and/or a media editing user interface) that includes a representation (e.g., 720 and/or 630) of media (e.g., photo media, video media) (e.g., live media, a live preview (e.g., media corresponding a representation of a field-of-view (e.g., a current field-of-view) of the one or more cameras that has not been captured (e.g., in response to detecting a request to capture media (e.g., detecting selection of a shutter affordance)) and/or previously captured media (e.g., media corresponding a representation of a field-of-view (e.g., a previous field-of-view) of the one or more cameras that has been captured, a media item that has been saved and is able to be accessed by a user at a later time and/or a representation of media that was displayed in response to receiving an gesture on a thumbnail representation of the media (e.g., in a media gallery)), the computer system detects (1702) (e.g., via one or more inputs devices) a request (e.g., 1650*a*, 1650*e*, 1650, 1650*k*1, and/or 1650*m*2) to display additional information (e.g., an enlarged version of the representation of media, visual content, text, and/or one or more user interface controls that corresponds to the representation of media (e.g., a plurality of options to manage text, as described above in relation to methods 800 and 900)) that corresponds to the representation (e.g., 630 and/or 720) of the media. In some embodiments, as a part of detecting the request to display additional information, the computer system detects an input on a user interface object that corresponds to one or more text management operations (e.g., as described above in relation to methods 800 and 900). In some embodiments, as a part of detecting the request to display additional information, the computer system detects an input on the representation of media (e.g., a thumbnail representation of media) and/or an input on a second representation of media that is different from the representation of media (e.g., as described above in relation to methods 800 and 900). In some embodiments, in response to detecting the request to display additional information that corresponds to the representation of media, the computer system displays a second representation of the media (e.g., an enlarged representation of the media). In some embodiments, the user interface includes the user interface object corresponding to the one or more text operations before the request to display additional information that corresponds to the representation of media is detected (e.g., using one or more techniques as described above in relation to methods 800 and 900). In some embodiments, in response to detecting the request to display additional information that corresponds to the representation of media, the computer system displays the user interface object corresponding to the one or more text operations, as described above in relation to methods 800 and 900). In some embodiments, the representation (e.g., 1624*a* and/or 630) of media is a photo or a video. In some embodiments, the representation (e.g., 1624*a*) of media is a screenshot (and/or a screen recording).

In response to (1704) detecting the request (e.g., 1650*a*, 1650*e*, 1650, 1650*k*1, and/or 1650*m*2) to display additional information that corresponds to the representation of the media (and/or in response to detecting an input directed to the user interface (e.g., as described above in relation to methods 800 and 900)) (and in accordance with a determination that the representation of media includes text that can be detected): in accordance with a determination that detected text (e.g., 1662, 1630*a*, 1630*b*, text in 648, 1652, and/or 1656) in the representation of media has a first set of properties (e.g., one or more properties that identify the detected text as including and/or being contact information, a phone number, a phrase in a language that is determined to not be familiar to the user and/or a phrase that can require translation, a document, a table of information, a unit of measurement (e.g., a unit of measurement that is determined to be unfamiliar to a particular user of the computer system) that can be converted, a list of items, and/or a medicine bottle and/or another item that contains information regarding health) (and, in some embodiments, does not have the second set of properties (e.g., described below)), the computer system displays (1706), via the display generation component, a first user interface object (e.g., 1690*a*-1690*g*) that, when selected, causes the computer system to perform a first operation based on the detected text (without displaying the second user interface object (e.g., described below) and/or a user interface object that, when selected, performs the second operation). In response to (1704) detecting the request (e.g., 1650_a_, 1650_e_, 1650, 1650_k_1, and/or 1650_m_2) to display additional information that corresponds to the representation of the media (and/or in response to detecting an input directed to the user interface (e.g., as described above in relation to methods 800 and 900)) (and in accordance with a determination that the representation of media includes text that can be detected): in accordance with a determination that detected text (e.g., 1662, 1630_a_, 1630_b_, text in 648, 1652, and/or 1656) in the representation of media has a second set of properties (e.g., one or more properties as described above in relation to the first set of properties) that is different from the first set of properties (and, in some embodiments, does not have the first set of properties), the computer system displays (1708), via the display generation component, a second user interface object (e.g., 1690_a_-1690_g_) that, when selected, causes the computer system to perform a second operation, different from the first operation, based on the detected text (without displaying the first user interface object and/or a user interface object that, when selected, performs the first operation). In some embodiments, the first user interface object is different from (e.g., visually different from) the second user interface object. In some embodiments, the first user interface object and/or the second user interface object is an option to manage the detected text (e.g., as described above in relation to methods 800 and 900 and the plurality of options to manage the respective text). In some embodiments, the first user interface object or the second user interface object is displayed concurrently with a respective representation of the media and/or the user interface object corresponding to the one or more text operations. In some embodiments, in accordance with a determination that detected text in the representation of media has the first set of properties, the computer system displays a third user interface object that, when selected, causes the computer system to perform a third operation concurrently with the first user interface object (without displaying the second user interface object). In some embodiments, in accordance with a determination that detected text in the representation of media has the second set of properties, the computer system displays the third user interface object concurrently with the second user interface object (without displaying the first user interface object). In some embodiments, in response to detecting the request to display additional information that corresponds to the representation of the media and in accordance with a determination that the representation of media does not include text that can be detected, the computer system displays the representation of media without displaying the first user interface object and/or the second user interface object. Displaying one or more user interface objects (e.g., the first user interface object and/or the second user interface object) that cause the computer system to perform one or more different operations in response to detecting the request to display additional information that corresponds to the representation of the media and when certain prescribed conditions are met allows the computer system to automatically provide the user with additional control options based on different conditions and allows the user to initiate a process to display the additional controls, which performs an operation when a set of conditions has been met without requiring further user input and provides additional control options without unnecessarily cluttering the user interface.

In some embodiments (in response to detecting the request to display additional information that corresponds to the representation of the media and in accordance with a determination that detected text in the representation of media has the first set of properties and in accordance with a determination that detected text in the representation of media has the second set of properties that is different from the first set of properties), the first user interface object (e.g., 1690_a_-1690_g_) is concurrently displayed with the second user interface object (e.g., 1690_a_-1690_g_). In some embodiments, the first user interface object is visually different from the second user interface object. In some embodiments, the first user interface object indicates the first operation that can be performed, and the second user interface object indicates that the second operation that can be performed. In some embodiments, the first user interface object does not indicate the second operation that can be performed, and the second user interface object does not indicate that the first operation can be performed.

Concurrently displaying multiple user interface objects (e.g., the first user interface object and/or the second user interface object) that cause the computer system to perform different operations in response to detecting the request to display additional information that corresponds to the representation of the media allows the computer system to provide the user with multiple additional control options that perform different operations based on the detected text in response to detecting the request to display additional information that corresponds to the representation of media, which provides additional control options without cluttering the user interface.

In some embodiments, wherein the user interface includes a third user interface object (e.g., 1680) (e.g., a user interface object corresponding to one or more text management operations, as described above in relation to method 1700), In some embodiments, the representation of media is concurrently displayed with the third user interface before the request to display additional information was detected and/or before the first user interface object and/or the second user interface object is displayed. In some embodiments, the request (e.g., 1650_a_, 1650_e_, 1650, 1650_k_1, and/or 1650_m_2) to display additional information that corresponds to the representation of media includes detecting an input that is directed to the third user interface object (e.g., while the third user interface object is displayed (concurrently with the representation of media)). In some embodiments, the third user interface object is displayed concurrently with the first user interface object after the first user interface object is displayed and/or concurrently with the second user interface object after the second user interface object is displayed. Displaying one or more user interface objects (e.g., the first user interface object and/or the second user interface object) that cause the computer system to perform one or more different operations in response to detecting an input that is directed to the third user interface object allows the user to initiate a process to display the additional controls by selection of the third user interface object, which provides additional control options without unnecessarily cluttering the user interface.

In some embodiments, in response to detecting the request (e.g., 1650_a_, 1650_e_, 1650, 1650_k_1, and/or 1650_m_2) to display additional information that corresponds to the representation of the media (e.g., that includes detecting the input that is directed to the third user interface object), the computer system visually emphasizes (e.g., enlarging, highlighting, and/or bolding) at least a first portion (e.g., 1662) (e.g., a portion of text and/or the detected) in the representation of the media relative to a second portion (e.g., wrench in 16B) (e.g., a portion of text and/or a portion of text that is not the detected text) in the representation of the media.

Visually emphasizing at least a first portion in the representation of the media relative to a second portion in the representation of the media provides visual feedback to a user about the portion of the representation of the media impacted and/or used when the computer system performs an operation based on selection of the first user interface and/or the second user interface object, which provides improved visual feedback.

In some embodiments, while displaying the first user interface object (e.g., 1690*a*-1690*g*) (and/or the second user interface object and/or the user interface object displayed in response to detecting the request to display the additional information that corresponds to the representation of the media), the computer system detects a request (e.g., 1650*n*3 and/or 1650*m*3) to cease display of additional information that corresponds to the representation of the media. In some embodiments, in response to detecting the request to cease display of additional information that corresponds to the representation of the media, the computer system ceases to display the first user interface object (e.g., as discussed above in relation to FIGS. 6B and 6N-6O) (and/or the second user interface object and/or the user interface object displayed in response to detecting the request to display the additional information that corresponds to the representation of the media). In some embodiments, as a part of detecting the request to cease display of additional information that corresponds to the representation of media, the computer system detects an input that is directed to the third user interface object as described above in relation to method 1700. Ceasing to display the first user interface object in response to detecting the request to cease display of additional information that corresponds to the representation of the media allows the user to control when the first user interface object (and/or the second user interface object) are displayed to avoid unnecessarily cluttering the user interface, which provides additional control options without unnecessarily cluttering the user interface.

In some embodiments, the first user interface object (e.g., 1690*c*) (or the second user interface object) is a user interface object for copying a third portion (e.g., that includes the detected text) of the representation of the media. In some embodiments, performing the first operation (or the second operation in the context of the second user interface object) includes copying the third portion of the representation of the media. In some embodiments, the computer system copies the third portion of the representation of media into a copy buffer. In some embodiments, the first operation (or the second operation) is an operation to copy (and, in some embodiments, to a copy buffer) the third portion of the representation of the media. Providing a user interface object that, when selected, causes the computer system to copy the third portion of the representation media in response to detecting the request to display additional information that corresponds to the representation of the media and when certain prescribed conditions are met allows the computer system to automatically provide the user with an additional control option for copying a portion of the representation of the media when the certain prescribed conditions are met, which performs an operation when a set of conditions has been met without requiring further user input and provides additional control options without cluttering the user interface.

In some embodiments, the first user interface object (e.g., 1690*b*) (or the second user interface object) is a user interface object for initiating a communication session. In some embodiments, performing the first operation (or the second operation in the context of the second user interface object) includes initiating a communication session (e.g., an e-mail messaging session, a text messaging session, a phone call, and/or a video call) (and, in some embodiments, to a copy buffer) (e.g., as discussed in relation to FIG. 16C) with a second computer system (and/or a user of the second computer system) that is associated with (e.g., via a phone number, e-mail address, and/or username associated with the second computer system) at least a first portion (e.g., a phone number, an e-mail, and/or a username in the detected text) of the detected text (e.g., 1662*b*). In some embodiments, the first operation is an operation to initiate the communication session. Providing a user interface object that, when selected, causes the computer system to initiate a communication session in response to detecting the request to display additional information that corresponds to the representation of the media and when certain prescribed conditions are met allows the computer system to automatically provide the user with an additional control option for initiating a communication session with another computer system that is associated with a portion of the detected text, which performs an operation when a set of conditions has been met without requiring further user input and provides additional control options without cluttering the user interface.

In some embodiments, the first user interface object (e.g., 1690*d*) (or the second user interface object) is a user interface object for converting a first value (e.g., a numerical value and/or an alpha-numerical value) with a first unit of measurement (e.g., 1630*a*) (e.g., such as, meters, inches, pints, pounds, yards, grams, miles, newtons, and/or hectares) to a second value (e.g., a numerical value and/or an alpha-numerical value) with a second unit of measurement (e.g., 1612) (e.g., such as, meters, inches, pints, pounds, yards, grams, miles, newtons, and/or hectares) that is different from the first unit of measurement. In some embodiments, performing the first operation (or the second operation in the context of the second user interface object) includes converting the first value with the first unit of measurement to the second value with the second unit of measurement. In some embodiments, the first value with the first unit of measurement equals and/or is equivalent to the second value with the second unit of measurement. In some embodiments, the first operation is an operation to convert the first value with the first unit of measurement to the second value with the second unit of measurement. In some embodiments, performing the first operation includes replacing display of the first value with the first unit of measurement with display of the second value with the second unit of measure in the detected text. Providing a user interface object that, when selected, causes the computer system to convert the first value with the first unit of measurement to the second value with the second unit of measurement in response to detecting the request to display additional information that corresponds to the representation of the media and when certain prescribed conditions are met allows the computer system to automatically provide the user with an additional control option for converting a first value with a first unit of measurement to a second value with a second unit of measurement when prescribed conditions are met, which performs an operation when a set of conditions has been met without requiring further user input and provides additional control options without cluttering the user interface.

In some embodiments, the first user interface object (e.g., 1690*f*) (or the second user interface object) is a user interface object for managing a first translation setting (e.g., a system setting, a system setting that activates and/or deactivates one or more operations (e.g., one or more automatic operations and/or one or more operations that occur without explicit user interface to translate text) that correspond to one or more translation functions and/or translation applications). In some embodiments, performing the first operation (or the second operation in the context of the second user interface object) includes: in accordance with a determination that the first translation setting is in a first state (e.g., an inactive state and/or an off state) (e.g., before the operation is performed), the computer system configures the computer system to operate in a translation mode (e.g., as described above in relation to FIG. 16M-16O). In some embodiments, while operating in the translation mode, the computer system is configured to translate one or more portions of the detected text (and configuring the transition setting to be in the second state). In some embodiments, in accordance with a determination that the translation setting is in the first state, the computer system displays a version of the detected text that has been translated (e.g., that is different from the original version of the detected text). In some embodiments, performing the first operation (or the second operation in the context of the second user interface object) includes: in accordance with a determination that the first translation setting is in a second state (e.g., an active state and/or an on state) that is different from the first state, the computer system configures the computer system to not operate in the translation mode (e.g., as described above in relation to FIG. 16M-16O). In some embodiments, in accordance with a determination that the translation setting is in the second state, the computer system displays a version of the detected text that has not been translated and/or does not display a version of the detected that has been translated. Providing a user interface object that, when selected, causes the computer system to be configured to operate or configured to not operate in the translation mode in response to detecting the request to display additional information that corresponds to the representation of the media and when certain prescribed conditions are met allows the computer system to automatically provide the user with an additional control option for changing whether the computer system is configured to operate in or not operate in the translation mode, which performs an operation when a set of conditions has been met without requiring further user input and provides additional control options without cluttering the user interface.

In some embodiments, the first user interface object (e.g., 1690*f*) is a user interface object for managing a second translation setting. In some embodiments, performing the first operation (or the second operation in the context of the second user interface object) includes ceasing to display a translated version of a second portion of the detected text (e.g., 1656) (e.g., as discussed above in relation to FIGS. 16M-16N) (and re-displaying a non-translated version of the second portion of the detected text and/or a version of the second portion of the detected text that was displayed before the request to display additional information that corresponds to the representation of the media was detected). In some embodiments, the computer system displays the translated version of the portion of the detected text in response to detecting the request to display additional information that corresponds to the representation of the media. In some embodiments, the translated version of the portion of the detected text is a portion of the detected text that was translated automatically and/or without an explicit user interface to translate the portion of the detected text that was translated. In some embodiments, the computer system displays the translated version of the portion of the detected text before detecting the request to display additional information that corresponds to the representation of the media. In some embodiments, the translated version of a portion of text includes one or more words that have been translated into another language that is different from the language of the words in the non-translated version of the detected text. Providing a user interface object that, when selected, causes the computer system to cease to display a translated version of a second portion of the detected text in response to detecting the request to display additional information that corresponds to the representation of the media and when certain prescribed conditions are met allows the computer system to automatically provide the user with an additional control option for undoing a translation (e.g., an automatic translation and/or a manual translation) of a portion of the detected text, which performs an operation when a set of conditions has been met without requiring further user input and provides additional control options without cluttering the user interface.

In some embodiments, the first user interface object (e.g., 1690*f*) (or the second user interface object) is a user interface object for managing a third translation setting. In some embodiments, performing the first operation (or the second operation in the context of the second user interface object) includes displaying (and/or inserting in the user interface) a translated version (e.g., 1658) of a third portion of the detected text (e.g., 1656) (e.g., that was not displayed before selection of the first user interface object) (e.g., as discussed above in relation to FIGS. 16N-16O). Providing a user interface object that, when selected, causes the computer system to display a translated version of a third portion of the detected text in response to detecting the request to display additional information that corresponds to the representation of the media and when certain prescribed conditions are met allows the computer system to automatically provide the user with an additional control option for displaying a translation of a portion of the detected text, which performs an operation when a set of conditions has been met without requiring further user input and provides additional control options without cluttering the user interface.

In some embodiments, the first user interface object (e.g., 1690*g*) (or the second user interface object) is a user interface object for scanning a fourth portion (e.g., 1658) (e.g., that includes the detected text) of the representation of the media. In some embodiments, performing the first operation (or the second operation in the context of the second user interface object) includes scanning the fourth portion of the representation of the media (e.g., as described above in relation to detecting input 1650*n*2) (and/or initiating a process to scan the fourth portion of the representation of media). In some embodiments, the fourth portion of the representation of media is the entire representation of media and/or a portion of the representation of media that is greater than 50% of the representation of the media. In some embodiments, after scanning the fourth portion of the representation of media, the computer system stores and/or initiates a process to store the representation of the media into a file format (e.g., .pdf, .doc, .img, .jpg, or .gif). In some embodiments, the representation of media is a document. Providing a user interface object that, when selected, causes the computer system to scan the fourth portion of the representation of the media in response to detecting the request to display additional information that corresponds to the representation of the media and when certain prescribed conditions are met allows the computer system to automatically provide the user with an additional control option for scanning a portion of the representation of the media, which performs an operation when a set of conditions has been met without requiring further user input and provides additional control options without cluttering the user interface.

In some embodiments, the first user interface object (e.g., 1690*e*) (or the second user interface object) is a user interface object for extracting one or more tables (e.g., data tables). In some embodiments, a fifth portion (e.g., that includes the detected text) of the representation of media includes a first table. In some embodiments, performing the first operation (or the second operation in the context of the second user interface object) includes copying (and/or extracting) the first table (e.g., as described above in relation to FIGS. 16I-16J). In some embodiments, the detected text includes the table. In some embodiments, as a part of copying the table, the computer system copies the table into an application that is different from the application in which the representation of media is displayed. Providing a user interface object that, when selected, causes the computer system to copy a table (e.g., in the detected text and/or in the representation of the media) in response to detecting the request to display additional information that corresponds to the representation of the media and when certain prescribed conditions are met allows the computer system to automatically provide the user with an additional control option for copying a table in the representation of the media, which performs an operation when a set of conditions has been met without requiring further user input and provides additional control options without cluttering the user interface.

In some embodiments, the first user interface object (e.g., 1690*e*) (or the second user interface object) is a user interface object for extracting information (e.g., data and/or text in one or more rows of the one or more tables) from one or more tables (e.g., data tables). In some embodiments, a fifth portion (e.g., that includes the detected text) of the representation of media includes a second table. In some embodiments, performing the first operation (or the second operation in the context of the second user interface object) includes displaying an indication that information (e.g., some and/or all of the information and/or the detected text) in the second table is selected (e.g., as described above in relation to FIGS. 16I-16J) (e.g., currently selected). In some embodiments, the selected information is the detected text. In some embodiments, while displaying an indication that information in the table is selected, the computer system indicates that other information in the table is not selected. In some embodiments, the computer system sends and/or adds the information that is indicated to be selected to an application (e.g., to a spreadsheet application). Providing a user interface object that, when selected, causes the computer system to display an indication that information in the table is second table is selected in response to detecting the request to display additional information that corresponds to the representation of the media and when certain prescribed conditions are met allows the computer system to automatically provide the user with an additional control option for selecting information from a table in the representation of the media, which performs an operation when a set of conditions has been met without requiring further user input and provides additional control options without cluttering the user interface.

In some embodiments, the first user interface object (e.g., 1690*a*) is a user interface object for managing one or more contacts. In some embodiments, performing the first operation includes adding a sixth portion of the representation of the media (e.g., a portion of the detected text) to a contact details form (e.g., as described above in relation to FIG. 16D) (e.g., a contract entry form and/or a contact details form for a particular contact (e.g., a contact of the user of the computer system and/or a contact that is associated with a different computer system than the computer system)). In some embodiments, performing the first operation includes initiating a process to add the sixth portion of the representation of the media and/or text from the sixth portion of the representation to media to a new or existing contact. In some embodiments, the sixth portion of the representation of media is text on a business card (e.g., that is represented in the representation of media). Providing a user interface object that, when selected, causes the computer system to add a sixth portion of the representation of the media to a contact details form in response to detecting the request to display additional information that corresponds to the representation of the media and when certain prescribed conditions are met allows the computer system to automatically provide the user with an additional control option for using at least a portion of the representation of the media and/or the detected text to create and/or manage details and/or information that is associated with a contact, which performs an operation when a set of conditions has been met without requiring further user input and provides additional control options without cluttering the user interface.

In some embodiments, the first user interface object is a user interface object for managing a shopping list, and wherein performing the first operation includes adding a seventh portion of the representation of the media (e.g., a portion of the detected text) to a list (e.g., in a reminder and/or a to-do-list application) (e.g., a shopping list, a to-do list, a reminder list, and/or a productivity list). Providing a user interface object that, when selected, causes the computer system to add a sixth portion of the representation of the media to a list in response to detecting the request to display additional information that corresponds to the representation of the media and when certain prescribed conditions are met allows the computer system to automatically provide the user with an additional control option for using at least a portion of the representation of the media to manage and/or create a shopping list (and/or another list of items), which performs an operation when a set of conditions has been met without requiring further user input and provides additional control options without cluttering the user interface.

In some embodiments, the first user interface object is a user interface object for managing medicine. In some embodiments, the first operations includes: identifying medical information (e.g., information about medicine and/or nutritional supplements medicine (e.g., dosage and/or type of medicine and/or nutritional supplements)) in the representation of media (e.g., in the detected text in the representation of media). In some embodiments, as a part of identifying medical information in the representation of media, the computer system scans and/or looks-up a barcode and/or identifies text (e.g., on a medicine bottle and/or a receipt) associated with medicine. In some embodiments, performing the first operation includes causing the medical information to be associated with a health application (e.g., a fitness application, a health-tracking application, an application for managing medical records, and/or an application for managing medicine) (with the permission of the user). In some embodiments, as a part of causing the medical information to be associated with the health application, the computer system sends instructions to the health application to add the medical information. In some embodiments, the medical information is added to a health account and/or another account that corresponds to a user (e.g., the user of the computer system and/or another user). Providing a user interface object that, when selected, causes the computer system to cause medical information to be associated with a health application in response to detecting the request to display additional information that corresponds to the representation of the media and when certain prescribed conditions are met allows the computer system to automatically provide the user with an additional control option for associating at least a portion of the representation of the media with a health application, which performs an operation when a set of conditions has been met without requiring further user input and provides additional control options without cluttering the user interface.

In some embodiments, the first user interface object is a user interface object for redeeming a gift card. In some embodiments, performing the first operation includes initiating a process to redeem a gift card based on an eighth portion of the representation of the media. In some embodiments, the eighth portion of the representation is identifying information (e.g., text (e.g., a bar code and/or a number) associated with the gift card and/or for redeeming the gift card)) associated with the gift card. In some embodiments, the process to redeem the gift card includes creating a reminder and/or a task and associating it with an application for managing tasks, lists, and/or reminders. Providing a user interface object that, when selected, causes the computer system to initiate process to redeem a gift card in response to detecting the request to display additional information that corresponds to the representation of the media and when certain prescribed conditions are met allows the computer system to automatically provide the user with an additional control option for redeeming a gift card, which performs an operation when a set of conditions has been met without requiring further user input and provides additional control options without cluttering the user interface.

In some embodiments, the first user interface object (e.g., 1688) is a user interface object for managing a barcode (e.g., 1652). In some embodiments, performing the first operation includes displaying first information (e.g., 1654) about a product (and/or service) that corresponds to a barcode, and wherein the barcode is displayed in the representation of the media. In some embodiments, as a part of displaying information corresponding to a barcode in a ninth portion of the representation of the media, the computer system scans the barcode. In some embodiments, the first information is displayed in a respective user interface object (e.g., a look-up card and/or a panel). In some embodiments, the respective user interface object overlays at least a portion of the representation of the media. In some embodiments, the first information and/or the look-up card includes information, such as information and/or links about the product, recipes using the product, reviews of the product, nutritional facts for the product, serving sizes for the product, and/or one or more options to adjust the serving size to determine how much a product would be used in the recipe. Providing a user interface object that, when selected, causes the computer system to display information about a product (and/or service) that corresponds to a barcode in response to detecting the request to display additional information that corresponds to the representation of the media and when certain prescribed conditions are met allows the computer system to automatically provide the user with an additional control option for providing information that is associated with a barcode, which performs an operation when a set of conditions has been met without requiring further user input and provides additional control options without cluttering the user interface.

In some embodiments, while displaying the representation (e.g., 630) of the media that includes the barcode (e.g., 1652) (and the user interface object for managing the barcode), the computer system detects an input (e.g., **1650*k*2**) that is directed to the barcode. In some embodiments, response to detecting the input (e.g., directed to the barcode, the computer system displays second information about the product that corresponds to the barcode. Displaying second information about the product that corresponds to the barcode in response to detecting the input directed to the barcode allows the computer system to display information about the barcode without displaying additional controls, which provides additional control options without cluttering the user interface.

In some embodiments, the user interface includes a fourth user interface object (e.g., 1680) (e.g., a user interface object corresponding to one or more text management operations, as described above in methods 800 and 900) that is displayed at a first location. In some embodiments, computer system detects the request (e.g., **1650*a*, 1650*e*, 1650, 1650*k*1, and/or 1650*m*2) to display additional information that corresponds to the representation (e.g., 630 and/or 1624*a*) of media includes detecting an input (e.g., 1650*a*, 1650*e*, 1650, 1650*k*1, and/or 1650*m*2) that is directed to the fourth user interface object (e.g., 1680). In some embodiments, in response to detecting the request to display additional information that corresponds to the representation of the media and in accordance with a determination that detected text (e.g., 1662, 1630*a*, 1630*b*, text in 648, 1652, and/or 1656) in the representation of media has the first set of properties, the first user interface object (e.g., 1688**) is displayed at the first location and the fourth user interface object is not displayed at the first location. In some embodiments in accordance with a determination that detected text in the representation of media has a second set of properties that is different from the first set of properties, the second user interface object is displayed at the first location and the fourth user interface object is not displayed at the first location. Displaying the first user interface object is displayed at the first location and not displaying the fourth user interface object at the first location in response to detecting the request to display additional information that corresponds to the representation of the media and in accordance with a determination that detected text in the representation of media has the first set of properties allows the computer system to displaying a user interface object that could be more relevant to the user at the first location and de-clutters the user interface, which performs an operation when a set of conditions has been met without requiring further user input and provides additional control options without cluttering the user interface.

In some embodiments, the computer system (e.g., 700) is in communication with one or more cameras. In some embodiments, the representation (e.g., 630) of media is a representation (e.g., 630) of visual content that is being captured (e.g., currently being captured and/or being captured with a small delay (e.g., 0.01-5 second delay)) by the one or more cameras (e.g., a live preview and/or a live representation of media). Displaying one or more user interface objects (e.g., the first user interface object and/or the second user interface object) that cause the computer system to perform one or more different operations in response to detecting the request to display additional information that corresponds to visual content that is being captured by the one or more cameras and when certain prescribed conditions are met allows the computer system to automatically provide the user with additional control options that cause the computer system to perform one or more operations based on live content, which performs an operation when a set of conditions has been met without requiring further user input and provides additional control options without unnecessarily cluttering the user interface.

In some embodiments, the representation (e.g., 1624*a*) of the media is a representation (e.g., 1624*a*) of previously captured media (e.g., visual content (e.g., data) that was previously captured by one or more cameras of the computer system and/or of a computer system that is different from the computer system). Displaying one or more user interface objects (e.g., the first user interface object and/or the second user interface object) that cause the computer system to perform one or more different operations in response to detecting the request to display additional information that corresponds to the representation of previously captured and when certain prescribed conditions are met allows the computer system to automatically provide the user with additional control options that cause the computer system to perform one or more operations based on previously captured content, which performs an operation when a set of conditions has been met without requiring further user input and provides additional control options without unnecessarily cluttering the user interface.

In some embodiments, one or more steps of method 1700 described above can also apply to a representation of video media, such as one or more live frames and/or paused frames of video media. In some embodiments, one or more steps of method 1700 described above can be applied to representation of media in user interfaces for applications that are different from the user interfaces described in relation to FIGS. 16A-16O, which include, but are not limited to, user interfaces corresponding to a productivity application (e.g., a note taking application, a spreadsheeting application, and/or a tasks management application), a web application, a file viewer application, and/or a document processing application, and/or a presentation application.

Note that details of the processes described above with respect to method 1700 (e.g., FIG. 17) are also applicable in an analogous manner to the other methods described herein. For example, method 1700 optionally includes one or more of the characteristics of the various methods described herein with reference to methods 800, 900, 1100, 1300, and 1500. For example, method 1700 optionally includes one or more of the characteristics of the various methods described herein with reference to methods 800, 900, 1100, and 1300, and 1500. For example, the computer system displays one or more user interface objects using method 1700 based on a set of criteria (e.g., visual prominence criteria) as described in relation to methods 800 and/or 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to allow the computer system to perform various functions for the user and/or to provide the user with an enhanced ability to manage visual content in media. For example, the computer system can use data from various source, such as images and/or video, to identify and scan medical information (e.g., medicine), as discussed above in relation to method 1000. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control over the type of visual content in the media that is managed. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data, including medical information that is scanned, processed, and/or gathered by the computer system, will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data, such as medical data gathered, processed, and/or scanned using one or more techniques as discussed above in relation to method 1700. That is, the present disclosure contemplates that hardware and/or software elements can be provided to prevent or block access to such personal information data. For example, in the case of targeted advertising (e.g., by detecting features in managed media), the present technology can be configured to allow users to select to “opt in” or “opt out” of participation in the collection of personal information data during registration for services or anytime thereafter. In another example, users can select not to provide data associated with content that the user has managed for the purposes of targeted advertising. In yet another example, users can select to limit the length of time data associated with content that the user has managed is maintained or entirely prohibit the development of a baseline profile, such as a profile that relates to health or medical data (e.g., using one or more techniques as discussed above in relation to method 1700). In addition to providing “opt in” and “opt out” options, the present disclosure contemplates providing notifications relating to the access or use of personal information, such as medical data. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user’s privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, visual content in media can be managed based on non-personal information data or a bare minimum amount of personal information, such as the content being requested by the device associated with a user, other non-personal information available to the source of the media, or publicly available information.

What is claimed is:

1. A computer system configured to communicate with a display generation component, comprising:

one or more processors; and memory storing one or more programs configured to be executed by the one or more processors, the one or more programs including instructions for:

displaying, via the display generation component, a media user interface that includes a representation of media;

while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including:

in accordance with a determination that the first detected feature is a first type of feature, the first indication has a first appearance; and in accordance with a determination that the first detected feature is a second type of feature that is different from the first type of feature, the first indication has a second appearance that is different from the first appearance.

2. The computer system of claim 1, wherein the one or more indications of detected features in the media includes a second indication of a second detected feature that is displayed at a second location in the representation of the media that corresponds to a location of the second detected feature of the representation of the media, including:

in accordance with a determination that the second detected feature is the first type of feature, the second indication has the first appearance; and in accordance with a determination that the second detected feature is the second type of feature that is different from the first type of feature, the second indication has the second appearance that is different from the first appearance.

3. The computer system of claim 2, wherein:

the first indication of the first detected feature is concurrently displayed with the second indication of the second detected feature; and the first detected feature is the first type of feature and the second feature is the second type of feature.

4. The computer system of claim 2, wherein:

the first indication of the first detected feature is concurrently displayed with the second indication of the second detected feature;

the first detected feature is different from the second detected feature; and the first detected feature is the first type of feature and the second feature is the first type of feature.

5. The computer system of claim 2, wherein:

the first indication that has the first appearance is displayed with a first color; and the first indication that has the second appearance is not displayed with the first color.

6. The computer system of claim 2, wherein:

the first indication that has the first appearance is displayed with a first graphical representation of the first type of feature; and the first indication that has the second appearance is displayed with a second graphical representation of the second type of feature that is different from the first graphical representation.

7. The computer system of claim 1, wherein:

the one or more indications of detected features in the media include a third indication of a third detected feature that is the first type of feature, a fourth indication of a fourth detected feature that is the first type of feature, and a fifth indication of a fifth detected feature that is the second type of feature;

the third indication is displayed with the same as the fourth indication; and the third indication is displayed with a different appearance than the fifth indication.

8. The computer system of claim 1, wherein receiving the request to display additional information about the plurality of detected features of the representation of the media includes detecting an input directed to a media library.

9. The computer system of claim 1, the one or more programs further including instructions for:

while displaying the first indication of the first detected feature, detecting a first input directed to the first indication of the first detected feature; and in response to detecting the first input directed to the first indication of the first detected feature, displaying, via the display generation component, a first user interface object that includes information about the first detected feature.

10. The computer system of claim 9, wherein the information about the first detected feature includes a representation of a portion of the media that corresponds to the first detected feature.

11. The computer system of claim 9, wherein the one or more indications of detected feature in media include a sixth indication of a sixth detected feature, the one or more programs further including instructions for:

while displaying the first user interface object that includes information about the first detected feature and the sixth indication of the sixth detected feature, detecting an input directed to the sixth indication of the sixth detected feature; and in response to detecting the input directed to the sixth indication of the sixth detected feature:

displaying, via the display generation component, a second user interface object that includes information about the sixth detected feature; and ceasing to display, via the display generation component, the first user interface object that includes information about the first detected feature.

12. The computer system of claim 9, wherein the information about the first detected feature includes an option to perform an action.

13. The computer system of claim 1, wherein:

the one or more indications include a seventh indication of a seventh detected feature;

displaying, via the display generation component, the one or more indications of detected feature in the media, includes displaying an animation of the first indication being displayed before the seventh indication of the seventh feature is displayed; and after displaying the animation, the first indication is concurrently displayed with the seventh indication.

14. The computer system of claim 1, the one or more programs further including instructions for:

while displaying the first indication of the first detected feature, detecting a second input directed to the first indication of the first detected feature; and in response to detecting the second input directed to the first indication of the first detected feature, displaying, via the display generation component, a third graphical representation of the first type of feature.

15. The computer system of claim 14, wherein the one or more indications of detected feature in media include a ninth indication of a ninth detected feature, the one or more programs further including instructions for:

while displaying the third graphical representation of the first type of feature and the ninth indication of the ninth detected feature, detecting an input directed to the ninth indication of the ninth detected feature; and in response to detecting the input directed to the ninth indication of the ninth detected feature, ceasing to display, via the display generation component, the third graphical representation of the first type of feature.

16. The computer system of claim 1, the one or more programs further including instructions for:

while displaying the first indication of the first detected feature, detecting a third input directed to the first indication of the first detected feature; and in response to detecting the third input directed to the first indication of the first detected feature, displaying, via the display generation component, a first user interface object that includes information about the first detected feature and information that corresponds to the representation of the media and does not correspond to the first detected feature.

17. The computer system of claim 16, wherein the information that corresponds to the representation of the media and does not correspond to the first detected feature includes metadata corresponding to the representation of the media.

18. The computer system of claim 16, wherein the information that corresponds to the representation of the media and does not correspond to the first detected feature includes one or more options for applying an effect.

19. The computer system of claim 16, wherein the information that corresponds to the representation of the media and does not correspond to the first detected feature includes one or more links to related content in a media library.

20. The computer system of claim 1, wherein:

the first indication is displayed at a first location on the display generation component in response to receiving the request to display additional information about the plurality of detected features;

the representation of the media is displayed with a first zoom level; and the one or more programs further including instructions for:

while displaying the first indication of the first detected feature at the first location and the representation of the media is displayed with a second zoom level, detecting a fourth input directed to the first indication of the first detected feature; and in response to detecting the fourth input directed to the first indication of the first detected feature, enlarging the representation of the media and displaying the first indication at a second location, wherein the second location is closer to a center of the display generation component than the first location.

21. The computer system of claim 1, wherein:

the plurality of detected feature includes a tenth detected feature that is a tenth type of detected feature; and displaying, via the display generation component, the one or more indications includes:

in accordance with a determination that a tenth location in the representation of the media that corresponds to a location of the tenth detected feature cannot be determined, displaying, via the display generation component, a tenth indication that corresponds to the tenth detected feature at a predetermined location on the media user interface.

22. The computer system of claim 21, wherein the tenth indication displayed at the predetermined location is concurrently displayed with the first indication that is displayed at the first location.

23. The computer system of claim 21, wherein:

the plurality of detected features include an eleventh detected feature; and displaying, via the display generation component, the one or more indications includes:

in accordance with a determination that an eleventh location in the representation of the media that corresponds to a location of the tenth detected feature cannot be determined and a twelfth location that corresponds to a location of the eleventh detected feature cannot be determined:

in accordance with a determination that the tenth detected feature and eleventh detected feature are a different type of detected feature, displaying, via the display generation component, an eleventh indication that corresponds to type of feature of eleventh detected feature at a second predetermined location in the media user interface; and in accordance with a determination that the tenth detected feature and eleventh detected feature are a same type of detected feature, forgoing displaying, via the display generation component, the eleventh indication.

24. The computer system of claim 23, the one or more programs further including instructions for:

while displaying the tenth indication, detecting an input directed to the tenth indication when the tenth detected feature and eleventh detected feature are the same type of detected feature; and in response to detecting the input directed to the tenth indication, displaying, via the display generation component, a user interface object that includes information about the tenth detected feature and information about the eleventh detected feature.

25. The computer system of claim 1, wherein displaying the media user interface includes displaying a first user interface object for displaying additional information concurrently with a user interface object for corresponding to one or more text management operations.

26. The computer system of claim 1, the one or more programs further including instructions for:

while displaying the representation of the media, receiving a request to display a second representation of second media that is different from the media; and in response to receiving the request to display the second representation of second media that is different from the media:

in accordance with a determination that the representation of the second media includes one or more detected features, displaying, via the display generation component, a second user interface object for displaying additional information; and in accordance with a determination that the representation of the media does not include the one or more detected feature, forgoing displaying, via the display generation component, the second user interface object for displaying additional information.

27. A non-transitory computer-readable storage medium storing one or more programs configured to be executed by one or more processors of a computer system, wherein the computer system is in communication with a display generation component, the one or more programs including instructions for:

displaying, via the display generation component, a media user interface that includes a representation of media;

while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including:

in accordance with a determination that the first detected feature is a first type of feature, the first indication has a first appearance; and in accordance with a determination that the first detected feature is a second type of feature that is different from the first type of feature, the first indication has a second appearance that is different from the first appearance.

28. A method, comprising:

at a computer system that is in communication with a display generation component:

displaying, via the display generation component, a media user interface that includes a representation of media;

while displaying the media user interface that includes the representation of the media, receiving a request to display additional information about a plurality of detected features in the representation of the media; and in response to receiving the request to display additional information about the plurality of detected features and while displaying the media user interface that includes the representation of the media, displaying one or more indications of detected features in the media, including a first indication of a first detected feature that is displayed at a first location in the representation of the media that corresponds to a location of the first detected feature in the representation of the media, including:

in accordance with a determination that the first detected feature is a first type of feature, the first indication has a first appearance; and in accordance with a determination that the first detected feature is a second type of feature that is different from the first type of feature, the first indication has a second appearance that is different from the first appearance.

* * * * *